United States Patent
Agarwal et al.

(10) Patent No.: US 12,459,207 B2
(45) Date of Patent: Nov. 4, 2025

(54) SYSTEMS AND METHODS FOR MANAGING ADDITIVE MANUFACTURING

(71) Applicant: Battelle Energy Alliance, LLC, Idaho Falls, ID (US)

(72) Inventors: Vivek Agarwal, Idaho Falls, ID (US); Sasa Kovacevic, Pullman, WA (US); John Buttles, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 975 days.

(21) Appl. No.: 17/570,306

(22) Filed: Jan. 6, 2022

(65) Prior Publication Data

US 2023/0211561 A1   Jul. 6, 2023

(51) Int. Cl.
| | |
|---|---|
| B29C 64/393 | (2017.01) |
| B33Y 50/02 | (2015.01) |
| G06F 30/12 | (2020.01) |
| G06F 111/20 | (2020.01) |
| G06F 113/10 | (2020.01) |
| G06Q 30/0283 | (2023.01) |

(52) U.S. Cl.
CPC ............ *B29C 64/393* (2017.08); *B33Y 50/02* (2014.12); *G06F 30/12* (2020.01); *G06Q 30/0283* (2013.01); *G06F 2111/20* (2020.01); *G06F 2113/10* (2020.01)

(58) Field of Classification Search
USPC ......................................................... 700/98
See application file for complete search history.

(56) References Cited

U.S. PATENT DOCUMENTS

| | | | |
|---|---|---|---|
| 9,895,845 B2 | 2/2018 | Bheda et al. | |
| 2013/0329258 A1* | 12/2013 | Pettis | ................... B29C 64/112 |
| | | | 358/1.15 |
| 2014/0208280 A1 | 7/2014 | Xu et al. | |
| 2019/0283328 A1 | 9/2019 | Schmidt et al. | |
| 2020/0050119 A1* | 2/2020 | Shores | .................... B22F 10/12 |
| 2020/0247057 A1* | 8/2020 | Bheda | .................... B33Y 50/02 |
| 2022/0107621 A1* | 4/2022 | Schwartz | ........... G05B 19/4063 |
| 2023/0264264 A1* | 8/2023 | Prentice | ................ B29C 64/393 |
| | | | 264/497 |

FOREIGN PATENT DOCUMENTS

| | | |
|---|---|---|
| CN | 108827768 A | 11/2018 |
| CN | 109571961 A | 1/2021 |
| WO | WO2018226709 A1 | 12/2018 |

\* cited by examiner

*Primary Examiner* — Mohammad Ali
*Assistant Examiner* — Joshua T Sanders
(74) *Attorney, Agent, or Firm* — Stoel Rives LLP

(57) ABSTRACT

A system for managing additive manufacturing (AM) may comprise a datastore configured to store entries pertaining to a design for a three-dimensional (3D) object. The entries may be configured to include a respective set of parameters for an AM process. The parameters may be configured to cause an AM system to produce 3D objects having anisotropic mechanical properties that satisfy specified anisotropic mechanical requirements. The system may further comprise a design manager configured to determine a set of parameters that optimally satisfy the specified requirements, e.g., satisfy the requirements at a minimal cost.

27 Claims, 35 Drawing Sheets

SYSTEMS AND METHODS FOR MANAGING ADDITIVE MANUFACTURING

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

BACKGROUND

Unless otherwise indicated herein, the approaches described in this section are not prior art to the claims in this disclosure and are not admitted to be prior art by inclusion in this section.

Additive manufacturing, also called three-dimensional (3D) printing, may comprise building objects layer by layer in an additive manner. This contrasts from traditional, "subtractive" manufacturing processes in which unwanted material is removed from a solid piece of material. Additive manufacturing (AM) processes may produce objects comprising anisotropic laminas, which may exhibit highly anisotropic mechanical and/or structural properties. The properties of these objects may be obtained with respect to a primary direction or axis, which may correspond to the direction along which layers of the object were formed during the AM process (and which typically corresponds to the dominant direction of loading to be endured by the object). For example, the "primary" mechanical properties of an object may be measured through pure tensile, compression and/or shear tests performed with respect to the primary axis or direction.

Parameters pertaining to the AM process, such as material type, infill density, infill geometry, and layer thickness can influence the mechanical properties of the resulting 3D objects. Although some information on the impact of these parameters on primary mechanical properties may be available in some situations, their impact on mechanical properties relative to other, non-primary axes or directions is not well understood. However, when used in real-world applications, objects may be subjected to loading in non-primary directions and/or along non-primary axes.

The parameters of the AM process can also impact production costs in terms of material consumption, manufacturing time, complexity, weight, and so on. Given these complexities, parameters are typically selected by trained personnel based on their experience, expertise, or even intuition. However, due to human subjectivity and the lack of objective information regarding relationships between these parameters and non-primary mechanical properties, it can be difficult, or even impossible, to consistently develop parameters that satisfy non-primary mechanical requirements while avoiding "over printing" (e.g., without incurring unnecessary costs due to use of excess material).

DETAILED DESCRIPTION

Figure 1A:
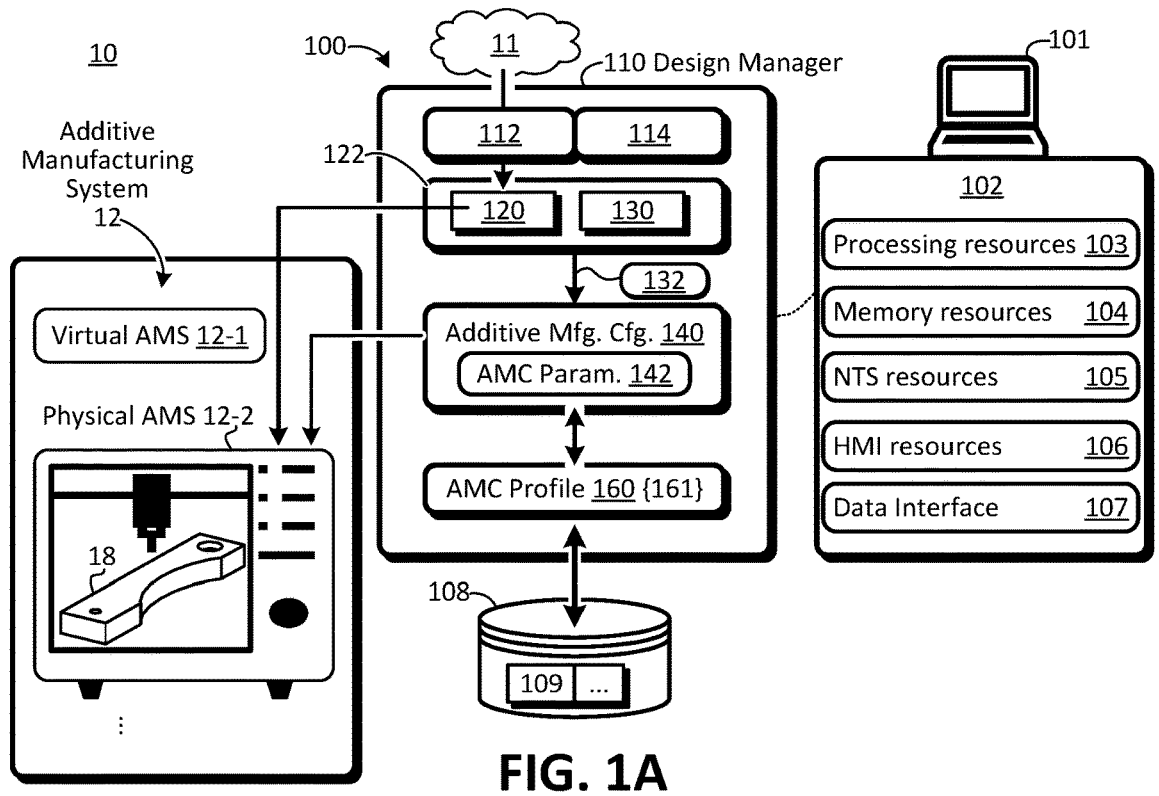
FIG. 1A illustrates an example operating environment including a system for managing AM operations.

FIG. 1A illustrates an example of an operating environment 10 in which aspects of system and methods for print fabrication parameter management may be practiced. The operating environment 10 may comprise an additive manufacturing system (AMS) 12. The AMS 12 may comprise any suitable means for implementing AM operations. In some implementations, the AMS 12 may comprise a simulated or virtual AMS 12-1; as disclosed in further detail herein, a virtual AMS 12-1 may comprise any suitable means for implementing AM operations pertaining to the production of simulated or virtual 3D object(s) through one or more simulated or virtual AM process(es). Alternatively, or in addition, the AMS 12 may comprise a physical AMS 12-2. The physical AMS 12-2 may comprise any suitable means for implementing AM operations pertaining to the production of physical 3D object(s), including, but not limited to: an AM device, a 3D printer, a 3D printing (3DP) device, a desktop manufacturing device, a fused deposition modeling (FDM) device, a fused filament fabrication (FFF) device, and/or the like.

The operating environment 10 may further include a system 100 configured to manage AM processes implemented by the AMS 12. The system 100 may comprise an apparatus 101. The apparatus 101 may comprise and/or be embodied by one or more physical components, which may include, but are not limited to: an electronic device, an AMS 12, a virtual AMS 12-1, a physical AMS 12-2, a computing device, a general-purpose computing device, an application-specific computing device, a mobile computing device, a smart phone, a tablet, a laptop, a server device, a distributed computing system, a cloud-based computing system, an embedded computing system, a programmable logic device, a field programmable gate array (FPGA), an application-specific integrated circuit (ASIC), an embedded device, an add-on device, a peripheral device, and/or the like.

As illustrated in FIG. 1A, the apparatus 101 may comprise and/or be coupled to computing resources 102, which may include, but are not limited to: processing resources 103, memory resources 104, non-transitory storage (NTS) resources 105, human-machine interface (HMI) resources 106, and data interface 107. The processing resources 103 may comprise any suitable processing means including, but not limited to: a processor, a processing unit, a physical processor, a virtual processor (e.g., a virtual machine), an arithmetic-logic unit (ALU), a central processing unit (CPU), a general-purpose processor, an ASIC, programmable logic, an FPGA, a System on Chip (SoC), virtual processing resources, or the like. The memory resources 104 may comprise any suitable memory means including, but not limited to: volatile memory, non-volatile memory, random access memory (RAM), dynamic RAM (DRAM), synchronous DRAM (SDRAM), cache memory, or the like. The NTS resources 105 may comprise any suitable non-transitory, persistent, and/or non-volatile storage means including, but not limited to: a non-transitory storage device, a persistent storage device, an internal storage device, an external storage device, a remote storage device, Network Attached Storage (NAS) resources, a magnetic disk drive, a hard disk drive (HDD), a solid-state storage device (SSD), a Flash memory device, and/or the like. The HMI resources 106 may comprise any suitable means for human-machine interaction including, but not limited to: input devices, output devices, input/output (I/O) devices, visual output devices, display devices, monitors, touch screens, a keyboard, gesture input devices, a mouse, a haptic feedback device, an audio output device, a neural interface device, and/or the like. The data interface 107 may comprise any suitable data communication and/or interface means including, but not limited to: a communication interface, an I/O interface, a network interface, an interconnect, and/or the like. The data interface 107 may be configured to couple the apparatus 101 and/or design manager 110 to one or more external devices and/or components, such as the AMS 12, a datastore 108, and/or the like. In some implementations, the data interface 107 is configured to couple the apparatus 101 to an electronic communication network 11, such as a wired network, a wireless network, a local area network (LAN), a wide area network (WAN), a virtual private network (VPN), Internet Protocol (IP) networks, Transmission Control Protocol/Internet Protocol (TCP/IP) networks, the Internet, or the like.

In some implementations, the apparatus 101 may further include a datastore 108. The datastore 108 may comprise any suitable data storage means, including, but not limited to: a non-transitory storage device, a persistent storage device, an internal storage device, an external storage device, a remote storage device, NAS resources, a magnetic disk drive, a HDD, an SSD, a Flash memory device, memory resources 104 of the apparatus 101, NTS resources 105 of the apparatus 101, a data management system (DMS), a database, a database management system (DBMS), a cloud-based storage system, and/or the like. The datastore 108 may be configured to maintain entries 109 pertaining to 3D object designs 120, as disclosed in further detail herein.

The apparatus 101 may further include a design manager 110. In some implementations, the design manager 110 may be implemented and/or embodied by computing resources 102 of the apparatus 101. For example, the design manager 110 may be configured for operation on processing resources 103 of the apparatus 101, utilize memory resources 104 of the apparatus 101, be embodied by computer-readable instructions stored within NTS resources 105 of the apparatus 101, and so on. Alternatively, or in addition, aspects of the design manager 110 may be implemented and/or realized by hardware components, such as application-specific processing hardware, an ASIC, FPGA, dedicated memory resources, and/or the like.

The design manager 110 may be configured to control and/or manage the manufacture of 3D objects. More specifically, the design manager 110 may be configured to manage AM of a 3D object design 120. As used herein, a design 120 may comprise any suitable information pertaining to an object or structure capable of being produced by or through additive manufacturing, e.g., a 3D printable object. A design 120 may include, but is not limited to: 3D object data, a digital 3D model, 3D a wireframe model, a 3D solid model, a parametric 3D model, a direct or explicit 3D model, a freedom surface model, computer aided design (CAD) data, a CAD model, a CAD file, 3D CAD data, a 3D CAD model, a 3D CAD file, stereolithography (STL) data, an STL file, AM data, an additive manufacturing file (AMF), and/or the like. The design 120 may be developed on a system that is separate and/or independent of the system 100 and/or apparatus 101, such as a CAD platform or the like; the design manager 110 may receive the design 120 through and/or by use of the HMI resources 106 and/or data interface 107 of the apparatus 101. In the FIG. 1A example, the design manager 110 may receive the design 120 through an electronic communication network 11. Alternatively, or in addition, the design manager 110 may comprise or be coupled to means for developing and/or refining the design 120 such as a CAD platform or the like (not shown in FIG. 1A to avoid obscuring details of the illustrated examples).

As disclosed in further detail herein, the design manager 110 may be configured to determine additive manufacturing configurations 140 for 3D object designs 120. As used herein, an additive manufacturing configuration (AMC) 140 refers to any suitable data for controlling, managing, implementing, performing, and/or otherwise configuring an AM process involving a 3D object design 120. For example, the AMC 140 determined for the 3D object design 120 illustrated in FIG. 1A may comprise data configured to control the additive manufacture of 3D objects by the AMS 12, e.g., may configure a physical AMS 12-2 to produce physical 3D objects. In some implementations, the AMC 140 determined for a design 120 may comprise and/or reference the 3D object design 120; the AMC 140 may comprise a design identifier, such as a name, a unique identifier, a globally unique identifier (GUID), a reference, a link, a uniform resource identifier (URI), a uniform resource locator (URL), a file identifier, a file name, a file path, and/or other information pertaining to the design 120.

An AMC 140 define and/or specify one or more additive manufacturing configuration (AMC) parameters 142. As disclosed in further detail herein, an AMC parameter 142 may pertain to any aspect of an AM process and/or AMS 12, including, but not limited to: material type, layout axis or direction, infill density, infill geometry, layer thickness, percentage of reinforcement filaments, distribution of reinforcement filaments, printing temperature, and/or the like. The AMC parameters 142 may, therefore, define, specify, manage, control and/or otherwise configure specified properties, characteristics, settings, and/or other aspects of the AM process(es) by which 3D objects of the design 120 are produced.

The AMC 140 utilized to control the additive manufacture of a 3D object design 120 may determine, inter alia, characteristics of the resulting additively manufactured objects 18. As used herein, an "additively manufactured object" (AMO) 18 may refer to any object or structure produced by or through an AM process; an AMO 18 may include, but is not limited to: an object, a 3D object, a 3D printed object, a structure, a 3D structure, a 3D printed structure, an AM structure, a part, a 3D printed part, an AM part, a mechanical part, a 3D printed mechanical part, an AM mechanical part, a component, a 3D printed component, an AM DC, a mechanical component, a 3D printed mechanical component, an AM DC, and/or the like. An AMO 18 may comprise physical objects or structures produced by and/or through physical additive manufacturing process(es), e.g., objects or structures produced by a physical AMS 12-2. Alternatively, or in addition, an AMO 18 may comprise simulated or virtual objects or structures produced by and/or through simulated or virtual additive manufacturing process(es), e.g., virtual or simulated AMO 18 produced by a virtual AMS 12-1, as disclosed in further detail herein.

As illustrated in FIG. 1A, the design manager 110 may determine an AMC 140 for a design 120 and, in response, may cause an AMS 12 to produce AMO 18 in accordance with the AMC 140. As used herein, an AMO 18 "of" or "resulting from" an AMC 140 and/or an AMO 18 produced "by," "through," "per," "in accordance with," "according to," "under," "using" or "utilizing" an AMC 140 may refer to an AMO 18 produced in one or more additive manufacturing process(es) controlled, managed, implemented, performed, and/or otherwise configured in accordance with the AMC 140 (e.g., additive manufacturing process(es) controlled by ACMP of the AMC 140). In other words, an AMO 18 "of" or "resulting from" an AMC 140 and/or an AMO 18 produced "by," "through," "per," "in accordance with," "according to," "under," "using" or "utilizing" an AMC 140 may refer to an AMO 18 produced by an AMS 12 controlled, managed, and/or otherwise configured by the AMC 140.

In some implementations, the design manager 110 may be configured to associate AMC 140 with respective profiles 160 (or AMC profiles 160). The profile 160 of an AMC 140 may be configured to model and/or quantify characteristics of the AMC 140, e.g., may comprise AMC characteristics 161, as disclosed in further detail herein. For example, the parameters 142 of an AMC 140 may influence, inter alia, anisotropic mechanical and/or structural properties of AMO 18 manufactured per the AMC 140; the profile 160 of an AMC 140 may comprise AMC characteristics 161 configured to model and/or predict the anisotropic mechanical and/or structural properties of AMO 18 manufactured under the AMC 140. The profile 160 may further comprise optimization metrics pertaining to the AMC 140, which may be configured to quantify costs and/or loss associated with the AMC 140, a utility of the AMC 140, and/or the like.

The design manager 110 may be configured to determine AMC 140 that satisfy requirements 130 specified for respective designs 120. As disclosed in further detail herein, the requirements 130 of a design 120 may be specified and/or associated with the design 120 in any suitable manner. For example, the requirements 130 of a design 120 may be included in the design 120 itself; the requirements 130 for a design 120 may be included in a design specification 122, as illustrated in FIG. 1A. The design specification 122 may further include AMS metadata pertaining to "target" AMS 12 for the design 120. As used herein, a "target" AMS 12 may refer to AMS 12 to be utilized to implement the AMC 140 determined by the design manager 110 to fabricate the design 120. In other words, the AMC 140 produced by the design manager 110 may be "targeted to" specified AMS 12. The AMS metadata associated with a design 120 may, for example, comprise information pertaining to the target AMS 12, such as capabilities of the target AMS 12, constraints of the target AMS 12, and/or the like. The design manager 110 may utilize the AMC metadata to configure AMC 140 that comply with capabilities, constraints, and/or limitations of the target AMS 12.

In some embodiments, the design manager 110 may comprise an analysis module 112 configured to, inter alia, a) determine and/or refine anisotropic mechanical and/or structural requirements (AM_REQ 132) for 3D object designs 120, and b) determine "suitable" AMC 140 for the designs 120. As used herein, a "suitable" AMC 140 for a design 120 may refer to an AMC 140 configured to produce AMO 18 that satisfy the anisotropic mechanical and/or structural requirements associated with the design 120. A "suitable" AMC 140 may, therefore, refer to an AMC 140 that defines parameters 142 configured to produce AMO 18 having anisotropic mechanical and/or structural properties that satisfy the anisotropic mechanical and/or structural requirements of the design 120. The suitability of an AMC 140 for a design 120 may, therefore, depend upon requirements 130 specified for the design 120. For example, an AMC 140 determined to be unsuitable for a design 120 for use under a first set of requirements 130 may be suitable for use in producing the same design 120 for use under a different set of requirements 130.

In some implementations, the analysis module 112 may be further configured to determine an "optimal" AMC 140 for a design 120. As disclosed in further detail herein, an "optimal" AMC 140 may refer to a suitable AMC 140 that is developed, refined, selected and/or otherwise determined based on one or more optimization criteria. For example, the "optimal" AMC 140 for a design 120 having specified requirements 130 may refer to an AMC 140 selected from a group of suitable AMC 140 (AMC 140 that satisfy the specified requirements 130 of the design 120), the selection based on optimization data determined for the suitable AMC 140, as disclosed in further detail herein (e.g., selection of an AMC 140 having a lowest cost, a highest utility, and/or the like).

In some implementations, the analysis module 112 may comprise and/or be coupled to an artificial intelligence and/or machine-learned (AI/ML) system 114. The AI/ML system 114 many comprise any suitable AI/ML means, including, but not limited to: a supervised learning AI/ML architecture, an unsupervised AI/ML architecture, a reinforcement AI/ML architecture, a deep learning AI/ML architecture, an artificial neural network (ANN), a convolutional neural network (CNN), a recurrent or recursive neural network (RNN), an AI/ML sorting architecture, an AI/ML clustering architecture, a generative model, and/or the like. The AI/ML system 114 may be configured to a) determine anisotropic mechanical and/or structural requirements for respective designs 120 (e.g., based on use conditions, such as force boundary conditions (FBC 230), as disclosed in further detail herein) and, in response, b) determine suitable or optimal AMC 140 for the designs 120.

Figure 1B:
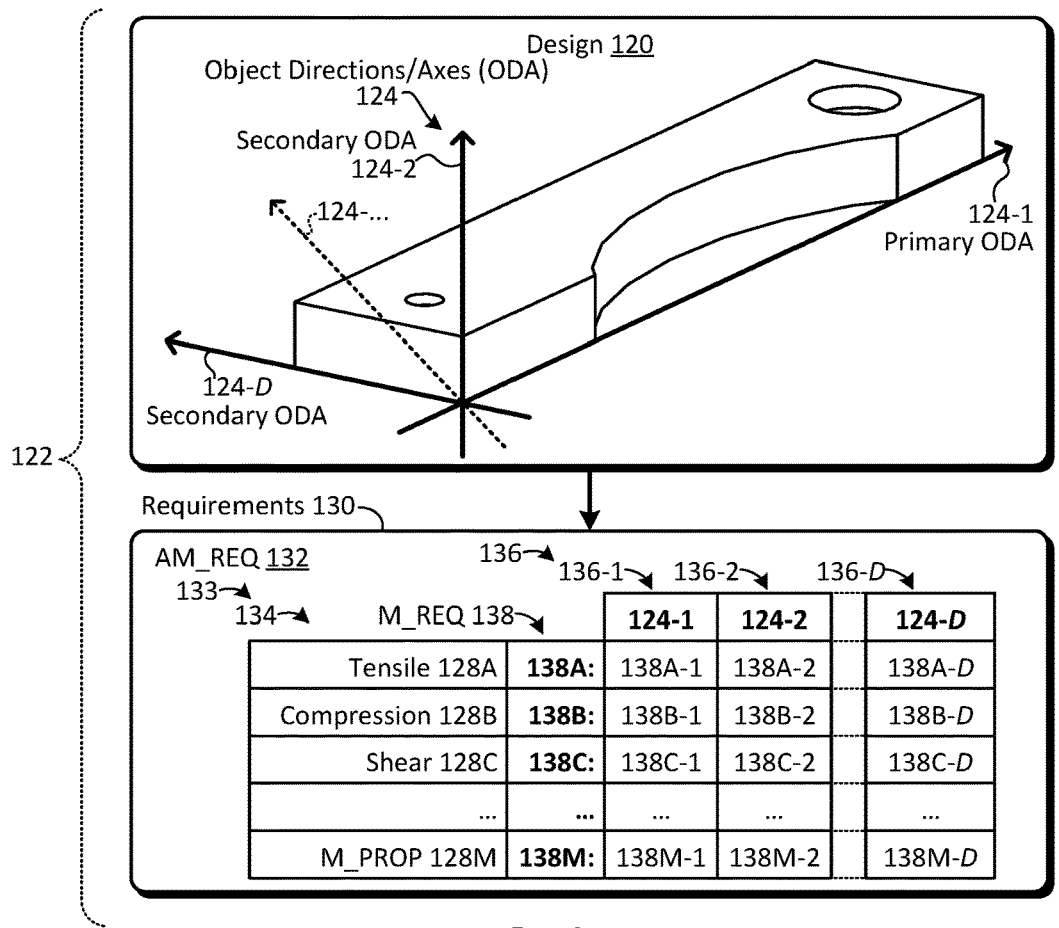
FIG. 1B illustrates an example of anisotropic mechanical requirements of a 3D object design.

As disclosed herein, in some implementations, the requirements 130 of a design 120 may comprise anisotropic mechanical and/or structural requirements (AM_REQ) 132. FIG. 1B illustrates an example of AM_REQ 132 of a design 120. The AM_REQ 132 may be represented, realized, and/or embodied by AM_REQ data 133. In the FIG. 1B example, the AM_REQ data 133 comprises an AM_REQ dataset (AM_REQ DS 134), the AM_REQ DS 134 comprising a plurality of mechanical and/or structural requirements (M_REQ) 138, each configured to define an M_REQ 138 for a specified mechanical and/or structural properties or characteristics (M_PROP) 128 with respect to a specified object direction or axis (ODA) 124, as disclosed in further detail herein. As used herein, an M_PROP 128 may refer to any suitable property or characteristic of a 3D object (e.g., an AMO 18), including, but not limited to: a mechanical property, a mechanical characteristic, a structural property, a structural characteristic, tensile strength, compression strength, shear strength, and/or the like. As used herein, an M_REQ 138 may refer to any suitable requirement, criterion, threshold, value, or quantity pertaining to an M_PROP 128. In the FIG. 1B example, the AM_REQ 132 may be configured to define M_REQ 138 for each of M_PROP 128A-M with respect to each of a plurality of ODA 124-1 through 124-D, including tensile strength M_REQ 138A for the tensile M_PROP 128A, compression strength M_REQ 138B for the compression M_PROP 128B, shear strength M_REQ 138C for the shear M_PROPR 128C, M_REQ 138M for M_PROP 128M, and so on.

As illustrated in FIG. 1B, the M_REQ 138 may be defined with respect to one or more ODA 124. As used herein, an ODA 124 may refer to any direction, axis, and/or other measure pertaining to a 3D object design 120 and/or additive manufacturing process. An ODA 124 may, for example, correspond to an axis of a coordinate system, such as an X, Y, and/or Z axis of a cartesian coordinate system, or the like. In the FIG. 1B example, the design 120 is associated with D ODA 124, including a primary ODA 124-1 and one or more secondary ODA 124-2 through 124-D.

In some implementations, the ODA 124 of a design 120 may be known or predetermined. For example, the ODA 124-1 through 124-D may be defined within the design 120 itself, may be defined by requirements 130 of the design 120, may be specified by a user, or the like. Alternatively, or in addition, one or more of the ODA 124 of a design 120 may be determined by the design manager 110. For example, the analysis module 112 may be configured to align the primary ODA 124-1 of the design 120 with direction(s), axes, and/or vector(s) along which primary or dominant force(s) or load(s) are to be applied to the 3D object, as disclosed in further detail herein. In some implementations, one or more non-primary or secondary ODA 124 of the design 120 (e.g., ODA 124-2 through 124-D) may be configured to be perpendicular and/or normal with respect to the primary ODA 124-1, as illustrated in the FIG. 1B example. Alternatively, or in addition, one or more of the secondary ODA 124-2 through 124-D may be non-orthogonal with respect to the primary ODA 124-1.

As disclosed herein, the AM_REQ 132 of a design 120 may define anisotropic M_REQ 138 for specified M_PROP 128; the M_REQ 138 may be configured to define requirements, such as thresholds, quantities, values, and/or other criteria for respective M_PROP 128 with respect to specified ODA 124, such as the primary ODA 124-1 and one or more secondary ODA 124-2 through 124-D. As illustrated in FIG. 1B, the AM_REQ 132 may comprise an AM_REQ DS 134 comprising M×D M_REQ 138, each defining an M_REQ 138 for one of M M_PROP 128 with respect to one of D ODA 124. In some implementations, the M_REQ 138 may comprise multivalued data elements, such as vectors, tuples, multivalued attributes, arrays, or the like. As illustrated in FIG. 1B, the AM_REQ 132 may comprise tensile M_REQ 138A configured to specify tensile strength M_REQ 138A-1 through 138A-D with respect to each of ODA 124-1 through 124-D (e.g., M_REQ 138A-1 specifying a tensile strength threshold in the primary ODA 124-1, M_REQ 138A-2 specifying a tensile strength threshold in the secondary ODA 124-2, and so on). The AM_REQ 132 may further comprise compression M_REQ 138B configured to specify compression strength M_REQ 138B-1 through 138B-D with respect to one or more of ODA 124-1 through 124-D, a shear M_REQ 138C configured to specify shear strength M_REQ 138C-1 through 138C-D with respect to one or more of ODA 124-1 through 124-D, M_REQ 138M configured to specify M_REQ 138M-1 through 138-D for M_PROP 128M with respect to one or more of ODA 124-1 through 124-D, and so on.

Although particular examples of AM_REQ 132 are described herein, the disclosure is not limited in this regard. The design manager 110 may be configured for AM_REQ 132 having any suitable arrangement or organization. For example, in some implementations, the AM_REQ 132 of a design 120 may comprise M_REQ 138 organized by ODA 124. As illustrated in the FIG. 1B example, the AM_REQ 132 may comprise a plurality of ODA_REQ datasets (ODA_REQ DS 136), each ODA_REQ DS 136 configured to define M_REQ 138 for a specified ODA 124; the AM_REQ DS 134 may comprise a primary ODA_REQ DS 136-1 configured to define M_REQ 138A-1 through 138M-1 (for M_PROP 128A-M) with respect to the primary ODA 124-1, a secondary ODA_REQ DS 136-2 configured to define M_REQ 138A-2 through 138M-2 (for M_PROP 128A-M) with respect to the secondary ODA 124-2, a secondary ODA_REQ DS 136-D configured to define M_REQ 138A-D through 138M-D (for M_PROP 128A-M) with respect to the secondary ODA 124-D, and so on. The AM_REQ DS 134 may, therefore, comprise a primary ODA_REQ DS 136-1 comprising M_REQ 138 defined with respect to the primary ODA 124-1 and one or more secondary ODA_REQ DS 136-2 through 124-D, each defining M_REQ 138 with respect to a respective secondary ODA 124-2 through 124-D.

Moreover, the AM_REQ 132 disclosed herein may be defined at any suitable granularity level. As used herein, the granularity level of AM_REQ 132, such as the AM_REQ 132 illustrated in FIG. 1B, may refer to a level of granularity at which the AM_REQ 132 are defined and/or specified with respect to the design 120. In the FIG. 1B example, the AM_REQ 132 comprises an AM_REQ DS 134 configured to define anisotropic M_REQ 138 for the design 120 as a whole (e.g., define AM_REQ 132 over the 3D structure of the design 120). The AM_REQ 132 may, therefore, correspond to a design granularity level. The disclosure is not limited in this regard, however, and could be adapted to define AM_REQ 132 at any suitable level of granularity. For example, the AM_REQ 132 of a design 120 may be defined at or within respective design locations as illustrated in FIGS. 3B-3E, 6A and 6B, may be defined for respective design locations of respective design components 420, as illustrated in FIGS. 4, 7A, and 7B, and/or the like.

The AM_REQ 132 of a design 120 may correspond to expected use conditions. In some implementations, the AM_REQ 132 for a design 120 may be known or predetermined. By way of non-limiting example, a design 120 may be associated with a set of user-specified M_REQ 138 (e.g., may define thresholds for specified M_PROP 128 with respect to each of a plurality of ODA 124, as disclosed herein). In another non-limiting example, the 3D object design 120 may be intended for use within a mechanical system, which may define requirements 130 (and/or AM_REQ 132) for AMO 18 utilized within the mechanical system.

Figure 2:
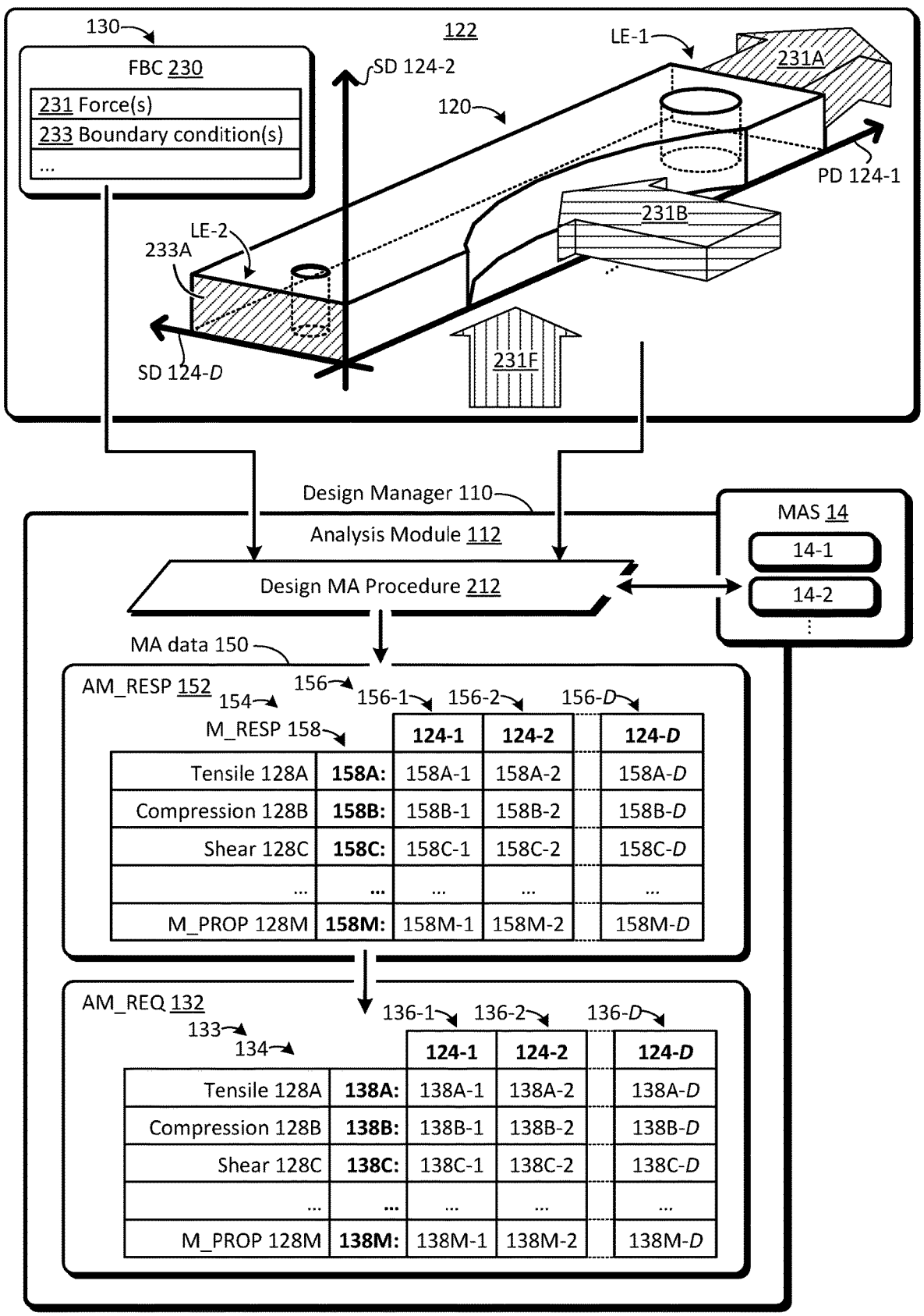
FIG. 2 is a schematic block diagram illustrating an example of a design manager configured to determine anisotropic mechanical and/or structural requirements for a 3D object design.

Alternatively, or in addition, in some embodiments, the design manager 110 may be configured to determine one or more AM_REQ 132 for a design 120, as illustrated in FIG. 2. The design manager 110 may receive a design specification 122 comprising a 3D object design 120 and requirements 130. The requirements 130 may comprise information from which AM_REQ 132 for the design 120 may be derived. In the FIG. 2 example, the requirements 130 may define FBC 230 for the design 120. The FBC 230 may be configured to model forces and/or mechanical loading conditions that AMO 18 of the design 120 may be required to withstand. More specifically, the FBC 230 may define one or more force(s) 231 to be applied to the AMO 18 in accordance with specified boundary condition(s) 233.

In the FIG. 2 example, the analysis module 112 of the design manager 110 may comprise and/or be coupled to a mechanical and/or structural analysis system (MAS) 14. The MAS 14 may comprise any suitable means for implementing mechanical and/or structural analysis (MA) operations pertaining to the design 120. The MAS 14 may comprise a simulated or virtual MAS 14-1. The virtual MAS 14-1 may comprise any suitable means for implementing MA operations pertaining to simulated or virtual 3D objects (e.g., 3D object designs 120, virtual AMO 18, or the like), including, but not limited to: a CAD system, a CAD analysis system, a 3D CAD system, a 3D CAD analysis system, an MDA system, a CAE system, a CAM system, a parametric feature-based modeling system, a freedom surface system, a PLM system, a digital prototyping system, an additive manufacturing simulation system, a virtual AM system, a mathematical modeling system, a structural analysis system, a finite element analysis (FEA) system, a finite element method (FEM) mechanical analysis system, a finite difference method (FDM) mechanical analysis system, and/or the like. Alternatively, or in addition, aspects of the MA operations may be implemented by use of a physical MAS 14-2, as disclosed in further detail herein.

The analysis module 112 may be configured to determine AM_REQ 132 for a 3D object design 120 through implementation of a design MA procedure 212. The design MA procedure 212 may comprise a) determining MA data 150 for the design 120 and b) deriving AM_REQ 132 for the design 120 from the MA data 150. The MA data 150 may be configured to model and/or quantify an anisotropic mechanical and/or structural response (AM_RESP) 152 of the design 120 to specified FBC 230. The MA data 150 may be determined through one or more MA operations. The MA operations may include, but are not limited to structural analysis operations, tensile analysis operations, compression analysis operations, shear analysis operations, linear stress analysis operations, deformation analysis operations, FEM analysis operations, FDM analysis operations, and/or the like.

The FBC 230 evaluated by the analysis module 112 may define any suitable force(s) 231 to be applied to the 3D object design 120 in accordance with any suitable boundary condition(s) 233. In the FIG. 2 example, the FBC 230 may be configured to model, inter alia, F forces 133A-F, including a force 231A applied at first longitudinal end of the 3D object design 120 (LE-1) while a second, opposite longitudinal end (LE-2) is fixed in accordance with the boundary condition 233A (e.g., a tensile load). The FBC 230 may further define a force 231B to be applied along ODA 124-D, a force 231F to be applied along ODA 124-2, and so on. In some implementations, the FBC 230 may define boundary condition(s) 233 for respective force(s) 231B-F (e.g., each force 231 may comprise a different, respective set of boundary conditions 233). Alternatively, a plurality of forces 133A-F of the FBC 230 may be evaluated under a common set of boundary conditions 233A, as illustrated in the FIG. 2 example.

In some implementations, the analysis module 112 may be configured to identify the primary or dominant load(s) imposed on the design 120 by the FBC 230 and determine and/or align ODA 124 of the design 120 accordingly. The primary or dominant load(s) may be identified based on MA analysis of the design 120; the primary or dominant load(s) may be identified based on a magnitude of the force(s) 231 defined by the FBC 230, the AM_RESP 152 of the 3D object design 120 to the FBC 230 (e.g., mechanical loads and/or stress imposed on the design 120 under the FBC 230), and/or the like. In the FIG. 2 example, the analysis module 112 may determine that the primary or dominant load on the design 120 is produced by the force 231A and, in response, may align the primary ODA 124-1 of the design 120 along the longitudinal direction or axis in which the force 231A is applied. The analysis module 112 may be further configured align secondary ODA 124-2 through 124-D with secondary or non-dominant load(s); the analysis module 112 may be configured to align ODA 124-2 with force 231F, align ODA 124-D with force 231B, and so on. Alternatively, or in addition, the analysis module 112 may configure secondary ODA 124-2 through 124-D to be substantially orthogonal or normal to the primary ODA 124-1. For example, the primary 124-1 may correspond to an X axis, ODA 124-2 may correspond to a Z axis, and ODA 124-D may correspond to a Y axis of a 3D cartesian coordinate system.

As disclosed herein, the MA data 150 determined by the analysis module 112 may be configured to model the AM_RESP 152 of the design 120 to the FBC 230. The MA data 150 may be configured to model any suitable aspect of the AM_RESP 152, including, but not limited to deformation, displacement, strain, load, tensile load, tensile strain, tensile stress, compression load, compression strain, compression stress, shear load, shear strain, shear stress, stress, and/or the like. In some embodiments, the MA data 150 may comprise mechanical and/or structural response quantities or values (M_RESP) 158 configured to model the AM_RESP 152 of respective M_PROP 128 with respect to a plurality of ODA 124 (e.g., with respect to the primary ODA 124-1 and one or more secondary ODA 124-2 through 124-D).

The analysis module 112 may be configured to model the AM_RESP 152 of the design 120 at any suitable granularity level. As used herein, the granularity level of an AM_RESP 152 may refer to a level of granularity at which the corresponding MA data 150 is configured to model the AM_RESP 152 of the design 120. In the FIG. 2 example, the AM_RESP 152 comprises an AM_RESP dataset (AM_RESP DS 154) comprising M×D M_RESP 158, each M_RESP 158 configured to model and/or quantify a specified one of M M_PROP 128 with respect to a specified one of D ODA 124. The AM_RESP DS 154 may be configured to model the AM_RESP 158 of the design 120 as a whole. The AM_RESP 152 may, therefore, correspond to the design granularity level. The disclosure is not limited in this regard, however, and could be adapted to model the AM_RESP 152 of a design 120 at any suitable granularity level. For example, the AM_RESP 152 of a design 120 may be modeled at or within respective design locations, as illustrated in FIGS. 3B-3E, at respective design locations of respective design components 420, as illustrated in FIG. 4, and/or the like.

As disclosed above, the MA data 150 of the FIG. 2 example may comprise an AM_RESP DS 154 configured to model the AM_RESP 152 of the design 120 (may be defined at the design granularity level); the AM_RESP DS 154 may comprise M×D M_RESP 158, each M_RESP 158 configured to model and/or quantify a specified one of M M_PROP 128 with respect to a specified one of D ODA 124. By way of non-limiting example, the AM_RESP DS 154 may comprise a tensile M_RESP 158A configured to model the tensile M_PROP 128A of the design 120 under the FBC 230 (e.g., M_RESP 158A-1 through 158A-D configured to model the response of the tensile M_PROP 128A in ODA 124-1 through 124-D, respectively), a compression M_RESP 158B configured to model the compression M_PROP 128B (e.g., M_RESP 158B-1 through 158B-D configured to model the response of the compression M_PROP 128B in ODA 124-1 through 124-D, respectively), a shear M_RESP 158C configured to model the shear M_PROP 128C (e.g., M_RESP 158C-1 through 158C-D configured to model the response of the shear M_PROP 128C in ODA 124-1 through 124-D, respectively), an M_RESP 158M configured to model M_PROP 128M (e.g., M_RESP 158M-1 through 158M-D configured to model the response of M_PROP 128M in ODA 124-1 through 124-D, respectively), and so on.

Alternatively, or in addition, the M×D M_RESP 158 may be arranged and/or organized into respective ODA_RESP datasets (ODA_RESP DS 156), each ODA_RESP DS 156 configured to model and/or quantify the AM_RESP 152 of the design 120 with respect to a specified ODA 124 (e.g., one of ODA-1 through 124-D). In the FIG. 2 example, the MA data 150 may comprise a primary ODA_RESP DS 156-1 configured to model M_PROP 128A through 128M with respect to the primary ODA 124-1 (e.g., M_RESP 158A-1 through 158M-1), a ODA_RESP DS 156-2 configured to model M_PROP 128A through 128M with respect to the secondary ODA 124-2 (e.g., M_RESP 158A-2 through 158M-2), a ODA_RESP DS 156-D configured to model M_PROP 128A through 128M with respect to the secondary ODA 124-D (e.g., M_RESP 158A-D through 158M-D), and so on. The AM_RESP 152 may, therefore, comprise a primary ODA_RESP DS 156-1 configured to model the M_RESP 158 of the design 120 with respect to the primary ODA 124-1 and one or more secondary ODA_RESP DS 156-2 through 156-D, each configured to model the M_RESP 158 of the design 120 with respect to a respective secondary ODA 124-2 through 124-D.

Although particular examples of MA data 150 are described herein, the disclosure is not limited in this regard. The design manager 110 may be adapted to model the AM_RESP 152 of a design 120 to specified FBC 230 at any suitable granularity level, in any suitable manner, using any suitable data types for formats (e.g., any suitable type of M_RESP 158), having any suitable arrangement or organization (e.g., multivalued M_RESP 158 organized by M_PROP 128, ODA_RESP DS 156 organized by ODA 124, and/or the like). Likewise, although particular examples of FBC 230 are described herein, the disclosure is not limited in this regard; the analysis module 112 may be adapted to implement design MA procedures 212 and/or model the AM_RESP 152 of 3D object designs 120 to any suitable type of mechanical and/or structural loading conditions defined in any suitable manner.

The design MA procedure 212 may further comprise determining AM_REQ 132 for the design 120 based, at least in part, on the AM_RESP 152 of the design 120 to the specified FBC 230. The AM_REQ 132 may be defined at a level of granularity corresponding to the granularity level of the AM_RESP 152. In the FIG. 2 example, the AM_RESP 152 is defined at the design granularity level and, as such, the AM_REQ 132 may also be defined at the design granularity level, as illustrated in FIG. 1B.

In the FIG. 2 example, the AM_REQ 132 may be represented, realized, and/or embodied by an AM_REQ dataset (AM_REQ DS 134). The AM_REQ DS 134 may comprise M×D M_REQ 138, each configured to define an M_REQ 138 for a specified M_PROP 128 with respect to a specified ODA 124. The M_REQ 138 of the AM_REQ DS 134 may be derived from M_RESP 158 of the AM_RESP 152. For example, the analysis module 112 may: derive a tensile strength M_REQ 138A-1 for the primary ODA 124-1 from the tensile M_RESP 158A-1 of the MA data 150, derive a compression strength M_REQ 138B-2 for the secondary ODA 124-2 from the compression M_RESP 158B-2, derive a shear strength M_REQ 138C-D for the secondary ODA 124-D from the compression M_RESP 158C-D, and so on.

In some embodiments, the M_RESP 158 may comprise multivalued data elements configured to model the AM_RESP 152 of respective M_PROP 128 in each of ODA 124-1 through 124-D. The analysis module 112 may be configured to derive multivalued M_REQ 138 from corresponding multivalued M_RESP 158, e.g., may derive tensile M_REQ 138A {124-1, . . . 124-D} (or M_REQ 138A-1 through 138A-D) from the tensile M_RESP 158A {124-1, . . . 124-D} (or M_RESP 158A-1 through 158A-D) of the design 120, derive compression M_REQ 138B {124-1, . . . 124-D} (or M_REQ 138B-1 through 138B-D) from the compression M_RESP 158B {124-1, . . . 124-D} (or M_RESP 158B-1 through 158B-D), derive shear M_REQ 138C {124-1, . . . 124-D} (or M_REQ 138C-1 through 138C-D) from the shear M_RESP 158C {124-1, . . . 124-D} (or M_RESP 158C-1 through 158C-D), derive M_REQ 138M {124-1, . . . 124-D} (or M_REQ 138M-1 through 138M-D) from M_RESP 158M {124-1, . . . 124-D} (or M_RESP 158M-1 through 158M-D), and so on.

Alternatively, or in addition, the analysis module 112 may be configured to determine and/or organize the M_REQ 138 of the AM_REQ 132 by ODA 124. For example, the AM_REQ DS 134 may comprise D ODA_REQ DS 136, each configured to define M_REQ 138A-M for respective M_PROP 128A-M with respect to a specified ODA 124. The analysis module 112 may be configured to derive the ODA_REQ DS 136-1 from the ODA_RESP DS 156-1 (e.g., derive M_REQ 138A-1 through 138M-1 from M_RESP 158A-1 through 158M-1), derive the ODA_REQ DS 136-2 from the ODA_RESP DS 156-2 (e.g., derive M_REQ 138A-2 through 138M-2 from M_RESP 158A-2 through 158M-2), derive the ODA_REQ DS 136-D from the ODA_RESP DS 156-D (e.g., derive M_REQ 138A-D through 138M-D from M_RESP 158A-D through 158M-D), and so on.

In some implementations, the M_REQ 138 may be configured to exceed corresponding M_RESP 158 quantities by a predetermined margin, percentage, or other function. In a first non-limiting example, M_REQ 138 may be configured to exceed corresponding M_RESP 158 by 10% or the like. For instance, tensile M_REQ 138A-1 through 138A-D may be configured to exceed corresponding tensile quantities M_RESP 158A-1 through 158A-D by a predetermined weight W. Similarly, compression M_REQ 138B-1 through 138B-D may be configured to exceed corresponding compression quantities M_RESP 158B-1 through 158B-D, shear M_REQ 138C-1 through 138C-D may be configured to exceed corresponding shear quantities M_RESP 158B-1 through 158B-D, and so on.

In a second non-limiting example, the analysis module 112 may configure the M_REQ 138 to exceed load, stress, and/or strain quantities of corresponding M_RESP 158 by property-specific margins $W_P$. For example, tensile M_REQ 138A-1, 138A-2, and 138A-D may be set to M_RESP 158A-1*$W_T$, M_RESP 158A-2*$W_T$, M_RESP 158A-D*$W_T$, respectively (where $W_T$ is a tensile-specific margin). Similarly, compression M_REQ 138B-1 ... 138B-D may be set to M_RESP 158B-1*$W_C$ ... 158B-D*$W_C$, shear M_REQ 138C-1 ... 138C-D may be set to M_RESP 158C-1*$W_S$ ... 158C-D*$W_S$, M_REQ 138M-1 ... 138M-D may be set to M_RESP 158M-1*$W_S$ ... 158M-D*$W_S$, and so on (where $W_C$ is a compression-specific margin, $W_S$ is a shear specific margin, and WM is specific to M_PROP 128M).

In a third non-limiting example, determining M_REQ 138 for the AM_REQ DS 134 may comprise scaling corresponding M_RESP 158 quantities by specified anisotropic weighting factors $W_{M_{PROP},ODA}$. For instance, tensile M_REQ 138A-1, 138A-2, 138A-D may be set to M_RESP 158A-1*$W_{T,1}$, 158A-2*$W_{T,2}$, 158A-D*$W_{T,D}$, respectively (where $W_{T,1}$, $W_{T,2}$, $W_{T,D}$ are tensile weighting factors for ODA 124-1, 124-2, and 124-D). Similarly, compression M_REQ 138B-1, 138B-2, 138B-D may be set to M_RESP 158B-1*$W_{C,1}$, 158B-2*$W_{C,2}$, 158B-D*$W_{C,D}$, shear M_REQ 138C-1, 138C-2, 138C-D may be set to M_RESP 158C-1*$W_{S,1}$, 158C-2*$W_{S,2}$, 158C-D*$W_{S,D}$, M_REQ 138M-1, 138M-2, 138M-D may be set to M_RESP 158M-1*$W_{M,1}$, 158M-2*$W_{M,2}$, 158M-D*$W_{M,D}$, and so on.

In a fourth non-limiting example, M_REQ 138 for specified M_PROP 128 and ODA 124 may be set in accordance with a mapping function $f_{M\_PROP,OSA}$, as follows: M_REQ$_{M\_PROP,OSA}$=$f_{M\_PROP,OSA}$(M_RESP$_{M\_PROP,OSA}$), where $f_{M\_PROP,OSA}$ is a function configured to derive M_REQ 138 for a specified M_PROP 128 with respect to a specified ODA 124 (M_REQ$_{M\_PROP,OSA}$) from the corresponding M_RESP 158 of the MA data 150 (from M_RESP$_{M\_PROP,OSA}$).

In some embodiments, the analysis module 112 may comprise and/or be coupled to an AI/ML system 114, as illustrated in FIG. 1A (AI/ML system 114 not shown in FIG. 2 to avoid obscuring details of the illustrated examples). The AI/ML system 114 may be configured to control and/or implement aspects of a design MA procedure 212. For example, the AI/ML system 114 may be configured to model FBC 230 specified for designs 120 (per requirements 130 associated with the designs 120), model the AM_RESP 152 of the designs 120 to the FBC 230, and derive AM_REQ 132 for the designs 120 based, at least in part, on the resulting MA data 150.

In some embodiments, the M_RESP 152 of a design 120 to specified FBC 230 may vary by design location, region, or volume (e.g., may vary by design unit 121). As used herein, a design unit (DU) 121 may comprise and/or correspond to any suitable portion of a 3D object design 120, such as a section of a 3D object design 120, a region of the design 120, a segment of the design 120, a point within the design 120 (e.g., a point defined by a 3D coordinate system, such as cartesian x, y, and z coordinates), a volume within the design 120 (e.g., a voxel), and/or the like.

Figure 3A:
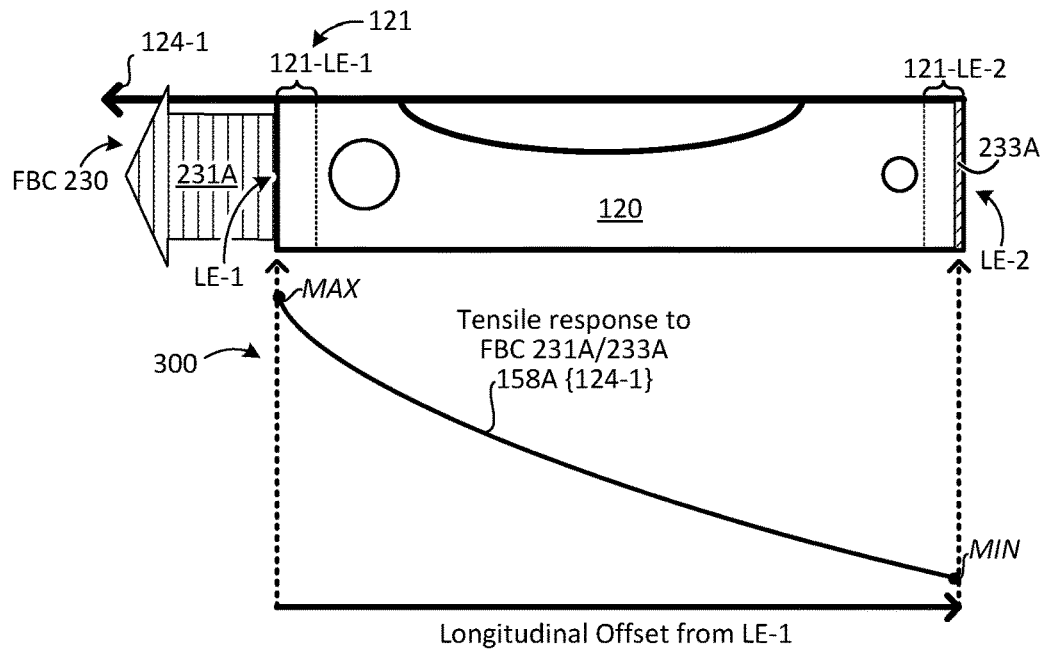
FIG. 3A illustrates a location-variant response of a 3D object design to specified force boundary conditions.
Figure 3B:
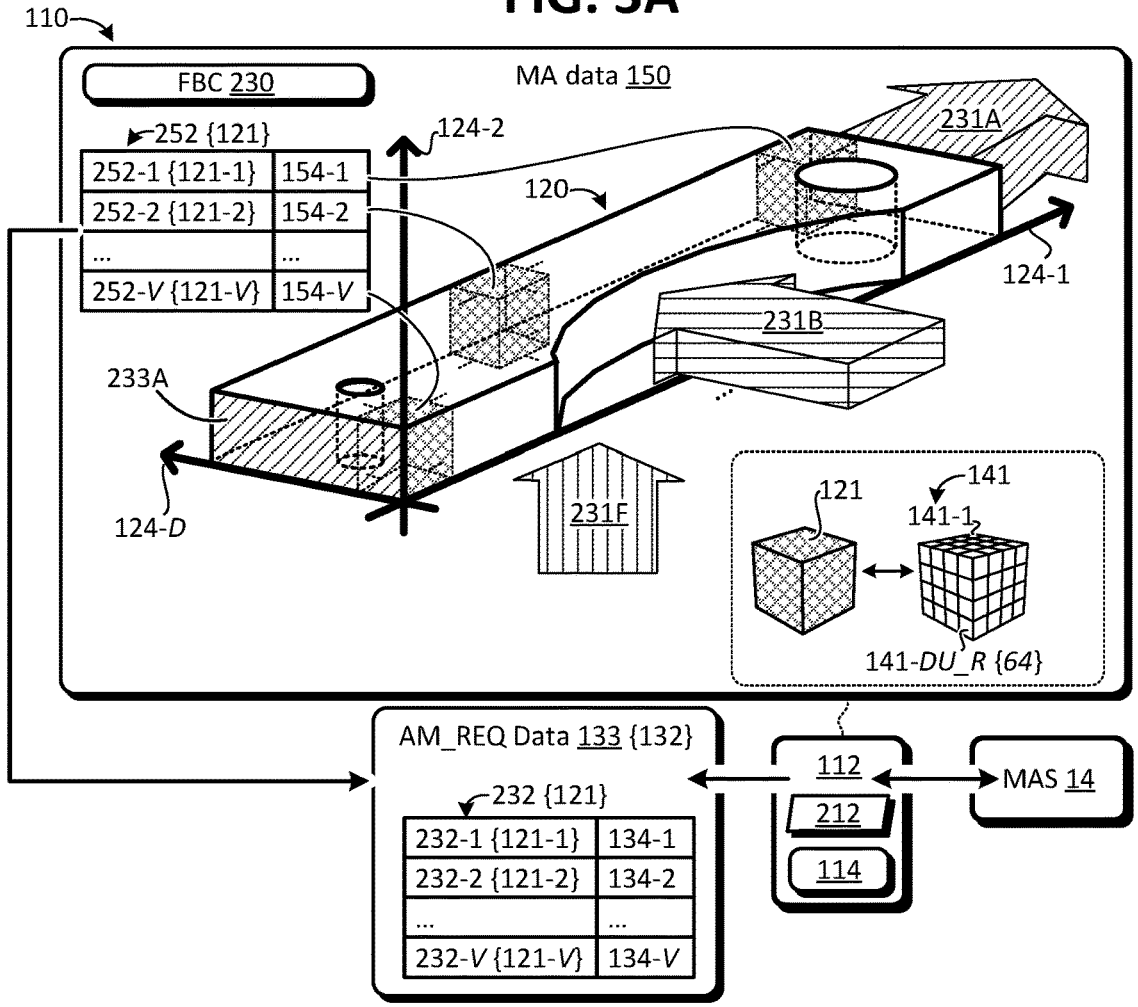
FIGS. 3B-3E are schematic block diagrams illustrating examples of a design manager configured to determine anisotropic mechanical and/or structural requirements for 3D object designs.

FIG. 3A illustrates aspects of the AM_RESP 152 of the 3D object design 120 to force 231A of the FBC 230 of FIG. 2. As illustrated, the tensile strain imposed on the 3D object design 120 by force 231A may vary by DU 121. The tensile M_RESP 158A in the primary ODA 124-1 imposed by force 231A may vary by offset from the first longitudinal end (LE-1) of the design 120 at which the force 231A is applied. As illustrated in plot 300, DU 121-LE-1 located at the first longitudinal end (LE-1) of the design 120 may be subjected to a maximum (MAX) tensile strain M_RESP 158A {124-1}. The tensile strain M_RESP 158A {124-1} may decrease at DU 121 further from the first longitudinal end (LE-1) along ODA 124-1. Accordingly, DU 121-LE-2 at the opposite longitudinal end (LE-2) of the design 120 may be subjected to a minimum (MIN) tensile strain M_RESP 158A {124-1} responsive to force 231A.

In some implementations, the analysis module 112 may be configured to model the AM_RESP 152 of designs 120 to specified FBC 230 at each of a plurality of DU 121. As illustrated in FIG. 3B, the analysis module 112 may be configured to divide and/or partition the design 120 into a plurality of DU 121, each DU 121 comprising and/or corresponding to a respective portion of the 3D object design 120. The design 120 may be divided into any suitable set of DU 121 having any suitable configuration. In some embodiments, the analysis module 112 may define DU 121 corresponding to a resolution of the AMS 12 and/or additive manufacturing process(es) implemented thereby. As used herein, the resolution of an AMS 12 may refer to a configuration of additive manufacturing unit(s) (AMU) 141 of the AMS 12, such as a) a minimum feature size of the AMS 12 with respect to the XY-plane, b) a Z-axis resolution of the AMS 12, such as layer thickness and/or height, c) a minimum AMU size (e.g., a minimum AMU 141 expressed as X, Y, Z extents), and/or the like. The resolution of an AMS 12 may, therefore, correspond to a size and/or configuration of additive manufacturing units (AMU) 141 capable of being fabricated by the AMS 12, where an AMU 141 represents a highest resolution of the AMS 12. In other words, an AMU 141 may refer to a lowest level of granularity at which parameters of the additive manufacturing may be controlled.

The analysis module 112 may implement one-to-many mappings between DU 121 and AMU 141; a design may be partitioned into DU 121, each DU 121 comprising and/or corresponding to $DU_R$ AMU 14, where $DU_R$ is the ratio between DU 121 and AMU 141. Accordingly, each DU 121 of the design 120 may comprise and/or correspond to $DU_R$ AMU 141 (with the possible exception of DU 121 disposed at or on boundaries of the 3D object design 120, which may comprise and/or correspond to fewer AMU 141). In the FIG. 3B example, the design 120 may be partitioned at a $DU_R$ of 64. The granularity of the AM_RESP 158 and resulting AM_REQ 132 may, therefore, be referred to as a $DU_{64}$ granularity level (where 64 indicates the ratio of AMU 121 to DU 121). The disclosure is not limited in this regard, however, and could be adapted for any relationship between DU 121 and AMR 141, including non-uniform DU 121 corresponding to user-specified regions or sections, as disclosed in further detail herein.

The analysis module 112 may be configured to model a response of the design 120 to specified FBC 230 by use of, inter alia, a MAS 14. As in the FIG. 2 example, the FBC 230 may define forces 133A-F having a common set of boundary conditions 233A. More specifically, the analysis module 112 may be configured to model the response of the design 120 to the FBC 230 at each of a plurality of DU 121. As illustrated in FIG. 3B, the design 120 may be divided into V DU 121 (e.g., DU 121-1 through 121-V). The MA data 150 determined by the analysis module 112 may be configured to model and/or quantify the AM_RESP 152 of the design 120 at or within each of DU 121-1 through 121-V. The MA data 150 may, for example, comprise V DU AM_RESP 252 (e.g., DU AM_RESP 252-1 through 252-V), each comprising a respective AM_RESP DS 154 (e.g., AM_RESP DS 154-1 through 154-V) configured to model and/or quantify the AM_RESP 152 of the design 120 at or within a respective one of DU 121-1 through 121-V. As illustrated in FIG. 3B, the MA data 150 may comprise an AM_RESP DS 154-1 configured to model and/or quantify DU AM_RESP 252-1 (e.g., the AM_RESP 152 of the design 120 at or within DU 121-1), an AM_RESP DS 154-2 configured to model and/or quantify DU RESP 252-2 (e.g., the AM_RESP 152 of the design 120 at or within DU 121-2), an AM_RESP DS 154-V configured to model and/or quantify DU AM_RESP 252-V (e.g., the AM_RESP 152 of the design 120 at or within DU 121-V), and so on. In some embodiments, each AM_RESP DS 154-1 through 154-V may comprise a respective set of M×D M_RESP 158, each of the M×D M_RESP 158 configured to model one of M M_PROP 128 with respect to one of D ODA 124, as illustrated in FIG. 2.

As illustrated above, the MA data 150 of the FIG. 3B example may be configured to model the AM_RESP 152 of the design 120 at a lower level or granularity (as compared to the MA data 150 illustrated in FIG. 2). More specifically, the MA data 150 may be configured to model the AM_RESP 152 of the design 120 at or within respective DU 121- through 121-V. The AM_RESP 152 of the FIG. 3B example, may, therefore, be defined at a lower, DU granularity level.

The analysis module 112 may be further configured to derive AM_REQ 132 for the design 120 from the MA data 150, as disclosed herein. The AM_REQ 132 may be represented, realized, and/or embodied by AMC_REQ data 133, as disclosed herein. AM_REQ 132 may be configured in accordance with the granularity level of the MA data 150 and/or corresponding AM_RESP 158. As disclosed herein, the AM_RESP 152 may be defined by DU 121 (e.g., may be defined at a DU granularity level). In the FIG. 3B example, the DU granularity level corresponds to a 64-to-one ratio, where respective DU 121 comprise and/or correspond to respective sets of 8×8 or {64} AMU 141 (e.g., AMU 141-1 through 141-DU_R {64}). The AM_REQ data 133 may be configured to define AM_REQ 132 for respective DU 121-1 through 121-V of the design 120 per the DU_R {64} DU ratio (as opposed to defining AMC_REQ 132 at the design granularity level).

In the FIG. 3B example, the analysis module 112 may be configured to derive a plurality of DU AM_REQ 232 from the MA data 150, each DU AM_REQ 232 configured to define AM_REQ 132 for a respective DU 121 of the design 120. For example, each DU AM_REQ 232 may comprise a respective AM_REQ DS 134 comprising a set of M×D M_REQ 138 for the corresponding DU 121. In the FIG. 3B example, the design 120 comprises V DU 121 (e.g., DU 121-1 through 121-V). The AM_REQ 132 determined for the design 120 may, therefore, comprise V DU AM_REQ 232, each of DU AM_REQ 232-1 through 232-V comprising a respective AM_REQ DS 134 for a respective DU 121 of the design 120.

The DU AM_REQ 232 for respective DU 121 may be derived from the DU AM_RESP 252 determined for the respective DU 121. In other words, the AM_REQ DS 134 for respective DU 121 may be derived from the AM_RESP DS 154 of the respective DU 121. In the FIG. 3B example, DU AM_REQ 232-1 through 232-V may be derived from the DU AM_RESP 252-1 through 252-V and AM_REQ DS 134-1 through 134-V may be derived from AM_RESP DS 154-1 through 154-V, respectively.

Figure 3C:
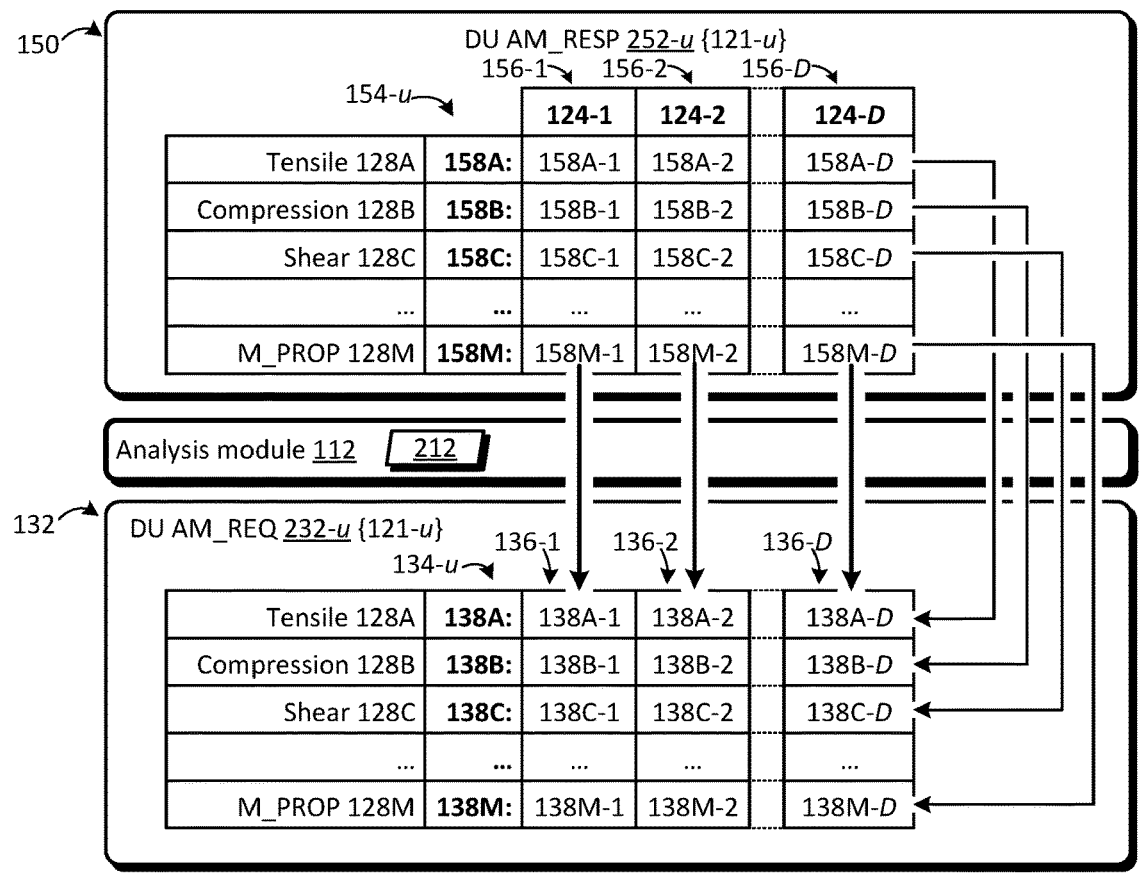
Figure 4:
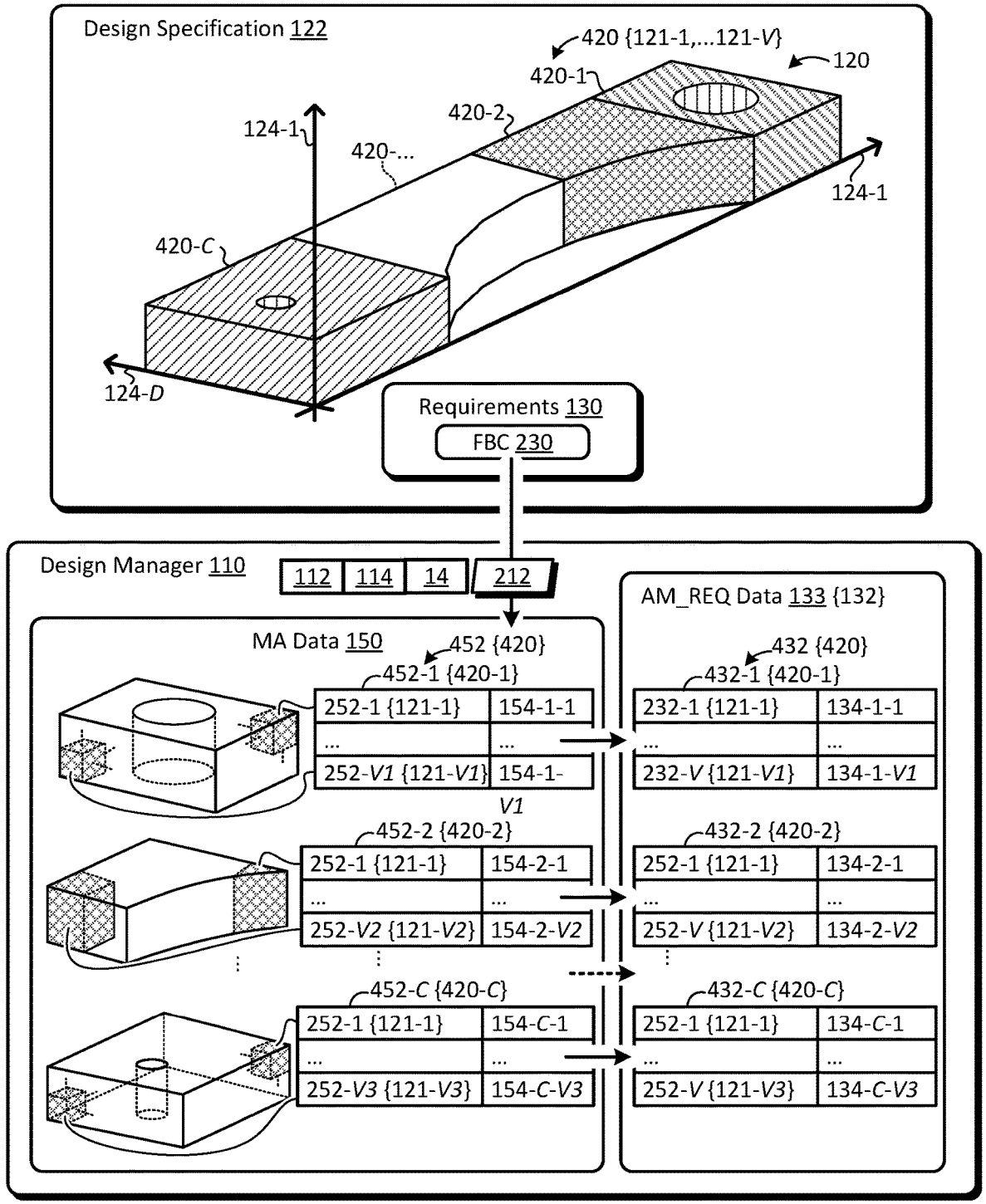
FIG. 4 is a schematic block diagram illustrating an example of a design manager configured to determine anisotropic mechanical and/or structural requirements for a hybrid 3D object design.

FIG. 3C illustrates an example of an analysis module 112 configured to determine DU AM_REQ 232-u for a DU 121-u of a 3D object design 120 (where u is an integer from 1 to V). As illustrated, DU AM_REQ 232-u may comprise an AM_REQ DS 134-u, configured to define AM_REQ 132 for DU 121-u. The AM_REQ DS 134-u may be derived from the DU AM_RESP 252-u of the design 120 at DU 121-u. For example, the DU AM_RESP 252-u may be modeled and/or quantified by an AM_RESP DS 154-u, as disclosed herein.

As illustrated, the AM_REQ DS 134-u for the DU AM_REQ 252-u may comprise a set of M×D M_REQ 138 (M_REQ 138A-1 through 138M-D), each defining an M_REQ 138 for a specified one of M M_PROP 128 with respect to a specified one of D ODA 124. The M_REQ 138A-1 through 138M-D of the AM_REQ DS 134-u may be based on the deformation, displacement, strain, load, tensile load, tensile strain, tensile stress, compression load, compression strain, compression stress, shear load, shear strain, shear stress, stress, and/or other characteristics of the AM_RESP 152 of the design 120 at or within DU 121-u. The AM_RESP 152 of the design 120 at or within DU 121-u may be modeled and/or quantified by M_RESP 158A-1 through 158M-D of the AM_RESP DS 154-u. As illustrated, tensile M_REQ 138A-1 through 138A-D for DU 121-u may be derived from the tensile M_RESP 158A-1 through 158A-D of the design 120 at DU 121-u, compression M_REQ 138B-1 through 138B-D for DU 121-u may be derived from the compression M_RESP 158B-1 through 158B-D of the design 120 at DU 121-u, shear M_REQ 138C-1 through 138C-D for DU 121-u may be derived from the shear M_RESP 158C-1 through 158C-D of the design 120 at DU 121-u, M_REQ 138M-1 through 138M-D for M_PROP 128M at DU 121-u may be derived from the M_RESP 158A-1 through 158A-D of M_PROP 128M of the design 120 at DU 121-u, and so on.

Alternatively, or in addition, the analysis module 112 may be configured to derive M_REQ 138 of the AM_REQ DS 134-u by ODA 124. For example, the analysis module 112 may derive a primary ODA_REQ DS 136-1 comprising M_REQ 138A-1 through 138M-1 for DU 121-u from the M_RESP 138A-1 through 138M-1 at DU 121-u (e.g., the primary ODA_RESP DS 156-1), derive M_REQ 138A-2 through 138M-2 for DU 121-$u$ from the M_RESP 138A-2 through 138M-2 at DU 121-$u$ (e.g., the secondary ODA_RESP DS 156-2), derive a secondary ODA_REQ DS 136-D comprising M_REQ 138A-D through 138M-D for DU 121-$u$ from the M_RESP 138A-D through 138M-D at DU 121-$u$ (e.g., the secondary ODA_RESP DS 156-D), and so on.

Figure 3D:
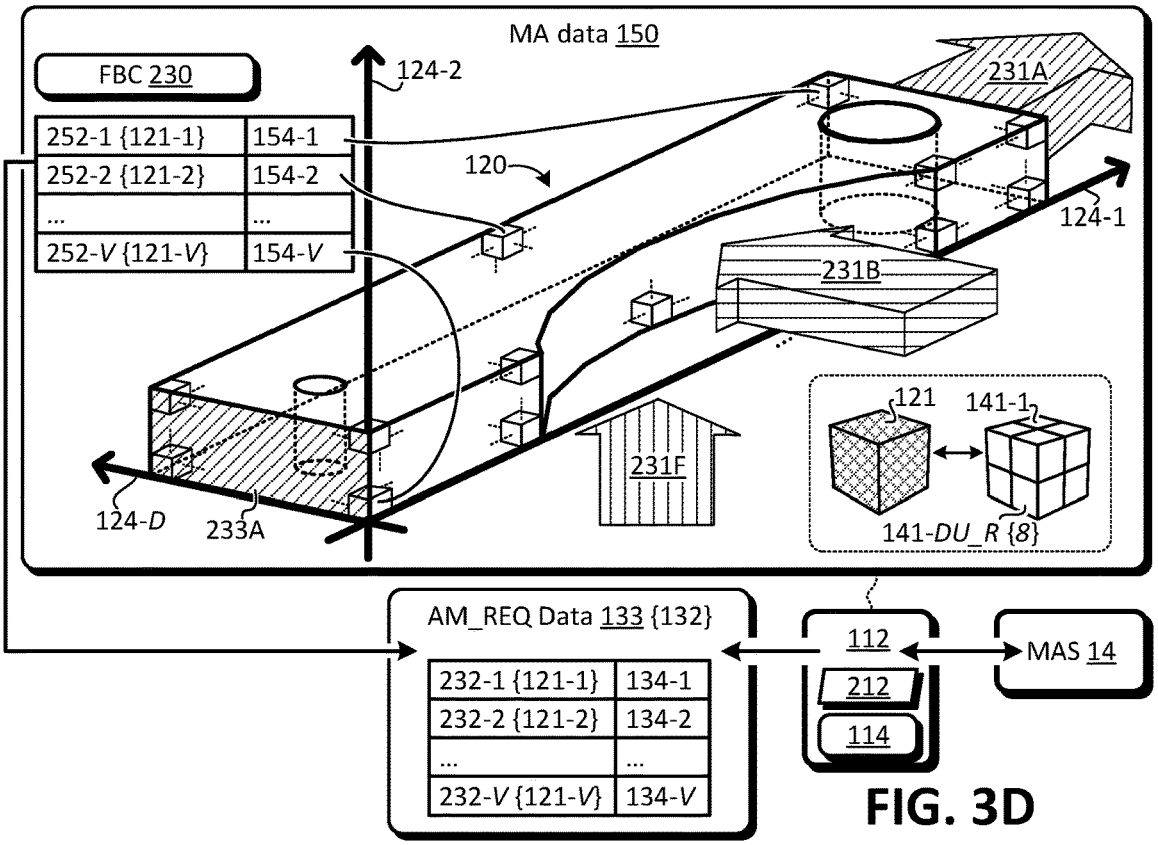

FIG. 3D illustrates another example of a design manager 110 configured to determine AM_REQ 132 for respective DU 121 of a 3D object design 120. In the FIG. 3D example, the design 120 may be partitioned into DU 121 at a $DU_R$ of 8, where each DU 121 comprises a respective set of DU_R {8}, 141-1 through 141-DU_R {8} (as opposed to 64 are in the example illustrated in FIG. 3B). The AM_RESP 158 and resulting AM_REQ 132 illustrated in FIG. 3D may, therefore, be referred to as a DU or $DU_8$ granularity level.

In the FIG. 3D example, the MA data 150 determined by the analysis module 112 may comprise V DU AM_RESP 252 each comprising a respective AM_RESP DS 154 comprising M_RESP 158 configured to model and/or quantify the AM_RESP 152 of the design 120 within a respective one of DU 121-1 through 121-V. As illustrated, the MA data 150 determined for the design 120 of FIG. 3D may comprise DU AM_RESP 252-1 through 252-V comprising AM_RESP DS 154-1 through 154-V, respectively. The analysis module 112 may be configured to derive V DU AM_REQ 232 from the MA data 150; the analysis module 112 may derive AM_REQ DS 134-1 through 134-V for DU AM_REQ 232-1 through 232-V from the AM_RESP DS 154-1 through 154-D of DU AM_RESP 252-1 through 252-V, as disclosed herein.

In other examples, designs 120 may be partitioned and/or divided in accordance with other schemes. For example, a design 120 may be partitioned into DU 121 having one-to-one relationships with AMU 141 (where $DU_R$=1). In these examples, the AM_RESP 154 and corresponding AM_REQ 132 of the design 120 may be determined at an AMU or AMS granularity level.

Figure 3E:
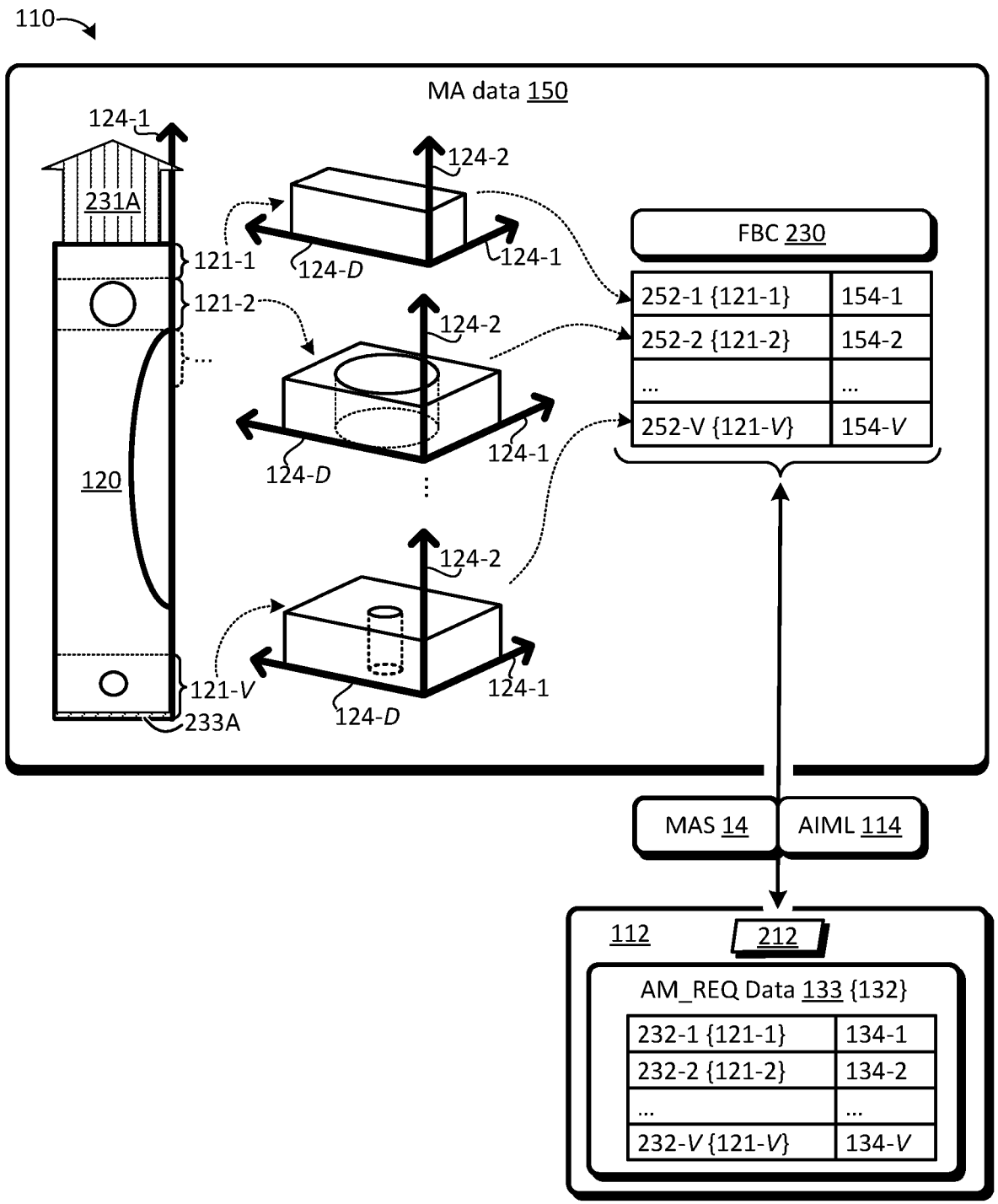

FIG. 3E illustrates another example of a design manager 110 comprising an analysis module 112 configured to determine AM_REQ 132 for 3D object designs 120. The design 120 may be divided into VDU 121, each DU 121 corresponding to a respective region or section of the 3D object. In the FIG. 3E example, DU 121-1 through 121-V may be non-uniform; in the example illustrated in FIG. 3E, the DU 121-1 through 121-V may differ by size, area, quantity of AMU 141, and/or the like. The MA data 150 produced by the analysis module 112 may be configured to model the AM_RESP 152 of the design 120 to specified FBC 230 at or within respective DU 121; the MA data 150 may comprise DU AM_RESP 252-1 through 252-V, each configured to model the AM_RESP 152 of the design 120 to specified FBC 230 at DU 121-1 through 121-V, respectively. The FBC 230 may define any suitable force(s) 231 and/or boundary conditions 233, such as forces 133A-F and boundary condition(s) 233A described above (forces 231B-F not shown in FIG. 3D to avoid obscuring details of the illustrated example). The analysis module 112 may be further configured to derive AM_REQ 132 for the design 120 from the MA data 150. The AM_REQ 132 derived from the MA data 150 in the FIG. 3E example, may comprise V DU AM_REQ 232, each comprising a respective AM_REQ DS 134 configured to define M_REQ 138 for a respective one of DU 121-1 through 121-V (where the value of Vin the FIG. 3E example differs from the value of Vin FIGS. 3B and 3D).

FIG. 4 is a schematic block diagram of another example of a design manager 110. In the FIG. 4 example, the design manager 110 may be configured to determine AM_REQ 132 for design 120 comprising a plurality of design components 420 (e.g., hybrid design 120). The design components (DC) 420 may be configured to be manufactured from respective materials or material types. The DC 420 may, for example, be configured to be manufactured in respective AM operations, each AM operation utilizing a respective material type. In the FIG. 4 example, the hybrid design 120 comprises C DC 420 (e.g., comprises DC 420-1 through 420-C). The disclosure is not limited in this regard, however, and could be adapted for 3D object designs 120 comprising any number of DC 420 in any suitable configuration.

The design 120 illustrated in FIG. 4 may be associated with requirements 130, as disclosed herein. In some implementations, the requirements 130 may comprise known and/or predetermined AM_REQ 132. Alternatively, or in addition, the requirements 130 may comprise information from which AM_REQ 132 for the hybrid design 120 may be derived, such as FBC 230 or the like (force(s) 231 and boundary condition(s) 233 not shown in FIG. 4 to avoid obscuring details of the illustrated examples).

The design manager 110 may determine AMC_REQ 132 for the design 120 through implementation of a design MA procedure 212. The design MA procedure 212 may comprise dividing DC 420 of the hybrid design 120 into respective sets of DU 121. In the FIG. 4 example, DC 420-1 comprises a set of V1 DU 121 (e.g., DU 121-1 through 121-V1 within DC 420-1), DC 420-2 comprises a set of V2 DU 121 (e.g., DU 121-1 through 121-V2 within DC 420-2), DC 420-C comprises a set of V3 DU 121 (e.g., DU 121-1 through 121-V3 within DC 420-C), and so on. The DC 420 of a hybrid design 120 may be divided into DU 121 according to any suitable scheme. In the FIG. 4 example, DC 420-1 and 420-C may be divided into substantially uniform DU 121, each comprising and/or corresponding to about R AMU 141. DC 420-2, however, may be divided into larger and/or non-uniform DU 121.

The design manager 110 may be configured to determine AMC_REQ 132 for the hybrid design 120 at a designated level of granularity. For example, the design manager 110 may be configured to determine AM_REQ 132 for respective DU 121 within respective DC 420. In other words, the design manager 110 may be configured to determine AM_REQ 132 at a DC-DU granularity level or DC-$DU_{DUR}$ granularity level, where DUR indicates a ratio between DU 121 and AMU 141 within respective DC.

The design MA procedure 212 may comprise determining MA data 150, the MA data 150 configured to model and/or quantify an AM_RESP 152 of respective DU 420 of the design 120 to specified FBC 230. The MA data 150 may be configured in accordance with the target granularity level for the AM_REQ 132. In the FIG. 4 example, the AM_REQ 132 are targeted to the DC-DU granularity level. The design MA procedure 212 may, therefore, comprise acquiring MA data 150 having a DC-DU granularity more specifically, the design MA procedure 212 may comprise acquiring MA data 150 configured to model, quantify, and/or otherwise determine the AM_RESP 152 of the hybrid design 120 at or within respective DU 121 of respective DC 420 of the hybrid design 120.

In the FIG. 4 example, the MA data 150 may comprise C DC AM_RESP 452, each configured to model and/or quantify the AM_RESP 152 of the design 120 at or within a respective one of the C DC 420 of the design 120. More specifically, the DC AM_RESP 452-1 may comprise DU AM_RESP 252-1 through 252-V1 comprising AM_RESP DS 154-1-1 through 154-1-V1 configured to model and/or quantify the AM_RESP 152 of the design 120 at or within respective DU 121-1 through 121-V1 of DC 420-1, the DC AM_RESP 452-2 may comprise DU AM_RESP 252-1 through 252-V2 comprising AM_RESP DS 154-2-1 through 154-2-V2 configured to model and/or quantify the AM_RESP 152 of the design 120 at or within respective DU 121-1 through 121-V2 of DC 420-2, DC AM_RESP 452-C may comprise DU AM_RESP 252-1 through 252-V3 comprising AM_RESP DS 154-C-1 through 154-C-V3 configured to model and/or quantify the AM_RESP 152 of the design 120 at or within respective DU 121-1 through 121-V3 of DC 420-C, and so on.

The design MA procedure 212 may further comprise deriving AM_REQ 132 from the MA data 150. The AM_REQ 132 may comprise C DC AM_REQ 452, each configured to define M_REQ 138 for a respective one of the C DC 420 of the design 120. More specifically, the AM_REQ 132 may comprise DC AM_REQ 432-1 comprising DU AM_REQ 232-1 through 232-V1 comprising AM_REQ DS 134-1 through 134-V1 configured to define anisotropic M_REQ 138 for DU 121-1 through 121-V1 of DC 420-1 of the design 120, DC AM_REQ 432-2 comprising DU AM_REQ 232-1 through 232-V2 comprising AM_REQ DS 134-1 through 134-V2 configured to define anisotropic M_REQ 138 for DU 121-1 through 121-V2 of DC 420-2 of the design 120, DC AM_REQ 432-C comprising DU AM_REQ 232-1 through 232-V3 comprising AM_REQ DS 134-1 through 134-V3 configured to define anisotropic M_REQ 138 for DU 121-1 through 121-V3 of DC 420-C of the design 120, and so on. The DC AM_REQ 432 of the AM_REQ 132 may be derived from corresponding DC AM_RESP 452 of the MA data 150. For example, AM_REQ DS 134-1 through 134-V1 of DC AM_REQ 432-1 {420-1} may be derived from AM_RESP DS 154-1 through 154-V1 of DC AM_RESP 452-1 {420-1}, AM_REQ DS 134-1 through 134-V2 of DC AM_REQ 432-2 {420-2} may be derived from AM_RESP DS 154-1 through 154-V2 of DC AM_RESP 452-2 {420-2}, AM_REQ DS 134-1 through 134-V3 of DC AM_REQ 432-C{420-C} may be derived from AM_RESP DS 154-1 through 154-V3 of DC AM_RESP 452-C{420-C}, and so on.

As disclosed herein, in some implementations, the analysis module 112 may be configured to implement MA analysis procedures on discrete DU 121 of a 3D object design 120. More specifically, the analysis module 112 may be configured to a) model the AM_RESP 152 of a 3D design 120 to specified FBC 230 at or within respective DU 121 of the design 120 (and/or respective DC 420) and b) derive AM_REQ 132 for respective DU 121. In these implementations, the MA data 150 determined by the analysis module 112 may comprise and/or correspond to a discrete table or function $MA_{D,FBC}(du)=AM\_RESP_{D,FBC,du}$, $du \in \{DU_1, \ldots DU_V\}$, where $MA_{D,FBC}(du)$ produces outputs $(AM\_RESP_{D,FBC,du})$ that quantify and/or model the anisotropic M_RESP 158 of a specified 3D object design 120 (D) to specified FBC 230 (FBC) at or within a specified DU 121 (du) within the design 120 (D). Similarly, the AM_REQ 132 determined for the design 120 may be expressed as a function $REQ_{D,FBC}(du)=AM\_REQ_{D,FBC,du}$, $du \in \{DU_1, \ldots DU_V\}$, where $REQ_{D,FBC}(du)$ produces outputs $(AM\_REQ_{D,FBC,du})$ that define AM_REQ 132 for a specified 3D object design 120 (D) at or within a specified DU 121 (du) within the design 120 (D), the outputs $(AM\_REQ_{D,FBC,du})$ based, at least in part, on the AM_RESP 158 produced by the $MA_{D,FBC}(du)$ at or within corresponding DU 121 (du). In these implementations, the functions $MA_{D,FBC}(du)$ and $REQ_{D,FBC}(du)$ may be defined over a specified set of VDU 121, e.g., $DU_1, \ldots DU_V$, as disclosed herein. The analysis module 112 may be further configured to divide designs 120 and/or DC 420 according to any suitable scheme, as disclosed herein.

Alternatively, or in addition, the analysis module 112 may be configured to implement MA analysis procedures that are substantially continuous (or pseudo continuous) or correspond to a granularity of the MAS 14, such as a granularity of the CAD platform on which the design 120 was developed. In other words, the MA data 150 may be configured to model the AM_RESP 152 of a design 120 to specified FBC 230 in a substantially continuous manner (e.g., at each point within the design 120 and/or within respective DC 420) and/or at DU 121 that comprise and/or correspond to a finest granularity and/or highest resolution of the MAS 14). In these implementations, the MA data 150 determined for a design 120 may be expressed as a substantially continuous function $MA_{D,FBC}(V)=AM\_RESP_{D,FBC,v}$, $v \in V_D$, where $MA_{D,FBC}$ produces outputs $(AM\_RESP_{D,FBC,v})$ configured to model the AM_RESP 158 of a specified design 120 (D) to specified FBC 230 (FBC) at a specified location or volume (v) within the design 120. Similarly, the AM_REQ 132 determined for the design 120 may be expressed as a function $REQ_{D,FBC}(v)=AM\_REQ_{D,FBC,v}$, $v \in V_D$, where $REQ_{D,FBC}(V)$ produces outputs $(AM\_REQ_{D,FBC,v})$ that define AM_REQ 132 at or within a specified location or volume (v) within a specified design 120 (D), the outputs $(AM\_REQ_{D,FBC,v})$ based, at least in part, on the AM_RESP 158 produced by $MA_{D,FBC}(v)$ at or within the corresponding location or volume (v). In these implementations, the functions $MA_{D,FBC}(v)$ and $REQ_{D,FBC}(v)$ may be defined over $V_D$ (the volume encompassed by the 3D object design 120). In these implementations, the granularity of the AM_RESP 158 and/or corresponding AM_REQ 132 may be referred to as "continuous" or a minimum (MIN) granularity level.

Figure 5A:
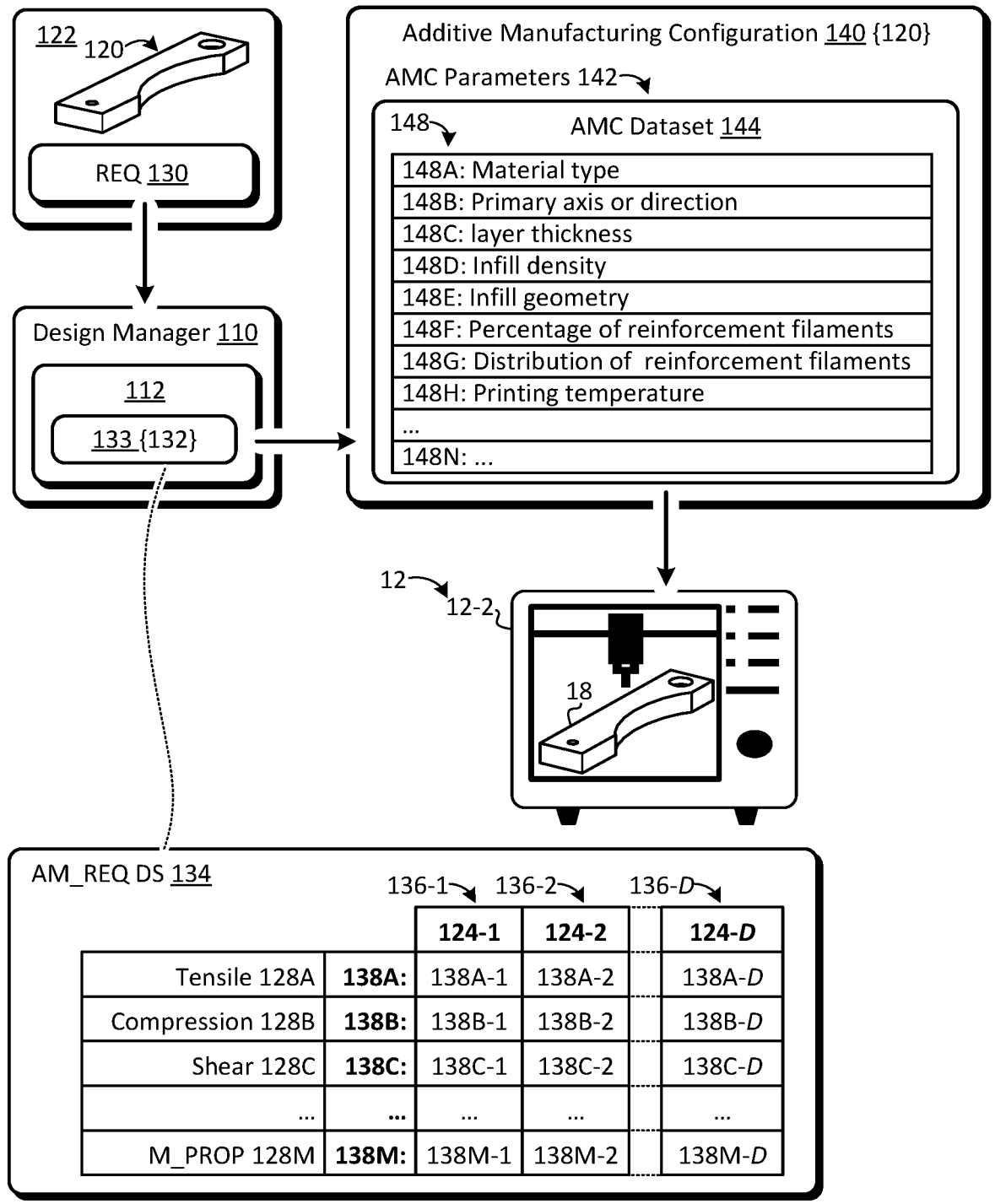
FIG. 5A illustrates an example of an AM configuration (AMC) for a 3D object design.

FIG. 5A illustrates an example of a design manager 110 configured to determine an AMC 140 for a 3D object design 120. The AMC 140 may be configured to control AM of the design 120, as disclosed herein. The AMC 140 determined by the design manager 110 may comprise any information pertaining to the manufacture of AMO 18 of a design 120. In the FIG. 5A example, the AMC 140 is configured to control a set of N AMC parameters 142, each corresponding to a respective aspect of an additive manufacturing process implemented by an AMS 12. The AMC 140 may comprise an AMC dataset (an AMC DS 144) configured to define values, settings, or quantities (AMC_PV) 148 for each of N AMC parameters 142. In the FIG. 5A example, AMC_PV 148A may be configured to control the type(s) of material(s) utilized to manufacture AMO 18 of the design 120, AMC_PV 148B may specify a primary axis or direction of the additive manufacturing process (e.g., specify a layout direction for additive material or structures, such as layers, filaments, and/or the like relative to one or more ODA 124), AMC_PV 148C may specify layer thickness (e.g., specify a thickness and/or other configuration parameters for additive materials or structures of the additive manufacturing process), AMC_PV 148D may specify infill density, AMC_PV 148E may specify infill geometry, AMC_PV 148F may specify the percentage of reinforcement filaments, AMC_PV 148G may specify the distribution of reinforcement filaments, AMC_PV 148H may specify printing temperature (e.g., specify the temperature utilized in the additive manufacturing process), and so on. Although specific examples of AMC parameters 142 and/or corresponding AMC_PV 148 are described herein, the disclosure is not limited in this regard and could be adapted to manage and/or control any suitable parameter, variable, attribute, setting, or other aspect of an additive manufacturing process and/or operation of an AMS 12.

In the FIG. 5A example, the AMC 140 may be configured to cause a physical AMS 12-2 to produce physical AMO 18 of the design 120. Alternatively, or in addition, the AMC 140 may be configured to cause a simulated or virtual AMS 12-1 to produce simulated or virtual AMO 18 (not shown in FIG. 5A to avoid obscuring details of the illustrated examples).

The AMC parameters 142 utilized to control the additive manufacture of the design 120 may influence the M_PROP 128 of the resulting AMO 18. In other words, the AMC_PV 148A-N used to control respective AMC parameters 142 may influence one or more M_PROP 128 of the AMO 18 produced under the AMC 140; modifying one or more of AMC_PV 148A-N may produce corresponding modifications in one or more M_PROP of the resulting AMO 18.

The AMC 140 determined by the design manager 110 may be configured to control AM of a design 120 at a designated granularity level. As used herein, the granularity level of an AMC 140 may refer to a level of granularity at which the AMC 140 is configured to control AM of a design 120. For example, the AMC 140 illustrated in FIG. 5A may comprise an AMC DS 144 configured to control AM of the design 120 at a design granularity level (e.g., the AMC_PV 148 of the AMC DS 144 may be configured to control manufacture of the design 120 as a whole).

The design manager 110 may be configured to determine "suitable" AMC 140 for design specifications 122 (e.g., designs 120 having specified requirements 130). As disclosed herein, a "suitable" AMC 140 may refer to an AMC 140 configured to produce AMO 18 that satisfy requirements 130 of the design 120, such as AM_REQ 132, as disclosed herein. The AM_REQ 132 may be known or predetermined. Alternatively, or in addition, at least a portion of the AM_REQ 132 may be determined in a design MA procedure 212, as disclosed herein. In the FIG. 5A example, the design manager 110 may be configured to determine a suitable AMC 140 for a design 120 having AM_REQ 132 defined at a design granularity level, as illustrated in the FIG. 2 example.

Figure 5B:
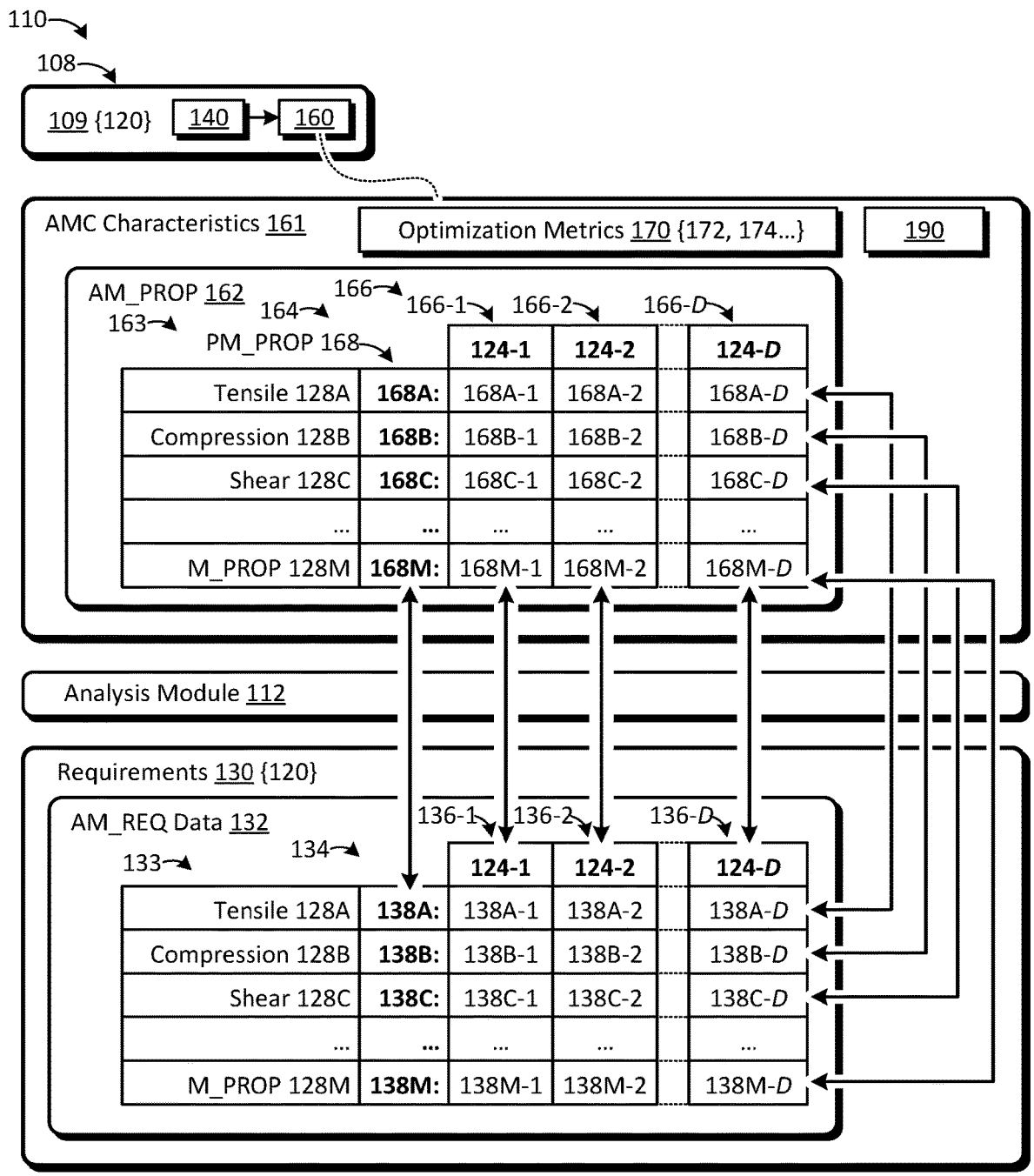
FIG. 5B is a schematic block diagram illustrating an example of a design manager configured to determine whether an AMC satisfies requirements associated with a 3D object design.

The design manager 110 may be configured to determine whether the AMC 140 satisfies the AM_REQ 132 of the design 120 by, inter alia, evaluating a profile 160 of the AMC 140. FIG. 5B illustrates an example of a profile 160 of an AMC 140. As used herein, a profile 160 of an AMC 140 may comprise AMC characteristics 161, the AMC characteristics 161 may pertain to any suitable characteristic, property, or aspect of the AMC 140, the additive manufacturing process defined by the AMC 140, AMO 18 produced using the AMC 140, costs or loss associated with the AMC 140, utility of the AMC 140, and/or the like. The profile 160 of an AMC 140 may, for example, comprise anisotropic mechanical and/or structural properties or characteristics (AM_PROP) 162 for AMO 18 produced by the AMC 140, as illustrated in FIG. 5B.

FIG. 5B illustrates an example of a profile 160. The profile 160 may be determined for the AMC 140 illustrated in FIG. 5A. The profile 160 may comprise AM_PROP 162 configured to model, quantify, estimate, and/or predict AM_PROP 162 of AMO 18 produced by the AMC 140. FIG. 5B further illustrates an example of AM_REQ 132 of the design 120 associated with the AMC 140 (e.g., AM_REQ 132 of the design 120 associated with the AMC 140 of the profile 160). The AM_REQ data 133 may define AM_REQ 132 at a design granularity level (e.g., may define anisotropic M_REQ 138 for the design as a whole, as disclosed herein).

In some implementations, the AM_PROP 162 may be configured in accordance with the AMC 140 and/or AM_REQ 132 of the design 120. For example, the level of granularity of the AM_PROP 162 may be configured to correspond with the level of granularity of the AM_REQ 132 of the AMC 140. In the FIG. 5A example, the AM_REQ 132 may be defined at the design granularity level and, as such, the design manager 110 may be configured to determine AM_PROP 162 for the AMC 140 at the design granularity level. The disclosure is not limited in this regard, however, and could be adapted to model AM_PROP 162 of AMC 140 at any suitable granularity level, such as the DU granularity, as illustrated in FIG. 6B, the DC-DU granularity level, as illustrated in FIG. 7B, and/or the like.

The AM_PROP 162 determined for the AMC 140 may be represented, realized, and/or embodied by AM_PROP data 163. In the FIG. 5B example, the AM_PROP data 163 comprises a set of predicted mechanical and/or structural properties or characteristics (PM_PROP 168), each PM_PROP 168 corresponding to a respective M_REQ 138 of the AM_REQ 132. By way of non-limiting example, the AM_REQ 132 of the design 120 may comprise a set of M×D M_REQ 138 (e.g., M_REQ 138A-1 through 138M-D), each defining an M_REQ 138 for a specified one of M M_PROP 128 with respect to a specified one of D ODA 124 of the design 120. The AM_PROP 162 of the profile 160 may be configured to model a corresponding set of M×D PM_PROP 168 (e.g., PM_PROP 168A-1 through 168M-D), each MP_PROP 168 configured to model a respective one of the M M_PROP 128 in a respective one of the D ODA 124 of the AM_REQ 132.

By way of further non-limiting example, the AM_REQ 132 of the design 120 associated with the profile 160 may include M_REQ 138 comprising multivalued data elements, such as vectors, tuples, multivalued attributes, arrays, or the like. For instance, the AM_REQ 132 may comprise a tensile M_REQ 138A configured to define M_REQ 138A-1 through 138A-D for the tensile M_PROP 128A with respect to ODA 124-1 through 124-D, a compression M_REQ 138B configured to define M_REQ 138B-1 through 138B-D for the compression M_PROP 128B with respect to ODA 124-1 through 124-D, a shear M_REQ 138C configured to define M_REQ 138C-1 through 138C-D for the shear M_PROP 128C with respect to ODA 124-1 through 124-D, an M_REQ 138M configured to define M_REQ 138M-1 through 138M-D for M_PROP 128M with respect to ODA 124-1 through 124-D, and so on. The AM_PROP 162 of the profile 160 may be configured to include corresponding multivalued M_PROP 168, including a tensile PM_PROP 168A configured to model the tensile M_PROP 128A in ODA 124-1 through 124-D (PM_PROP 168A-1 through 168A-D corresponding to M_REQ 138A-1 through 138A-D), a compression PM_PROP 168B configured to model the compression M_PROP 128B in ODA 124-1 through 124-D (PM_PROP 168B-1 through 168B-D corresponding to M_REQ 138B-1 through 138B-D), a shear PM_PROP 168C configured to model the shear M_PROP 128C in ODA 124-1 through 124-D (PM_PROP 168C-1 through 168C-D corresponding to M_REQ 138C-1 through 138C-D), an PM_PROP 168M configured to model M_PROP 128M in ODA 124-1 through 124-D (PM_PROP 168M-1 through 168M-D corresponding to M_REQ 138M-1 through 138M-D), and so on.

Alternatively, or in addition, the AM_REQ 132 of the design 120 associated with the profile 160 may comprise a plurality of ODA_REQ DS 136, each configured to define M_REQ 138 with respect to one of ODA 124-1 through 124-D. In these implementations, the AM_PROP 162 of the profile 160 comprise a plurality of ODA_PROP datasets (ODA_PROP DS 166), each ODA_PROP DS 166 comprising PM_PROP 168 corresponding to the M_REQ 138 of a respective ODA_REQ DS 136 of the AM_REQ 132. In the FIG. 3B example, the AM_PROP DS 164 may comprise a primary ODA_PROP DS 166-1 configured to model M_PROP 128A-M of AMO 18 with respect to the primary ODA 124-1 (e.g., PM_PROP 168A-1 through 168M-1), a secondary ODA_PROP DS 166-2 configured to model M_PROP 128A-M with respect to the secondary ODA 124-2 (e.g., PM_PROP 158A-2 through 158M-2), a secondary ODA_PROP DS 166-D configured to model M_PROP 128A-M with respect to the secondary ODA 124-D (e.g., PM_PROP 168A-D through 168M-D), and so on. The AM_PROP 162 of the AMC 140 may, therefore, comprise a primary ODA_PROP DS 166-1 configured to model M_PROP 128 produced by the AMC 140 with respect to the primary ODA 124-1 and one or more secondary ODA_PROP DS 166-2 through 166-D, each configured to model M_PROP produced by the AMC 140 with respect to a respective secondary ODA 124-2 through 124-D. Although particular examples of AM_PROP 162, AM_PROP DS 164, ODA_PROP DS 166, and PM_PROP 168 are described herein, the disclosure is not limited in this regard. The design manager 110 may be adapted to model anisotropic M_PROP 128 of AMO 18 manufactured under specified AMC 140 in any suitable manner, using any suitable data in any suitable format or arrangement.

FIG. 5B further illustrates an example of an analysis module 112 configured to determine whether the AMC 140 satisfies AM_REQ 132 associated with the design 120. The analysis module 112 may be configured to compare AM_PROP 162 of the AMC profile 160 with AM_REQ 132 of the design 120. The analysis module 112 may classify the AMC 140 as "suitable" for the design 120 if the AM_PROP 162 of the profile 160 satisfy the AM_REQ 132 of the design (e.g., if PM_PROP 168 of the profile 160 satisfy corresponding M_REQ 138 of the AM_REQ 132) and may classify the AMC 140 as "unsuitable" otherwise.

In a first non-limiting example, the analysis module 112 may be configured to compare each of the M×D M_PROP 168 of the AM_PROP DS 164 to a corresponding M_REQ 138 of the M×D M_REQ 138 of the AM_REQ DS 134 and/or may evaluate each M_REQ 138 of the M×D M_REQ 138 of the AM_REQ DS 134 in view of a corresponding M_PROP 168 of the M×D M_PROP 168 of the AM_PROP DS 164.

In a second non-limiting example, the analysis module 112 may be configured to compare multivalued M_PROP 168 for corresponding multivalued M_REQ 138 (or vice versa); the analysis module 112 may be configured to compare tensile M_REQ 138A-1 through 138A-D of the AM_REQ DS 134 to corresponding tensile PM_PROP 168A-1 through 168A-D of the AM_PROP DS 164, compare compression M_REQ 138B-1 through 138B-D to corresponding compression PM_PROP 168B-1 through 168B-D, compare shear M_REQ 138C-1 through 138C-D to corresponding shear PM_PROP 168C-1 through 168C-D, compare M_REQ 138M-1 through 138M-D defined for M_PROP 128M to PM_PROP 168M-1 through 168M-D determined for M_PROP 128M, and so on.

Although particular examples of logic for evaluating AMC 140 are described herein, the disclosure is not limited in this regard and could be configured to evaluate a degree to which AMC 140 satisfy specified requirements 130 by any suitable means and by use of any suitable AM_REQ 132 and/or AM_PROP 162. For example, the analysis module 112 may be configured to evaluate profiles 160 by ODA 124; the analysis module 112 may be configured to compare respective ODA_REQ DS 136 of the AM_REQ 134 to corresponding ODA_PROP DS 166 of the AM_REQ DS 164. The analysis module 112 may compare M_REQ 138 defined with respect to the primary ODA 124-1 to PM_PROP 168 corresponding to the primary ODA 124-1 (e.g., compare M_REQ 138A-1 through 138M-1 of ODA_REQ DS 136-1 to PM_PROP 168A-1 through 168M-1 of ODA_PROP DS 166-1), compare M_REQ 138 defined with respect to the secondary ODA 124-2 to PM_PROP 168 corresponding to the secondary ODA 124-2 (e.g., compare M_REQ 138A-2 through 138M-2 of ODA_REQ DS 136-2 to PM_PROP 168A-2 through 168M-2 of ODA_PROP DS 166-2), compare M_REQ 138 defined with respect to the secondary ODA 124-D to PM_PROP 168 corresponding to the secondary ODA 124-D (e.g., compare M_REQ 138A-D through 138M-D of ODA_REQ DS 136-D to PM_PROP 168A-D through 168M-D of ODA_PROP DS 166-D), and so on. In other words, the analysis module 112 may be configured to compare M_REQ 138 of ODA_REQ DS 136-1 through 136-D to PM_PROP 168 of the corresponding ODA_REQ DS 166-1 through 166-D.

In some implementations, the AMC profile 160 may further comprise AMC optimization metrics (AMC metrics 170). The AMC metrics 170 may comprise any information for quantifying the suitability or optimality of an AMC 140. In some implementations, the AMC metrics 170 may comprise cost metrics 172 configured to quantify cost and/or loss factors associated with the AMC 140, which may include, but are not limited to: quantity of material consumed during fabrication under the AMC 140, material type, material cost, material waste, fabrication time (e.g., time required to fabricate AMO 18 in accordance with the AMC 140), complexity (e.g., complexity of the additive manufacturing process specified by the AMC 140), failure rate (e.g., failure rate of additive manufacturing processes implemented per the AMC 140), weight of the fabricated 3D objects, failure rate of the AMO 18, and/or the like. The cost metrics 172 may comprise and/or be derived from a combination of a plurality of cost factors, each cost factor assigned a respective weight (a respective user-specified weight or the like).

Alternatively, or in addition, the AMC metrics 170 may comprise mechanical and/or structural utility (MU) metrics 174, which may be configured to quantify mechanical and/or structural performance characteristics of the AMC 140 (or AMO 18 manufactured under the AMC 140). The MU metrics 174 may, for example, be derived from AM_PROP 162 of the AMC 140 (and/or evaluation of a prototype 180 of the AMC 140, as disclosed in further detail herein). By way of non-limiting example, the MU metrics 174 may comprise a tensile strength of the AMO 18 with respect to one or more of ODA 124-1 through 124-D. Alternatively, or in addition, the MU metrics 174 may be derived from tensile strength M_PROP 128A across a plurality of AMR 421 (or DU 121), within respective AMR 421 (or DU 121), within respective additively manufactured design components (AM DC) 720 (or DC 420), and/or the like, as disclosed in further detail herein. In some implementations, the MU metrics 174 may be further configured to incorporate cost or loss factors associated with the AMC 140, as disclosed herein. The MU metrics 174 may, for example, incorporate utility factors configured to be inversely proportional to corresponding one or more cost factors, such as material consumption, fabrication time, complexity, failure rate, weight, and/or the like. The MU metrics 174 may comprise and/or be derived from a combination of a plurality MU factors, each assigned a respective weight (a respective user-specified weight or the like).

In some implementations, the profile 160 of an AMC 140 may further comprise evaluation metrics 190. The evaluation metrics 190 may be configured to quantify a suitability and/or optimality of the AMC 140 for specified designs 120 and/or design specifications 122. For example, the evaluation metrics 190 may indicate whether AM_PROP 162 of the AMC 140 satisfy AM_REQ 132 of specified designs 120, as disclosed herein. The evaluation metrics 190 may be further configured to quantify an optimality of the AMC 140 for designated design specifications 122 with respect to one or more other suitable AMC 140 for the designated design specifications 122. The evaluation metrics 190 may, for example, rank the AMC 140 relative to other suitable AMC 140 determined for a design specification 122, as disclosed in further detail herein (e.g., may rank the suitable AMC 140 using AMC metrics 170, such as cost metrics 172, MU metrics 174, and/or the like).

In some embodiments, the design manager 110 may comprise and/or be coupled to a datastore 108. The datastore 108 may be configured to store information pertaining to respective 3D object designs 120, such as AMC 140 determined for the designs 120, profiles 160 of the AMC 140, and so on. The datastore 108 may be configured to maintain such information according to any suitable schema and/or in any suitable format, including, but not limited to: structured data, a table, name-value data, an object, eXtensible Markup Language (XML) data, Structured Query Language (SQL) data, semi-structured data, no-SQL data, a blob, and/or the like. As illustrated in FIG. 5B, the datastore 108 may be configured to store one or more entries 109 pertaining to respective 3D object designs 120. The entry 109 illustrated in the FIG. 5B example may be configured to associate the AMC 140 illustrated in FIG. 5A with the profile 160 illustrated in FIG. 5B.

Figure 6A:
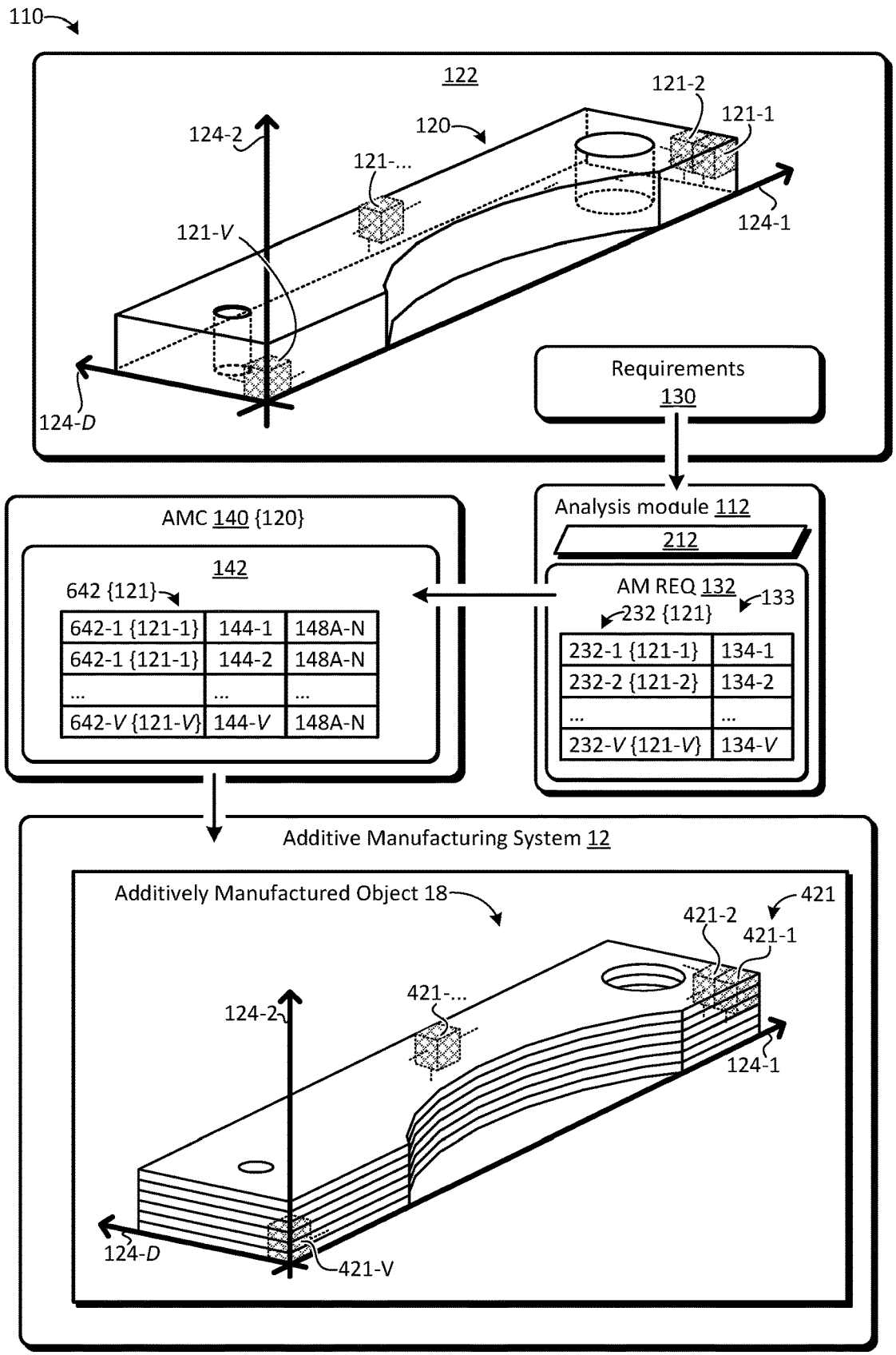
FIG. 6A illustrates an example of an AMC configured to control AM processes at or within respective design units of a 3D object design.
Figure 6B:
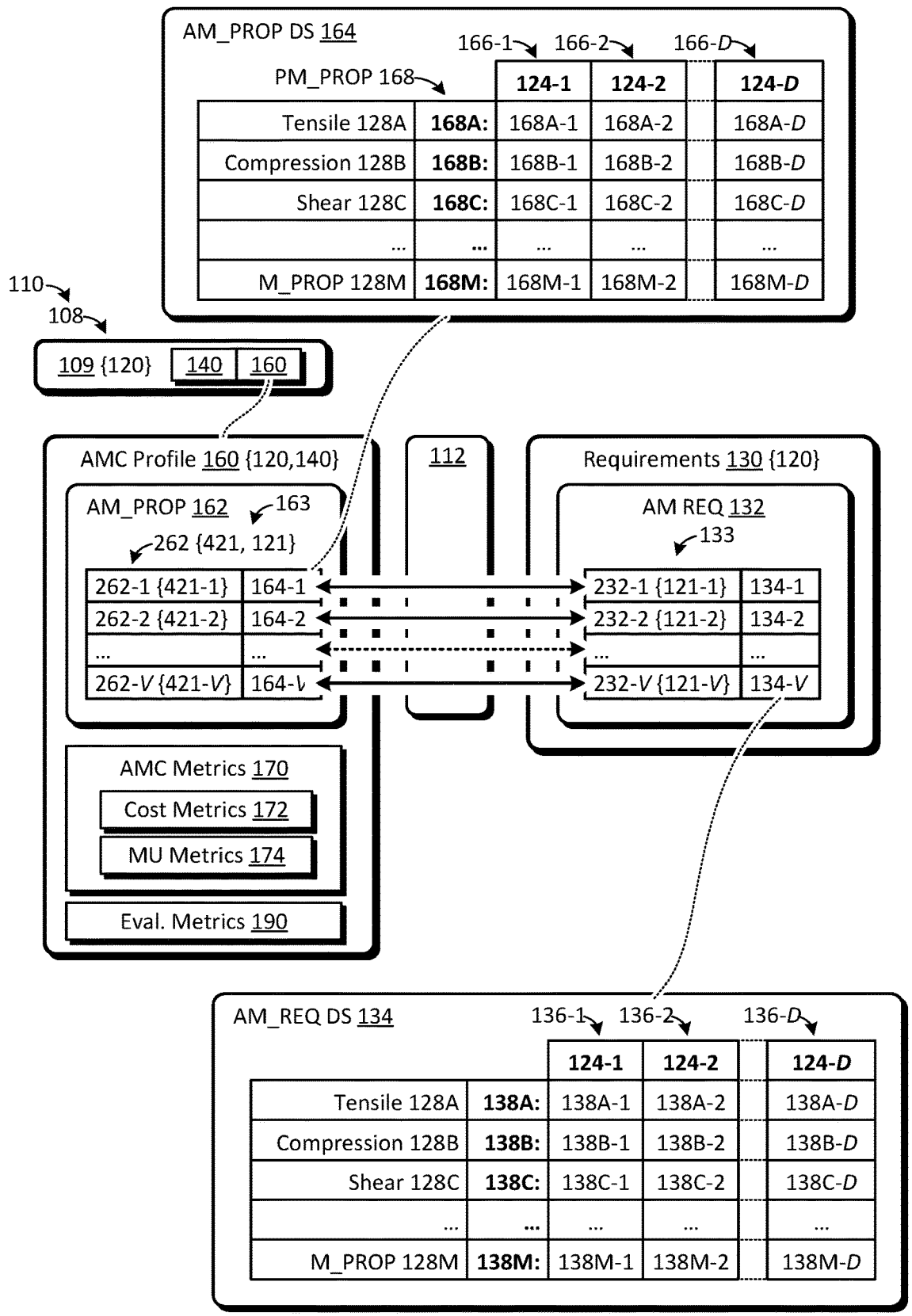
FIG. 6B is a schematic block diagram illustrating an example of a design manager configured to determine whether an AMC satisfies requirements specified for respective design units of a 3D object design.
Figure 7A:
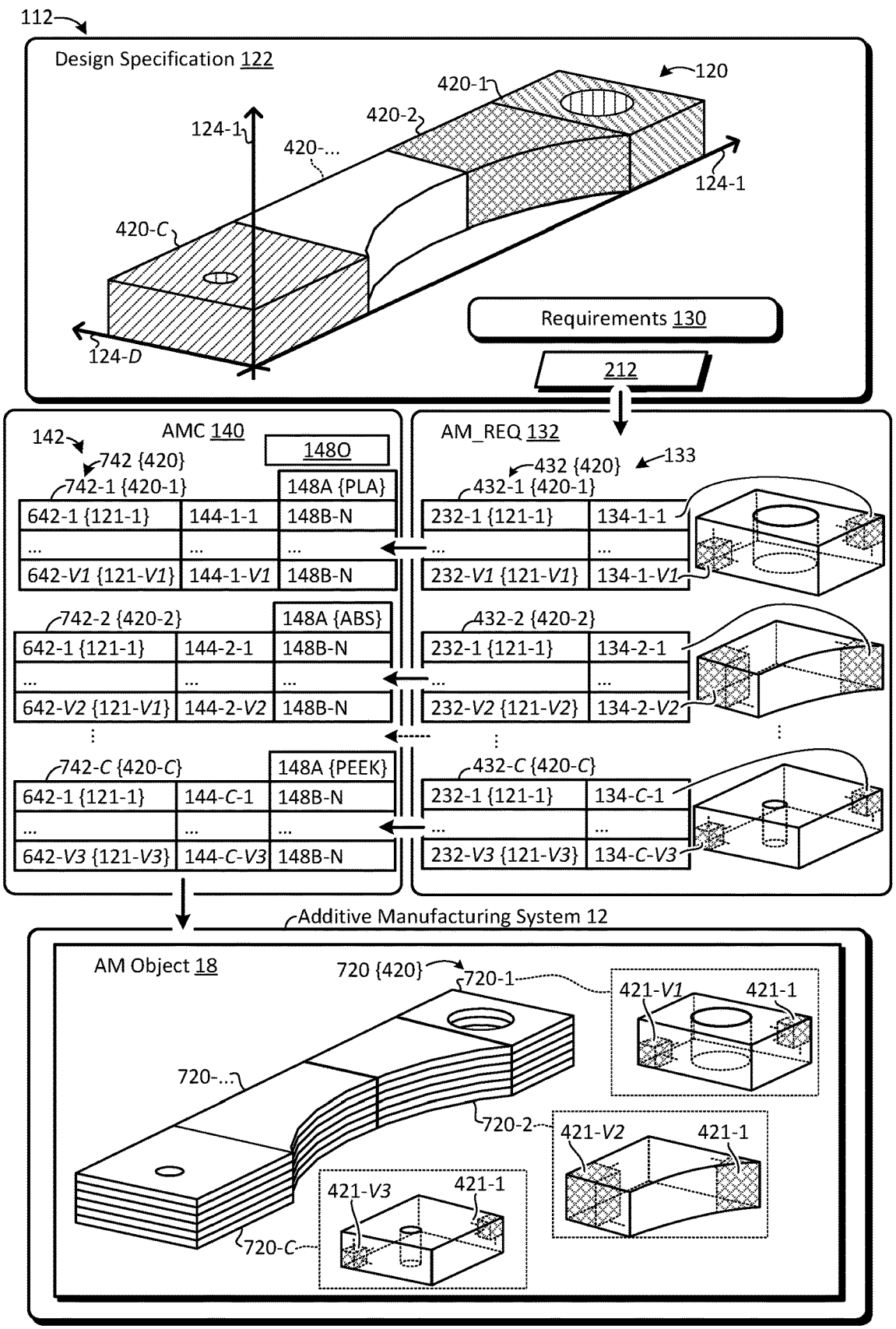
FIG. 7A illustrates an example of an AMC configured to control the additive manufacture of a hybrid 3D object design.
Figure 7B:
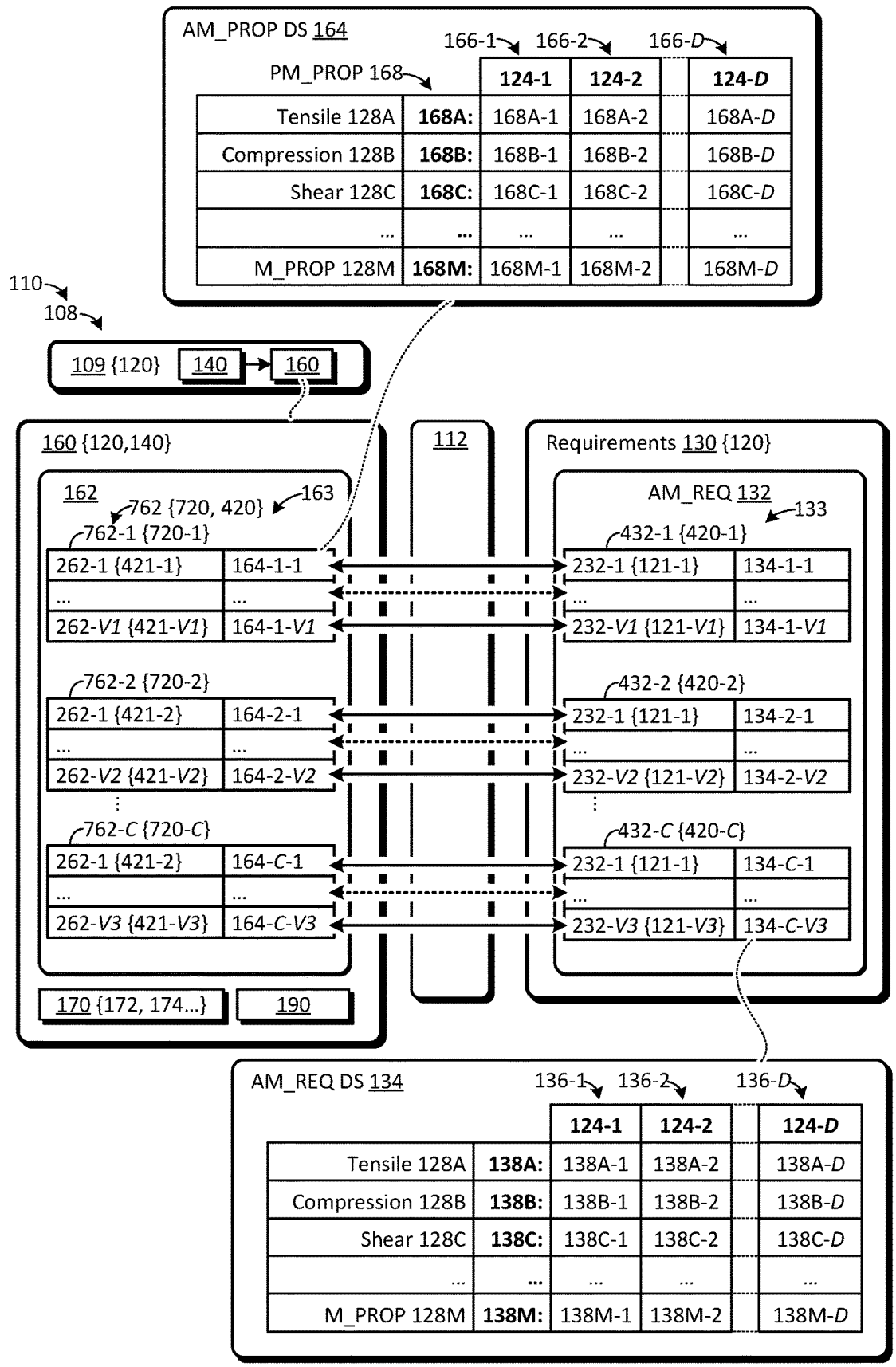
FIG. 7B is a schematic block diagram illustrating an example of a design manager configured to determine whether an AMC satisfies requirements specified for a hybrid 3D object design.

FIG. 6A illustrates another example of a design manager 110 configured to determine an AMC 140 for a 3D object design 120. In the FIG. 6A example, the AMC 140 may be configured to control the manufacture of a design 120 comprising V DU 121 (e.g., DU 121-1 through 121-V), as illustrated in one or more of FIGS. 3B-3E. The AMC 140 illustrated in FIG. 6A may, therefore, be configured to control AM of the design 120 at a DU granularity level (e.g., may comprise a plurality of DC AMC 642, each configured to control AM of the design 120 at or within a respective DU 121).

In the FIG. 6A example, the requirements 130 of the design 120 may also be defined at the DU granularity level. The AMC_REQ data 133 of the design 120 may comprise VDU AM_REQ 232, each DU AM_REQ 232 comprising a respective AM_REQ DS 134 configured to define AM_REQ 132 for a respective DU 121 of the design 120 (e.g., AM_REQ DS 134-1 through 134-V configured to define AM_REQ 132 for DU 121-1 through 121-V, respectively). The AM_REQ 132 of the design 120 may be determined and/or refined in a design MA procedure 212, as illustrated in one or more of FIGS. 3B-3E.

As disclosed herein, the AMC 140 determined by the design manager 110 may be configured to control AM of the design 120 at the DU granularity level. An AMC 140 may comprise a plurality of DU AMC 642, each DU AMC 642 comprising n AMC DS 144 configured to control AM of the design 120 at or within a specified DU 121 of the design 120. In the FIG. 6A example, the AMC 140 comprises DU AMC 642-1 through 642-V configured to control AM of the design 120 at or within DU 121-1 through 121-V, respectively; DU AMC 642-1 may comprise AM DS 144-1 configured to define AMC_PV 148A-N to control AM of the design 120 within DU 121-1, DU AMC 642-2 may comprise AM DS 144-2 configured to define AMC_PV 148A-N to control AM of the design 120 within DU 121-2, DU AMC 642-V may comprise AM DS 144-V configured to define AMC_PV 148A-N to control AM of the design 120 within DU 121-V, and so on. The AMC parameters 142 utilized to control AM of the design 120 may, therefore, vary by DU 121 (e.g., different DU 121 of the design 120 may be manufactured under different AMC_PV 148).

AMO 18 manufactured under the AMC 140 illustrated in FIG. 6A may comprise (and/or be comprised of) a plurality of "additively manufactured regions" 421. As used herein, an "additively manufactured region" (AMR) 421 refers to a location, region, section, volume, and/or other portion of the 3D structure of an AMO 18 manufactured in accordance with a specified DU AMC 642 (and/or AMC DS 144). The AMO 18 illustrated in FIG. 6A may comprise V AMR 421, each AMR 421 manufactured in accordance with the DU AMC 642 of the corresponding DU 121. In other words, the AMO 18 may comprise AMR 421-1 through 421-V manufactured in accordance with AMC DS 144-1 through 144-V of DU AMC 642-1 through 642-V. The AM_PROP 162 of the AMO 18 at or within AMR 421 may be influenced by the AMC_PV 148 defined by the corresponding AMC DS 144 of the AMC 140; the AM_PROP 162 of AMR 421-1 may be influenced by the AMC DS 144-1 used to control AM of DU 121-1, the AM_PROP 162 of AMR 421-2 may be influenced by the AMC DS 144-2 used to control AM of DU 121-2, the AM_PROP 162 of AMR 421-V may be influenced by the AMC DS 144-V used to control AM of DU 121-V, and so on.

In some implementations, the profile 160 of the AMC 140 may be configured to model AM_PROP 162 of AMO 18 at or within respective DU 121 of the design 120 (e.g., at or within corresponding AMR 421). In other words, the AM_PROP data 163 determined for the AMC 140 may be defined at the DU granularity (per the granularity of the AMC 140 and AM_REQ 132); the AM_PROP data 163 may be configured to model, quantify, estimate, and/or predict AM_PROP 162 of AMO 18 at or within respective AMR 421 (and/or DU 121).

FIG. 6B illustrates an example of a profile 160 determined for the AMC 140 of FIG. 6A. The profile 160 may be maintained in the datastore 108 in association with the design 120 and/or AMC 140, as disclosed herein. The profile 160 illustrated in FIG. 6B may be determined for the AMC 140 and/or AM_REQ 132 illustrated in FIG. 6A. As disclosed herein, the AMC 140 and AM_REQ 132 may be defined at the DU granularity level; the AMC 140 may comprise DU AMC 642 configured to control AM of the design 120 at or within respective DU 121 and the AM_REQ data 133 may define AM_REQ 132 for respective DU 121. The AM_PROP 162 determined for the profile 160 may be configured in accordance with the granularity level of the AMC 140 and/or AM_REQ 132. The profile 160 may comprise AM_PROP data 163 configured to model AM_PROP 162 of the AMC 140 at or within respective AMR 421 (and/or DU 121).

As illustrated in FIG. 6B, the AM_PROP data 163 may comprise VDU AM_PROP 262, each DU AM_PROP 262 configured to model AM_PROP 162 of AMO 18 produced by the AMC 140 at or within AMR 421-1 through 421-V (and/or DU 121-1 through 121-V), respectively. For example, each DU AM_PROP 262 may comprise a respective AM_PROP DS 164, as illustrated in FIG. 5B. DU AM_PROP 262-1 through 262-V may comprise AM_PROP DS 164-1 through 164-V, AM_PROP DS 164 comprising a respective set of M×D PM_PROP 168 (e.g., PM_PROP 168A-1 through 168M-D), each PM_PROP 168 configured to model and/or quantify a respective one of M M_PROP 128 with respect to a specified one of D ODA 124. Alternatively, or in addition, the AM_PROP DS 134 of the DU AM_PROP 262 may comprise respective sets of D ODA_PROP DS 166 (e.g., ODA_PROP DS 166-1 through 166-D), as disclosed herein.

The design manager 110 may determine whether the AMC 140 illustrated in FIG. 6A is suitable for the design specification 122. The analysis module 112 may classify the AMC 140 as "suitable" in response to determining that the profile 160 determined for the AMC 140 satisfies requirements 130 associated with the design 120, as disclosed herein. In the FIG. 6B example, the determining may comprise comparing the AM_PROP DS 164 of respective DU AM_PROP 262 to the AM_REQ DS 134 of corresponding DU AM_REQ 232 (or vice versa), e.g., comparing AM_PROP DS 164-1 through 164-V to AM_REQ DS 134-1 through 134-V (or vice versa). Comparisons between respective AM_REQ DS 134 of the AM_REQ 132 associated with the design 120 and corresponding AM_PROP DS 164 of the profile 160 of the AMC 140 may be implemented as described herein (e.g., as described in conjunction with FIG. 5B).

FIG. 7A illustrates another example of a design manager 110 configured to determine an AMC 140 for a 3D object design 120. The design manager 110 may be configured to determine AMC 140 and/or AM_REQ 132 for designs 120 comprising a plurality of DC 420, as disclosed herein (e.g., hybrid designs 120). In some embodiments, the DC 420 of a hybrid design 120 may be divided and/or partitioned into DU 121, as disclosed herein. The hybrid design 120 illustrated in FIG. 7A may comprise C DC 420; DC 420-1 may comprise V1 DU 121 (e.g., DU 121-1 through 121-V1 within DC 420-1), DC 420-2 may comprise V2 DU 121 (e.g., DU 121-1 through 121-V2 within DC 420-2), DC 420-C may comprise V3 DU 121 (e.g., DU 121-1 through 121-V3 within DC 420-C), and so on.

The hybrid design 120 illustrated in FIG. 7A may be associated with requirements 130. In some embodiments, the analysis module 112 may be configured to determine and/or refine AM_REQ 132 for the hybrid design 120, as disclosed herein (e.g., as illustrated in FIG. 4). The AM_REQ 132 may be defined at the DC-DU granularity level. In the FIG. 7A example, the AM_REQ data 133 may comprise C DC AM_REQ 432, each DC AM_REQ 432 configured to define AM_REQ 132 for a respective DC 420; DC AM_REQ 432-1 may comprise DU AM_REQ 232-1 through 232-V1, comprising AM_REQ DS 134-1-1 through 134-1-V1 for DU 121-1 through 121-V1 of DC 420-1, DC AM_REQ 432-2 may comprise DU AM_REQ 232-1 through 232-V2, comprising AM_REQ DS 134-2-1 through 134-2-V2 for DU 121-1 through 121-V2 of DC 420-2, DC AM_REQ 432-C may comprise DU AM_REQ 232-1 through 232-V3, comprising AM_REQ DS 134-C-1 through 134-C-V2 for DU 121-1 through 121-V3 of DC 420-C, and so on. In some implementations, the AM_REQ DS 134-1-1 through 134-C-V3 may comprise respective sets of M×D M_REQ 138 (and/or may be organized into ODA_REQ DS 136), as illustrated in one or more of FIGS. 5B, 6B, and 7B.

The design manager 110 may be configured to determine AMC 140 for hybrid designs 120. An AMC 140 for a hybrid design 120 may comprise a plurality of DC AMC 742, each DC AMC 742 configured to control the AM of a respective DC 420 of the design 120; each DC AMC 742 may comprise a set of DU AMC 642 configured to control AM of the DC 420 at or within a respective DU 121 of the DC 420 (e.g., each DU AMC 642 may comprise a respective AMC DS 144, as illustrated in FIG. 6A). In the FIG. 7A example, the AMC 140 may comprise V DC AMC 742; DC AMD 742-1 may comprise AMC 144-1-1 through 144-1-V1 configured to control AM at or within DU 121-1 through 121-V1 of DC 420-1, DC AMC 742-2 may comprise AMC 144-2-1 through 144-2-V2 configured to control AM at or within DU 121-1 through 121-V2 of DC 420-2, DC AMC 742-C may comprise AMC 144-C-1 through 144-C-V3 configured to control AM at or within DU 121-1 through 121-V3 of DC 420-C, and so on.

As disclosed herein, the DC 420 of a hybrid design 120 may be configured for manufacture from respective materials and/or material types. In the FIG. 7A example, the AMC parameters 142 for DC 420-1 (defined in AMC DS 144-1-1 through 144-1-V1 of DC AMC 742-1) may specify that DC 420-1 is to be manufactured from a polylactic acid (PLA) material. Accordingly, the material type AMC_PV 148A specified for DU 121-1 through 121-V1 of DC 420-1 (per AMC DS 144-1-1 through 144-1-V1) may be set to PLA, while other AMC_PV 148B-N of the DC AMC 740-1 may vary by DU 121. As also illustrated in the FIG. 7A example, the AMC parameters 142 for DC 420-2 (defined in AMC DS 144-2-1 through 144-2-V2 of DC AMC 740-2) may specify that DC 420-2 is to be fabricated using a thermoplastic material type, such as acrylonitrile butadiene styrene (ABS). As such, the material type AMC_PV 148A for each DU 121-1 through 121-V2 of DC 420-2 may be set to ABS, while other AMC_PV 148-B-N of DC AMC 740-2 may vary by DU 121. By way of further non-limiting example, the AMC parameters 142 for DC 420-C (defined in AMC DS 144-C-1 through 144-C-V3 of DC AMC 740-C) may specify that DC 420-C of the hybrid design 120 is to be formed from a semi-crystalline engineering thermoplastic material, such as polyetheretherketone (PEEK). The material type AMC_PV 148A for DU 121-1 through 121-V3 of DC 420-C may, therefore, may be set to PEEK, while other AMC_PV 148A-N of DC AMC 740-D may vary by DU 121. Although particular examples of material type AMC_PV 148A are described herein, the disclosure is not limited in this regard and could be adapted for hybrid designs 120 comprising any number of DC 420 formed from any suitable additive manufacturing materials.

The AMC 140 may further comprise a hybrid design configuration (HDC) AMC_PV 1480 for a HDC AMC parameter 142. The HDC AMC_PV 1480 may be adapted to configure aspects of a multi-material and/or multi-stage additive manufacturing process for the hybrid design 120. By way of non-limiting example, the HDC AMC_PV 1480 may specify an order in which DC 420 of the hybrid design 120 are to be manufactured, e.g., the HDC AMC_PV 1480 may specify that DC 420-2 is to be manufactured first followed by DC 420-1, DC 420-C, and so on.

The AMO 18 produced by the AMC 140 of the hybrid design 120 may comprise a plurality of AM DC 720, each corresponding to a respective DC 420 of the hybrid design 120. The AMP_PROP 162 of respective AM DC 720 may be influenced, at least in part, by the DC AMC 742 used to control the AM of the respective AM DC 720. In the FIG. 7A example, the AM_PROP 162 of AM DC 720-1 through 720-C may be influenced by DC AMC 740-1 through 740-C, respectively. Moreover, the AM DC 720 may comprise (and/or be comprised of) AMR 421, each AMR 421 corresponding to a respective DU 121.

The AM_PROP 162 of AMO 18 produced by the AMC 140 at or within respective AMR 421 may be influenced by the AMC DS 144 used to control manufacture of the design 120 at or within the corresponding DU 121.

In the FIG. 7A example, AM_PROP 162 at or within AMR 421-1 through 421-V1 of AM DC 720-1 may be influenced by AMC DS 144-1-1 through 144-1-V1 of DC AMC 742-1, the AM_PROP 162 at or within AMC 421-1 through 421-V2 of DC 720-2 may be influenced by AMC DS 144-2-1 through 144-2-V2 of DC AMC 742-2, the AM_PROP 162 at or within AMC 421-1 through 421-V3 of DC 720-C may be influenced by AMC DS 144-C-1 through 144-C-V3 of DC AMC 742-C, and so on.

In some implementations, the profiles 160 determined for AMC 140 of hybrid designs 120 may be configured to predict AM_PROP 162 of the resulting AM DC 720 and/or AM_PROP 162 at or within respective AMR 421 of the AM DC 720. FIG. 7B illustrates an example of a profile 160 determined for the AMC 140 of FIG. 7A. The profile 160 may be maintained in the datastore 108 in association with the design 120 and/or AMC 140, as disclosed herein.

In the FIG. 7B example, the profile 160 of the AMC 140 for the hybrid design 120 comprises C DC AM_PROP 762, each configured to model, quantify, and/or predict AM_PROP 162 of a respective AM DC 720. The DC AM_PROP 762-1 may comprise DU AM_PROP 262-1 through 262-V1, comprising AM_PROP DS 164-1-1 through 164-1-V1 configured to model, quantify, and/or predict AM_PROP 162 at or within AMR 421-1 through 421-V1 of AM DC 720-1 (and/or at DU 121-1 through 121-V1 of DC 420-1), the DC AM_PROP 762-2 may comprise DU AM_PROP 262-1 through 262-V2, comprising AM_PROP DS 164-2-1 through 164-2-V2 configured to model, quantify, and/or predict AM_PROP 162 at or within AMR 421-1 through 421-V2 of AM DC 720-2 (and/or at DU 121-1 through 121-V2 of DC 420-2), the DC AM_PROP 762-C may comprise DU AM_PROP 262-1 through 262-V3, comprising AM_PROP DS 164-C-1 through 164-C-V2 configured to model, quantify, and/or predict AM_PROP 162 at or within AMR 421-1 through 421-V3 of AM DC 720-C (and/or at DU 121-1 through 121-V3 of DC 420-C), and so on. In some implementations, the AM_PROP DS 164-1-1 through 164-C-V3 may comprise respective sets of M×D PM_PROP 168 (and/or may be organized into ODA_PROP DS 166), as illustrated in one or more of FIGS. 5B, 6B, and 7B.

The design manager 110 may determine whether the AMC 140 illustrated in FIG. 7A is suitable for the design specification 122. The analysis module 112 may classify the AMC 140 as "suitable" in response to determining that the profile 160 determined for the AMC 140 satisfies requirements 130 associated with the design 120, as disclosed herein. In the FIG. 7B example, the determining may comprise comparing AM_REQ 132 of the design 120 to the AM_PROP 162 of the profile 160. More specifically, the determining may comprise comparing respective DC AM_REQ 432 to corresponding DC AM_PROP 762 (e.g., comparing DC AM_REQ 432-1 through 432-C to DC AM_PROP 762-1 through 762-C, respectively). Comparing DC AM_REQ 432 to a corresponding DC AM_PROP 762 may comprise comparing a set of DU AM_REQ 232 of the DC AM_REQ 432 to corresponding set of DU AM_PROP 262 of the DC AM_PROP 762. The comparisons between sets of DU AM_REQ 232 and corresponding sets of DU AM_PROP 262 may be implemented as described above in conjunction with FIG. 6B. Alternatively, or in addition, in the FIG. 7B example, suitability of the AMC 140 may be determined by comparing AM_REQ DS 134-1-1 through 134-C-V3 to AM_PROP DS 164-1-1 through 164-C-V3, each comparison between an AM_REQ DS 134 and a corresponding AM_PROP DS 164 implemented as described above in conjunction with FIG. 5B.

Referring back to FIG. 1A, the design manager 110 may be configured to determine a suitable AMC 140 for a design 120 having specified requirements 130. In some implementations, the design manager 110 may be configured to select the suitable AMC 140 from the datastore 108. The datastore 108 may be configured to store entries 109 pertaining to the design 120, each entry 109 configured to include a respective set of parameters 142 (e.g., a respective set of AMC_PV 148), configured to cause an AMS 12 to produce 3D objects having designated mechanical properties (e.g., as indicated by a profile 160 associated with the AMC 140). The design manager 110 may be configured to determine a set of parameters 142 (e.g., AMC_PV 148) that satisfy specified requirements 130, the determined set of parameters 142 based, at least in part, on parameters 142 of one or more entries 109 of the datastore 108.

Figure 8:
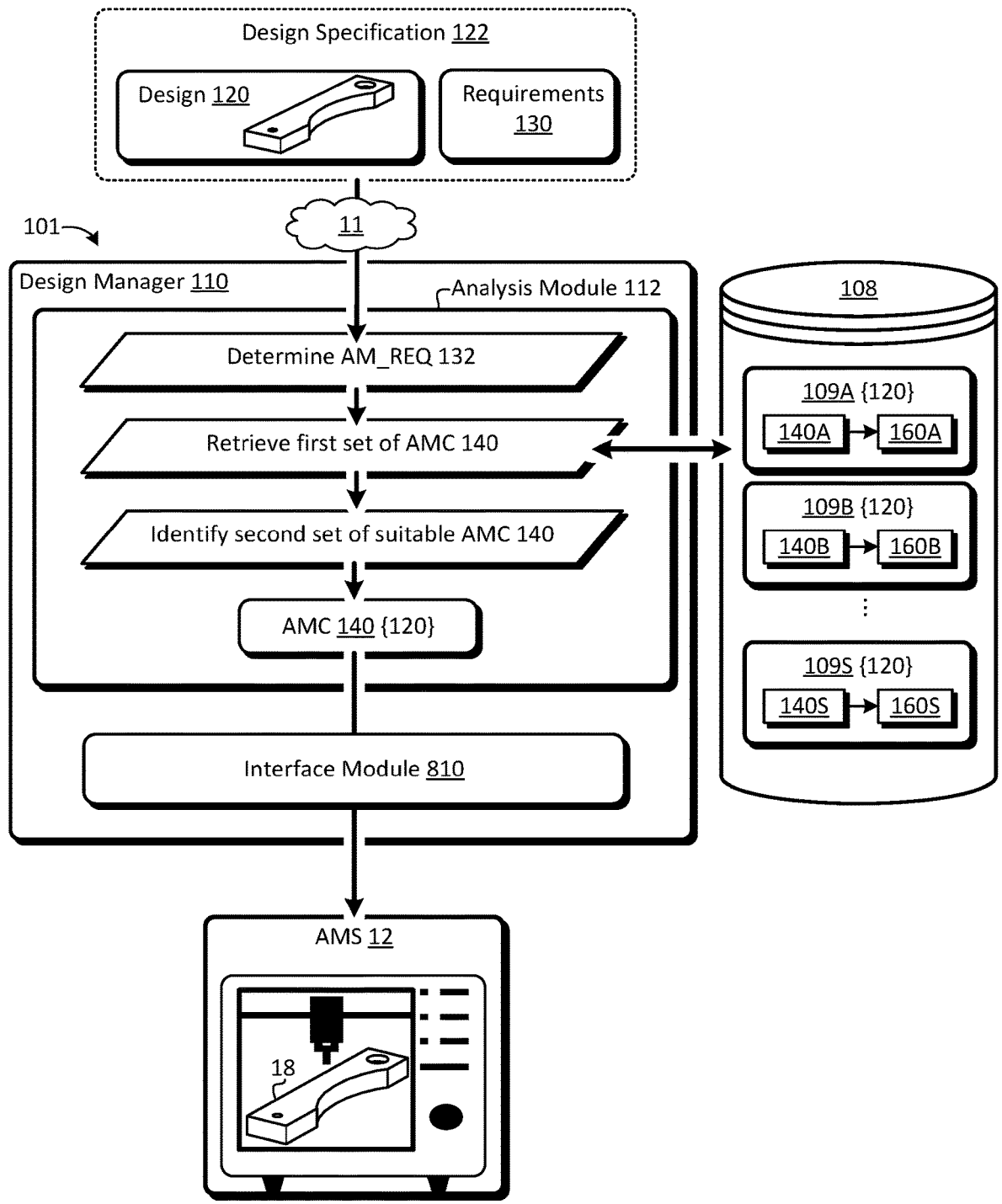
FIG. 8 is a schematic block diagram illustrating an example of a design manager configured to determine a suitable and/or optimal AMC for a 3D object design.

FIG. 8 is a schematic block diagram illustrating another example of a design manager 110 configured to determine an AMC 140 for a 3D object design 120. As illustrated in FIG. 8, the datastore 108 may comprise a plurality of entries 109 for the design 120, each comprising a respective AMC 140 configured to cause an AMS 12 to produce AMO 18 of the design 120. In the FIG. 8 example, the datastore 108 comprises S entries 109A-S, each comprising a respective AMC 140A-S. The datastore 108 may comprise AMC 140 as illustrated in one or more of FIGS. 5A, 6A, and/or 7A. By way of non-limiting example, the AMC 140A-S may, a) define AMC parameters 142 (AMC_PV 148) for substantially all of the structure of the 3D object design 120 as illustrated in the FIG. 5A example, b) may comprise AMC DS 144 configured to define AMC parameters 142 for respective DU 121, as illustrated in the FIG. 6A example, c) may comprise DC AMC 740 configured to define AMC parameters 142 for respective DU 121 of respective DC 420 of a hybrid design 120 as illustrated in the FIG. 7A example, and/or the like. By way of further non-limiting example, the AM_PROP 162 of the profiles 160A-S determined for respective AMC 140A-S may comprise, a) a single AM_PROP DS 164 configured to model, quantify, and/or predict AM_PROP 162 of AMO 18 manufactured under respective AMC 140A-S, as illustrated in FIG. 5B, b) a plurality of DU AM_PROP 262, each comprising a respective AM_PROP DS 164 configured to model, quantify, and/or predict AM_PROP 162 at or within a respective DU 121 of the design 120, as illustrated in FIG. 6B, b) a plurality of DC AM_PROP 762, each DC AM_PROP 762 comprising a plurality of DU AM_PROP 262, comprising respective AM_PROP DS 164 configured to model, quantify, and/or predict AM_PROP 162 at or within respective DU 121 of respective DC 420 of a hybrid design 120, as illustrated in FIG. 7B, and/or the like.

In some embodiments, the design manager 110 may be configured to import one or more of the AMC 140A-S and/or corresponding profiles 160A-S into the datastore 108. The design manager 110 may receive one or more of the AMC 140A-S and/or corresponding profiles 160A-S through the electronic communication network 11, memory resources 104 of the apparatus 101, NTS resources of the apparatus 101, HMI resources 106 of the apparatus 101, e.g., through a user interface (UI), such as a graphical user interface (GUI), through a data interface 107 of the apparatus 101, and/or the like.

The design manager 110 may utilize the datastore 108 to determine a suitable AMC 140 for a design specification 122 (e.g., for a 3D object design 120 having specified requirements 130). In response to receiving the design specification 122 the analysis module 112 of the design manager 110 may be configured to a) determine AM_REQ 132 for the design 120, b) retrieve a first set of AMC 140 from the datastore 108, and c) identify a second set of one or more suitable AMC 140 for the design 120.

Determining AM_REQ 132 for the design 120 may comprise retrieving known and/or predetermined AM_REQ 132 (e.g., retrieving known and/or predetermined AM_REQ 132 from the design specification 122 and/or requirements 130 associated with the design 120). Alternatively, or in addition, the design manager 110 may be configured to derive AM_REQ 132 for the design through implementation of a design MA procedure 212 as disclosed above in conjunction with one or more of FIGS. 2, 3B-3E, and/or 4 (e.g., derive AM_REQ 132 for the design 120 from specified FBC 230).

Retrieving the first set of AMC 140 from the datastore 108 may comprise retrieving and/or accessing AMC 140 associated with the design 120 from the datastore 108 (e.g., retrieving and/or accessing entries 109 that comprise and/or reference AMC 140 associated with the design 120). The AMC 140 associated with the design 120 may be identified by use of a design identifier, as disclosed herein (e.g., a name, identifier, URI, URL, GUID, and/or the like). Identifying the second set of suitable AMC 140 may comprise evaluating profiles 160 of the first set of AMC 140. An AMC 140 may be classified as suitable by comparing the profile 160 of the AMC 140 to the requirements 130 of the design 120, e.g., comparing AM_REQ 132 of the design 120 to AM_PROP 162 of the AMC 140 as illustrated in one or more of FIGS. 5B, 6B, and/or 7B. AMC 140 having profiles 160 that satisfy the requirements 130 of the design 120 may be classified as suitable (and may be included in the second set). By contrast, AMC 140 having profiles 160 that do not satisfy the requirements 130 of the design 120 may be classified as unsuitable and, as such, may be excluded from the second set. The design manager 110 may be further configured to select an AMC 140 for the design 120 from the second set of AMC 140.

The design manager 110 may further comprise and/or be coupled to an interface module 810. The interface module 810 may be configured to communicatively and/or operatively couple the design manager 110 to an AMS 12. The design manager 110 may utilize the interface module 810 to configure the AMS 12 to implement the AMC 140 determined for the design specification 122. More specifically, the design manager 110 may configure the AMS 12 to produce one or more AMO 18 of the design 120 in accordance with the selected AMC 140. The interface module 810 may comprise any suitable interface means, including, but not limited to: HMI resource(s) 106 of the apparatus 101, components of the data interface 107 of the apparatus 101 (e.g., a I/O interface, a network interface, or the like), a dedicated electronic communication interface, a direct communication interface, an indirect communication interface, user-driven interface components (e.g., manual interface components), and/or the like.

Alternatively, or in addition, the analysis module 112 may be configured to determine an "optimal" AMC 140 for the design specification 122. As disclosed herein, an "optimal" AMC 140 may refer to an AMC 140 that is selected and/or determined in accordance with an optimization criterion or procedure. An "optimal" AMC 140 may refer to a "locally" optimum AMC 140, a "pseudo-optimal" AMC 140, or the like. In the FIG. 8 example, determining an optimal AMC 140 for the design specification 122 may comprise configuring the analysis module 112 to a) determine AM_REQ 132 for the design 120, b) retrieve a first set of AMC 140 from the datastore 108, and c) identify a second set of suitable AMC 140 for the design 120, and d) select an optimal AMC 140 from the second set of suitable AMC 140 in accordance with an optimization criterion. The analysis module 112 may determine the AM_REQ 132, retrieve the first set of AMC 140, and identify the second set of suitable AMC 140 for the design 120, as disclosed above. The analysis module 112 may select the optimal AMC 140 for the design 120 based, at least in part, on AMC metrics 170 of the profiles 160 of the second set of AMC 140. The analysis module 112 may select the AMC 140 based on one or more optimization factors, as disclosed herein. For example, the analysis module 112 may select the AMC 140 having a lowest cost, a highest utility, and/or the like. The design manager 110 may configure the AMS 12 to implement the optimal AMC 140, as disclosed herein (e.g., by use of the interface module 810).

As disclosed herein, in some embodiments, the design manager 110 may be configured to import AMC 140 and corresponding profiles 160 from an external source, such as a user, another system, an AMS 12, a MAS 14, and/or the like. For example, the design manager 110 may be configured to import AMC 140 and/or profiles 160 received through the electronic communication network 11, memory resources 104 of the apparatus 101, NTS resources of the apparatus 101, HMI resources 106 of the apparatus 101, e.g., through user interaction with an interface, such as a GUI, through a data interface 107 of the apparatus 101, and/or the like. The design manager 110 may maintain the imported AMC 140 and corresponding profiles 160 within respective entries 109 of the datastore 108 and may determine suitable and/or optimal AMC 140 for designs 120 having specified requirements 130 by use of the stored entries 109, as disclosed herein.

Figure 9A:
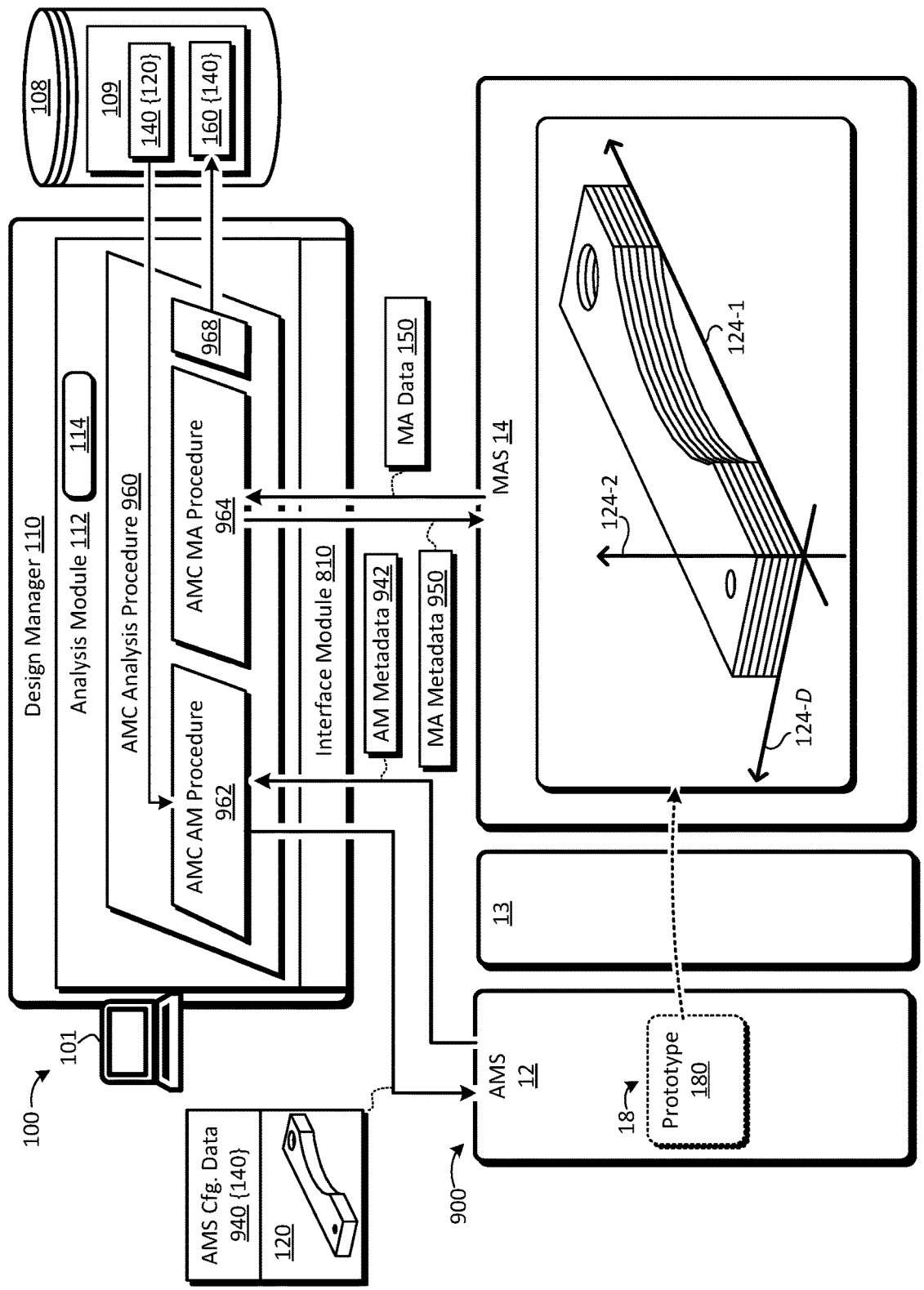
FIG. 9A-9C are schematic block diagrams illustrating examples of a design manager configured to determine profiles for AMC.

Alternatively, or in addition, the design manager 110 may be configured to determine profiles 160 for respective AMC 140, as illustrated in FIG. 9A. FIG. 9A is a schematic block diagram illustrating an example of a design manager 110 configured to determine a profile 160 of an AMC 140 for a 3D object design 120. As disclosed herein, the profile 160 determined for the AMC 140 may comprise information pertaining to the additive manufacturing process specified by the AMC 140, including information pertaining to the predicted AM_PROP 162 to be exhibited by AMO 18 fabricated using the AMC 140.

In the FIG. 9A example, the profile 160 of the AMC 140 may be determined through implementation of one or more AMC analysis (AMCA) procedures 960. An AMCA procedure 960 may comprise an AMC AM procedure 962 and an AMC mechanical and/or structural analysis (AMC MA) procedure 964. As disclosed in further detail herein, the AMC AM procedure 962 may comprise producing a prototype 180 of the AMC 140 and the MA procedure 964 may comprise evaluating characteristics of the resulting prototype 180 (e.g., determining a profile 160 of the AMC 140, such as AM_PROP 162 of the prototype 180 and/or the like). As used herein, a prototype 180 of an AMC 140 may refer to an AMO 18 produced in additive manufacturing process(es) controlled by the AMC 140. In other words, the prototype 180 of an AMC 140 may refer to an AMO 18 produced by an AMS 12 configured in accordance with the AMC 140. A prototype 180 may comprise one or more of a simulated or virtual prototype 180-1, a physical prototype 180-2, and/or the like. A simulated or virtual prototype 180-1 of an AMC 140 may refer to a simulated or virtual AMO 18 produced through simulated or virtual AM process(es) controlled by the AMC 140 (e.g., a virtual prototype 180-1 produced by a virtual AMS 12-1 per the AMC 140). A physical prototype 180-2 of an AMC 140 may refer to a physical AMO 18 produced through physical AM process(es)_controlled by the AMC 140 (e.g., a physical prototype 180-2 produced by a physical AMS 12-2 per the AMC 140).

In some implementations, the AMCA procedure 960 may further comprise an AMC profile analysis (AMC PA) procedure 968. The AMC PA procedure 968 may comprise deriving a profile 160 for the AMC 140 from information acquired during implementation of the AMCA procedure 960 (e.g., during implementation of the AMC AM procedure 962, AMC MA procedure 964, and/or the like). The AMC PA procedure 968 may comprise deriving AM_PROP 162 for the profile 160 from MA data 150, as disclosed herein. The AMC PA procedure 968 may further comprise determining one or more AMC metrics 170 for the AMC 140. For example, the AMC PA procedure 968 may comprise determining cost metrics 172 for the AMC 140 based on AMC additive manufacturing (AMC AM) metadata 942. The AMC AM metadata 942 may be configured to quantify cost and/or loss factors associated with AM of the prototype(s) 180 under specified AMC 140, e.g., based on one or more cost factors as disclosed herein, such as material consumption, manufacture time, and/or the like. The AMC PA procedure 968 may further comprise determining and/or refining the cost metrics 172 based, at least in part, on cost factors derived from the MA data 150 derived from the prototype 180, such prototype weight or the like. The AMC PA procedure 968 may further include determining MU metrics 174 for the AMC 140. The MU metrics 174 may be derived from the MA data 150 and/or resulting AM_PROP 162 determined for the profile 160, as disclosed herein.

In some embodiments, the analysis module 112 may implement aspects of the AMCA procedure 960 by use of an AMC analysis (AMCA) system 900. The AMCA system 900 may comprise an AMS 12 and MAS 14, as disclosed if further detail herein. In some implementations, the AMCA system 900 may be separate from and/or independent of the design manager 110 (and/or apparatus 101). For example, AMS 12 and/or MAS 14 of the AMCA system 900 may be implemented by use of systems and/or apparatus that are separate and/or independent of the system 100, apparatus 101, and/or computing resources 102 of the design manager 110. Alternatively, or in addition, aspects of the design manager 110 and AMCA system 900 may be implemented on same, common, and/or overlapping components, such as a same system 100, apparatus 101, computing resources 102, and/or the like.

In some implementations, the design manager 110 may further comprise an interface module 810. The interface module 810 may be configured to operatively and/or communicatively couple the design manager 110 (and/or analysis module 112) to components of the AMCA system 900. The interface module 810 may be configured to operatively and/or communicatively couple the design manager 110 to one or more of the AMS 12 and/or MAS 14, as disclosed in further detail herein.

The analysis module 112 may issue data and/or commands to the AMS 12 (e.g., through the interface module 810). In the FIG. 9A example, the analysis module 112 may be configured to communicate AMS configuration data 940 to the AMS 12. The AMS configuration data 940 may comprise and/or reference the design 120 of the AMC 140. The AMS configuration data 940 may further comprise the AMC 140. Alternatively, or in addition, the AMS configuration data 940 may comprise AMS-specific data adapted for the AMS 12. For example, the AMS configuration data 940 may be produced by encoding, formatting, and/or otherwise converting the AMC 140 into a form capable of being interpreted and/or implemented by the AMS 12. In other words, the AMS configuration data 940 may comprise an AMS-specific version of the AMC 140 adapted for the AMS 12 utilized to produce a prototype 180 of the AMC 140 for subsequent evaluation and analysis.

In some implementations, the AMC AM procedure 962 may further comprise acquiring AMC AM metadata 942 pertaining to implementation of the AMC 140. The AMC AM metadata 942 may be configured to quantify optimization factors from which aspects of the profile 160 of the AMC 140 may be derived, such as AMC metrics 170, evaluation metrics 190, AM_PROP 162, and/or the like. For example, the AMC AM metadata 942 may comprise information pertaining to one or more cost factors, such as material type specified by the AMC 140 (e.g., per one or more AMC_PV 148A of the AMC 140), material cost, material consumption (e.g., amount of material and/or respective material type(s) consumed during fabrication of the prototype 180 under the AMC 140), material waste produced by the AMC 140, fabrication time (e.g., time required to fabricate the prototype 180 per the AMC 140), complexity of the AMC 140 (e.g., a number of steps and/or AM operations involved in implementation of the AMC 140), failure rate of the AMC 140 (e.g., failures incurred during production of prototype(s) 180 per the AMC 140), and/or the like. Alternatively, or in addition, the AMC AM metadata 942 may be configured to quantify one or more utility factors, which may be inversely proportional to respective cost factors. For example, the AMC AM metadata 942 may comprise information pertaining to one or more MU metrics 174, such as AM_PROP 162 of the prototype 180, and so on, as disclosed in further detail herein.

The AMC MA procedure 964 may comprise determining AM_PROP 162 of the prototype 180 produced by the AMC 140. The analysis module 112 may determine the AM_PROP 162 by use of an MAS 14, as disclosed herein. The analysis module 112 may communicate MA configuration metadata 950 to the MAS 14, the MA configuration metadata 950 specifying MA operations to perform on the prototype 180. The MA operations may be configured to cause the MAS 14 to produce MA data 150 from which characteristics of the AMC 140 may be derived, as disclosed herein (e.g., AM_PROP 162 at a determined granularity level) The MA configuration metadata 950 may, for example, configure the MAS 14 to determine an AM_RESP 152 of the prototype 180 to specified FBC 230 (e.g., may comprise MA data 150 for the prototype 180, as illustrated in one or more of FIGS. 2, 3B-3E, and 4). In the FIG. 9A example, however, the FBC 230 of the MA configuration metadata 950 may be configured to determine maximum and/or threshold quantities for AM_PROP 162 of the prototype 180 (as opposed to modeling design requirements 130, such as expected use conditions or the like).

In some implementations, the AMC MA procedure 964 may comprise configuring the MAS 14 to acquire MA data 150 comprising a set of M×D M_RESP 158 (e.g., M_RESP 158A-1 through 158M-D), as illustrated in FIG. 2, each M_RESP 158 configured to model a respective one of the M M_PROP 128 in a respective one of the D ODA 124 of the prototype 180. The analysis module 112 may derive a set of M×D PM_PROP 168 (e.g., PM_PROP 168A-1 through 168M-D) from the MA data 150, each MP_PROP 168 configured to model a respective one of the M M_PROP 128 of the prototype 180 in a respective one of ODA 124-1 through 124-D, as illustrated in FIG. 5B. The AM_PROP 162 of the prototype 180 may be configured to model a tensile strength PM_PROP 168A, compression strength PM_PROP 168B, shear strength PM_PROP 168C, PM_PROP 168M configured to quantify a strength M_PROP 128M, and so on, with respect to each of ODA 124-1 through 124-D.

In some implementations, the design 120 associated with the AMC 140 (and prototype 180) may be divided and/or partitioned into a plurality of DU 121 (e.g., into V DU 121), as disclosed herein. In these implementations, the analysis module 112 may configure the MAS 14 to acquire MA data 150 configured to model the AM_RESP 152 of the prototype 180 at or within respective AMU 421 (each AMU 421 corresponding to a respective DU 121), as illustrated in one or more of FIGS. 3B-3E and 4. The analysis module 112 may derive V AM_PROP 262 from the MA data 150, each of AM_PROP 262-1 through 262-V comprising a respective AM_PROP DS 162 (e.g., AM_PROP DS 162-1 through 162-V) configured to model, quantify, and/or predict AM_PROP 162 produced by the AMC 140 at or within AMU 421-1 through 421-V of the prototype 180, as illustrated in FIGS. 3B-3E.

In some implementations, the design 120 associated with the AMC 140 (and prototype 180) may comprise a plurality of DC 420; for example, the AMC 140 may be configured to control AM of a hybrid design 120 comprising C DC 420, each DC 420 comprising a respective set of DU 121, as illustrated in FIG. 4. In these implementations, the analysis module 112 may produce MA configuration metadata 950 configured to cause the MAS 14 to acquire MA data 150 configured to model the AM_RESP 152 of the prototype 180 at or within respective AMU 421 of respective AMC AM 720 (e.g., each AMU 421 corresponding to a respective DU 121 of a respective DC 420 of the hybrid design 120, as shown in FIG. 4). In these implementations, the MA data 150 may comprise C DC AM_RESP 452, each DC AM_RESP 452-1 through 452-C configured to model the AM_RESP 152 of the design 120 at or within a respective DC 420; each DC AM_RESP 452 may comprise a set of DU AM_RESP 252, comprising AM_RESP DS 164 configured to model and/or quantify the AM_RESP 152 of the prototype 180 at or within a respective AMR 421 (or DU 121) within the corresponding DC 420. The analysis module 112 may be further configured to derive C DC AM_PROP 762 from the C DC AM_RESP 452 of the MA data 150, each DC AM_PROP 762 comprising a set of DU AM_PROP 262, comprising respective AM_PROP DS 164 configured to model, quantify, and/or predict AM_PROP 168 produced by the AMC 140 at or within a respective AMR 421 of a respective AM DC 720 of the prototype 180 (and/or at respective DU 121 of respective DC 420 of the hybrid design 120), as illustrated in FIG. 7B.

The analysis module 112 may be further configured to determine AMC optimization factors from the MA data 150 determined for the AMC 140, such as a weight of the prototype 180, AM_PROP 162 of the prototype 180, and/or the like. The analysis module 112 may utilize the AMC optimization factors to determine one or more AMC metrics 170, as disclosed herein (e.g., determine cost metrics 172, MU metrics 174, evaluation metrics 190 and/or the like). The AM_PROP 162, AMC metrics 170, and/or other information determined through implementation of the AMCA procedure 960 may be recorded in a profile 160 of the AMC 140. The profile 160 may be stored within the datastore 108, or other NTS resources 105 of the apparatus 101. In the FIG. 9A example, the profile 160 may be maintained within a datastore entry 109 associated with the AMC 140 and/or design 120.

Figure 9B:
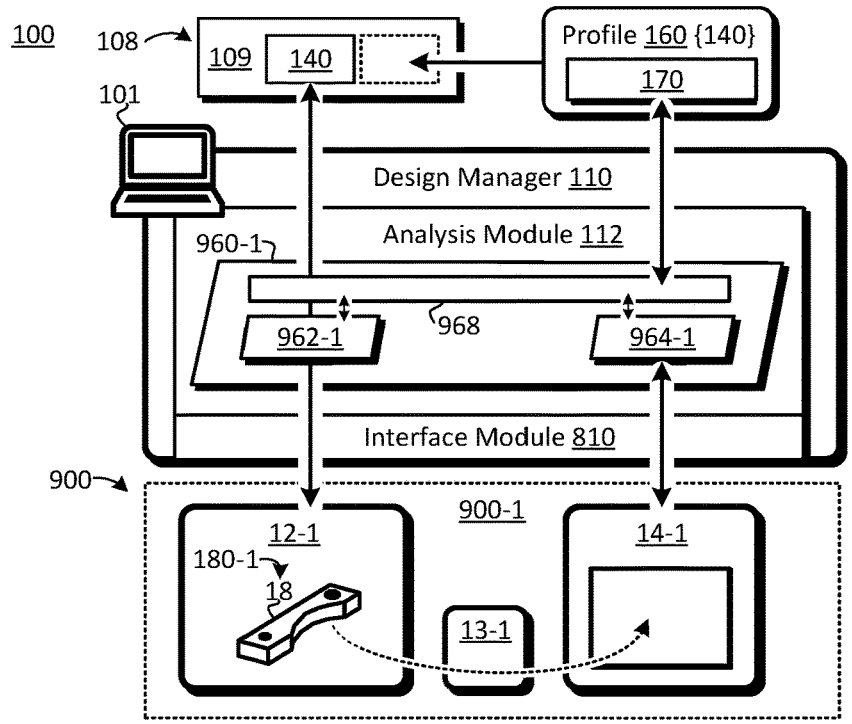
Figure 9C:
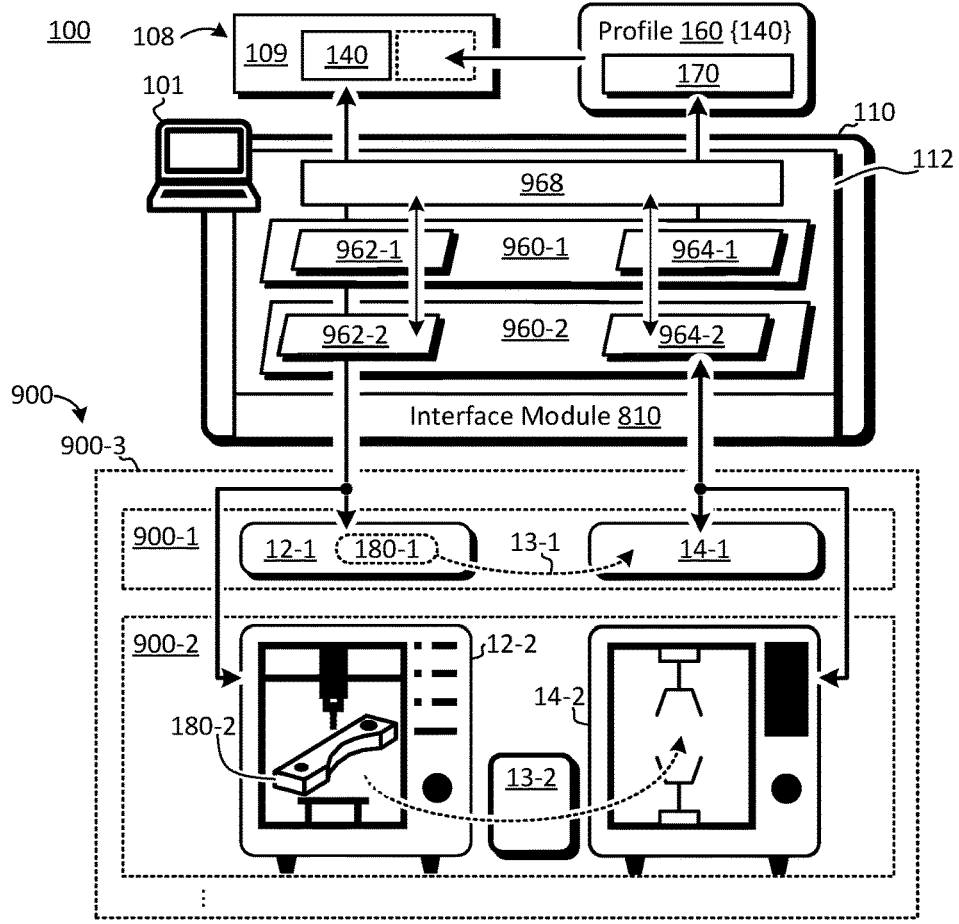

In some embodiments, the AMCA system 900 may further comprise and/or be coupled to an AMC analysis automation system (AMCAAS) 13. The AMCAAS 13 may be configured to automate aspects of AMCA procedures 960 implemented by the analysis module 112 (e.g., automate interactions between the AMS 12 and/or MAS 14 of the AMCA system 900); the AMCAAS 13 may be configured to automate aspects of virtual AMCA procedure(s) 960-1, as illustrated in FIG. 9B, physical AMCA procedure(s) 960-2, as illustrated in FIG. 9C, and/or the like.

In some embodiments, aspects of the AMCA procedure 960 may be implemented and/or controlled by an AI/ML system 114. The AI/ML system 114 may be configured to control AMCA AM procedures 962, MA procedures 964, AMC PA procedures 968, and/or the like. Alternatively, or in addition, the AI/ML system 114 may be trained to determine AMC 140 that optimally satisfy the resulting AM_REQ 132, as illustrated in one or more of FIGS. 10A, 10B, 13, and 20-22. In some implementations, the AI/ML system 114 may be configured to determine suitable or optimal AMC 140 by use of an AI/ML optimization algorithm, one or more AI/ML optimization components, one or more AI/ML models, and/or the like as disclosed in further detail herein.

As disclosed herein, in some embodiments, the AMS 12 of the AMCA system 900 may be configured to profile AMC 140 through fabrication and/or analysis of virtual prototypes 180-1. A virtual prototype 180-1 of an AMC 140 may be produced in AM process(es) controlled by the AMC 140 (e.g., may be produced by fabricating a virtual AMO 18 of the AMC 140). Alternatively, or in addition, the AMCA system 900 may be configured to profile AMC 140 through fabrication and/or analysis of physical prototypes 180-2. A physical prototype 180-2 of an AMC 140 may be produced one or more physical AM process(es) implemented by a physical AMC 12-2 (e.g., may be produced by fabricating a physical AMO 18 of the AMC 140).

It may be more efficient to fabricate, analyze, profile, and/or evaluate virtual prototypes 180-1. For example, the costs or losses associated with virtual AMCA procedures 960-1 (e.g., as illustrated in FIG. 9B) may be substantially lower than the costs or losses associated physical AMCA procedures 960-2 (e.g., as disclosed in further detail herein in conjunction with FIG. 9C), in terms of analysis time, material consumption, wear on physical components, resource utilization, and so on. Therefore, in some implementations, the design manager 110 may be configured to determine suitable and/or optimal AMC 140 for respective design specifications 122 through virtual AMCA procedures 960-1, as illustrated in FIG. 9B. In some implementations, the design manager 110 may implement physical AMCA procedures 960-2 on selected AMC 140, such as suitable or optimal AMC 140 determined for designated design specifications 122. The design manager 110 may utilize the results of the physical AMCA procedures 960-2 to correct or refine the AMC 140 (e.g., correct or refine AMC 140 and/or corresponding profiles 160 determined through virtual AMCA procedures 960-1).

FIG. 9B illustrates an example of a design manager 110 configured to implement virtual AMCA procedures 960-1. Implementing a virtual AMCA procedure 960-1 on an AMC 140 may comprise determining a profile 160 for the AMC 140 based, at least in part, on AM and/or MA of one or more virtual prototypes 180-1 produced under the AMC 140. In the FIG. 9B example, implementing a virtual AMCA procedure 960-1 for an AMC 140 may comprise producing a virtual prototype 180-1 of the AMC 140 in a virtual AMC AM procedure 962-1 and implementing MA analysis operations on the resulting virtual prototype 180-1 in a virtual AMC MA procedure 964-1. Aspects of the virtual AMCA procedure 960-1 may be implemented by use of a virtual AMCA system 900-1, which may comprise a virtual AMS 12-1 and a virtual MAS 14-1.

Implementation of a virtual AMC AM procedure 962-1 may comprise causing the virtual AMS 12-1 to produce a virtual prototype 180-1 of the AMC 140. The virtual prototype 180-1 may comprise a simulated or virtual AMO 18 produced in accordance with the AMC 140, as disclosed herein. The analysis module 112 may issue data and/or commands to the virtual AMS 12-1 through and/or by use of the interface module 810. In some implementations, the analysis module 112 may communicate AMS configuration data 940 to the virtual AMS 12-1, the AMS configuration data 940 may comprise the design 120 associated with the AMC 140 and/or AMS-specific configuration data adapted for the virtual AMS 12-1, as disclosed herein. The analysis module 112 may be further configured to acquire AMC AM metadata 942 from the virtual AMS 12-1. The AMC AM metadata 942 may comprise information from which AMC metrics 170 of the profile 160 may be derived; for example, the AMC AM metadata 942 may comprise information corresponding to cost and/or utility factors of respective AMC metrics 170, as disclosed herein.

The analysis module 112 may communicate MA configuration metadata 950 to the virtual MAS 14-1, the MA configuration metadata 950 may be configured to cause the virtual MAS 14-1 to produce MA data 150 from which AM_PROP 162 of the virtual prototype 180-1 may be derived (e.g., configure the virtual MAS 14-1 to implement one or more MA operations on the virtual prototype 180-1, as disclosed herein). The virtual AMCA procedure 960-1 may further comprise an AMC PA procedure 968. The AMC PA procedure 968 may be configured to derive aspects of the profile 160 for the AMC 140 from data acquired through implementation of the virtual AMCA procedure 960-1, as disclosed herein (e.g., determine AM_PROP 162 from the MA data 150 produced by the virtual MAS 14-1, determine AMC metrics 170 for the AMC 140, such as cost metrics 172, MU metrics 174, or the like, and so on). The AM_PROP 162, AMC metrics 170, and/or other information determined through implementation of the virtual AMCA procedure 960-1 may be recorded within a profile 160 of the AMC 140. The profile 160 may be written to an NTS system, such as NTS resources 105 of the apparatus 101, the datastore 108 or the like; for example, the profile 160 may be stored within a datastore entry 109 configured to associate the AMC 140 with the profile 160 and/or corresponding design 120.

In some implementations, the virtual AMCA system 900-1 may further comprise a virtual AMCAAS 13-1. The virtual AMCAAS 13-1 may be configured to automate aspects of virtual AMCA procedures 960-1 implemented by the design manager 110. For example, the virtual AMCAAS 13-1 may be configured to transfer virtual prototypes 180-1 between the virtual AMS 12-1 and the virtual MAS 14-1 (or within the virtual AMS 12-1), convert the virtual prototype 180-1 for use by the virtual AMS 12-1 and/or virtual MAS 14-1 (e.g., convert the virtual prototype 180-1 from a data or file format utilized by the virtual AMS 12-1 into a data or file format usable by the virtual MAS 14-1 and vice versa), and so on.

Although particular examples of virtual AMCA systems 900-1 are described herein, the disclosure is not limited in this regard and could be adapted to utilize any number of different types of virtual AMCA systems 900-1 comprising any suitable virtual AMCA components (e.g., virtual AMCA systems 900-1 comprising any suitable virtual AMS 12-1, virtual MAS 14-1, virtual AMCAAS 13-1, and/or the like).

As disclosed herein, it may be more efficient to profile, analyze, and/or evaluate candidate AMC 140 through virtual AMCA procedures 960-1 as compared to physical AMCA procedures 960-2 involving physical prototypes 180-2. In some implementations, however, it may be advantageous to validate and/or refine AMC 140 and/or corresponding profiles 160 using physical prototypes 180-2. For example, the profile 160 of a suitable or optimal AMC 140 determined for a 3D object design 120 may be validated (or refined) by, inter alia, analysis of physical prototypes 180-2 produced by the determined AMC 140 in one or more physical AMCA procedures 960-2, as illustrated in FIG. 9C.

FIG. 9C is a schematic block diagram illustrating an example of a system 100 configured to implement aspects of AMCA procedures 960, as disclosed herein. In the FIG. 9C example, the system 100 is configured to implement virtual AMCA procedures 960-1 on AMC 140, as disclosed herein (e.g., by use of a virtual AMCA system 900-1). The analysis module 112 may be further configured to implement physical AMCA procedures 960-2 on selected AMC 140. For example, the analysis module 112 may be configured to implement physical AMCA procedures 960-2 on suitable or optimal AMC 140 determined for respective design specifications 122, as disclosed in further detail herein. The AMCA system 900 illustrated in FIG. 9C may, therefore, comprise and/or be referred to as a virtual and/or physical (V/P) AMCA system 900-3.

The design manager 110 may be operatively and/or communicatively coupled to the V/P AMCA system 900-3 (and/or components thereof) by an interface module 810, as disclosed herein. The design manager 110 may be operatively and/or communicatively coupled to one or more of the virtual AMCA system 900-1 (and/or components thereof), the physical AMCA system 900-2 (and/or components thereof), and so on. In the FIG. 9C example, the design manager 110, virtual AMS 12-1, virtual MAS 14-1, virtual AMCAAS 13-1, physical AMS 12-2, physical MAS 14-2, and/or physical AMCAAS 13-2 may be implemented and/or embodied by respective devices or systems. Alternatively, or in addition, aspects of the design manager 110 or V/P AMCA system 900-3 may be implemented on same, shared, or overlapping components, as disclosed herein.

The physical AMCA system 900-2 may be configured to implement physical AMCA procedures 960-2 on selected AMC 140, the physical AMCA procedures 960-2 involving physical prototypes 180-2 of the selected AMC 140. The physical AMCA system 900-2 may comprise a physical AMS 12-2. The physical AMS 12-2 may be configured to implement physical AMC AM procedures 962-2 to, inter alia, produce physical prototypes 180-2 of selected AMC 140. Configuring a physical AMS 12-2 to produce a physical prototype 180-2 of an AMC 140 may comprise communicating data and/or commands to the physical AMS 12-2 using the interface module 810, as disclosed herein. For example, a physical AMC AM procedure 962-2 may comprise communicating AMS configuration data 940 to the physical AMS 12-2, the AMC configuration data 940 configured to cause the physical AMS 12-2 to produce physical prototype(s) 180-2 of the design 120 per the AMC 140.

The AMC 140 may be configured to control physical AM process(es) implemented by the physical AMS 12-2 at any suitable granularity or granularity level. In a first non-limiting example, the AMC 140 may be defined at a design granularity; the AMC 140 may comprise an AMC DS 144 configured to define parameters 142 and/or AMC_PV 148 configured to control AM over the 3D structure of the resulting physical prototypes 180-2. In a second non-limiting example, the AMC 140 may be defined at a DU granularity; the AMC 140 may comprise a plurality of AMC DS 144, each configured to control AM of the design 120 by the physical AMS 12-2 at or within a respective DU 121 of the design 120 (e.g., at or within each of DU 121-1 through 121-V). In a third non-limiting example, the AMC 140 may be defined at a DC-DU or DC-DU$_{DUR}$ granularity level; the AMC 140 may comprise a plurality of DC AMC 742, each configured to control AM of a respective AM_DC 720, each AM DC 720 comprising a set of DU AMC 642, each comprising an AM DS 144 configured to control AM of the design 120 at or within a respective DU 121 of a respective DC 420 of the hybrid design 120. The analysis module 112 may be further configured to acquire AMC AM metadata 942 from the physical AMS 12-2. The AMC AM metadata 942 may comprise information from which AMC metrics 170 of the profile 160 may be derived; for example, the AMC AM metadata 942 may comprise information corresponding to respective cost and/or utility factors of the AMC 140, as disclosed herein.

The physical AMCA system 900-2 may further comprise a physical MAS 14-2. The physical MAS 14-2 may comprise any suitable means for implementing MA operations pertaining to physical AMO 18 and/or physical prototypes 180-2, including, but not limited to: a physical mechanical testing system, a physical mechanical testing device, a universal testing machine (UTM), a UTM system, a universal tester, a materials testing machine, a materials test frame, a load frame, a load cell, a force test device, a structural analysis system, a static analysis system, a static analysis device, a force transducer, an Extensometer, a test fixture, tensometer, a compression test machine (CTM), an electromechanical CTM, a hydraulic CTM, a load resistance tester, a compressive strength test device, a digital force gauge, a mechanical force gauge, a hydraulic force gauge, a manual compression tester, a motorized compression tester, an automated compression tester, a shear test machine, a direct shear machine, a modular shear test machine, a column shear test machine, a shear test fixture, a shear box, a manual shear test machine, an automated shear test machine, and/or the like.

The analysis module 112 may utilize the physical MAS 14-2 to implement AMC MA procedures 964-2 on physical prototypes 180-2. The AMC MA procedures 964-2 may comprise communicating MA configuration metadata 950 to the physical MAS 14-2, the MA configuration metadata 950 configured to cause the physical MAS 14-2 to derive MA data 150 a physical prototype 180-2 from which AM_PROP 162 and/or other characteristics of the physical prototype 180-2 may be derived (e.g., configure the physical MAS 14-2 to implement one or more MA operations on the physical prototype 180-2, as disclosed herein). The physical AMCA procedure 960-2 may further comprise an AMC PA procedure 968 to derive a profile 160 for the AMC 140 from information gathered during implementation of the physical AMCA procedure 960-2, as disclosed herein. The resulting AMC profile 160 may be recorded in NTS resources 105 of the apparatus 101, such as an entry 109 of the datastore 108.

In some implementations, the physical AMCA procedure 960-2 may include manual intervention. For example, the physical AMCA procedure 960-2 may comprise manual operations to configure the physical AMS 12-2 to produce the physical prototype 180-2 of the AMC 140, transfer the physical prototype 180-2 to the physical MAS 14-2, configure components or devices of the physical MAS 14-2 (e.g., manual operations to configure the physical MAS 14-2, place or arrange physical prototypes 180-2 within the physical MAS 14-2, and so on).

In some embodiments, the physical AMCA system 900-2 may further comprise a physical AMCAAS 13-2. The physical AMCAAS 13-2 may comprise a physical handling components configured to manipulate physical 3D objects, such as physical prototypes 180-2. For example, the physical AMCAAS 13-2 may be configured to transfer physical prototypes 180-2 produced by the physical AMS 12-2 to/from the physical MAS 14-2. The physical AMCAAS 13-2 may be further configured to transfer physical prototypes 180-2 between respective components, devices, and/or modules of the physical MAS 14-2, position or arrange the physical prototypes 180-2 therein, configure the physical MAS 14-2 to perform specified tests on the physical prototypes 180-2, and so on. The physical AMCAAS 13-2 may, therefore, enable the analysis module 112 to implement virtual AMCA procedures 960-1 substantially autonomously (e.g., with no or minimal manual intervention).

Although particular examples of physical AMCA systems 900-2 are described herein, the disclosure is not limited in this regard and could be adapted to utilize any number of different types of physical AMCA systems 900-2 comprising any suitable physical components (e.g., physical AMCA systems 900-2 comprising any suitable physical AMS 12-2, physical MAS 14-2, physical AMCAAS 13-2, and/or the like). Moreover, although FIGS. 9A-9C illustrate particular examples of AMCA systems 900, the disclosure is not limited in this regard. The design manager 110 may be configured to utilize any number of different AMCA systems 900, AMS 12, MAS 14, and/or AMCAAS 13, including any number of virtual AMCA systems 900-1, physical AMCA systems 900-2, and/or the like.

Figure 10A:
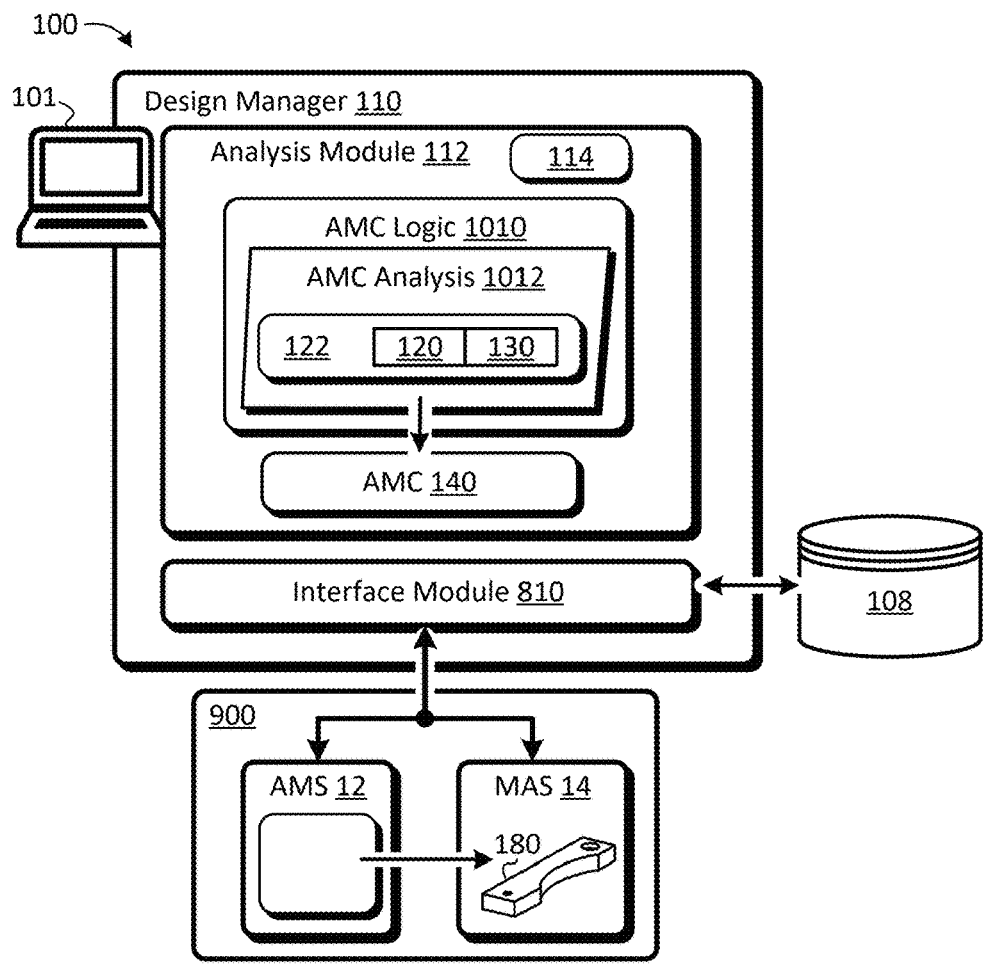
FIG. 10A is a schematic block diagram illustrating an example of a design manager configured to determine AMC through an iterative procedure.

FIG. 10A is a schematic block diagram illustrating another example of a system 100 for managing additive manufacturing. In the FIG. 10A example, the system 100 comprises a design manager 110 configured to implement AMC analysis operations 1012. As used herein, an AMC analysis operation 1012 refers to an operation to develop, refine, select, and/or otherwise determine an AMC 140 for a 3D object design 120 having specified requirements 130 (e.g., a design specification 122). An AM analysis operation 1012 may comprise determining a suitable or optimal AMC 140 for the design specification 122, as disclosed herein. The design manager 110 may utilize the AMC 140 determined for the design specification 122 to cause an AMS 12 to produce AMO 18 that satisfy requirements 130 of the design 120, as disclosed herein.

In some implementations, the AMC analysis operation 1012 for a design specification 122 may comprise selecting an AMC 140 for the design 120 from a datastore 108, the datastore 108 configured to maintain entries 109 comprising known or predetermined AMC 140, as illustrated in FIG. 8 (e.g., AMC 140 associated with known or predetermined profiles 160).

In the FIG. 10A example, analysis module 112 may be configured to implement AMC analysis operations 1012 to determine and/or refine AMC 140 for design specifications 122. The AMC 140 determined through the AMC analysis operations 1012 may differ from known or predetermined AMC 140 maintained in the datastore 108. For example, the AMC analysis operations 1012 implemented by the analysis module 112 may be configured to populate the datastore 108 (e.g., may be configured to add new entries 109 to the datastore 108).

Figure 10B:
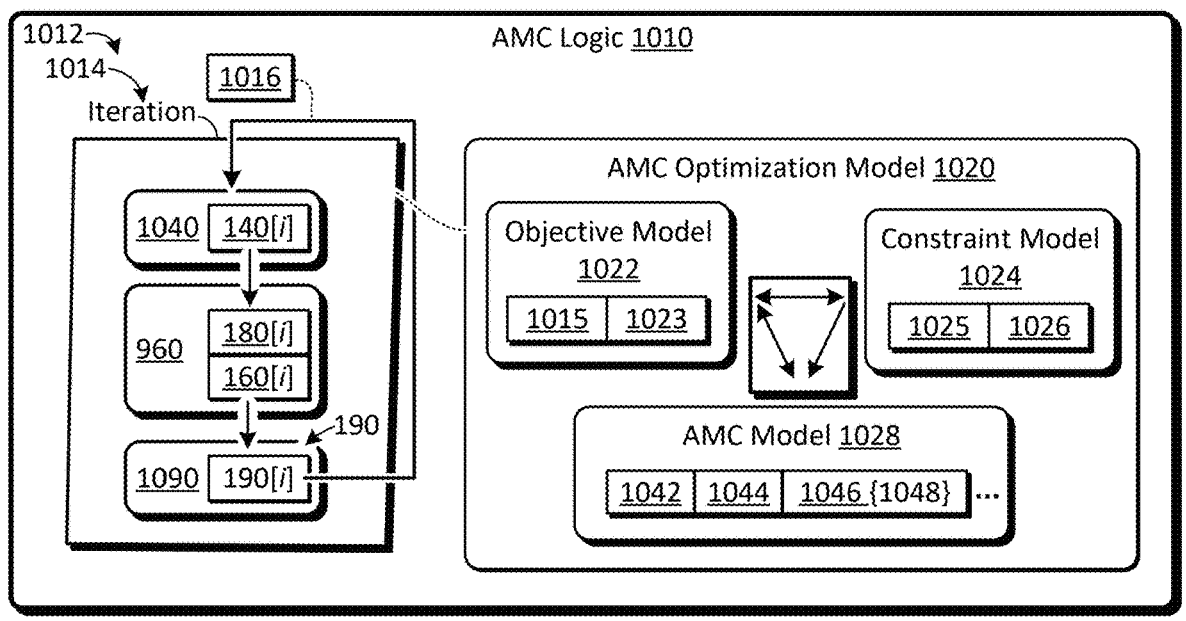
FIG. 10B illustrates an example of an AMC optimization model.

Aspects of the disclosed AMC operations 1012 may be implemented by use of AMC analysis logic 1010. In some implementations, the AMC analysis logic 1010 may be configured develop, refine, and/or otherwise determine AMC 140 for respective design specifications 122 through an iterative analysis (IA) procedure 1014, as illustrated in FIG. 10B. As disclosed in further detail herein, respective iterations (I) of the IA procedure 1014 may comprise implementation of a) a candidate procedure 1040 to determine an AMC 140[$i$] for the iteration (i), b) an AMCA procedure 960, and b) an evaluation procedure 1090 to evaluate the AMC 140[$i$] and/or resulting profile 160[$i$] in view of requirements 130 of the design specification 122.

The candidate procedure 1040 may comprise deriving candidate AMC 140[$i$] for respective iterations (i) of the IA procedure 1014 based, at least in part, on information learned in one or more previous iterations of the IA procedure 1014 (and/or previous implementations of the IA procedure 1014). For example, the candidate AMC 140[$i$] for the $i^{th}$ iteration of the IA procedure 1014 may be based, at least in part, on information learned during the development, profiling, and/or evaluation candidate AMC 140 in one or more previous iterations; candidate AMC 140, profiles 160, prototypes 180, evaluation metrics 190, and/or other information determined in previous iterations of the IA procedure 1014 may be referred to herein as AMC 140[$i-1$ . . . 1], profiles 160[$i-1$ . . . 1], AMC metrics 170[$i-1$ . . . 1], prototypes 180[$i-1$ . . . 1], evaluation metrics 190[$i-1$ . . . 1], and so on.

The AMCA procedure 960 may comprise developing profiles 160[$i$] for respective candidate AMC 140[$i$]. For example, respective iterations (i) of the AMCA procedure 960 may comprise an AMC AM procedure 962 to produce prototype(s) 180[$i$] of the candidate AMC 140[$i$], an AMC MA procedure 964 to evaluate the prototypes 180[$i$], and an AMC PA procedure 968 to determine a profile 160[$i$] of the AMC 140[$i$], as disclosed herein.

The evaluation procedure 1090 may comprise classifying candidate AMC 140[$i$] as "suitable" or "unsuitable," as disclosed herein. The evaluation procedure 1090 may further comprise evaluating AMC metrics 170 of the AMC 140[$i$]; for example, the evaluation procedure 1090 may comprise ranking the AMC 140[$i$] with respect to one or more other suitable AMC 140 determined for the design specification 122 based, at least in part, on AMC metrics 170 of the AMC 140[$i$]. In some implementations, the evaluation procedure 1090 may include producing evaluation data 190[$i$] for respective candidate AMC 140[$i$]. The evaluation data 190[$i$] may be configured to quantify a suitability and/or optimality of respective AMC 140[$i$]. The evaluation procedure 1090 may further comprise storing the AMC 140[$i$], profiles 160[$i$], and/or evaluation data 190[$i$] determined in respective iterations (i) of the IA procedure 1014 within the datastore 108 (e.g., within respective entries 109, as disclosed herein).

In some implementations, the AMC analysis logic 1010 may be configured to maintain IA metadata 1016 pertaining to the IA procedure 1014. The IA metadata 1016 may comprise any suitable information pertaining to implementation of the IA procedure 1014 and/or respective iterations thereof; the IA metadata 1016 at iteration (i), for example, may comprise information pertaining to previous iterations of the IA procedure 1014, which may include, but is not limited to: candidate AMC 140[$i-1$ . . . 1], profiles 160[$i-1$ . . . 1], AMC metrics [$i-1$ . . . 1], information pertaining to respective AMC prototypes 180[$i-1$ . . . 1], evaluation data 190[$i-1$ . . . 1], and so on. In some implementations, the IA metadata 1016 may be maintained in NTS resources 105 of the apparatus 101, such as the datastore 108 or the like. For example, information pertaining to respective iterations (i) may be stored within respective entries 109 of the datastore 108, as disclosed herein.

In some embodiments, the AMC analysis logic 1010 may be configured to formulate the task of determining an AMC 140 for a design specification 122 as an optimization problem. In the FIG. 10B example, the AMC analysis logic 1010 may comprise and/or implement an AMC optimization (AMC OPT) model 1020. In the FIG. 10B example, the AMC OPT model 1020 may comprise an optimization framework, including an objective model 1022, a constraint model 1024, and an AMC model 1028. The AMC OPT model 1020 may be configured to formulate the IA procedure 1014 as an iterative search within a "search space" or "AMC space." As used herein, a "search space" for an AMC 140 (or "AMC space") may refer to the domain of possible AMC 140 for a 3D object design 120. The AMC search space may be very large with many possible permutations; for example, an AMC 140 comprising N parameters 142, as illustrated in FIG. 5A, may correspond to an N dimensional AMC search space, an AMC 140 comprising V AMC datasets 144 for respective DU 121, as illustrated in FIG. 6A, may correspond to a V×N AMC search space, an AMC 140 comprising an HDC AMC_PV 1480 and DC AMC 742 for each of C DC 420, as illustrated in FIGS. 7A, may correspond to a V1×V2×V3×N+1 dimensional AMC search space, e.g., where DC AMC 742-1 comprises V1 AMC DC 144, DC AMC 742-2 comprises V2 AMC DC 144, DC AMC 742-C comprises V3 AMC DC 144, and so on, as in the FIG. 7A example. Moreover, it may be time-consuming and expensive to evaluate respective candidate AMC 140 within the search space, particularly through physical AMCA procedures 960-2. However, even when more efficient virtual AMCA procedures 960-1 are utilized, it may be advantageous to reduce the number of iterations to converge at suitable or optimal AMC 140. The AMC analysis logic 1010 may be configured to improve efficiency by, inter alia, implementing AMC analysis operations 1012 (and/or corresponding IA procedures 1014) in accordance with the AMC OPT model 1020, as disclosed in further detail herein.

The AMC OPT model 1020 may comprise an objective model 1022 configured to define optimization metrics and/or criteria, such as AMC metrics 170, cost metrics 172, MU metrics 174, and/or the like, as disclosed herein. The objective model 1022 may define one or more AMC metrics 170, such as the factors to include in respective AMC metrics 170 (e.g., cost factors, loss factors, utility factors, and/or the like), specify weights for respective optimization factors, and so on. The objective model 1022 may be further configured to define means for evaluating AMC 140, such as evaluation logic and/or an evaluation procedure 1090 for determining evaluation metrics 190 for respective AMC 140, as disclosed herein.

In some implementations, the objective model 1022 may be further configured to define and/or manage termination criteria 1015. As disclosed herein, the termination criteria 1015 may specify criteria by which the AMC analysis logic 1010 may determine whether to terminate or continue iteration(i) of the IA procedure 1014. As disclosed in further detail herein, the termination criteria 1015 may comprise any suitable criteria, including, but not limited to: optimization criteria to determine whether the IA procedure 1014 has identified and/or converged at a suitable or optimal AMC 140 (e.g., optimization metric criteria, cost criteria, MU criteria, and/or the like), iteration criteria (e.g., an iteration limit or threshold), and/or the like.

In some embodiments, the objective model 1022 may operate in accordance with an objective configuration 1023. The objective configuration 1023 may be specified in any suitable manner. For example, the objective configuration 1023 may be included in the design specification 122, may be maintained in NTS resources 105 of the apparatus 101 such as the datastore 108, may be specified through an HMI resource 106 of the apparatus 101 (e.g., may be specified by a user through a GUI), and/or the like. The objective configuration 1023 may be adapted to control any suitable aspect of the objective model 1022, including, but not limited to: AMC metrics 170, evaluation metrics 190, termination criteria 1015, and/or the like.

The constraint model 1024 may be configured to manage constraints pertaining to the AMC 140 (AMC constraints 1026). The AMC constraints 1026 may comprise any suitable information pertaining to AMC 140 determined through the AMC analysis operations (and/or corresponding IA procedures 1014), disclosed herein. For example, the AMC constraints 1026 may be configured to define limits, bounds, and/or other constraints for respective AMC parameters 142 and/or AMC_PV 148; the AMC constraints 1026 may define acceptable ranges or extents of AMC_PV 148 for respective parameters 142. As disclosed herein, the AMC analysis operation 1012 (and corresponding IA procedure 1014) disclosed herein may be configured to determine a suitable or optimal AMC 140 to control the manufacture of a design 120 on a particular AMS 12 (e.g., a "target" AMS 12). The AMC constraints 1026 imposed on the ANC analysis operation 1012 by the constraint model 1024 may be configured to model the capabilities and/or constraints of the target AMS 12. The AMC constraints 1026 may, therefore, vary between AMC analysis operations 1012 (and/or IA procedures 1014). For example, the AMC constraints 1026 of a first AMC analysis operation 1012 for a design specification 122 for AM on a first AMS 12 may differ from the AMC constraints 1026 imposed on a second AMC analysis operation 1012 for the same design specification 122 for AM on a different AMS 12 (e.g., due to differences in the capabilities and/or constraints of the AMS 12); as a result, AMC 140 determined for the design specification 122 in the first and second AMC analysis operations 1012 may differ from one another.

In some implementations, the AMC constraints 1026 may be specified, at least in part, by a constraint configuration 1025. The constraint configuration 1025 may be specified in any suitable manner. For example, the constraint configuration 1025 for a design specification 122 may be included in the design specification 122; the design specification 122 may comprise AMS metadata, as disclosed herein. Alternatively, or in addition, the constraint configuration 1025 may be maintained in NTS resources 105 of the apparatus 101 such as the datastore 108, may be specified through an HMI resource 106 of the apparatus 101, may be retrieved from the target AMS 12 of the design specification 122, and/or the like.

In some embodiments, the constraint model 1024 may be further configured to model design requirements 130, such as AM_REQ 132 or the like. The constraint model 1024 may be configured to model AM_REQ 132 of a design 120 in any suitable manner and/or at any suitable level of granularity. The constraint model 1024 may be configured to determine and/or refine AM_REQ 132 for a design specification 122 through implementation of a design MA procedure 212, as described herein in conjunction with one or more of FIGS. 2, 3B-3E, 4, 6A, and 7A. In a first non-limiting example, the constraint model 1024 may be configured to determine and/or refine an AM_REQ DS 134 for a design 120, the AM_RES DS 134 configured to define AM_REQ 132 over the 3D structure of the design 120 (e.g., over a plurality of DU 121 and/or AMU 141 of the design 120), as illustrated in one or more of FIGS. 1B, 2, and 5B. In a second non-limiting example, the constraint model 1024 may be configured to determine and/or refine AM_REQ DS 134 for respective DU 121 of a design 120, each AM_REQ DS 134-1 through 134-V configured to define AM_REQ 132 for a respective DU 121-1 through 121-V, as illustrated in one or more of FIGS. 3B-3E, 6A, and 6B. In a third non-limiting example, the constraint model 1024 may be configured to determine AM_REQ 132 for respective DC 420 of a hybrid design 120 (e.g., may define AM_REQ 132 for respective DU 121 of respective DC 420), as illustrated in one or more of FIGS. 4, 7A, and 7B.

The AMC model 1028 may be configured to model aspects of an AMC 140. More specifically, the AMC model 1028 may be configured to model the influence of specified AMC parameters 142 on specified AMC characteristics, such as AM_PROP 162 of the AMO 18 produced by the AMC 140, AMC metrics 170, cost metrics 172, MU metrics 174, and/or the like. In some embodiments, the AMC model 1028 may be configured to develop and/or maintain parameter models 1042 for respective AMC parameters 142. As disclosed in further detail herein, the parameter models 1042 developed for respective AMC parameters 142 may comprise generalized parameter correlation (GPC) models 1044, context-specific parameter correlation (CSPC) models 1046, and/or the like. The GPC model 1044 of an AMC parameter 142 may be configured to model generalized correlational relationships between AMC_PV 148 of the parameter 142 and characteristics of the resulting AMC 140 (e.g., trends between AMC_PV 148 and respective AMC characteristics, such as specified AMC metrics 170 or the like). The CSPC models 1046 of an AMC parameter 142 may be configured to model correlational relationships pertaining to the parameter 142 at or within specified AMC contexts (AMC_CTX) 1048, as disclosed in further detail herein.

Figure 11A:
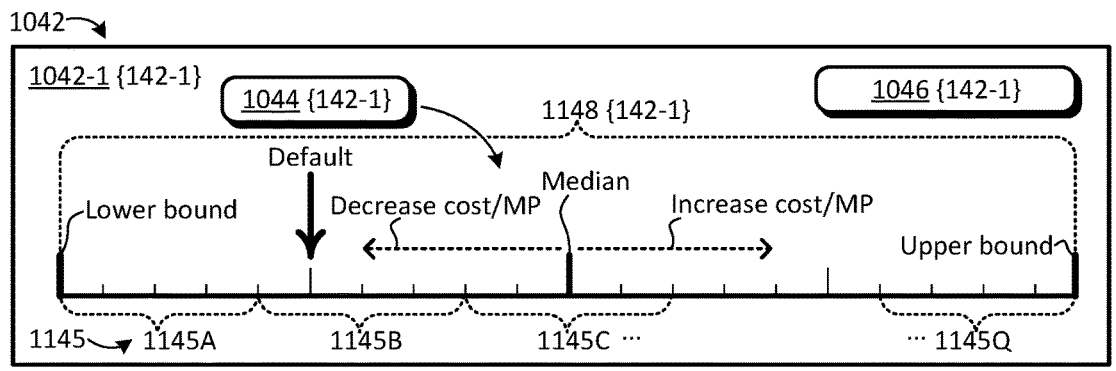
FIG. 11A-12 illustrate examples of AMC and/or AMC parameter models.
Figure 11B:
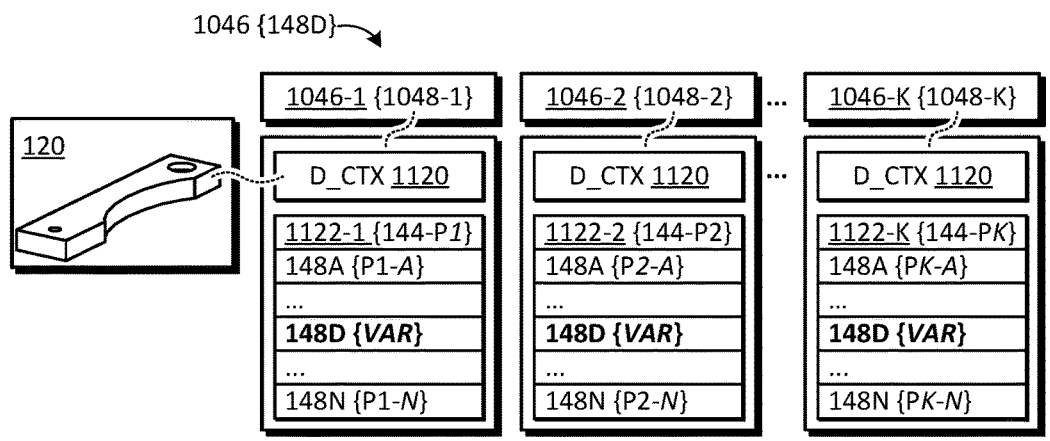
Figure 11C:
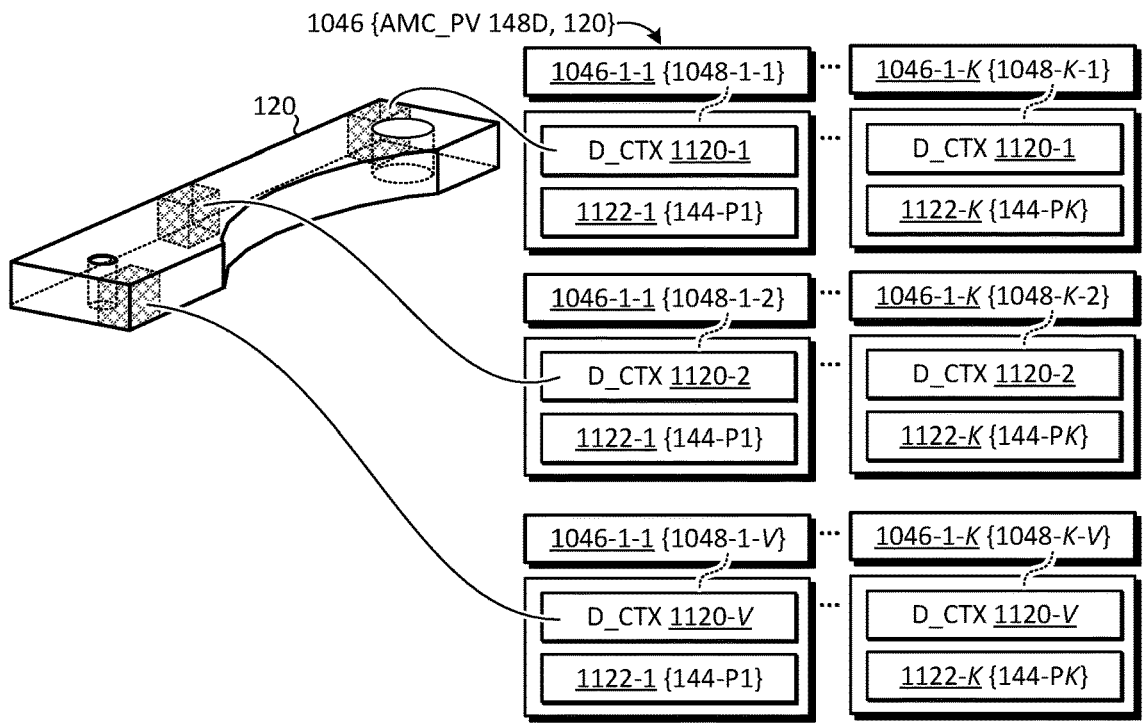
Figure 11D:
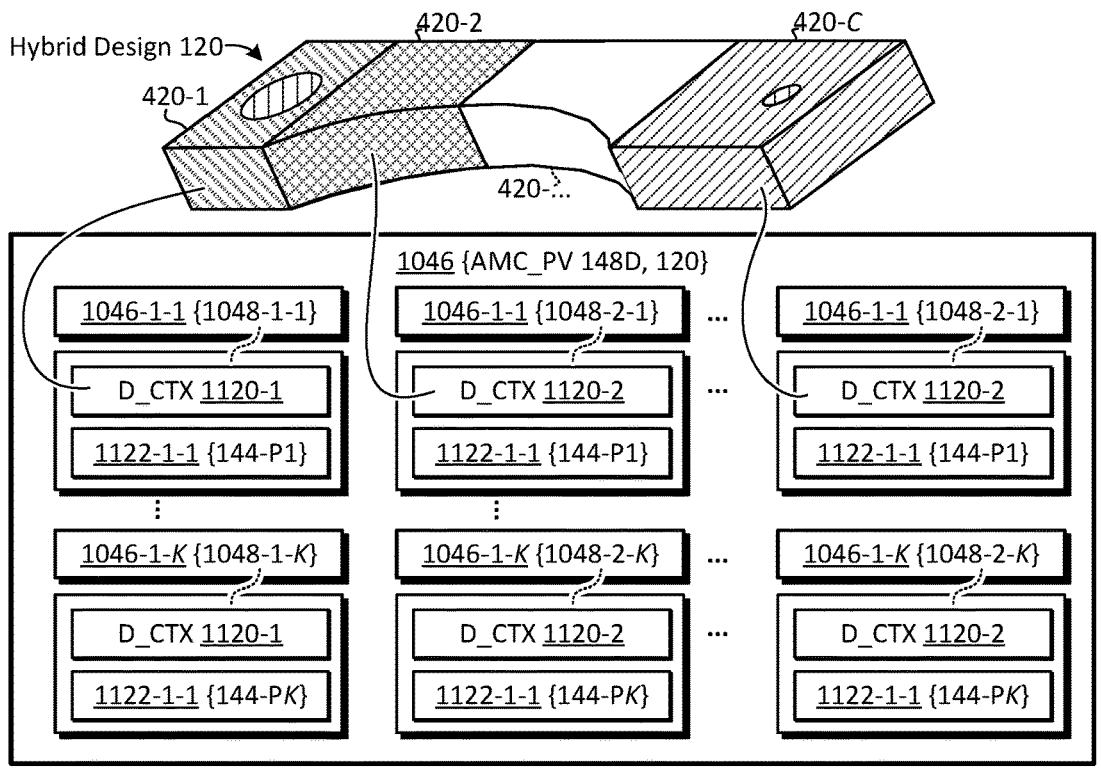
Figure 11E:
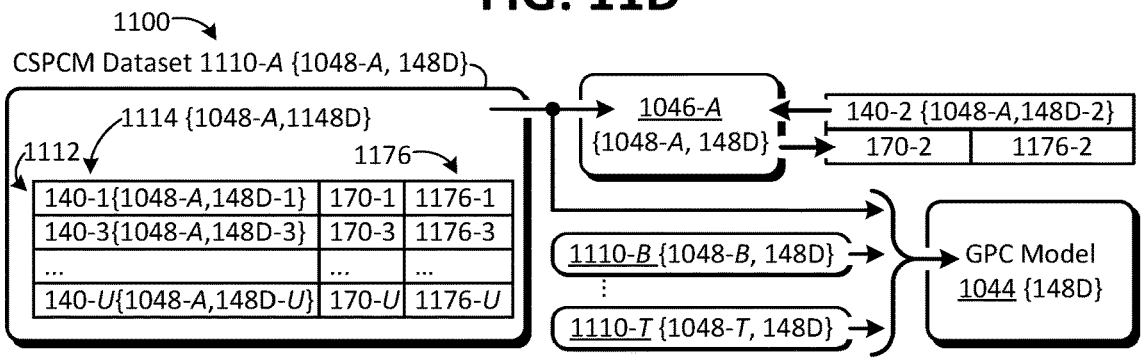
Figure 11E:
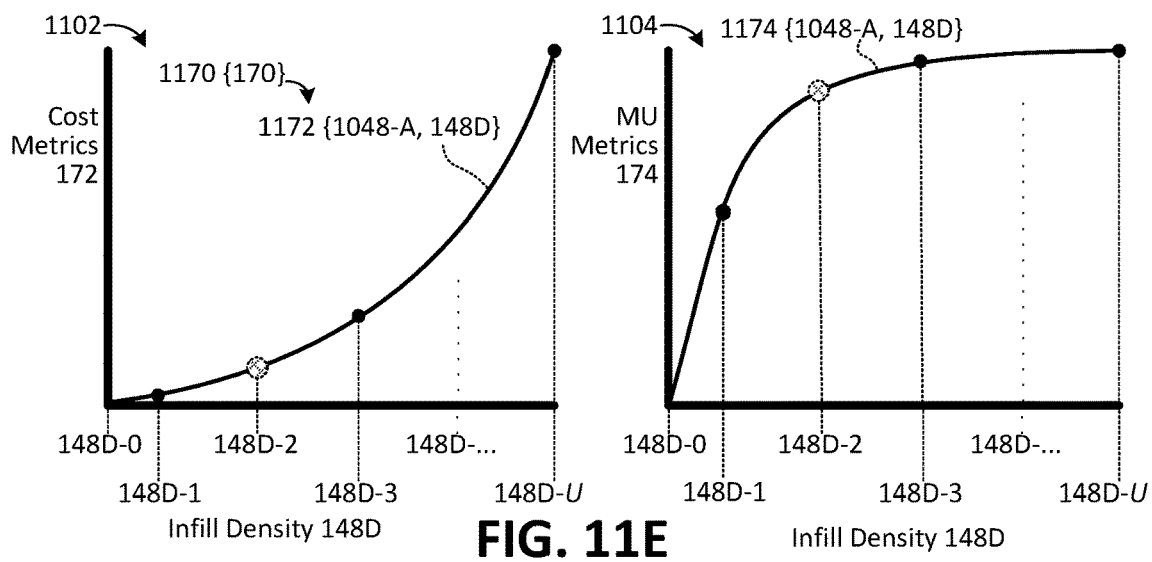
Figure 11F:
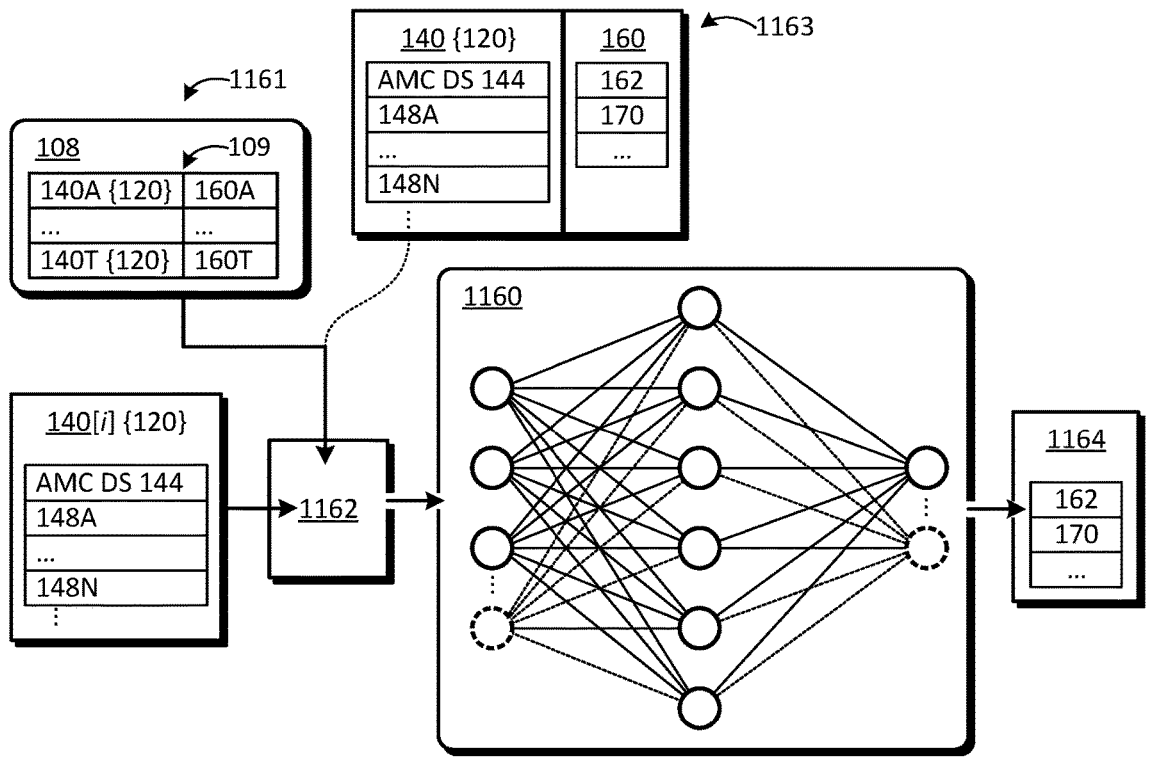
Figure 11G:
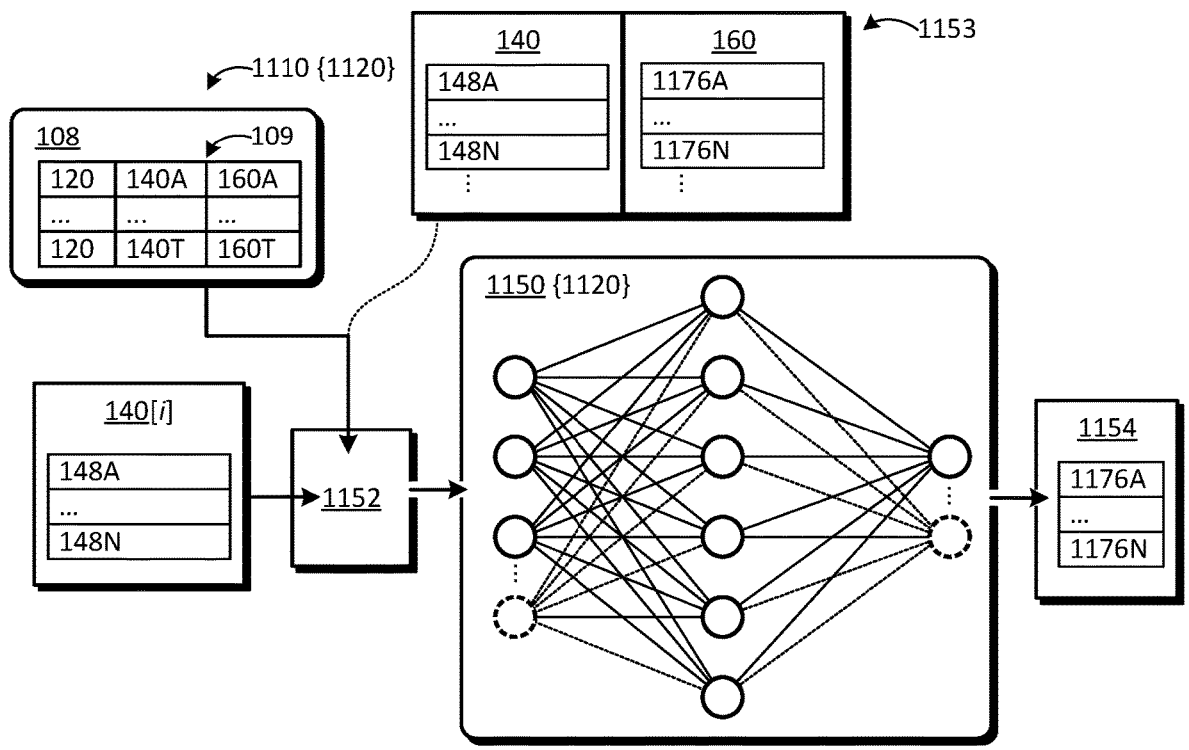
Figure 11H:
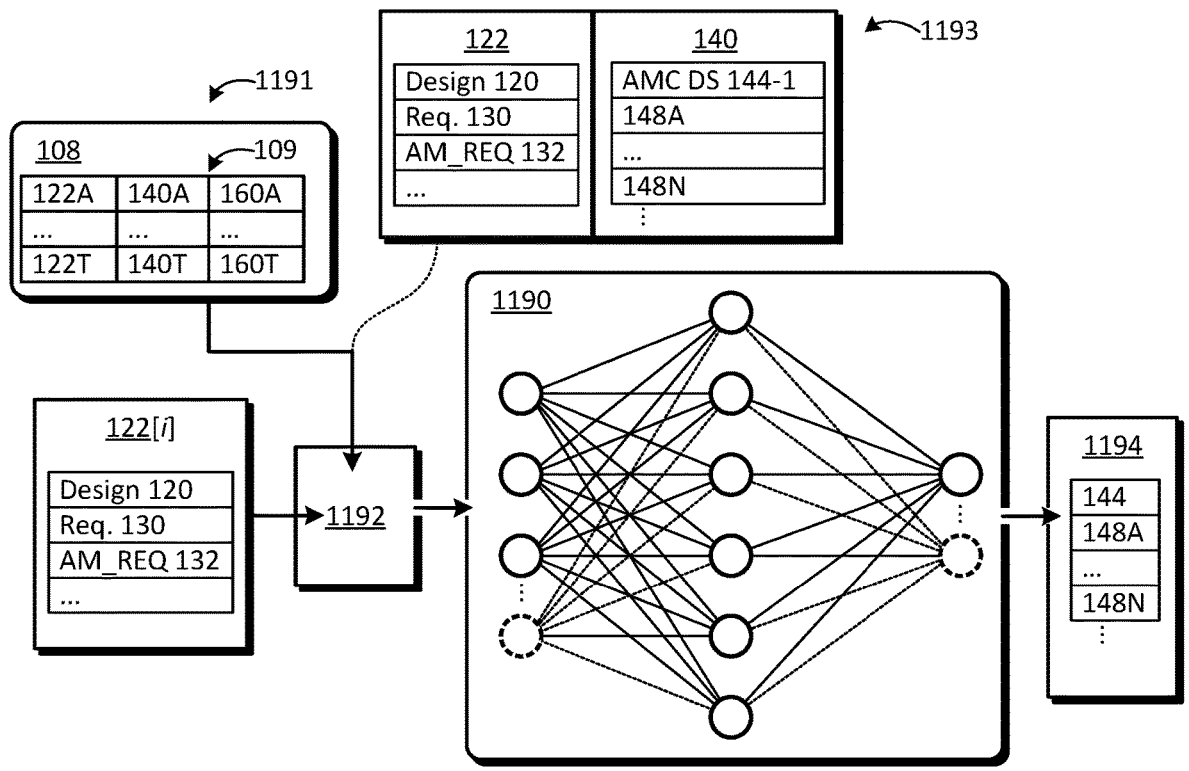
Figure 12:
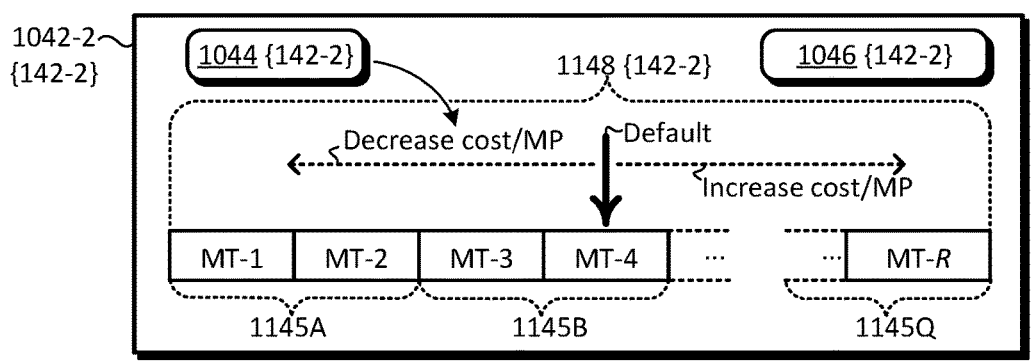

FIGS. 11A through 12 illustrate examples of parameter models 1042. FIG. 11A illustrates an example of a parameter model 1042 for a "quantitative" AMC parameter 142-1 (e.g., a quantitative parameter model 1042-1 {142-1}). As used herein, a "quantitative" AMC parameter 142-1 refers to an AMC parameter 142 that is defined over a range of quantitative or numerical AMC_PV 148, such as layer thickness (AMC_PV 148C), infill density (AMC_PV 148D), or the like.

The parameter model 1042-1 may define an AMC_PV range 1148 for the AMC parameter 142-1. The AMC_PV range 1148 may define limits or bounds for the AMC parameter 142-1 in accordance with AMC constraints 1026 defined by the constraint model 1024, or the like. The AMV_PV range 1148 may correspond to capabilities or constraints of an AMS 12. For example, the AMV_PV range 1148 may define the set or range of AMC_PV 148 for the AMC parameter 142-1 capable of being implemented by the AMS 12. The AMC_PV range 1148 defined for the quantitative parameter 142-1 is illustrated along the horizontal or "X" axis of FIG. 11A. The disclosed parameter models 1042 may, however, be adapted to define AMV_PV ranges 1148 in any suitable manner, e.g., in terms of a lower bound and an upper bound, an offset from a median or respective bounds, a range, an extent, and/or the like.

In some implementations, the parameter model 1042-1 may comprise information pertaining to any suitable characteristics of the AMC parameter 142-1, such as a granularity or resolution of the AMC parameter 142-1 (e.g., degree to which AMC_PV 148 may be increased or decreased), a default parameter setting (e.g., a default AMC_PV 148), iteration metadata (e.g., information to control modification to the AMC_PV 148 in an iterative procedure, as disclosed in further detail herein, such as an increment amount, a decrement amount, and/or the like), and so on. The analysis module 112 may, therefore, utilize the parameter model 1042-1 to ensure that AMC 140 produced by the design manager 110 specify acceptable AMC_PV 148 for the parameter 142-1, e.g., AMC_PV 148 that satisfy AMC constraints 1026 associated with the AMC parameter 142-1.

The design manager 110 may be further configured to develop GPC models 1044 for respective AMC parameters 142. The GPC model 1044 developed for an AMC parameter 142 may be configured to model general correlational relationship(s) between AMC_PV 148 of the parameter 142 and characteristics of the resulting AMC 140, such as AMC metrics 170 of the AMC 140 and/or the like.

In the FIG. 11A example, the parameter model 1042-1 may comprise and/or reference a GPC model 1044 {142-1}. By way of non-limiting example, the GPC model 1044{142-1} may be configured to model general correlational relationships for the infill density AMC parameter 142. In other words, the GPC model 1044 {142-1} illustrated in FIG. 11A may be configured to model generalized correlational relationships between the infill density AMC_PV 148D in respective AMC 140 and AMC metrics 170 of the resulting AMC 140, e.g., may comprise generalized trend information or the like. As shown in FIG. 11A, the GPC model 1044 {142-1} indicates that increasing the infill density AMC_PV 148D results in increased MU metrics 174 due to, inter alia, increased material density within the resulting AMO 18 (e.g., may increase one or more AM_PROP 162 of the AMC 140). Increasing the infill density AMC_PV 148D, however, may also result in increased cost metrics 172 due to, inter alia, increased material consumption by the AMC 140. The GPC model 1044 {142-1} further indicates that decreasing the infill density AMC_PV 148D may advantageously lower the cost metric 172 of the AMC 140 but may also result in decreased MU metrics 174 (e.g., may result in reductions to one or more AM_PROP 162 of the AMC 140). Although examples of GPC models 1044 are described herein, the disclosure is not limited in this regard and could be adapted to develop GPC models 1044 configured to model any suitable type of generalized correlational relationship between any suitable parameter 142 and any suitable AMC characteristic (e.g., inverse correlational relationships, proportional relationships, or the like).

In some embodiments, the analysis module 112 may be further configured to divide the AMC_PV range 1148 of a parameter 142 into respective AMC_PV zones (AMC_PVZ) 1145. In the FIG. 11A example, the AMC_PV range 1148 comprises Q AMC_PVZ 1145A-Q each comprising AMC_PV 148 corresponding to a respective anisotropic mechanical and/or structural classification (AM_CLS). For example, AMC_PV 148 within AMC_PVZ 1145A of the parameter 142-1 may produce relatively "low" or "minimum" cost metrics 172 (and MU metrics 174) as compared to AMC_PV 148 within other AMC_PVZ 1145 and, as such, the AMC_PVZ 1145A may be assigned a "low" or "MIN" AM_CLS. The AMC_PVZ 1145B may correspond to lower-end AMC cost metrics 172 (and MU metrics 174) and, as such, may be assigned a "mid-low" AM_CLS, the AMC_PVZ 1145C may correspond to mid-range cost metrics 172 (and MU metrics 174) and, as such, may be assigned a "mid" AM_CLS, the AMC_PVZ 1145Q may correspond to high or maximum cost metrics 172 (and MU metrics 174) and, as such, may be assigned a "high" or "MAX" AM_CLS, and so on.

The influence of particular AMC parameters 142 on characteristics of the resulting AMC 140 may vary based on number of factors, such as the design 120 manufactured by the AMC 140, design location or region (e.g., may vary by DU 121 or DC 420), the AMC_PV 148 assigned to other AMC parameters 142 in the AMC 140, and/or the like. For example, impact of the infill density AMC_PV 148D on certain AMC metrics 170 may be more pronounced in AMC 140 utilized to control the manufacture of a first design 120 than on other AMC 140 developed for a second, different design 120. The correlational relationships of the infill density AMC_PV 148D may also vary by DU 121 and/or DC 420; the influence of the infill density AMC_PV 148D may vary across DU 121-1 through 121-V within the designs 120 illustrated in one or more of FIGS. 3B-3E and/or 6A, may between DC 420-1 through 420-C (and/or by DU 121 within respective DC 420) within the hybrid designs illustrated in one or more of FIGS. 4 and 7A. Alternatively, or in addition, the influence of the infill AMC_PV 148D may vary based on the AMC_PV 148 of other parameters 142 of the AMC 140 (e.g., AMC_PV 148A-C and 148E-N). For example, the influence of the infill density AMC_PV 148D may vary by material type (e.g., may vary based on the material type AMC_PV 148A of the AMC 140), may vary by layer thickness 148C, infill geometry 148E, and/or the like.

In view of the foregoing, the design manager 110 may be configured to develop CSPC models 1046 to model correlational relationships between specified AMC parameters 142 at or within specified AMC_CTX 1048. The AMC_CTX 1048 of a CSPC model 1046 developed for a particular AMC parameter 142 may comprise any suitable set of conditions determined to influence correlational relationship(s) of the particular AMC parameter 142. As disclosed in further detail herein, developing a CSPC model 1046 for a specified AMC parameter 142 over a designated AMC_CTX 1048 may comprise evaluating a plurality of AMC 140, the evaluating comprising: a) varying the AMC_PV 148 of the specified AMC parameter 142 within respective AMC 140, while b) maintaining other aspects of the respective AMC 140 (per the AMC_CTX 1048). The AMC_CTX 1048 of the CSPC model 1046 developed for a specified AMC parameter 152 may, therefore, specify conditions under which the CSPC model 1046 may be used to accurately model correlational relationships of the specified AMC parameter 142.

FIGS. 11B-11D illustrate examples of CSPC models 1046. As illustrated in FIGS. 11B-11D, the AMC_CTX 1048 of the CSPC models 1046 may comprise a design context (D_CTX) 1120 and a parameter context (P_CTX) 1122. The D_CTX 1120 may specify design(s) 120 and/or design locations covered by the AMC_CTX 1048 (and corresponding CSPC model 1046). The D_CTX 1120 may specify one or more design(s) 120, DC 420, and/or DU 121, as disclosed herein. The P_CTX 1122 may specify AMC_PV 148 for AMC parameters 142 other than the "target" or "subject" of the CSPC model 1046, e.g., "non-target" parameters 142 or AMC_PV 148. As used herein, the "target" or "subject" of CSPC model 1046 may refer to the AMC parameter 142 (and/or AMC_PV 148) modeled thereby. The P_CTX 1122 of a CSPC model 1046 may specify AMC_PV 148 for AMC parameters 142 other than the target AMC parameter 142. The P_CTX 1122 may, for example, comprise an AMC dataset 144, as disclosed herein (the AMC dataset 144 specifying AMC_PV for each of N AMC parameters 142 other than the subject AMC parameter 142).

In the FIG. 11B example, the CSPC model 1046 {148D} may be configured to model correlational relationships of the infill density AMC_PV 148D over the 3D object design 120 specified by the D_CTX 1120. The CSPC models 1046 may be further configured to model the influence of infill density AMC_PV 148D in respective parameter states. The design manager 110 may be configured to develop a plurality of CSPC models 1046 for infill density AMC_PV 148D, each corresponding to a respective parameter state (AMC_CTX 1048). In the FIG. 11B example, the design manager 110 may be configured to develop K infill density CSPC models 1046 for the infill density AMC_PV 148D (1046-1 through 1046-K), each corresponding to a respective parameter state (per P_CTX 1122-1 through 1122-K, respectively).

The design manager 110 may be configured to develop CSPC models 1046 for respective AMC_CTX 1048 by varying AMC_PV 142 other than the subject, infill density AMC_PV 142D and evaluating the resulting AMC 140 (e.g., prototyping the AMC 140, profiling the AMC 140, and evaluating the resulting AMC profile 160). For example, developing CSPC models 1046 {1048, 148D} for infill density may comprise varying the infill density AMC_PV 148D while maintaining other AMC_PV 148A-C and 148E-N per AMC dataset 144-P1 (at P1-A through P1-N, respectively), developing the CSPC model 1046-2 may comprise varying the infill AMC_PV 148D while maintaining other AMC_PV 148A-C and 148E-N per AMC dataset 144-P2 (at P2-A through P2-N, respectively), developing the CSPC model 1046-K may comprise varying the infill AMC_PV 148D while maintaining other AMC_PV 148A-C and 148E-N per AMC dataset 144-PK (at PK-A through PK-N, respectively), and so on.

FIG. 11C illustrates further examples of CSPC models 1046. In the FIG. 11C examples, the design manager 110 may be configured to model correlational relationships for the infill density AMC_PV 148D at each of K parameter states (P_CTX 1122-1 through 1122-K) at or within each of V DU 121 of the design 120 (D_CTX 1120-1 through 1120-V). In the FIG. 11C example, the design manager 110 may develop K×V CSPC models 1046 for AMC_PV 148D (CSPC models 1046-1-1 through 1044-K-V), each configured to model correlational relationships of the infill density AMC parameter 142 at or within a respective DU 121-1 through 121-V at a respective P_CTX 1122-1 through 1122-K. The design manager 110 may develop K CSPC models 1046 for respective DU 121 by varying the infill density AMC_PV 148D utilized within the respective DU 121 while maintaining other AMC_PV 148 utilized within the respective DU 121 per P_CTX 1122-1 through 1122-K, respectively.

FIG. 11D illustrates additional examples of CSPC models 1046. In the FIG. 11D examples, the design manager 110 may be configured to model correlational relationships for the infill density AMC_PV 148D at K parameter states (P_CTX 1122-1 through 1122-K) at or within each of C DC 420 of a hybrid design 120. In the FIG. 11D example, the design manager 110 may develop K×C CSPC models 1046 for AMC_PV 148D (CSPC models 1046-1-1 through 1044-K-C), each configured to model correlational relationships of the infill density AMC parameter 142 at or within a respective DC 420-1 through 420-C at a respective P_CTX 1122-1 through 1122-K. The design manager 110 may develop the K CSPC models 1046 for respective DC 420 by varying the infill density AMC_PV 148D utilized within the respective DC 420 while maintaining other AMC_PV 148 utilized within the respective DC 420 per P_CTX 1122-1 through 1122-K, respectively. Alternatively, the design manager 110 may be configured to model the influence of the infill density AMC_PV 148D at or within respective DU 121 of respective DC 420. The design manager 110 may develop K×C×V CSPC models 1046 for AMC_PV 148D, each configured to model correlational relationships of the infill density AMC parameter 142 at or within a respective DU 121 of a respective one of DC 420-1 through 420-C (where each DC 420 comprises V DU 121).

Although particular examples of CSPC models 1046 and AMC_CTX 1048 are described herein, the disclosure is not limited in this regard and could be adapted to model parameter correlation using any suitable technique and/or at any suitable level of granularity. For example, as disclosed herein, the AMC_CTX 1048 of a CSPC model 1046 may specify the design location (D_CTX 1120) and/or parameter state (P_CTX 1122) at which the CSPC relationships of the target parameter 142 apply. In other words, the AMC_CTX 1048 of a CSPC model 1046 {1048} may define a coverage of the CSPC model 1046 with respect to design location and parameter state; the D_CTX 1120 may define a design context of the CSPC model 1046 and the P_CTX 1122 may define the parameter context of the CSPC model 1046 (e.g., define coverage with respect to non-target AMC parameters 142). In some implementations, the analysis module 112 may be configured to develop CSPC models 1046 that cover a range of design and/or parameter contexts. In over words, the analysis module 112 may be configured to develop CSPC models 1046 having AMC_CTX 1048 configured to cover a range of design(s) 120, design location(s), and/or AMC parameter states.

In some implementations, the D_CTX 1120 of a CSPC model 1046 may be configured to cover a range of design contexts (a D_CTX range); the D_CTX range defined by the D_CTX 1120 may be configured to cover one or more design(s) 120, DU 121, DC 420, and/or other design locations. The analysis module 112 may configure the D_CTX range for a CSPC model 1046 of a target parameter 142 based, at least in part, on information pertaining to the correlational relationships of the target parameter 142. For example, the analysis module 112 may configure the D_CTX range to span design(s) 120, DU 121, and/or DC 420 at which correlational relationships between the target parameter 142 and respective AMC characteristics are determined to be substantially the same (e.g., are within a predetermined threshold or error margin).

Alternatively, or in addition, the P_CTX 1122 of a CSPC model 1046 may be configured to cover a range of parameter contexts (a P_CTX range). The P_CTX range defined by the P_CTX 1122 may specify AMC_PV_CTX ranges for respective, non-target parameters 142 (ranges for non-target AMC_PV 148). The AMC_PV_CTX ranges may be configured to specify a degree to which respective, non-target AMC_PV 148 may vary within the AMC_CTX 1048. More specifically, the AMC_PV_CTX ranges may specify non-target AMC_PV 148 at which correlational relationships between the target parameter 142 and respective AMC characteristics are determined to be substantially the same (e.g., are within a predetermined threshold or error margin).

In some embodiments, the analysis module 112 may be configured to develop baseline-coverage CSPM models 1046 for respective AMC parameters 142. As used herein, a set baseline-coverage (BC) CSPM models 1046 for an AMC parameter 142 may refer to a set of CSPM models 1046 configured to cover AMC_CTX 1048 having a determined distribution across or within the AMC search space (e.g., span the AMC search space at determined intervals). The AMC analysis logic 1010 may utilize the BC CSPM models 1046 to infer CSPM models 1046 for other AMC_CTX 1048, such as other designs 120 or design locations (other D_CTX 1120), other parameter states (other P_CTX 1122), or the like. The AMC analysis logic 1010 may be further configured to develop GPC models 1044 for respective AMC parameters 142 based, at least in part, on a CSPC modeling (CSPCM) dataset 1110 acquired during development of the BC CSPM models 1046.

FIG. 11E illustrates another example of a CSPC model 1046. The CSPC model 1046-A illustrated in FIG. 11E may be configured to model correlational relationships of the infill density AMC_PV 148D at or within AMC_CTX 1048-A. The CSPC model 1046-A may be derived, at least in part, from a CSPCM dataset 1110. The CSPCM dataset 1100 may be acquired by use of an AMCA system 900, as disclosed herein. In the FIG. 11E example, the CSPCM dataset 1100 comprises a plurality of data units, such as rows or entries (CSPCM entries 1112). The CSPCM entries 1112 may comprise information pertaining to respective AMC 140 of a group of related AMC 140, e.g., a CSPCM group 1114. As used herein, a CSPCM group 1114 suitable for developing a CSPC model 1046 for a target parameter 142 at a specified AMC_CTX 1048, e.g., a CSPCM group 1114{1048, 148}, refers to a group or collection of AMC 140 configured such that a) AMC_PV 148 of the target parameter 142 vary between AMC 140 of the CSPCM group 1114 and b) other aspects of the AMC 140 are within ranges defined by the AMC_CTX 1048, as disclosed herein. Generating a CSPCM dataset 1110 for a CSPM model 1046 {1048, 148}, e.g., CSPCM dataset 1110 {1048, 148}, may comprise a) determining a CSPCM group 1114 {1048, 148} comprising a plurality of related AMC 140, b) evaluating AMC 140 of the CSPCM group 1114, the evaluating comprising recording the AMC 140 and resulting profiles 160 in the CSPCM dataset 1110 {1048, 148}, e.g., as respective CSPCM entries 1112.

More specifically, the analysis module 112 may acquire CSPCM dataset 1110 for a target AMC parameter 142 (and target AMC_CTX 1048) by a) determining a plurality of "related" AMC 140 (a CSPCM group 1114), each specifying a respective AMC_PV 148 for the target parameter 142 while other aspects of the AMC 140 are maintained per the target AMC_CTX 1048, and b) profiling the plurality of related AMC 140, as disclosed herein (e.g., producing prototypes 180 and determining profiles 160 for AMC 140 of the CSPCM group 1114). As used herein, "related" AMC 140 may refer to AMC 140 having a same AMC_CTX 1048 with respect to a designated AMC parameter 142. For example, the CSPCM group 1114 of related AMC 140 illustrated in FIG. 11E may be comprise AMC 140 in which the target infill density AMC_PV 148D may vary while other AMC_PV 148A-C and 148E-N (and/or the HDC AMC_PV 1480) are maintained within ranges specified by the AMC_CTX 1048-A.

The analysis module 112 may be further configured to distribute AMC_PV 148 within the AMC_PV range 1148 of the target parameter 142 (per the parameter model 1042 thereof). In the FIG. 11E example, the analysis module 112 may distribute the infill density AMC_PV 148D in AMC 140-1 through 140-U within (or across) the infill density AMC_PV range 1148D. By way of non-limiting example, the analysis module 112 may set the infill density AMC_PV 148D-1 of AMC 140-1 within a low end of the infill density AMC_PV range 1148D and may increase the infill density AMC_PV 148D in other AMC 140 of the CSPCM group 1114 (in AMC_PV 148D-3 of AMC 140-3); the infill density 148D-U of AMC 140-U may be set at or within a threshold of the upper bound of the infill density AMC_PV range 1148D.

In some implementations, the CSPC models 1046 developed by the design manager 110 may be configured to model correlational relationships pertaining to specified AMC metrics 170. For example, a CSPC model 1046 may comprise one or more optimization metric CSPC (OM_CSPC) models 1170, each configured to model correlational relationships pertaining to a respective AMC metric 170. In the FIG. 11E example, the CSPC model 1046-A may comprise a cost model 1172, MU model 1174, and so on. The cost model 1172 may be configured to model context-specific correlational relationships between the infill density AMC_PV 148D and the cost metric 172 at AMC_CTX 1048-A, as illustrated in plot 1102. The MU model 1174 may be configured to model context-specific correlational relationships between the infill density AMC_PV 148D and the MU metric 174 at AMC_CTX 1048-A, as illustrated in plot 1104. The CSPC model 1046-1 (and/or OM_CSPC models 1170) may be developed using any suitable technique, including, but not limited to: AI/ML techniques (e.g., may be developed using artificial intelligence and/or machine-learning components of an AI/ML system 114, as disclosed herein), mathematical modeling, numerical modeling, statistical inference, regression analysis, a fitting technique, a linear fit procedure, a polynomial fit procedure, a quadratic fit procedure, a spline fit procedure, an exponential fit procedure, and/or the like. For example, the cost model 1172 {1048-A, 148D} and MU model 1174 {1048-A, 148D} may be determined by fitting mathematical models to the AMC metrics 170 of the CSPCM group 1114 (e.g., to cost metrics 172 and MU metrics 174 of AMC metrics 170-1, 170-3, and 170-U, respectively).

In some implementations, the analysis module 112 may be further configured to determine parameter modification (PM) metrics 1176 for respective AMC_PV 148 of the target parameter 142. As used herein, PM metrics 1176 may refer to metrics configured to quantify and/or model a degree to which modifications to the AMC_PV 148 of the target parameter 142 are likely to impact AMC metrics 170 of the resulting AMC 140. In the FIG. 11E example, the CSPM model 1046 may comprise PM metrics 1176 configured to indicate a degree to which modifications to the infill density parameter 142 are likely to impact cost metrics 172 and/or MU metrics 174 at respective infill density AMC_PV 148D; the CSPM model 1046 may comprise PM metrics 1176-1, 1176-3, and 1176-U, which may be configured to quantify a degree to which modifications to the infill density AMC_PV 148D are likely to impact AMC metrics 170 at or around infill density AMC_PV 148D-1, 148D-3, and 148D-U, respectively.

In some implementations, the PM metrics 1176 may be configured to quantify the influence of the infill density AMC_PV 148D on cost metrics 172 based, at least in part, on a derivative (or numerical approximation of a derivative) of the cost model 1172 {1048-A, 148D}, e.g., $$\frac{\Delta CLO}{\Delta 148D}$$

where CLO represents the cost metric 172 and ΔCLO corresponds to a rate of change of the cost metric 172 with respect to the rate of change of the infill density AMC_PV 148D (Δ148D). The PM metrics 1176 may be further configured to quantify the influence of the infill density AMC_PV 148D on MU metrics 174 based, at least in part, on a derivative (or numerical approximation of a derivative) of the MU model 1174{1048-A, 148D}, e.g., $$\frac{\Delta MUO}{\Delta 148D}$$

where MUO represents the MU metric 174 and ΔMUO corresponds to a rate of change of the MU metric 174 with respect to the rate of change of the infill density AMC_PV 148D (Δ148D).

As illustrated in plots 1102 and 1104, the PM metrics 1176-1 may indicate that increasing the infill density parameter 142 at or around AMC_PV 148D-1 may result in relatively small changes to the cost metric 172 while yielding larger increases in the MU metric 174 (e.g., mechanical performance improvements may outweigh cost increases at AMC_PV 148D-1). Accordingly, in this range, it may be advantageous to increase the infill density AMC_PV 148D to satisfy design requirements 130 (e.g., to satisfy AM_REQ 132 of the design 120, as disclosed herein). Similarly, in this range, it may be advantageous to decrease parameters 142 other than the infill density AMC_PV 148D to, inter alia, reduce the cost metrics 172 of the AMC 140 while continuing to satisfy the requirements 130 of the design 120. Conversely, the PM metrics 1176 at higher infill density AMC_PV 148D (e.g., PM metrics 1176-3 and 1176-U) may indicate that increasing the infill density parameter 142 may result in relatively large increases to cost metrics 172 while yielding relatively smaller increases (if any) in MU metrics 174. Therefore, in this infill density range (e.g., AMC_PV 148D-3 and above), it may be advantageous to increase parameters 142 other than the infill density parameter 148D to satisfy specified AM_REQ 132 for the design 120. Similarly, in this range, it may be advantageous to decrease the infill density AMC_PV 148D to, inter alia, reduce the cost metrics 172 of the resulting AMC 140 while satisfying the AM_REQ 132.

In some implementations, the analysis module 112 may be further configured to utilize CSPC models 1046 to infer characteristics of AMC 140 without explicitly profiling the AMC 140. In the FIG. 11E example, the analysis module 112 may leverage the CSPM model 1046-A {1048-A, 148D} to infer cost metrics 172, MU metrics 174, and/or PM metrics 1176 for AMC 140 in which the infill density AMC_PV 148D is set to other values, such as 148D-2 (and other aspects of the AMC 140 are set per the AMC_CTX 1048-A). As illustrated in FIG. 11E, the CSPM model 1046-A {1048-A, 148D} may predict AMC metrics 170-2 and PM metrics 1176-2 for an AMC 140 having infill density AMC_PV 148D-2.

As disclosed herein, CSPM models 1046 may be specific to respective AMC_CTX 1048. For example, the CSPM model 1046-A {1048-A, 148D} may vary in different AMC_CTX 1048 (e.g., for different material type AMC_PV 148A, different layer thickness AMC_PV 148C, and/or the like). In some embodiments, the analysis module 112 may be configured to develop CSPC models 1046 for respective parameters 142 under a plurality of different AMC_CTX 1048, as disclosed herein (e.g., by generating a CSPCM dataset 1110 for respective AMC_CTX 1048 and deriving corresponding CSPC models 1046 {1048}). Alternatively, or in addition, the analysis module 112 may be configured to infer an CSPC model 1046 for an AMC_CTX 1048 from one or more other, previously determined CSPC models 1046 corresponding to other AMC_CTX 1048. By way of non-limiting example, the analysis module 112 may leverage the infill density CSPC model 1046-A {1048-A} to infer another infill density CSPC model 1046 for a different AMC_CTX 1048, e.g., inter a CSPC model 1046-F{1048-F} (not shown in FIG. 11E to avoid obscuring aspects of the illustrated embodiments). By way of further non-limiting example, the analysis module 112 may leverage first CSPC models 1046 developed for a first 3D object design 120 to infer second CSPC models 1046 for a second, different 3D object design 120. The accuracy of the second CSPC models 1046 may depend, at least in part, on a structural similarity of the first and second designs 120.

In some implementations, the analysis module 112 may be configured to develop GPC models 1044 for respective parameters 142. As disclosed herein, the GPC models 1044 may be configured to model correlational relationships of specified AMC parameters 142 across different AMC_CTX 1048 (e.g., across different D_CTX 1120 and/or P_CTX 1122). The GPC models 1044 for respective parameters 142 may be based, at least in part, on CSPC models 1046 and/or CSPCM datasets 1110 developed for the respective parameters 142. In the FIG. 11E example, the analysis module 112 may be configured to derive and/or refine a GPC model 1044 {148D} for the infill density parameter 142 based, at least in part, on the CSPC model 1046-A {1048-A, 148D} and/or the CSPCM dataset 1100-A {1048-A, 1048D}. For example, the analysis module 112 may incorporate the CSPCM dataset 1110-A {1048-A, 1048D} illustrated in FIG. 11E to develop and/or refine the infill density GPC model 1044 {148D}. The analysis module 112 may be further configured to incorporate other CSPCM datasets 1110 developed for other infill density CSPC models 1046. In the FIG. 11E example, the analysis module 112 may be further configured to develop and/or refine the infill density GPC model 1044 {148D} by use of CSPCM datasets 1110-B through 1110-T, each comprising CSPCM entries 1112 for related AMC 140 in which the infill density AMC_PV 148D varies while other aspects of the AMC 140 are set in accordance with respective AMC_CTX 1048-B through 1048-T, respectively.

FIG. 12 illustrates another example of a parameter model 1042. More specifically, FIG. 12 illustrates an example of a parameter model 1042-2 for a discrete or "qualitative" parameter 142-2. As used herein, a "qualitative" parameter 142-2 refers an AMC parameter 142 that is defined over a discrete set of classes or types, such as the material type AMC_PV 148A, infill geometry AMC_PV 148E, or the like. In the FIG. 12 example, the AMC_PV range 1148 {142-2} may comprise a set of types or classes. Byway of non-limiting example, the qualitative parameter 142-2 may correspond to the material type AMC_PV 148A and the AMC_PV range 1148 {142-2} may define R material types (MT), MT-1 through MT-R, each configured to represent a respective type of material capable of being utilized by the AMS 12. The AMC_PV range 1148 {142-2} may, therefore, correspond to physical constraints and/or capabilities of the AMS 12, as disclosed herein.

The parameter model 1042-2 may further comprise a GPC model 1044 of the qualitative parameter 142-2. For example, GPC model 1044 {142-2} may indicate general correlational relationships between the material type AMC_PV 148A and specified AMC characteristics, such as AMC metrics 170. As illustrated in FIG. 12, the GPC model 1044 {142-2} may organize MT-1 through MT-R in accordance with cost and/or mechanical performance; MT-1 through MT-R may be ordered from a lower bound having lowest cost metrics 172 (and/or lowest MU metrics 174) to an upper bound having highest cost metrics 172 (and/or highest MU metrics 174). Increasing the qualitative parameter 142-2 may comprise selection of a higher class (e.g., from MT-1 to MT-2) and decreasing the qualitative parameter 142 may comprise selecting a lower class (e.g., from MT-2 to MT-1). The qualitative parameter model 1042-2 may specify other parameter characteristics, such as a default value for the AMC parameter 142-2, mechanical characteristics and/or constraints, may divide the AMC_PV range 1148 into AMC_PVZ 1145A-Q, and/or the like. In some implementations, the AMC_PV range 1148 of the qualitative parameter 142-2 may be divided into respective AMC_PVZ 1145, each corresponding to a respective AM_CLS. In the FIG. 12 example, the AMC_PV range 1148 {142-2} comprises AMC_PVZ 1145A-Q, ranging from a "low" or "MIN" AM_CLS at AMC_PVZ 1145A to a "high" or "MAX" AMC_PVZ 1145Q.

The qualitative parameter model 1042-2 may further comprise CSPC model(s) 1046 for the parameter 142-2. As disclosed herein, the CSPC models 1046 {142-2} may be configured to model correlational relationships between AMC_PV 148 of the qualitative parameter 142-2 and characteristics of the resulting AMC 140. More specifically, the CSPC model(s) 1046 {142-2} may be configured to model correlational relationships pertaining to the parameter 142-2 at or within respective AMC_CTX 1048, as disclosed herein.

Referring back to FIG. 10B, the AMC analysis logic 1010 may utilize the AMC OPT model 1020 to develop and/or refine AMC 140 for design specifications 122. In some implementations, the AMC analysis logic 1010 may determine AMC 140 for design specifications 122 through AMC analysis operations 1012. The AMC analysis operation 1012 for a design specification 122 may comprise an IA procedure 1014 to iteratively develop, refine, and/or otherwise determine an AMC 140 for the design specification. As illustrated in FIG. 10B, respective iterations (i) of the IA procedure 1014 may comprise a) a candidate procedure 1040 to determine a candidate AMC 140[i] for the iteration (i), b) an AMCA procedure 960, and c) an evaluation procedure 1090 to, inter alia, evaluate the profile 160[i] of the candidate AMC 140[i] in view of the requirements 130 of the design specification 122 (and/or AMC 140 evaluated in one or more previous iterations).

The candidate procedure 1040 may comprise determining candidate AMC 140[i] for respective iterations (i) based on information learned in one or more previous iterations of the IA procedure 1014; for example, the candidate AMC 140[i] for a current iteration (I) of the IA procedure 1014 may be based on the evaluation of AMC 140[i−1 . . . 1] in iterations i-1 through 1. Information pertaining to previous iterations of the IA procedure 1014, such as AMC 140[i−1 . . . 1] and corresponding profiles 160[i−1 . . . 1] may be maintained in IA metadata 1016 and/or within the datastore 108 (e.g., within respective datastore entries 109), as disclosed herein.

The evaluation procedure 1090 may comprise classifying candidate AMC 140[i] as "suitable" or "unsuitable" for the design specification 122. In other words, the evaluation procedure 1090 may comprise a REQ procedure to determine whether the candidate AMC 140[i] satisfies requirements 130 of the design specification 122. The REQ procedure to determine the suitability of a candidate AMC 140[i] may comprise comparing the profile 160[i] determined for the AMC 140[i] to requirements 130 of the design specification 122, as disclosed herein. In some embodiments, the REQ procedure may comprise comparing AM_REQ 132 of the design 120 to AM_PROP 162 of the profile 160[i] as illustrated in one or more of FIGS. 5B, 6B, and 7B. In a first non-limiting example, the REQ procedure may comprise comparing an AM_REQ DS 164 of the AM_REQ 132 to an AM_PROP DS 168 of the profile 160[i] (e.g., comparing a set of M×D M_REQ 138 to a corresponding set of M×D PM_PROP 168), as illustrated in FIG. 5B. In a second non-limiting example, the design 120 may comprise and/or correspond to a plurality of DU 121 (e.g., V DU 121-1 through 121-V) and the REQ procedure may comprise comparing DU AM_PROP 262 of the profile 160[i] configured to model, quantify, and/or predict AM_PROP 162 of the AMC 140 at or within respective DU 121 of the design 120 to corresponding DU AM_REQ 232 determined for the respective DU 121, as illustrated in FIG. 6B. In a third non-limiting example, the design 120 may comprise and/or correspond to a plurality of DC 420 (e.g., DC 420-1 through 420-C) and the REQ procedure may comprise comparing DC AM_PROP 762 of the profile 160[i] configured to model, quantify, and/or predict AM_PROP 162 at or within respective DC 420 of the design 120 to corresponding DC AM_REQ 432 determined for the respective DC 420, as illustrated in FIG. 7B. Although particular examples of techniques for implementing REQ procedures are described herein, the disclosure is not limited in this regard and could be adapted to compare and/or evaluate AMC 140 and/or AM_PROP 162 in view of design requirements 130 and/or AM_REQ 132 using any suitable method or technique.

The evaluation procedure 1090 may further comprise evaluating AMC metrics 170 of respective AMC 140[i]. Evaluation of the AMC 140[i] in the i$^{th}$ iteration of the IA procedure 1014 may comprise comparing AMC metrics 170[i] of the AMC 140[i] to AMC metrics 170[i−1 . . . 1] of AMC 140[i−1 . . . 1]. The evaluating may comprise ranking the AMC 140[i] in a set of one or more suitable AMC 140 for the design specification 122, the ranking based, at least in part, on the AMC metrics 170[i] of the AMC 140[i] relative to AMC metrics 170[i−1 . . . 1]. The AMC metrics 170 may be compared and/or evaluated in accordance with the objective model 1022, as disclosed herein.

The evaluation procedure 1090[i] may further comprise determining whether to terminate the IA procedure 1014. For example, in respective iterations (i), the evaluation procedure 1090 may be configured to determine whether termination criteria 1015 of the IA procedure 1014 has been satisfied. The termination criteria 1015 may be defined and/or managed by the objective model 1022 (per an objective configuration 1023), as disclosed herein. In response to determining to terminate the IA procedure 1014 at iteration (i), the evaluation procedure 1090[*i*] may further comprise a termination procedure, which may comprise an output procedure to, inter alia, output the AMC 140 determined for the design specification 122 in the AMC analysis operation 1012 (if any). For example, the output procedure may comprise outputting an "optimal" AMC 140, which may comprise selecting a suitable AMC 140 from a plurality of suitable AMC 140 evaluated during the IA procedure 1014, e.g., AMC 140[*i* . . . 1]. The output procedure may comprise selecting a suitable AMC 140 that a) satisfies the requirements 130 of the design specification 122, and b) has satisfies optimization criteria of the objective model 1022. The optimization criteria may be based on any suitable AMC characteristic. The optimization criteria may be based on one or more AMC metrics 170, as disclosed herein. For example, the "optimal" AMC 140 for the design specification 122 may comprise the suitable AMC 140 having the lowest cost metric 172 within a group of suitable AMC 140 identified during implementation of the IA procedure 1014. The termination procedure may, for example, comprise a) identifying a first set of AMC 140, the first set comprising AMC 140 for the design 120 that satisfy the design requirements and b) selecting the "optimal" AMC 140 from the first set based on predetermined optimization criteria (e.g., selecting the AMC 140 having the lowest cost metrics 172 or highest MU metrics 174 within the first set of AMC 140).

In some implementations, the analysis module 112 may be configured to develop and/or refine the AMC OPT model 1020 during implementation of the IA procedure 1014. Respective iterations (i) of the IA procedure 1014 may comprise evaluation of an AMC 140[*i*] having a defined AMC_CTX 1048 and, as such, each iteration (i) may involve generating CSPC modeling data suitable for, inter alia, developing and/or refining one or more parameter models 1042, GPC models 1044, CSPC models 1046, and/or the like. For example, respective iterations (i) of the IA procedure 1014 may comprise generating CSPCM entries 1112 suitable for use in one or more CSPCM datasets 1110, as illustrated in FIG. 11E. The analysis module 112 may utilize the CSPCM entries 1112 (and/or resulting CSPCM datasets 1110) to develop and/or refine the AMC OPT model 1020, e.g., develop and/or refine GPC models 1044, CSPC models 1046, and/or the like, as disclosed herein.

The AMC analysis logic 1010 may utilize the AMC OPT model 1020 to predict or infer AMC characteristics for candidate AMC 140[*i*] without profiling and/or evaluating the candidate AMC 140[*i*]. Alternatively, or in addition, the AMC analysis logic 1010 may utilize the AMC OPT model 1020 to control the candidate procedure 1040; the candidate procedure 1040 may be configured to leverage the AMC OPT model 1020 to adapt AMC 140[*i*] for respective design specifications 122 (e.g., set AMC_PV 148 of the AMC 140[*i*]), which may reduce the number of iterations (i) required to identify suitable or optimal AMC 140 for the design specifications 122. For example, the AMC analysis logic 1010 may utilize the AMC model 1028 to select parameters 142 to modify in order to, inter alia, increase the MU metrics 174 of candidate AMC 140[*i*] (to satisfy requirements 130 of a design specification 122), increase the cost metrics 172 of candidate AMC 140[*i*](to determine whether requirements 130 of the design specification 122 can be satisfied at lower cost or loss), and/or the like.

In some embodiments, aspects of the disclosed AMC analysis operations 1012 and/or IA procedures 1014 may be controlled and/or implemented by an AI/ML system 114 of the design manager 110, as illustrated in FIG. 10A. As disclosed herein, the AI/ML system 114 may comprise any suitable AI/ML means including, but not limited to: a supervised learning AI/ML architecture, an unsupervised AI/ML architecture, a reinforcement AI/ML architecture, a deep learning AI/ML architecture, an ANN, a CNN, an RNN, an AI/ML sorting architecture, an AI/ML clustering architecture, a generative model, and/or the like. The AI/ML system 114 may be configured to learn aspects of an AMC OPT model 1020, as disclosed herein. For example, the AI/ML system 114 may be configured to train AI/ML components to learn an AMC OPT model 1020, as disclosed herein. The AI/ML system 114 may comprise AI/ML components configured to model respective AMC parameters 142. For example, the AI/ML system 114 may comprise AI/ML components, such as ANN configured to learn and/or refine: a) correlational relationships between respective AMC parameters 142 and characteristics of the resulting AMC 140 (e.g., AMC metrics 170, such as cost metrics 172, MU metrics 174, and/or the like), b) context-specific correlational relationships between respective AMC parameters 142 and respective AMC characteristics, c) generalized correlational relationships between respective AMC parameters 142 and respective AMC characteristics, d) CSPC models 1046 for respective parameters 142 at respective AMC_CTX 1048, e) CSPC models 1046 for respective parameters 142 at AMC_CTX 1048 configured to cover specified design and/or parameter ranges (e.g., AMC_CTX 1048 that define D_CTX ranges and/or P_CTX ranges), f) BC CSPM models 1046 for respective parameters 142 at AMC_CTX 1048 distributed across the AMC search space from which one or more CSPM models 1046 may be inferred, g) GPC models 1044 for respective parameters 142, and/or the like.

The AI/ML system 114 may be configured to develop and/or refine the AMC model 1028 during implementation of AMC analysis operations 1012 and/or respective iterations of the IA procedure 1014. For example, the AI/ML system 114 may acquire CSPCM datasets 1110 comprising CSPCM entries 1112, as illustrated in FIG. 11E. The AI/ML system 114 may utilize the CSPCM datasets 1110 as training or ground-truth data to train and/or refine respective AI/ML components, as disclosed herein (e.g., train and/or refine AI/ML components corresponding to GPC models 1044 for respective parameters, CSPM models 1046 for specified AMC_CTX 1048, and/or the like).

FIG. 11F is a schematic block diagram illustrating an example of an AI/ML component. The AI/ML component illustrated in FIG. 11F may be configured to predict AMC characteristics based on AI/ML input data, such as AI/ML features 1162. The AI/ML features 1162 may comprise and/or be derived from parameters 142 of an AMC 140, such as AMC_PV 148A-N defined by AMC DS 144 of an AMC 140. The AI/ML module may be configured to predict any suitable characteristics of the AMC 140. In the FIG. 11F example, the AMC module may be configured to produce an AI/ML output 1164 in response to AI/ML features 1162, the AI/ML output 1164 may comprise predictions for specified AM_PROP 162 and/or AMC metrics 170 of the AMC 140 (e.g., cost metrics 172, MU metrics 174, and/or the like). The AI/ML module illustrated in FIG. 11F may, therefore, comprise and/or be referred to as an AI/ML profile model 1160.

The AI/ML profile model 1160 may be trained and/or refined by use of AI/ML training data 1161. The AI/ML training data 1161 may comprise a plurality of entries (training entries 1163), each training entry 1163 comprising an AMC 140 for a specified design 120 having a known or predetermined profile 160 (e.g., having a known or predetermined AI/ML output 1164). In the FIG. 11F example, the AI/ML training data 1161 comprises T AMC 140, each having a known or predetermined profile 160 (e.g., AMC 140A-T having profiles 160A-T). The AI/ML training data 1161 may comprise datastore entries 109 determined through implementation of AMC analysis operation(s) 1012 and/or iteration(s) of the IA procedure 1014, as disclosed herein. The AI/ML profile model 1160 may be trained accurately reproduce the AI/ML outputs 1164 of the training entries 1163 in response to AI/ML features 1162 of the training entries 1163. In other words, the AI/ML profile model 1160 may be trained to accurately predict the known, predetermined AMC characteristics of the training entries 1163 in response to AMC DS 144 of the training entries 1163. The AI/ML profile model 1160 may be trained through any suitable AI/ML technique.

The analysis module 112 may utilize the AMC OPT model 1020 developed by the AI/ML system 114 to implement AMC analysis operations 1012 and/or aspects of the IA procedure 1014, as disclosed herein. For example, the analysis module 112 may utilize the AI/ML profile model 1160 to predict AMC characteristics 161 of candidate AMC 140[*i*] for specified designs 120, without implementing AMCA procedures 960 for the candidate AMC 140[*i*].

The AI/ML system 114 may be further configured to develop and/or refine AI/ML models configured to predict parameter correlations, such as GPC, CSPC, and/or the like. FIG. 11G is a schematic block diagram illustrating an example of an AI/ML model 1150 configured to predict PM metrics 1176 for respective parameters (an AI/ML CSPM model 1150). As disclosed herein, the PM metrics 1176 of a parameter 142 may indicate an influence of the AMC_PV 148 at respective AMC_CTX 1048; in order words, indicate the manner and degree that modifications to the AMC_PV 148 assigned to the parameter 142 are likely to have on the AMC metrics 170 of the resulting AMC 140, as illustrated in FIG. 11E.

The AI/ML CSPM model 1150 may be configured to produce an AI/ML output 1154 comprising predicted PM metrics 1176 for respective parameters 142 in response to AI/ML features 1152. The AI/ML features 1152 may comprise AMC_DS 144 of an AMC 140. The AI/ML features 1152 may be derived from an AMC 140 defined at a design granularity level (e.g., an AMC 140 comprising a single AMC DS 140), an AMC 140 defined at a DU granularity level (e.g., an AMC 140 comprising V AMC DS 140 configured to control AM at or within respective DU 121), and/or the like. Likewise, the AI/ML output 1154 may comprise a single set of PM metrics 1176 (in response to an AMC 140 comprising a single AMC DS 144) or a plurality of sets of PM metrics 1176, each corresponding to a respective AMC DS 144 of the AMC 140. Alternatively, the AI/ML system 114 may be configured to develop a plurality of AI/ML CSPM models 1150, each corresponding to a respective D_CTX 1120, as disclosed herein (e.g., as illustrated in FIGS. 11C through 11D).

The AI/ML system 114 may train and/or refine the AI/ML CSPM model 1150 by use of one or more CSPCM datasets 1110, as disclosed herein. More specifically, the training data 1151 for the AI/ML CSPM model 1150 may comprise known predetermined AMC 140 for a design 120 having known or predetermined profiles 160. Training entries 1153 may comprise an AMC 140 and known or predetermined PM metrics 1176 for respective parameters 142 of the AMC 140. Alternatively, the AI/ML CSPM model 1150 may be targeted to a specified parameter 142, and the training entries 1153 may comprise AMC 140 in which parameters 142 other than the target parameter 142 are set at an AMC_CTX 1048 and the known, predetermined profile 160 for the AMC 140 comprises PM metrics 1176 for the target parameter. The analysis module 112 may utilize the trained AI/ML CSPM model 1150 to determine candidate AMC 140[*i*] in respective iterations of the IA procedure 1014, e.g., to converge to an optimal AMC 140 in fewer iterations.

Alternatively, or in addition, the AI/ML system 114 may be configured to implement aspects of the disclosed AMC analysis operations 1012 and/or IA procedure 1014. For example, the AI/ML system 114 may comprise AI/ML means configured to predict suitable or optimal AMC 140 for design specifications 122; the AI/ML system 114 may be configured to develop and/or refine an AI/ML AMC model 1190, as illustrated in FIG. 11H. The AI/ML AMC model 1190 may comprise any suitable AI/ML means, as disclosed herein (e.g., an ANN, or the like). The AI/ML AMC model 1190 may be configured to produce AI/ML outputs 1194 in response to AI/ML features 1192 comprising and/or derived from design specifications 122. The AI/ML features 1192 may comprise and/or be derived from 3D object designs 120 of the design specifications 122, requirements 130 of the design specifications 122, AM_REQ 132, and/or the like. The AI/ML outputs 1194 produced by the AI/ML AMC model 1190 in response to AI/ML features 1192 may comprise a prediction of a suitable or optimal AMC 140 for the design specification 122 (e.g., a prediction for one or more AMC DS 144 configured to define AMC_PV 148A-N for respective AMC parameters 142).

The AI/ML AMC model 1190 may be trained and/or refined by use of AMC AI/ML training data 1191. The AI/ML training data 1191 may comprise known, predetermined suitable or optimal AMC 140 determined for respective design specifications 122. Training entries 1193 of the AMC AI/ML training data 1191 may, therefore, comprise a design specification 122 and a suitable or optimal AMC 140 determined for the design specification 122. The training entries 1193 may comprise and/or correspond to entries 109 maintained within the datastore 108, as disclosed herein. In the FIG. 11H example, the AI/ML training data 1191 comprises T training entries 1193, each comprising a respective design specification 122A-T and a corresponding suitable or optimal AMC 140A-T for the design specification 122A-T. The AI/ML AMC model 1190 may be trained to produce AI/ML outputs 1194 that accurately reproduce the known AMC 140A-T in response to AI/ML features 1192 comprising and/or derived from the corresponding design specifications 122A-T. The AMC analysis logic 1010 may utilize the resulting AI/ML AMC model 1190 to predict suitable or optimal AMC 140 for unknown design specifications 122 (e.g., designs 120 and/or requirements 130 different from the design specifications 122 included in the AMC AI/ML training data 1191). Alternatively, or in addition, the AMC analysis logic 1010 may utilize the AI/ML AMC model 1190 to determine candidate AMC 140 during the first, initial iterations (1) of respective IA procedures 1014.

Although particular examples of AI/ML components are described herein, the disclosure is not limited in this regard and could be adapted to train and/or utilize an AMC OPT model 1020 comprising any suitable AI/ML components (and/or AI/ML models) configured to implement any suitable aspect of the AMC analysis operations 1012 and/or IA procedure 1014 disclosed herein, such as AI/ML GPC models 1044, AI/ML CSPM models 1150 for respective parameters 142, and/or the like.

Figure 13A:
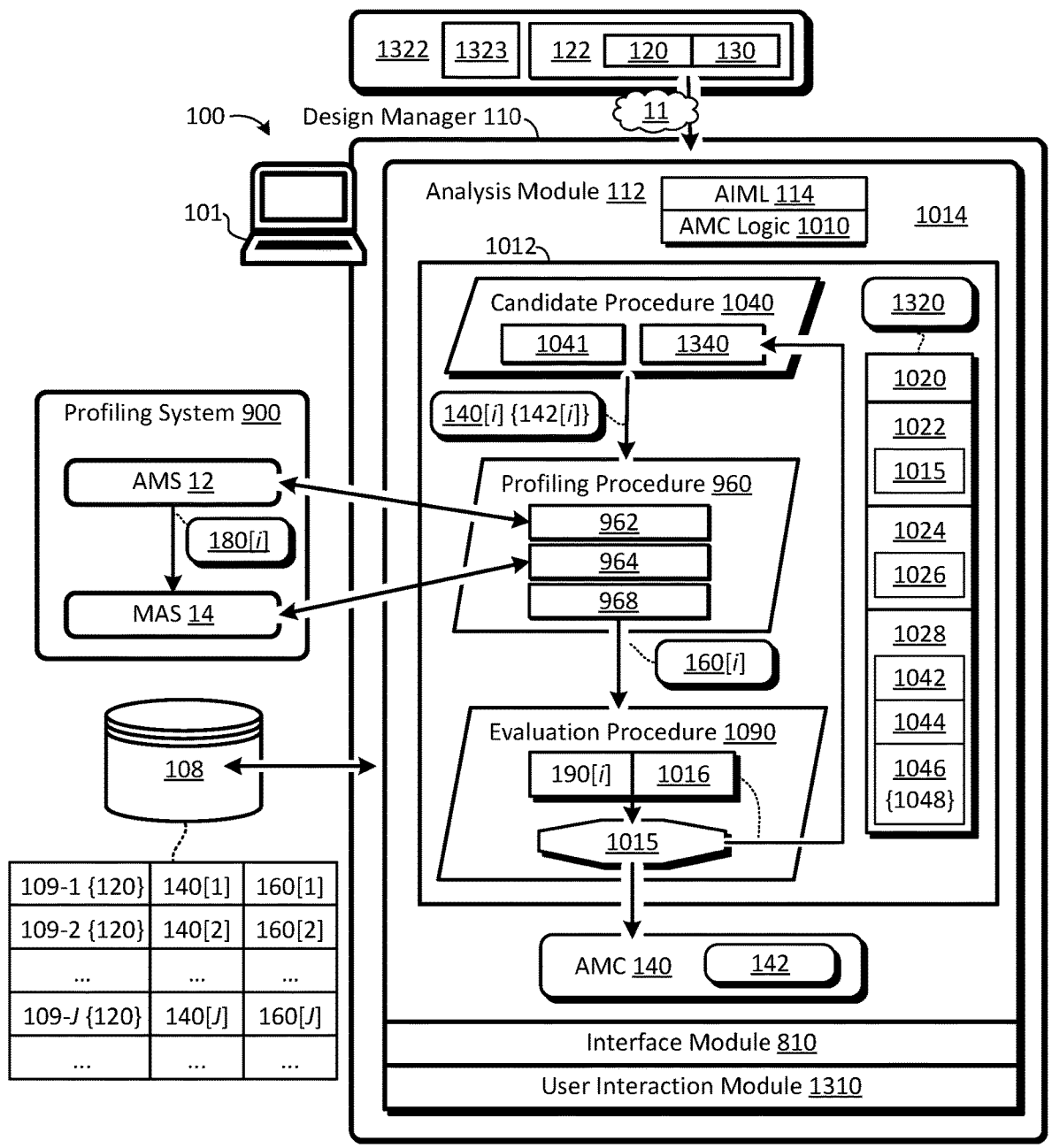
FIG. 13A illustrates another example of a design manager configured to determine AMC through an iterative procedure.

FIG. 13A is a schematic block diagram illustrating another example of a design manager 110. In the FIG. 13A example, the design manager 110 may be configured to receive a request 1322 pertaining to a 3D object design 120. The request 1322 may be received through any suitable mechanism, as disclosed herein (e.g., may be received through an electronic communication network 11, may be retrieved from memory and/or NTS resources 104/105, may be received through HMI component(s) of the apparatus 101, such as user interaction with a GUI, and/or the like).

The request 1322 may be configured to cause the design manager 110 to determine a suitable or optimal AMC 140 for a 3D object design 120 having requirements 130 (e.g., a design specification 122). In some implementations, the request 1322 may be further configured to cause the design manager 110 to manufacture one or more AMO 18 under the determined AMC 140.

The request 1322 may comprise and/or reference a request configuration 1323. The request configuration 1323 may comprise information pertaining to AMC analysis operation(s) 1012 implemented by the design manager 110 to determine an AMC 140 for the design specification 122. The request configuration 1323 may include, but is not limited to: an objective configuration 1023 (e.g., weights for AMC optimization factors, configurations for AMC metrics 170 such as cost metrics 172 and/or MU metrics 174, AMC optimization criteria, termination criteria 1015, and/or the like), a constraint configuration 1025 (e.g., information pertaining to target AMS 12 for the AMC 140, such as AMC_PV ranges 1148 for respective AMC parameters 142), and/or the like.

The design manager 110 may determine an AMC 140 for the request 1322. The AMC 140 may be determined in an AMC analysis operation 1012 comprising an IA procedure 1014, as disclosed herein. The IA procedure 1014 may comprise iteratively adapting candidate AMC 140[i] to arrive at an optimal AMC 140 for the design specification 122. The candidate AMC 140[i] for respective iterations may be determined in a candidate procedure 1040. In the FIG. 13A the candidate procedure 1040 may comprise an AMC initialization (AMC_INI) procedure 1041 configured to determine initial candidate AMC 140[1] for the first or initial iteration (1) of respective IA procedures 1014 and a candidate AMC optimization (AMC OPT) procedure 1340 configured to refine candidate AMC 140[i] in subsequent iterations of respective IA procedures 1014 (e.g., iterations (i), where i is an integer greater than 1).

As disclosed in further detail herein, the AMC OPT procedure 1340 may comprise determining and/or deriving candidate AMC 140[i] for respective iterations (I) based, at least in part, AMC 140[i-1 . . . 1] evaluated in one or more previous iterations. By contrast, the AMC INI procedure 1041 may comprise determining an initial candidate AMC 140[1] for the first iteration of the AMC analysis operation 1012, e.g., without the benefit of information pertaining to previous iterations.

In a first non-limiting example, the initial candidate AMC 140[1] may comprise a predetermined, default AMC 140, such as an AMC 140 comprising parameters 142 set to default AMC_PV 148 (e.g., as defined by respective parameter models 1042), as illustrated in FIGS. 11A and 12.

In a second non-limiting example, the AMC_PV 148 of the initial candidate AMC 140[1] may be selected arbitrarily (e.g., may be randomly or pseudo-randomly selected from respective AMC_PV ranges 1148).

In a third non-limiting example, the AMC INI procedure 1041 may be configured to adapt the initial candidate AMC 140[1] in accordance with requirements 130 of the design specification 122. For example, the design specification 122 may be assigned an AM_CLS. The AM_CLS may be configured to characterize AM_REQ 132 of the design 120. For example, the AM_CLS may correspond a range of AM_REQ thresholds, e.g., from a "high" or "MAX" AM_CLS corresponding to high or maximum AM_REQ thresholds down to a "low" or "MIN" AM_CLS. The AMC INI procedure 1041 may comprise a) assigning an AM_CLS to the design specification 122 and b) setting parameters 142 of the initial candidate AMC 140[1] to AMC_PV 148 within AMC_PVZ 1145 corresponding to the assigned AM_CLS. For example, the AMC INI procedure 1041 for a design specification 122 assigned the "high" or "MAX" AMC_CLS may comprise selecting AMC_PV 148 for respective parameters 142 from AMC_PVZ 1145 assigned the "high" or "MAX" AM_CLS (e.g., AMC_PVZ 1145Q). Conversely, the AMC INI procedure 1041 for a design specification 122 assigned the "low" or "MIN" AMC_CLS may comprise selecting AMC_PV 148 for respective parameters 142 from AMC_PVZ 1145 assigned the "low" or "MIN" AM_CLS (e.g., AMC_PVZ 1145A), and so on.

In a fourth non-limiting example, the initial candidate AMC 140[1] may be determined by the AI/ML system 114, as disclosed herein. The AI/ML system 114 may comprise an AI/ML component configured to predict AMC 140 for respective design specifications 122 (e.g., one or more ANN or the like). For example, the AI/ML system 114 may comprise an AI/ML AMC model 1190, as illustrated in FIG. 11H. The AI/ML AMC model 1190 may be trained to predict suitable or optimal AMC 140 for respective design specifications 122. More specifically, the AI/ML AMC model 1190 may be trained and/or refined using AMC AI/ML training data 1191 comprising training entries 1193, each training entry 1193 comprising a known or predetermined suitable or optimal AMC 140 for a respective design specification 122. The AI/ML AMC model 1190 may be configured to accurately predict AMC 140 for design specifications 122 of the training entries 1193. The trained AI/ML AMC model 1190 may then be used to predict AMC 140 for unknown design specifications 122, such as the design specification 122 of the IA procedure 1014. The initial candidate AMC 140[1] for the IA procedure 1014 may, therefore, comprise an AMC 140 predicted for the design specification 122 by the trained AI/ML AMC model 1190.

In a fifth non-limiting example, the AMC INI procedure 1041 incorporate user interaction. For example, the AMC INI procedure 1041 may comprise a) determining a recommended candidate AMC 140[1] for the initial iteration, b) providing access to the recommended candidate AMC 140[1] through a UI, and c) receiving a user-approved initial candidate AMC 140[1] in response to user interaction with the UI. The recommended candidate AMC 140 may be determined by any suitable technique (e.g., as described one or more of the non-limiting examples above).

In some implementations, the design manager 110 may comprise a user interaction module 1310. The user interaction module 1310 may be configured to generate UI for managing AM, as disclosed herein. The user interaction module 1310 may be configured to generate UI configured for display on a HMI of a computing device, such as the apparatus 101, a remote computing device, a client computing device, or the like. The user interaction module 1310 may be configured to generate an AMC_INI UI 1400 to facilitate user interaction pertaining to the initial candidate AMC 140[1], as illustrated in FIGS. 14A-14C.

Figure 14A:
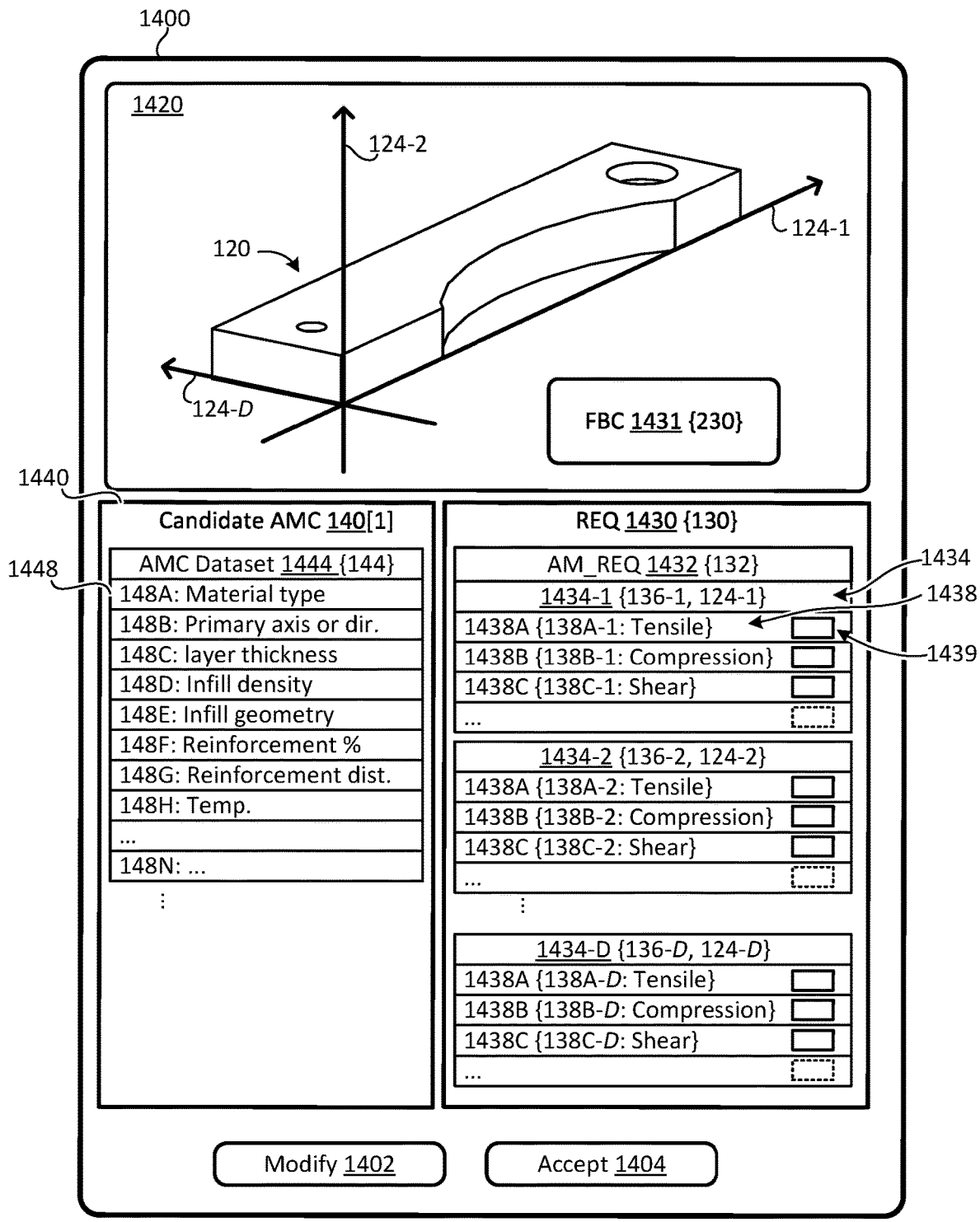
FIGS. 14A-15F illustrate examples of graphical user interfaces for managing AM processes.
Figure 14B:
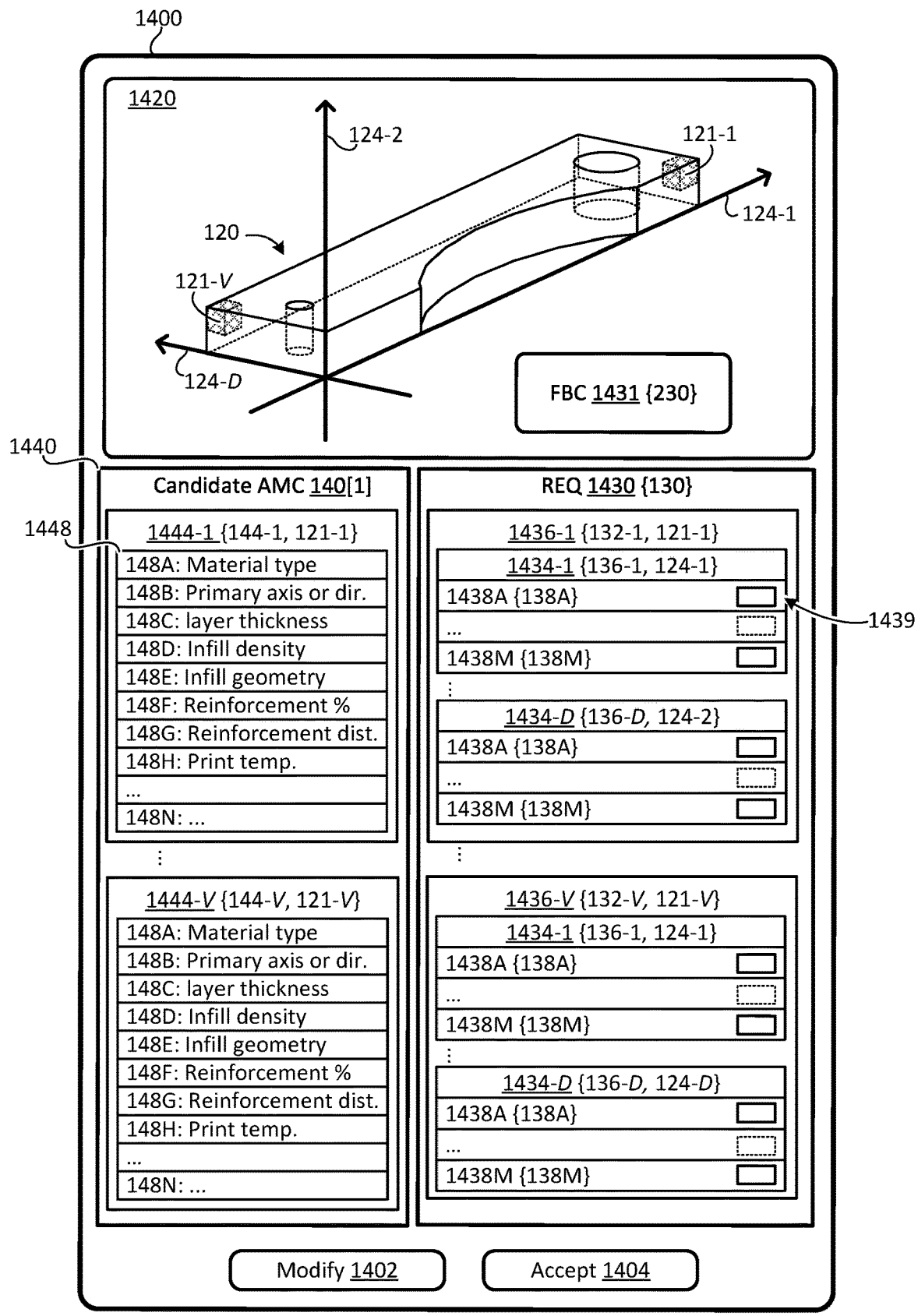
Figure 14C:
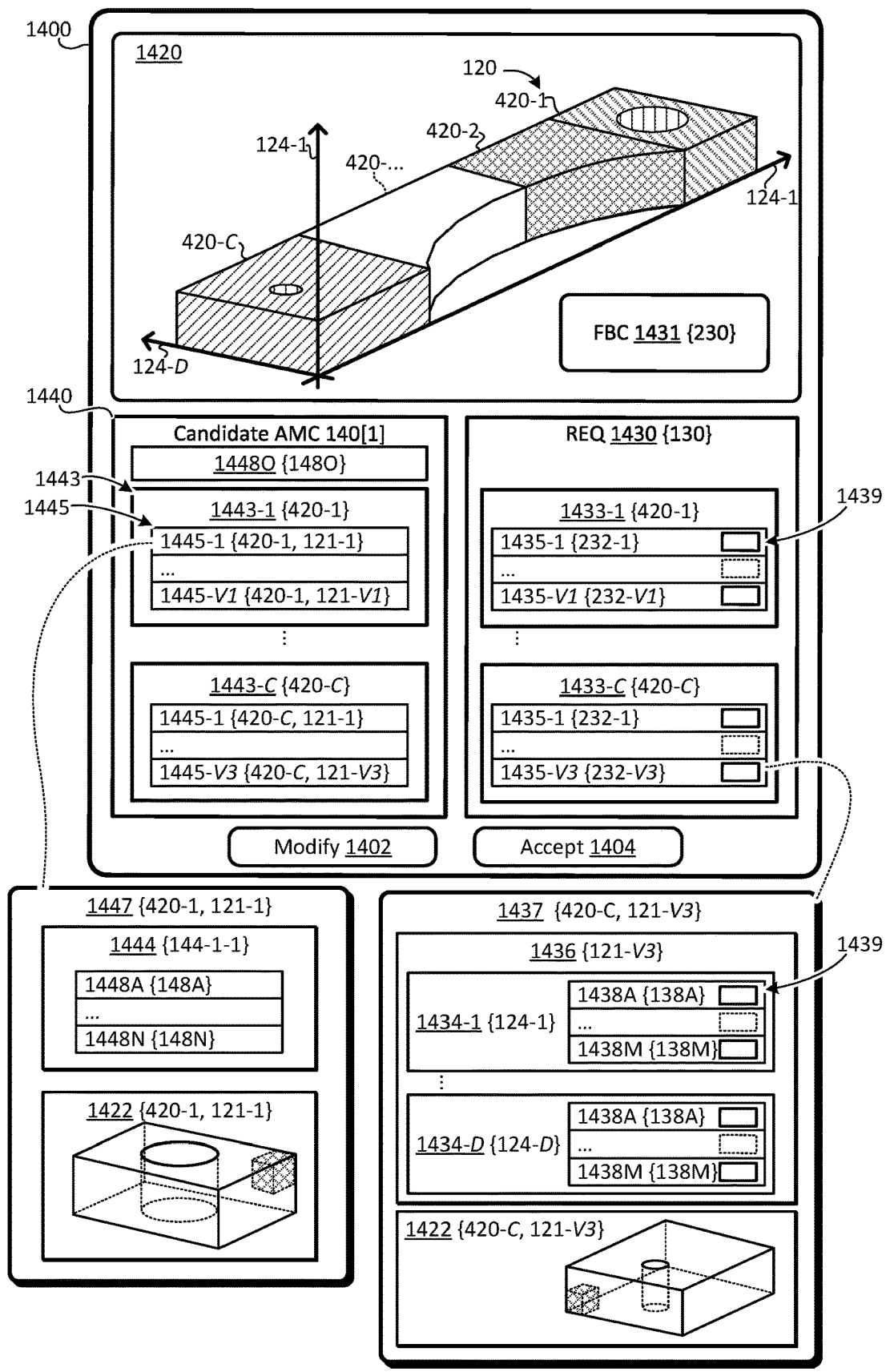

FIG. 14A illustrates an example of an AMC_INI UI 1400. The AMC_INI UI 1400 may be configured to facilitate user interaction pertaining to an initial candidate AMC 140[1]

comprising a single AMC dataset 144, including AMC_PV 148A-N configured to control manufacture of substantially all of the design 120, as illustrated in FIG. 5A. The AMC_INI UI 1400 may comprise an AMC UI 1440 configured to display information pertaining the initial candidate AMC 140[1]. The AMC UI 1440 may be initially populated with the recommended candidate AMC 140[1] determined by the analysis module 112, as disclosed herein. The AMC_INI UI 1400 may further comprise an AMC dataset UI 1444 comprising AMC_PV UI 1448 configured to display AMC_PV 148A-N assigned to respective AMC parameters 142 of the initial candidate AMC 140[1]. The AMC_PV UI components 1448 provide for user modification of AMC_PV 148 assigned to respective parameters 142.

The AMC_INI UI 1400 may further comprise a REQ UI 1430, which may be configured to display information pertaining to the requirements 130 of the design specification 122. In the FIG. 14A example, the REQ UI 1430 may comprise an AM_REQ UI 1432 configured to display information pertaining to a design specification 122 having a single set of AM_REQ 132, as illustrated in FIG. 2. The AM_REQ UI 1432 may comprise a plurality of M_REQ dataset UI 1434, each configured to display M_REQ 138 for a specified ODA 124 (e.g., M_REQ 138A-M for specified ODA 124), such as tensile M_REQ 138A, compression M_REQ 138B, shear M_REQ 138C, and so on. The REQ UI 1430 may include a primary M_REQ dataset UI 1434-1 configured to display the primary ODA_REQ DS 136-1 for ODA 124-1, a secondary M_REQ dataset UI 1434-2 for ODA 124-2, a secondary M_REQ dataset UI 1434-D for ODA 124-D, and so on. The M×D M_REQ 138 comprising the AM_REQ 132 may be displayed within respective M_REQ UI 1438 (M_REQ UI 1438A-1438N for M_REQ 138A-N, respectively). The M_REQ UI 1438 may further comprise labels 1439 configured to indicate AM_CLS assigned to the AM_REQ 132, ODA_REQ DS 136, and/or respective M_REQ 138 (e.g., indicate whether the M_REQ 138 are "high," "MAX," "mid," "low," "MIN" or the like).

In some implementations, the AMC_INI UI 1400 may further include a design UI 1420 configured to display a graphical representation of the 3D object design 120. The design UI 1420 may be further configured to display graphical representations of one or more ODA 124, including the primary ODA 124-1 and one or more secondary ODA 124-2 through 124-D. As illustrated in FIG. 14A, the AMC INI procedure 1041 may be configured to align the primary axis AMC_PV 148B with the primary ODA 124-1 of the design 120 in the recommended candidate AMC 140[1]. The design UI 1420 may further include an FBC UI 1431 configured to display information pertaining to FBC 230 from which AM_REQ 132 for the design 120 were derived.

The AMC INI UI 1400 may further comprise a modify input 1402, which may enable a user to modify one or more aspects of the candidate AMC 140[1]. Selection of the modify input 1402 may, for example, enable the user to edit the contents of one or more of the AMC_PV UI 1448 (e.g., modify the AMC_PV 148 assigned to a specified AMC parameter 142). In some implementations, the AMC INI UI 1400 may be configured to control modification of respective AMC parameters 142. For example, the AMC INI UI 14000 may comprise and/or be coupled to logic configured to verify that user-specified AMC_PV 148 comply with AMC constraints 1026 (e.g., fall within AMC_PV ranges 1028 defined by parameter models 142 of the respective parameters 142). The AMC INI UI 1400 may also include an accept input 1404, which may enable a user to accept the candidate AMC 140[1] as defined by and/or within the AMC UI 1440.

FIG. 14B illustrates another example of an AMC INI UI 1400. In the FIG. 14B example, the AMC INI UI 1400 may be configured for AMC 140 for a design 120 comprising a plurality of DU 121, e.g., V DU 121-1 through 121-V as illustrated in FIGS. 3B-3E and 6A-6B. The candidate AMC 140[1] may, therefore, comprise a plurality of AMC datasets 144 (AMC datasets 144-1 through 144-V), each defining a respective set of AMC_PV 148A-N configured to control additive manufacture of the design 120 at or within DU 121-1 through 121-V, respectively. The REQ UI 1430 may comprise a plurality of DU AM_REQ UI 1436, each configured to display DU AM_REQ 232 of a respective DU 121 of the design 120 (e.g., DU AM_REQ UI 1436-1 through 1436-V configured to display AM_REQ 132-1 through 132-V for DU 121-1 through 121-V). As illustrated in FIG. 14B, the design UI 1420 may be further configured to display graphical representations of respective DU 121-1 through 121-V and/or associate the DU 121 with corresponding AMC dataset UI 1444 and/or DU AM_REQ UI 1436 (e.g., AMC dataset UI 1444-1 through 1444-V and DU AM_REQ UI 1436-1 through 1436-V).

FIG. 14C illustrates another example of an AMC INI UI 1400. In the FIG. 14C example, the AMC INI UI 1400 may be configured for AMC 140 of a design 120 comprising a plurality of DC 420, each DC 420 comprising respective DU 121 (e.g., a hybrid design 120 as illustrated in FIGS. 4 and 7A-7B).

The AMC UI 1440 of the FIG. 14C example may include a plurality of DC UI 1443, each DC UI 1443 configured to represent aspects of the AMC 140[1] pertaining to a respective DC 420 of the hybrid design 120 (e.g., DC UI 1443-1 through 1443-C); each DC UI 1443 may comprise a plurality of DC_DU UI 1445, each DC_DU UI 1445 configured to represent the AMC dataset 144 configured to control the additive manufacture of the DC 420 at or within a respective DU 121 of the DC 420. In the FIG. 14C example, the hybrid design 120 comprises C DC 420 (e.g., DC 420-1 through 420-C) and, as such, the AMC UI 1440 may comprise C DC UI 1443 (e.g., DC UI 1443-1 through 1443-C corresponding to DC 420-1 through 420-C, respectively). As illustrated in FIGS. 4 and 7A, DC 420-1 may comprise V1 DU 121, DC 420-2 may comprise V2 DU 121, DC 420-C may comprise V3 DU 121, and so on. Accordingly, the DC UI 1443-1 may comprise V1 DC_DU UI 1445 (e.g., DC_DU UI 1445-1 through 1445-V1), the DC UI 1443-C may comprise V3 AMC dataset UI 1445 (e.g., DC_DU UI 1445-1 through 1445-V3), and so on.

In some implementations, user selection of a DC_DU UI 1445 may invoke a DC_DU AMC UI 1447. The DC_DU AMC UI 1447 may be configured to provide access an AMC dataset 144 for a specified DU 121 of the DC 420. As illustrated in FIG. 14C, the DC_DU AMC UI 1447 may comprise an AMC dataset UI 1444, as disclosed herein. The DC_DU AMC UI 1447 may further comprise a DC UI 1422 configured to display a graphical representation of the DC 420 and/or DU 121 covered by the AMC dataset 144.

FIG. 14C illustrates an example of a DC_DU AMC UI 1447 invoked in response to user selection of the DC_DU UI 1445-1{420-1, 121-1} of DC UI 1443-1. The DC_DU UI 1447 {421-1, 121-1} may be configured to provide access to the AMC dataset 144 for DU 121-1 of DC 420-1, e.g., provide access to AMC dataset 144-1-1. The AMC_PV UI 1448A-N of the AMC dataset UI 1444 {144-1-1} may comprise AMC_PV 148A-N to control additive manufacturing within DU 121-1 of DC 420-1. User selection of other DC_DU UI 1445 may invoke DC_DU AMC UI 1447 for other AMC datasets 144. For example, selection of DC_DU UI 1445-V1 {420-1, 121-V1} of DC AMC 1445-1 may invoke a DC_DU AMC UI 1447 configured to provide access to the AMC dataset 144 for DU 121-V1 of DC 420-1, e.g., AMC dataset 144-V1-1, selection of DC_DU UI 1445-1 {420-C, 121-1} of DC UI 1443-C may invoke a DC_DU AMC UI 1447 configured to provide access to the AMC dataset 144 for DU 121-1 of DC 420-C, e.g., AMC dataset 144-1-C, selection of DC_DU UI 1445-V3 {420-C, 121-V3} of DC UI 1443-C may invoke a DC_DU AMC UI 1447 configured to provide access to the AMC dataset 144 for DU 121-V3 of DC 420-C, e.g., AMC dataset 144-V3-C, and so on.

In the FIG. 14C example, the AMC_UI 1440 may further comprise an AMC_PV UI 14480 configured to provide access to the HDC AMC_PV 1480 assigned to the HDC parameter 142 of the candidate AMC 140[1]. As disclosed herein, the HDC parameter 142 may be configured to control aspects of a multi-material and/or multi-stage additive manufacturing process for the hybrid design 120. For example, HDC AMC_PV 1480 may specify an order in which respective DC 420-1 through 420-C of the hybrid design 120 are to be manufactured. The AMC_PV UI 14480 may display a recommended HDC AMC_PV 1480 (e.g., a recommended DC fabrication order) and may provide for user modification of the HDC AMC_PV 1480, as disclosed herein.

The AMC INI UI 1400 may further comprise information pertaining to AM_REQ 132 for respective DC 420 of the design 120. In the FIG. 14C example, the REQ UI 1430 may comprise a plurality of DC AM_REQ UI 1433, each configured to represent the DC AM_REQ 432 for a respective DC 420, e.g., DC AM_REQ UI 1433-1 through 1433-C configured to represent DC AM_REQ 432-1 through 432-C, respectively. The DC AM_REQ UI 1433 may comprise respective DC_DU_REQ UI 1435, each configured to represent AM_REQ 132 for a specified DU 121 within the DC 420. In the FIG. 14C example, DC 420-1 may comprise V1 DU 121 and, as such, the DC AM_REQ UI 1433-1{420-1} may comprise V1 DC_DU_REQ UI 1435-1 through 1435-V1, DC 420-C may comprise V3 DU 121 and, as such, the DC AM_REQ UI 1433-C{420-C} may comprise V3 DC_DU_REQ UI 1435-1 through 1435-V3, and so on.

In some implementations, user selection of a DC_DU_REQ UI 1435 may invoke a DC_DU AM_REQ UI 1437. The DC_DU AM_REQ UI 1437 may comprise a DU AM_REQ UI 1436 configured to display information pertaining to the AM_REQ 132 for a specified DU 121 of a specified DC 420, as disclosed herein. The DC_DU AM_REQ UI 1437 may further comprise a DC UI 1422 configured to display a graphical representation of the DC 420 and/or DU 121 covered by the DC_DU_REQ UI 1435, as disclosed herein.

FIG. 14C illustrates an example of a DC_DU AM_REQ UI 1437 invoked in response to user selection of DC_DU_REQ UI 1435-V3 {420-C, 121-V3} of DC_REQ UI 1433-C. The resulting DU AM_REQ UI 1436 may be configured to display AM_REQ 132 for DU 121-V3 of DC 420-C. the DU AM_REQ UI 1436 may comprise a primary M_REQ dataset UI 1434-1 and one or more secondary M_REQ dataset UI 1434-2 through 1434-D, each configured to display M_REQ 138A-M for ODA 124-1 through 124-D, respectively.

Referring back to FIG. 13A, the initial iteration (1) may further comprise profiling the initial candidate AMC 140[1]. The AMCA procedure 960 may comprise producing a prototype 180[1] of the AMC 140[1] in an AMC AM procedure 962, implementing a prototype MA procedure 964, and determining a profile 160[1] for the AMC 140[1] in an AMC PA procedure 968, as disclosed herein.

The AMC profile 160[1] may be evaluated in view of the requirements 130 of the design specification 122. The evaluation procedure 1090 may comprise determining whether the AMC 140[1] satisfies AM_REQ 132 of the design 120, as disclosed herein (e.g., may comprise determining whether the AMC 140[1] is suitable for the design specification 122). The evaluation procedure 1090 may further comprise determining evaluation metrics 190[1] for the AMC 140[1], and so on. The AMC 140[1], profile 160[1] and/or other information pertaining to the initial iteration (1) may be maintained within IA metadata 1016 of the IA procedure 1014, as disclosed herein. Alternatively, or in addition, the AMC 140[1] and corresponding profile 160[1] may be written to the datastore 108, e.g., may be stored within an entry 109-1, as illustrated in FIG. 13A.

In subsequent iterations (I, where i>1), candidate AMC 140[i] may be determined through the AMC OPT procedure 1340. The AMC OPT procedure 1340 may be configured to iteratively refine candidate AMC 140[i] until an "optimal" AMC 140 for the design specification 122 is determined. As disclosed herein, the AMC OPT procedure 1340 may determine candidate AMC 140[i] for respective iterations (i) based, at least in part, on IA metadata 1016, such as AMC 140[i−1 . . . 1] and corresponding profiles 160[i−1 . . . 1], AMC metrics 170[i−1 . . . 1], evaluation metrics 190[i−1 . . . 1], and so on.

In some implementations, the AMC OPT procedure 1340 may be controlled by an optimization algorithm 1320. The optimization algorithm 1320 may comprise and/or correspond to any suitable optimization means, including, but not limited to: an iterative optimization algorithm, gradient descent, stochastic gradient descent (SGD), a matrix-based optimization algorithm, a derivative-based optimization algorithm, a genetic algorithm, an artificial intelligence (AI) optimization algorithm, a machine-learning or machine learned (ML) optimization algorithm, an AI/ML optimization algorithm, an AI/ML component, and/or the like. The optimization algorithm 1320 may comprise and/or leverage an AMC OPT model 1020, which may include an objective model 1022, constraint model 1024, and AMC model 1028 (e.g., parameter models 1042, GPC models 1044, CSPM models 1046 for specified AMC_CTX 1048), and/or the like. Alternatively, or sin addition, aspects of the AMC OPT procedure 1340 may be controlled by an AI/ML system 114, as disclosed herein.

Figure 13B:
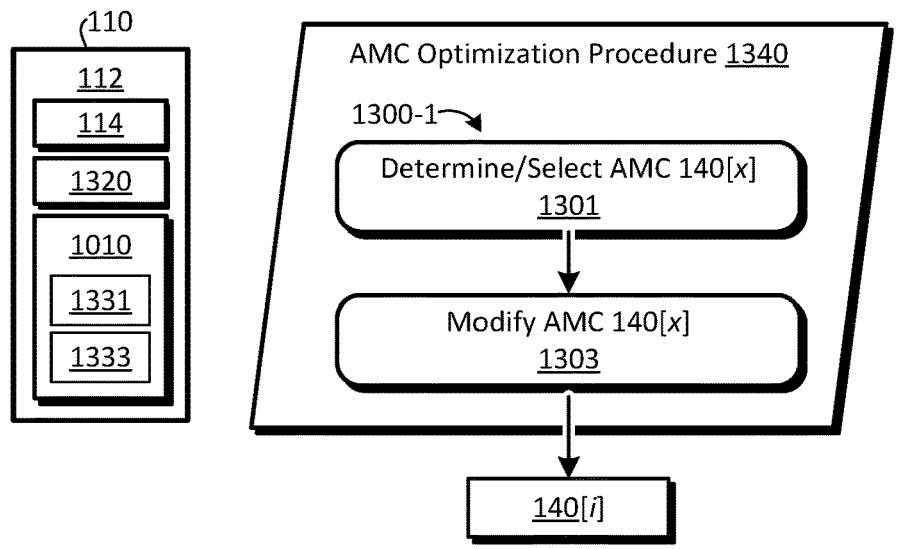
FIGS. 13B-13E illustrate examples of AMC optimization procedures.

FIG. 13B illustrates an example of a method 1300-1 for implementing an AMC OPT procedure 1340 by the design manager 110. Aspects of the method 1300-1, and other methods, procedures, and/or operations disclosed herein may be implemented by hardware components, such as a processor, processing circuitry, computing resources 102 of the apparatus 101, e.g., processing resources 103, memory resources 104, NTS resources 105, HMI resources 106, a data interface 107, and/or the like. Alternatively, or in addition, aspects of the method 1300-1, and other methods, procedures, and/or operations disclosed herein may be embodied by instructions stored on a non-transitory, computer-readable storage medium. The instructions may be configured to cause a processor of a computing device to implement operations for managing additive manufacturing, as disclosed herein.

The method 1300-1 may comprise modifying one or more AMC 140 evaluated in one or more previous iterations of the IA procedure 1014, e.g., one or more of AMC 140[i–1 . . . 1], to produce a candidate AMC 140[i] for a current iteration (I) of the IA procedure 1014. For example, the candidate AMC 140[i] may be produced by combining one or more AMC 140[x]. Alternatively, or in addition, the candidate AMC 140[i] may be determined by mutating or modifying the selected AMC 140[x], e.g., modifying one or more AMC_PV 148 of the AMC 140[x].

In the FIG. 13B example, the method 1300-1 may comprise determining an AMC 140[x] from which to derive the AMC 140[i] at 1301. The AMC 140[x] may be selected from AMC 140[i–1 . . . 1] evaluated in one or more previous iterations of the IA procedure 1014 (or previous AMC analysis operations 1012), as disclosed herein. Alternatively, or in addition, the AMC 140[x] may be selected from the datastore 108 (e.g., may be selected from an entry 109 comprising a known, previously determined AMC 140 for the design 120) or may be determined through an AMC INI procedure 1041. In some implementations, the selection at 1301 may be controlled by AMC selection logic 1331 of the analysis module 112. The AMC selection logic 1331 may be configured to select an AMC 140[x] from AMC 140[i–1 . . . 1] based on any AMC selection criteria, including but not limited to: random or pseudo random criteria, suitability criteria (e.g., the AMC 140[x] may be selected from AMC 140[i–1 . . . 1] that satisfy the requirements 130 of the design 120), AMC metric criteria (e.g., may comprise selecting an AMC 140[i–1 . . . 1] having optimal AMC metrics 170), evaluation metric criteria (e.g., may comprise selecting an AMC 140[i–1 . . . 1] having optimal evaluation metrics 190), and/or the like. In some implementations, the AMC 140[x] may be selected and/or determined at 1301 by an optimization algorithm 1320, as disclosed herein. Alternatively, the AMC 140[x] may be determined by the AI/ML system 114; for example, the AMC 140[x] may be determined by a trained AI/ML AMC model 1190, as disclosed herein.

The AMC 140[x] may be modified to produce a candidate AMC 140[i] for the current iteration (i) of the IA procedure 1014 at 1303. The mutations or modifications to the selected AMC 140[x] may be determined by AMC modification logic 1333. The AMC modification logic 1333 may determine modifications for the AMC 140[x] based on, inter alia, the profile 160[x] of the AMC 140[x]. In some implementations, the AMC modification logic 1333 may comprise predetermined modification rules. For example, if the selected AMC 140[x] satisfies the requirements 130 of the design specification 122 the AMC modification logic 1333 may be configured to modify the AMC 140[x] to reduce or decrease cost metrics 172 of the resulting candidate AMC 140[i], e.g., to determine whether the requirements 130 of the design specification 122 can be satisfied at a lower cost, as disclosed herein. Conversely, if the selected AMC 140[x] does not satisfy the requirements 130, the AMC modification logic 1333 may be configured to modify the AMC 140[x] to increase MU metrics 174 of the resulting candidate AMC 140[i], as disclosed herein. Alternatively, or in addition, the modifications to the AMC 140[x] at 1303 may be controlled by the optimization algorithm 1320 and/or AI/ML system 114, as disclosed herein. For example, the optimization algorithm 1320 may comprise a gradient descent algorithm, which may control the modifications to the candidate AMC 140[i] in respective iterations (1).

Figure 13C:
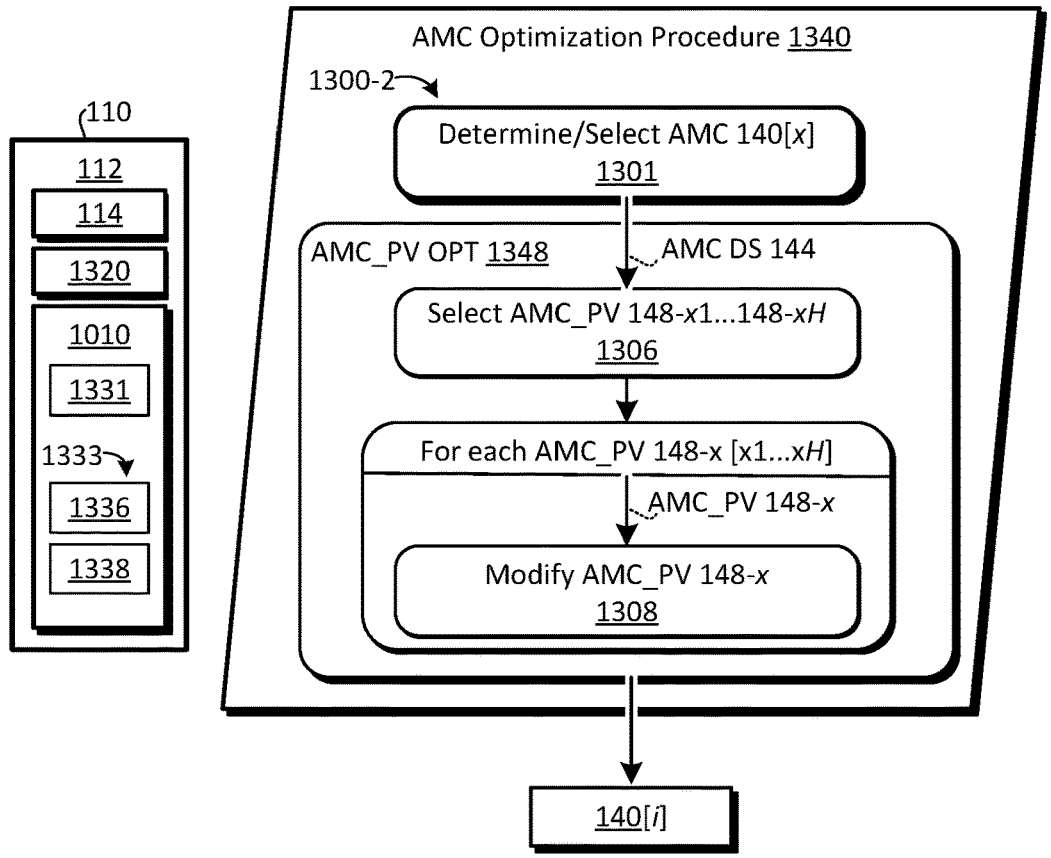

FIG. 13C illustrates another example of a design manager 110 configured to implement a method 1300-2 for an AMC OPT procedure 1340, as disclosed herein. The method 1300-2 may be configured to determine AMC 140 at the design granularity level; e.g., AMC 140 comprising an AMC DS 144 configured to control additive manufacturing over the design 120 as a whole, as illustrated in FIG. 5A. Step 1301 may comprise determining and/or selecting an AMC 140[x], as disclosed herein. The method 1300-2 may further comprise implementation of an AMC_PV optimization (AMC_PV OPT) procedure 1348 at 1306 through 1308. The AMC_PV OPT procedure 1348 may comprise optimizing AMC_PV 148 of the AMC 140[x] to produce the candidate AMC 140[i], as disclosed in further detail herein.

The AMC_PV OPT procedure 1348 may comprise selecting one or more AMC_PV 148 for modification at 1306, e.g., selecting AMC_PV 148-x1 . . . 148-xH, where [x1 . . . xH] are selected from AMC_PV 148A . . . 148N of AMC 140[x]. The AMC_PV 148 may be selected by use of AMC_PV selection logic 1336. The AMC_PV selection logic 1336 may select AMC_PV 148 based on any suitable criteria. In a first non-limiting example, substantially all of the parameters 142 may be selected for modification at 1306 (e.g., AMC_PV 148-x1 . . . 148-xH may correspond to AMC_PV 148A through 148N).

In a second non-limiting example, the selection of 1306 may be based on PM metrics 1176 of the parameters 142 (per GPC models 1044, CSPC models 1046, and/or AI/ML CSPM models 1150 determined for the parameters 142). Parameters 142 having favorable PM metrics 1176 may be selected over other parameters 142. For example, in the FIG. 11E example, the AMC 140[x] may correspond to the AMC_CTX 1048-A; the infill density AMC_PV 148D may be set at 148D-1 in AMC 140[x] (and other parameters 142 may be within AMC_CTX 1048-A). The PM metrics 1176 for the infill density parameter 142 indicate that increasing infill density from AMC_PV 148D is likely to yield significant increases to MU metrics 174 with relatively small increases to cost (cost metrics 172). Therefore, if the AMC 140[x] is being modified to increase AM_PROP 162 to satisfy AM_REQ 132 for the design 120, the infill density parameter 142 may be selected for modification at 1306 (based on the PM metrics 1176 for the infill density AMC_PV 148D-1). Conversely, the infill density PM metrics 1176 at AMC_PV 148D-1 indicate that decreasing infill density from the already low AMC_PV 148D-1 is likely to result in a significant decrease in the MU metrics 174, while yielding relatively modest reductions to the cost metrics 172. Therefore, if the AMC 140[x] is being modified to decrease cost 172 while continuing to satisfy AM_REQ 132 of the design 120, the infill density parameter 142 may not be selected at 1306.

In a third non-limiting example, parameters 142 may be selected for modification at 1306 based on relative levels of the AMC_PV 148. As illustrated in FIGS. 11A and 12, the AMC_PV ranges 1148 of respective parameters 142 may be divided into AMC_PVZ 1145, each corresponding to a respective AM_CLS (e.g., from "low" or "MIN" to "high" or "MAX"). The AMC analysis logic 1010 may be configured to modify AMC 140[i] such that AMC_PV 148 of respective parameters 142 are maintained within same or similar AMC_PVZ 1145. Therefore, if the AMC 140[x] is being modified to increase MU metrics 174 (e.g., to satisfy AM_REQ 132 of the design 120), parameters 142 having AMC_PV 148 in lower AMC_PVZ 1145 may be selected for modification over parameters 142 having AMC_PV 148 in higher AMC_PVZ 1145. Conversely, if the AMC 140[x] is being modified to decrease cost metrics 172 (while continuing to satisfy AM_REQ 132 for the design 120), parameters

142 having higher AMC_PVZ 1145 may be selected for modification over parameters 142 having AMC_PV 148 in higher AMC_PVZ 1145.

In a fourth non-limiting example, parameters 142 may be selected for modification at 1306 based on respective AMC_PV levels, the AMC_PV levels configured to quantify a position of respective AMC_PV 148 within corresponding AMC_PV ranges 1148. The AMC_PV level of a parameter 142 $n$ ($PVL_n$) may, for example, be expressed as a percentage of a maximum value of the parameter ($MAX_n$) as follows, $$PVL_n = \left(\frac{PV_n}{MAX_n}\right)100,$$

where $PV_n$ is the AMC_PV 148 of the parameter 142 ($n$). Parameters 142 may be selected for modification based on AMC_PV levels as described above in conjunction with AMC_PVZ 1145.

In a fifth non-limiting example, the selection of AMC_PV 148-$x1$ . . . 148-$x$H at 1306 may involve user intervention, as disclosed in further detail herein.

At 1308 the AMC analysis logic 1010 may be configured to modify the parameters 142 selected at 1306, e.g., modify AMC_PV 148-$x1$ . . . 148-$x$H, selected at 1306. The modifications may be determined by parameter modification logic 1338. In a first non-limiting example, the AMC_PV 148-$x1$ . . . 148-$x$H may be incremented or decremented by a predetermined step amount; the AMC_PV 148-$x1$ . . . 148-$x$H may be incremented if the AMC 140[$x$] fails to satisfy the AM_REQ 132 of the design 120 and may be decremented otherwise (e.g., to decrease cost metrics 172 of the resulting candidate AMC 140[$i$]). The parameters 142 may be incremented and/or decremented in accordance with iteration metadata of the respective parameter models 1042 (e.g., per predetermined increment and/or decrement amounts for the parameters 142).

In a second non-limiting example, the modifications at 1308 may be based on PM metrics 1176 of the AMC_PV 148-$x1$ . . . 148-$x$H; parameters 142 having more favorable PM metrics 1176 may be incremented or decremented by a higher degree than parameters 142 having less favorable CSPM metrics s1176. In other words, the modifications to respective AMC_PV 148-$x1$ . . . 148-$x$H may be proportional to the PM metrics 1176 of the respective AMC_PV 148-$x1$ . . . 148-$x$H.

In a third non-limiting example, the AMC_PV 148-$x1$ . . . 148-$x$H may be modified such that the AMC_PV 148 in the resulting candidate AMC 140[$i$] fall within corresponding AMC_PVZ 1145, as disclosed herein.

In a fourth non-limiting example, the AMC_PV 148-$x1$ . . . 148-$x$H may be modified to fall within respective AMC_PV levels (and/or fall within AMC_PV level thresholds), as disclosed herein.

Figure 15A:
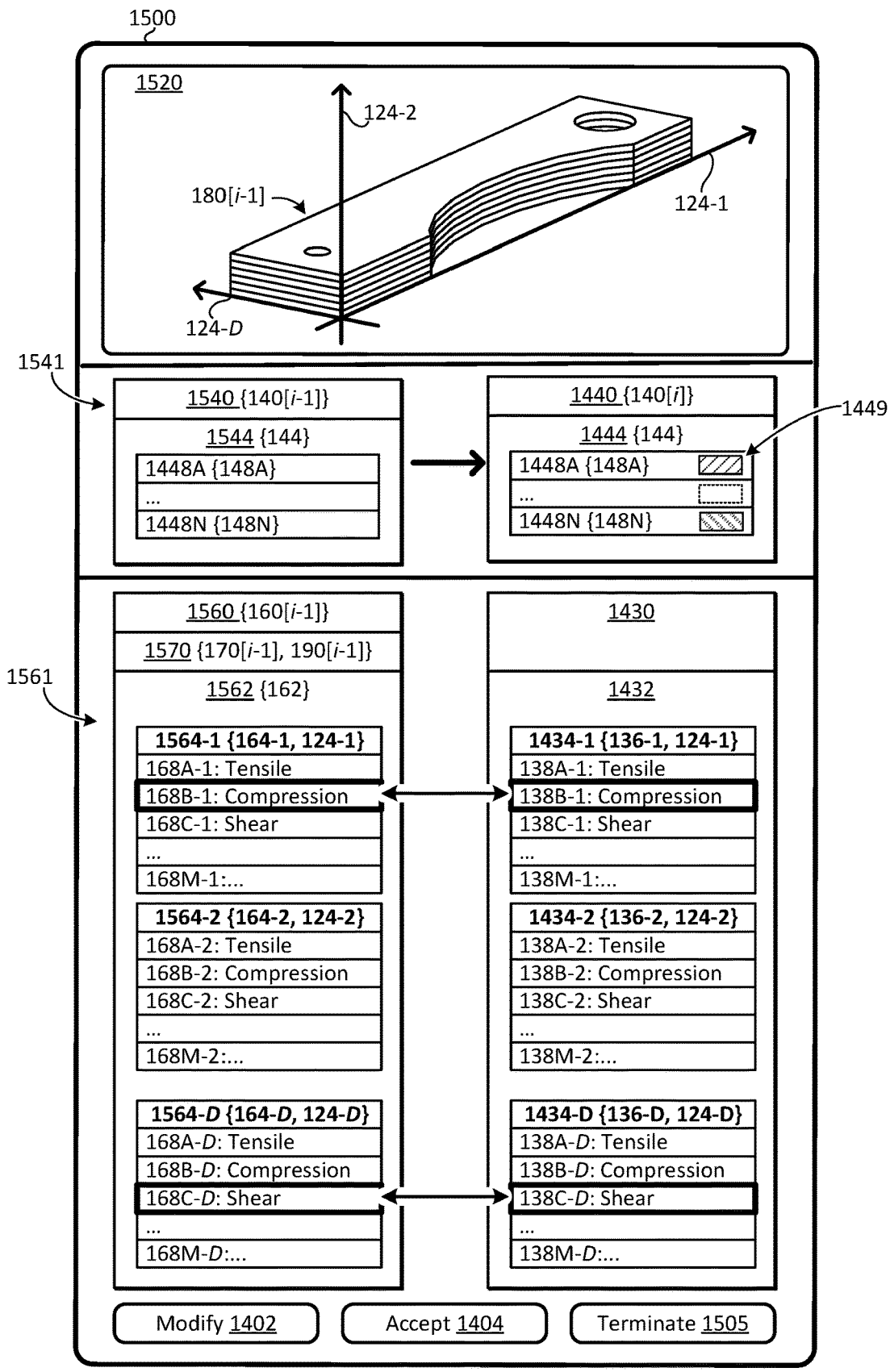

In a fifth non-limiting example, the selection and/or modification of the AMC_PV 148-$x1$ . . . 148-$x$H at 1306 and 1308 may comprise user interaction. More specifically, the AMC analysis logic 1010 may determine recommended modifications to AMC_PV 148-$x1$ . . . 148-$x$H at 1306 and 1308 as described above and may present the recommended modifications in an AMC OPT UI 1500, as illustrated in FIG. 15A. A user may view, modify, and/or approve the recommended parameter modifications.

FIG. 15A illustrates an example of an AMC OPT UI 1500. The AMC OPT UI 1500 may be configured to facilitate user interaction with respect to the AMC_PV OPT procedure 1348 illustrated in FIG. 13C (e.g., 1301, 1306, and 1306 of method 1300-2). The AMC OPT UI 1500 may comprise a candidate OPT UI 1541, which may comprise a candidate OPT UI 1541 configured to display information pertaining to one or more or more AMC 140[$i$–1 . . . 1] of previous iteration(s) of the IA procedure 1014 (e.g., AMC 140[$i$–1]) and a candidate AMC UI 1440 configured to provide access to information pertaining to the candidate AMC 140[$i$] for a next or current iteration ($i$). The previous AMC UI 1540 may comprise a previous AMC DC UI 1544 configured to display information pertaining to the AMC DC of AMC 140[$i$–1], including AMC_PV UI 1448 indicating AMC_PV 148 assigned to respective parameters 142 in AMC 140 [$i$–1].

The AMC OPT UI 1500 may further comprise an evaluation UI 1561, which may be configured to display information pertaining to evaluation of one or more of AMC 140[$i$–1 . . . 1]. In the FIG. 15A example, the evaluation UIO 1561 comprises a profile UI 1560 configured to display information pertaining to the profile 160[$i$–1] determined for the previous AMC 140[$i$–1] and a REQ UI 1430 configured to display information pertaining to AM_REQ 132 of the design 120.

The profile UI 1560 may comprise a metric UI 1570 configured to display information pertaining to AMC metrics 170[$i$–1] determined for the AMC 140[$i$–1], such as cost metrics 172, MU metrics 174, and/or the like. The metric UI 1570 may further comprise information pertaining to evaluation metrics 190[$i$–1], such as whether the AMC 140[$i$–1] satisfies AM_REQ 132 of the design 120 and/or the like.

The profile UI 1560 may further comprise an AM_PROP UI 1562 configured to display AM_PROP 162 of the AMC 140[$i$–1]. The AM_PROP UI 1562 may comprise ODA AM_PROP UI 1562, configured to display PM_PROP 168 of the AMC [$i$–1] with respect to the primary ODA 124-1 (primary ODA PM_PROP UI 1564-1) and one or more secondary ODA 124-2 through 124-D (secondary ODA AM_PROP ODA PM_PROP UI 1564-2 through 1564-D).

Figure 17:
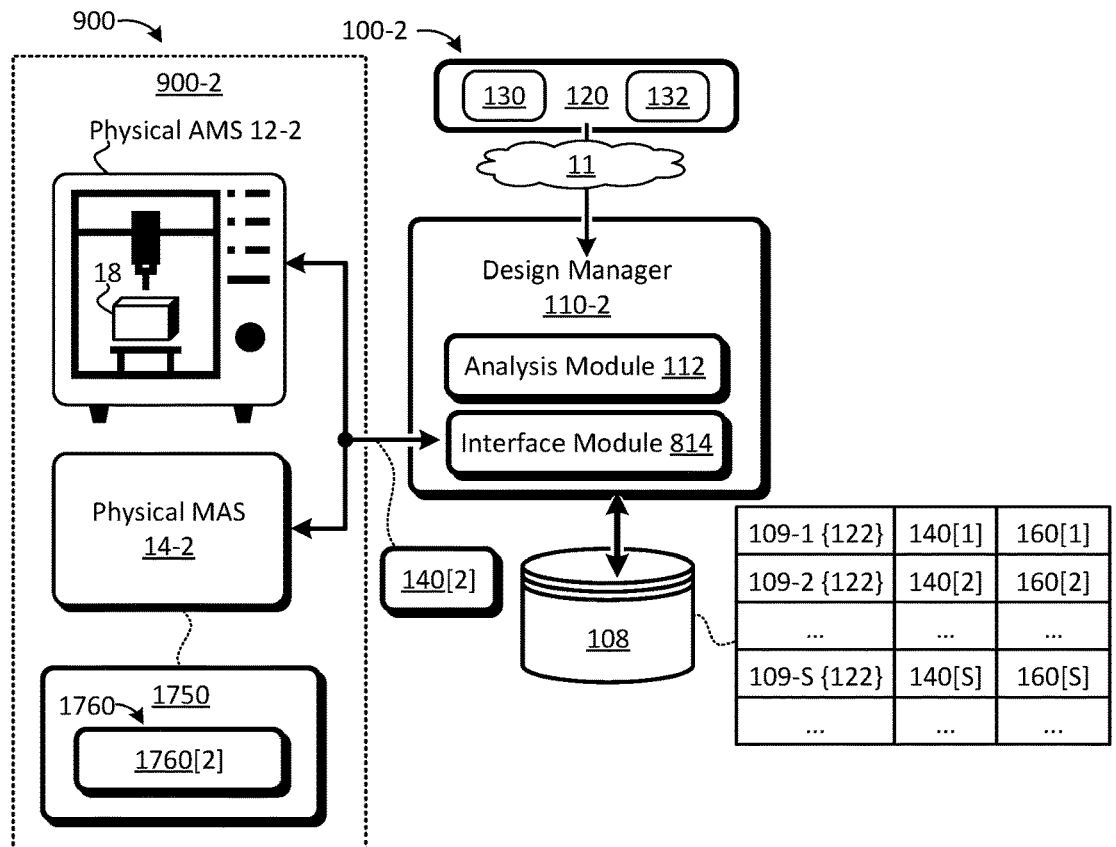
FIG. 17 illustrates another example of a system configured to refine AM configuration data maintained within a datastore.

In some implementations, the AMC OPT UI 1500 may be configured to display information pertaining to other previous iterations, e.g., iterations $i$–2, $i$–3, and so on. For example, the AMC OPT UI 1500 may be configured to display AMC 140[$i$–1 . . . $i$–P] and corresponding mechanical profiles 160[$i$–1 . . . $i$–P], where P<I and P is the number of completed iterations of the IA procedure 1014. Alternatively, or in addition, the AMC OPT UI 1500 may be configured to display a summary of one or more completed iterations, as illustrated in FIG. 17.

In some embodiments, the AMC OPT UI 1500 may further comprise a prototype UI 1520, which may be configured to display a graphical representation of the prototype 180[$i$–1] produced for the AMC 140[$i$–1]. The prototype UI 1520 may be further configured to display the primary ODA 124-1 and/or one or more secondary ODA 124-2 through 124-D, as disclosed herein.

The AMC OPT UI 1500 may further include a REQ UI 1430, which may be configured to display information pertaining to AM_REQ 132 of the design 120, as disclosed herein. The REQ UI 1430 of the AMC OPT UI 1500 may be further configured to identify requirements 130 that the AMC 140[$i$–1] (or profile 160[$i$–1]) fails to satisfy (if any). In the FIG. 15A example, the prototype 180[$i$–1] produced by the AMC 140[$i$–1] may have a compression PM_PROP 168B-1 along the primary ODA 124-1 that fails to satisfy the primary compression M_REQ 138B-1. The AMC OPT UI 1500 may be configured to highlight or otherwise identify the failed PM_PROP 168B-1 and/or unsatisfied M_REQ 138B-1. As further illustrated in FIG. 15A, the shear PM_PROP 168C-D in the secondary ODA 124-D may fail to satisfy the corresponding shear M_REQ 138C-D and, as such, may be highlighted in the AMC OPT UI 1500.

The AMC OPT UI 1500 may be further configured to display information pertaining to a recommended AMC 140[$i$] for a next iteration (i) of the IA procedure 1014. In some implementations, the recommended AMC 140[$i$] may be determined through implementation the AMC OPT procedure 1340, as disclosed herein (and/or as illustrated in FIG. 14C); the AMC UI 1440 of the AMC OPT UI 1500 may be initially populated with the AMC 140[$x$] selected at 1301 and modified at 1306-1308.

The AMC OPT UI 1500 may comprise a modify input 1402, which may be configured to enable a user to modify the recommended AMC 140[$i$] (e.g., modify one or more of the AMC_PV 148A-N). An accept input 1404 may enable a user to accept the recommended AMC 140[$i$] including user-submitted modifications (if any).

In some embodiments, the AMC OPT UI 1500 may further comprise parameter modification controls 1449. The parameter modification controls 1449 may be configured to display information pertaining to respective parameters 142 (and/or recommended AMC_PV 148). The parameter modification controls 1449 may be configured to display graphical representations of PM metrics 1176 determined for respective AMC_PV 148. As disclosed herein, the PM metrics 1176 may indicate a degree to which modification of respective AMC_PV 148A-N are predicted to influence optimization metrics of the resulting AMC 140 [$i$]. For example, colors or other aspects of the parameter modification controls 1449 may be adapted in accordance with outcome predictions: the parameter modification controls 1449 of AMC_PV 148 that are predicted to result in improved MU metrics 174 with relatively little increase to cost metrics 172 (or reduced cost metrics 172 with relatively little decrease to MU metrics 174) may be highlighted in green; the parameter modification controls 1449 of AMC_PV 148 that are predicted to result in relatively small improvements to MU metrics 174 (if any) with relatively large increases to cost metrics 172 (or relatively little reduction to cost metrics 172 with relatively large decreases to MU metrics 174) may be highlighted in red; the parameter modification controls 1449 of AMC_PV 148 that are predicted to result in average or median changes to AMC metrics 170 may be highlighted in white or orange; and so on.

Figure 15B:
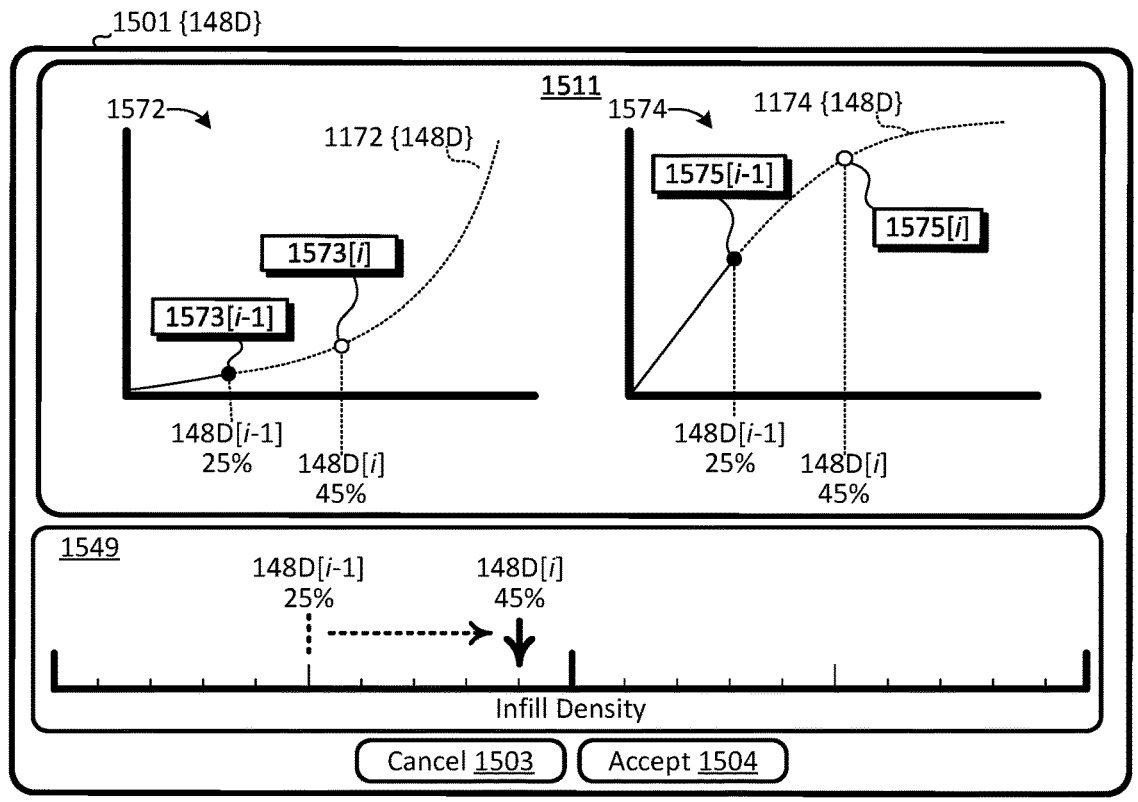

The AMC OPT UI 1500 may be further configured to invoke a parameter UI 1502 in response to user interaction with the corresponding parameter modification control UI 1449. The parameter UI 1502 may be configured to display information pertaining to a selected parameter 142 (and/or recommended AMC_PV 148). FIG. 15B illustrates an example of a parameter UI 1502. The parameter UI 1502 may include a model UI 1511 and an edit UI 1549. The model UI 1511 may be configured to display information pertaining to the parameter model 1042, GPC model 1044, and/or CSPM model 1046 determined for the parameter 142 (if any). The model UI 1511 may comprise a cost UI 1572 and a MU UI 1574. The cost UI 1572 may be configured to display information pertaining to a cost model 1172 determined for the parameter 142 and the MU UI 1574 may be configured to display information pertaining to a MU model 1174 determined for the parameter 142, as disclosed herein.

The edit UI 1549 may be configured to display information pertaining to the parameter 142 and/or AMC_PV 148 in one or more previous iterations, such as a previous iteration i−1 (AMC_PV 148[$i$−1]). The edit UI 1549 may be further configured to display information pertaining to the recommended AMC_PV 148 for the next iteration (i), which may be populated with a recommended AMC_PV 148 determined in the AMC OPT procedure 1340, as disclosed herein. The edit UI 1549 may be configured to receive user-submitted input to, inter alia, modify or set the AMC_PV 148 in the AMC 140[$i$].

In the FIG. 15B example, the parameter UI 1502 may be configured to display information pertaining to the infill density AMC_PV 148D (may comprise a parameter UI 1502 {148D}); the cost UI 1572 may be configured to display information pertaining to the infill density cost model 1172 {148D} and the MU UI 1574 may be configured to display information pertaining to the infill density utility model 1174{148D}. The edit UI 1549 may be configured to display the infill density AMC_PV 148D[i−1] utilized in the previous iteration i−1 (e.g., 25%) and a recommended AMC_PV 148D[i] determined for the next iteration i (e.g., 45%).

The model UI 1511 may be configured to display a cost metric UI 1573[$i$−1] comprising information pertaining to cost metric 172 of AMC 140[$i$−1] and a cost metric UI 1573[$i$] comprising predictions for the cost metric 172 in the candidate AMC 140[$i$] based, at least in part, on the selected infill density AMC_PV 148D[i] of the edit UI 1549 (e.g., predicted cost metric 172). The model UI 1511 may be further configured to display a MU metric UI 1575[$i$−1] comprising information pertaining to the MU metric 174 of the AMC 140[$i$−1] and a MU metric UI 1575[$i$] configured to display the MU metric 174 projected for the candidate AMC 140[$i$]. The predicted AMC metrics 170 may be determined in accordance with a cost model 1172 {148D} and/or MU model 1174{148D} determined for the infill density AMC_PV 148D, as disclosed herein.

The model UI 1511 may be configured to update projected AMC metrics 170 for the candidate AMC 140[$i$] in response to modifications to the AMC_PV 148D[i] submitted through the edit UI 1549 (e.g., through user interaction with the edit UI 1549).

The parameter UI 1502 may further comprise a cancel input 1503 and an accept input 1504. Selection of the cancel input 1503 may dismiss the parameter UI 1502 and set the AMC_PV 148[$i$] to one of the previous AMC_PV 148[$i$−1] and the recommended AMC_PV 148[$i$] in the AMC OPT UI 1500. Selection of the accept input 1504 may dismiss the parameter UI 1502 and set the AMC_PV 148[$i$] per the contents of the edit UI 1549. In the FIG. 15B example, selection of the cancel input 1503 may set the infill density AMC_PV 148D[i] to the previous infill density AMC_PV 148D[i−1] and selection of the accept input 1504 may set the infill density AMC_PV 148D[i] to the value set in the edit UI 1549.

As disclosed herein, the parameter UI 1502 may provide visual, easy-to-understand feedback regarding the predicted results for modifications to respective parameters 142.

In the FIG. 15B example, the model UI 1511 indicates that the proposed increase from the infill density AMC_PV 148[$i$−1] of 25% to an infill density AMC_PV 148[$i$] of 45% will result in a relatively small increase to the cost metric 172 and a relatively large increase to the MU metric 174. Based on this visual feedback, a user may be prompted to raise the infill density AMC_PV 148D to 45% (or higher) in the next iteration i of the IA procedure 1014.

Figure 15C:
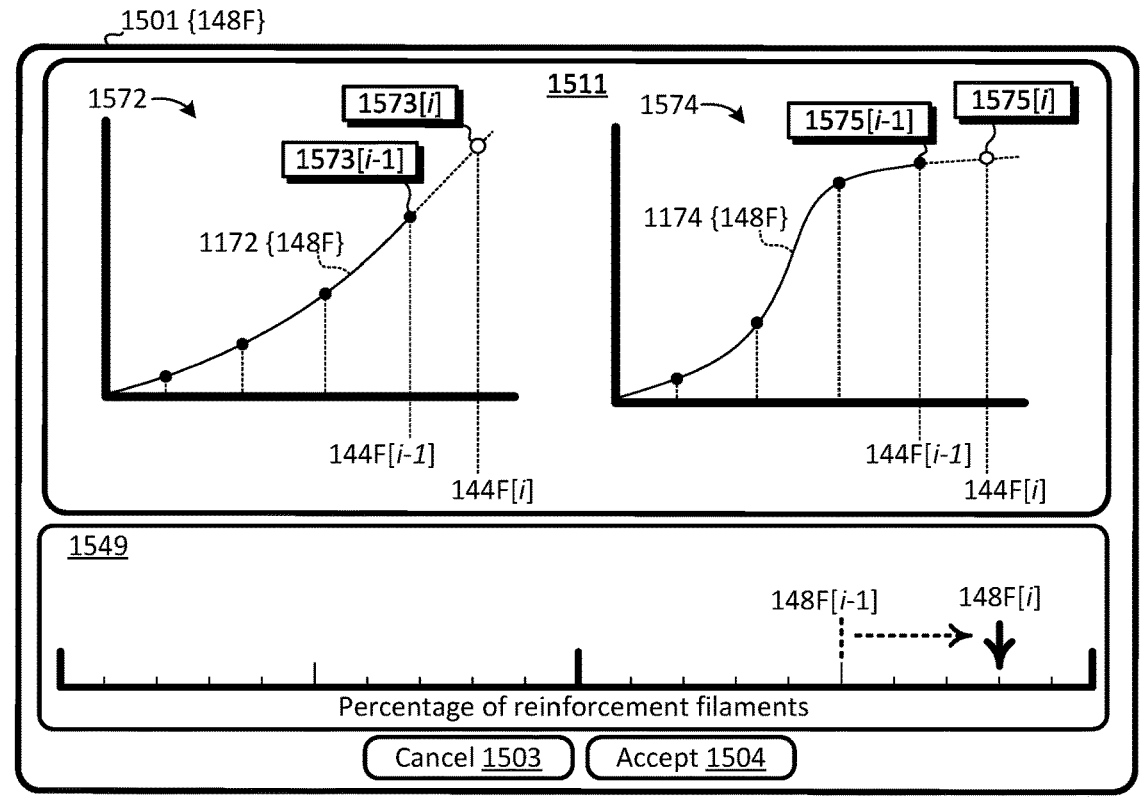

FIG. 15C illustrates another example of a parameter UI 1502. In the FIG. 15C example, the parameter UI 1501 is configured to display information pertaining to the percentage of reinforcement filaments AMC_PV 148F (may comprise a parameter UI 1502 {148F}). The edit UI 1549 may be configured to display the percentage of reinforcement filaments AMC_PV 148F[$i$–1] utilized in the previous iteration $i$–1 and receive a user-submitted AMC_PV 148F[$i$] for the next iteration $i$ of the IA procedure 1014.

The model UI 1511 may be configured to display information pertaining to one or more previous iterations (e.g., iteration $i$–1), as disclosed herein. The cost UI 1572 may display information pertaining to a cost model 1172 {148F} determined for the percentage of reinforcement filaments AMC_PV 148F and the MU UI 1574 may display information pertaining to a corresponding MU model 1174 {148F}.

As illustrated in the FIG. 15C example, the cost UI 1572 shows that the projected increase to the cost metric 172 for the proposed percentage of reinforcement filaments AMC_PV 148F[$i$] is relatively large while the projected increase to the MU metric 174 is relatively small (if any). Based on this visual feedback, the user may be dissuaded from implementation of the proposed modification to the percentage of reinforcement filaments AMC_PV 148F[$i$]. If further improvements to MU metric 174 are required (e.g., to satisfy AM_REQ 132 for the design 120), the user may be guided to modify other parameters 142 with more favorable PM metrics 1176 (as visually depicted in corresponding parameter UI 1501 {148} for the other parameters 142).

Conversely, the user may leverage the parameter UI 1501 to select parameters 142 to decrease in the next iteration $i$ of the IA procedure 1014. For example, one or more AMC_PV 148 may be reduced to, inter alia, determine whether AM_REQ 132 of the design 120 can be satisfied at a lower cost metric 172. In the FIG. 15C example, the visual feedback provided by the model UI 1511 may enable a user to recognize that decreasing the percentage of reinforcement filaments AMC_PV 148F[$i$–1] may result in a relatively large reduction in the cost metric 172 while producing a relatively small decrease in the MU metric 174. Based on this visual feedback, the user may select the percentage of reinforcement filaments AMC_PV 148F[$i$–1] to, inter alia, reduce the cost metric 172 of the resulting AM configuration [$i$] in the next iteration $i$ of the IA procedure 1014. The visual feedback provided by the recommendations and parameter modeling information presented in the parameter UI 1501 may, therefore, guide user interaction, thereby reducing subjectivity and/or user error that can occur in user-driven approaches.

Figure 15D:
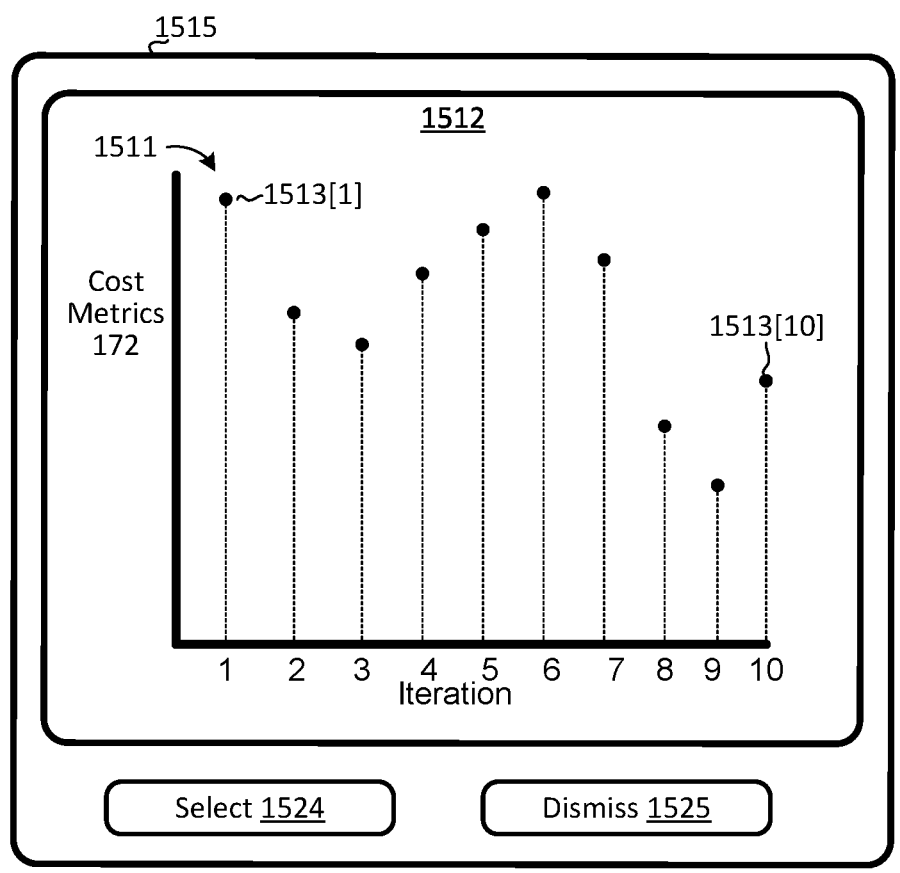

Referring back to FIG. 15A, in some implementations, the AMC OPT UI 1500 may further comprise a terminate input 1505. Selection of the terminate input 1505 may terminate the IA procedure 1014, as disclosed herein. The termination may comprise selection of a suitable or optimal AMC 140 for the design specification 122. The optimal AMC 140 may be selected from suitable AMC 140 identified in one or more iterations of the IA procedure 1014. The optimal AMC 140 may be selected from the set of suitable AMC 140 based on cost metrics 172, MU metrics 174, and/or other optimization criteria, as disclosed herein. In some implementations, selection of the optimal AMC 140 may incorporate user interaction. For example, selection of the terminate input 1505 may invoke display of a terminate UI 1515, as illustrated in FIG. 15D.

The terminate UI 1515 may be configured to display information pertaining to the IA procedure 1014, such as IA metadata 1016 and/or the like. The terminate UI 1515 may comprise a trend UI 1512, which may be configured to display historical and/or trend information pertaining to the IA procedure 1014. The information may be displayed in any suitable form. In the FIG. 15D example, the information may be displayed in a plot 1511. The plot 1511 may be configured display cost metrics 172 of suitable AMC 140 evaluated in one or more iterations of the IA procedure 1014. In the FIG. 15D example, the plot 1511 displays cost metrics 172 for 10 iterations (e.g., cost metrics 172 of suitable AMC 140[1] through 140[10]). The points 1513[$i$] displayed on the plot 1511 may represent the cost metrics 172 of the corresponding suitable AMC 140[$i$].

The plot 1511 may be configured the provide users with an easy-to-understand, graphical representation of the results of the IA procedure 1014. More specifically, an indication of whether further iterations are likely to yield additional improvements. The terminate UI 1515 may further comprise a select input 1524, which may be configured to allow a user to select the AMC 140[$i$] of a previous iteration as the optimal AMC 140 for the design specification 122 (as the output of the AMC analysis operation 1012). For example, the user may select the AMC 140[$i$] having the lowest cost metric 172 (e.g., select AMC 140[9]). The terminate UI 1515 may also include a dismiss input 1525, which may enable the user to continue to IA procedure 1014 (e.g., return to the AMC OPT UI 1500).

Referring back to FIG. 13C, the candidate AMC 140[$i$] determined in the AMC optimization procedure 1340 may be profiled and evaluated as illustrated in FIG. 13A and described herein.

Figure 13D:
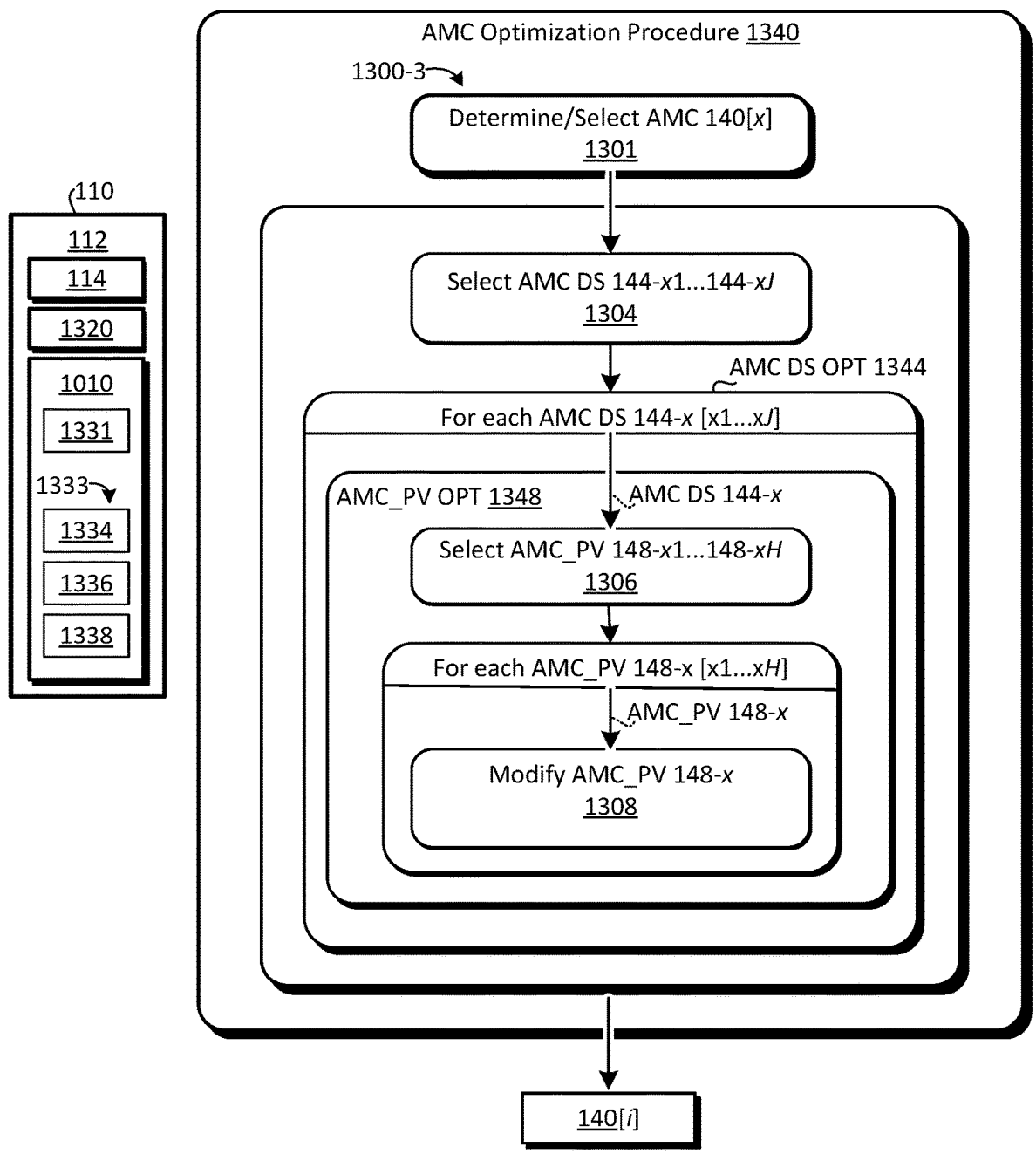

FIG. 13D illustrates another example of a design manager 110 configured to implement a method 1300-3 for an AMC OPT procedure 1340, as disclosed herein. The method 1300-3 may be configured to determine candidate AMC 140[$i$] configured to control AM of a design 120 at or within respective DU 121; in other words, an AMC 140[$i$] defined at a DU or $DU_{DUR}$ granularity level. The candidate AMC 140[$i$] in the FIG. 13D example may comprise V AMC DS 144, each configured to control AM at or within respective one of V DU 121 as illustrated in FIG. 6A.

The method 1300-3 may comprise determining and/or selecting an AMC 140[$x$] at 1301, as disclosed herein. At 1304, one or more AMC DS 144-$x1$ . . . 144-$xJ$ may be selected for modification, where [$x1$ . . . $xJ$] are selected from AMC DS 144-1 . . . 144-V of AMC 140[$x$]. The AMC DS 144 may be selected by use of AMC DS selection logic 1334. The AMC DS selection logic 1334 may select AMC DS 144 based on any suitable criteria. In a first non-limiting example, substantially all of the AMC DS 144 may be selected for modification at 1304 (e.g., AMC DS 144-$x1$ . . . 144-$xJ$ may correspond to AMC DS 144-1 through 144-V). In a second non-limiting example, AMC DS 144 may be selected on a random or pseudo random basis. In a third non-limiting example, where the AMC 140[$x$] fails to satisfy the AM_REQ 132 of the design 120, the AMC DS 144-$x1$ . . . 144-$xJ$ may be selected from AMC DS 144-1 through 144-V of AMC 140[$x$] that fail to satisfy AM_REQ 132 defined for corresponding DU 121 of the design 120 and/or are proximate or within a proximity threshold of DU 121 of such DU 121 (if any). In a fourth non-limiting example, where the AMC 140[$x$] satisfies AM_REQ 132 of the design 120, the AMC DS 144-$x1$ . . . 144-$xJ$ may be selected from AMC DS 144-1 through 144-V of AMC 140[$x$] having AMC_PV 148 (or cost metrics 172) that are higher than other AMC DS 144. In a fifth non-limiting example, selection and/or modification of the AMC DS 144-$x1$ . . . 144-$xJ$ may involve user interaction, as described in further detail herein.

The method 1300-3 may further comprise implementing an AMC DS OPT procedure 1344 on each AMC DS 144-$x1$ . . . 144-$xJ$ selected at 1304. The AMC DS OPT procedure 1344 implemented on each AMC DS 144-*x*1 . . . 144-*x*J (each AMC DS 144-*x*) may comprise selecting AMC_PV 148-*x*1 . . . 148-*x*H of the AMC DS 144-*x* for modification at 1306 and modifying the selected AMC_PV 148-*x*1 . . . 148-*x*H at 1308, as disclosed herein.

Figure 15E:
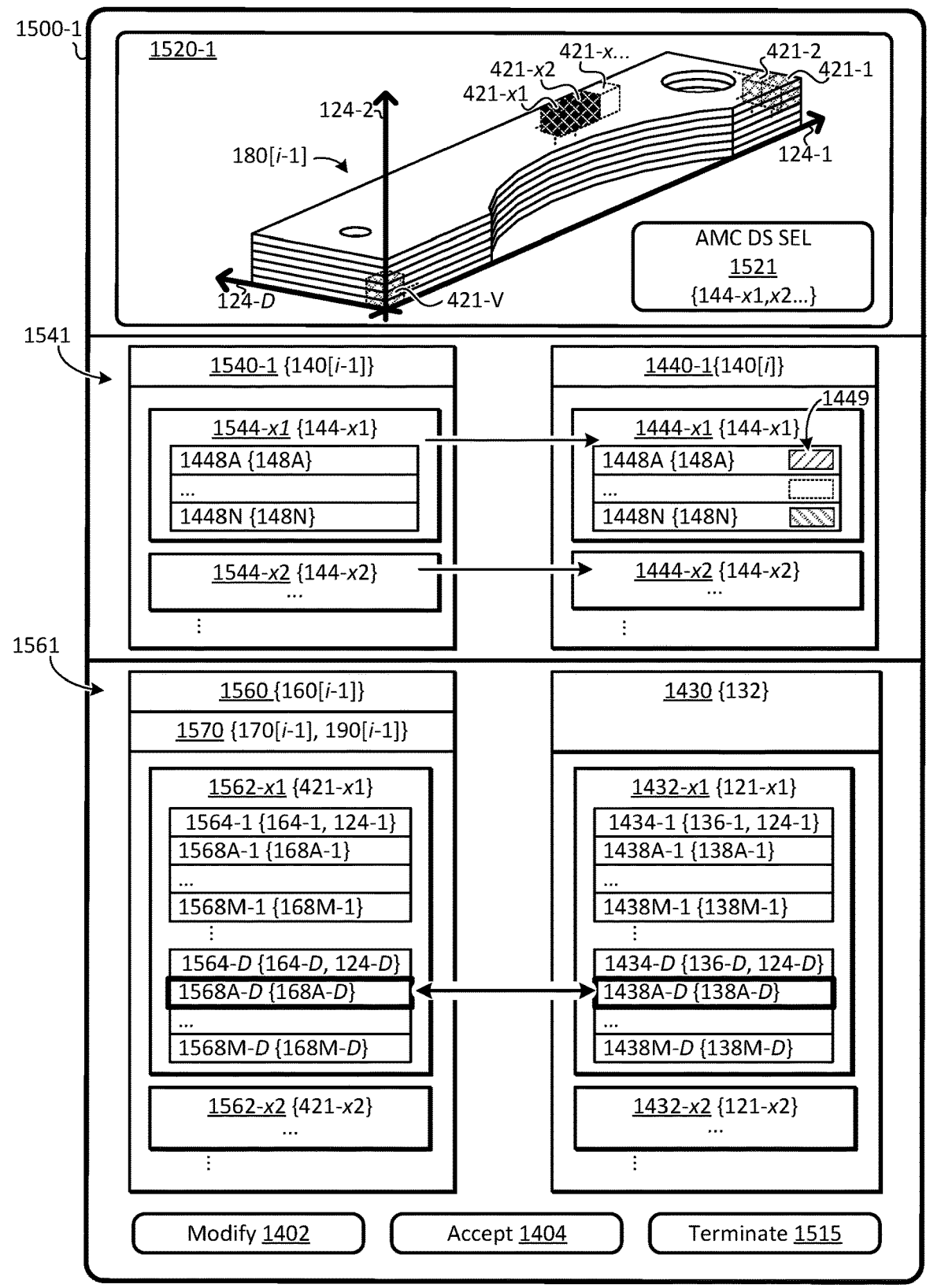

In some embodiments, 1304, 1306, and/or 1308 may involve user interaction. FIG. 15E illustrates an example of an AMC OPT UI 1500-2 configured to facilitate user interaction to select AMC DS 144-*x*1 . . . 144-*x*J for modification at 1304, and/or implement AMC DS OPT procedures 1344 on selected AMC DS 144-*x*1 . . . 144-*x*J, as disclosed herein.

In some embodiments, the AMC OPT UI 1500-1 may include a prototype UI 1520-1, which may be configured to display a graphical representation of the prototype 180[*i*−1] produced for the AMC 140[*i*−1] evaluated in the previous iteration of the IA procedure 1014. The prototype UI 1520-1 may be further configured to display information pertaining to DU 121 of the design 120 and/or corresponding AMR 421 of the prototype 180[*i*−1]. In some implementations, the prototype UI 1520-1 may provide for user selection of AMR 421 and/or DU 121 on the prototype 180[*i*−1], which may cause information pertaining to the selected AMR 421, DU 121 to be displayed in other portions of the AMC OPT UI 1500-1, as disclosed in further detail herein. Alternatively, or in addition, the AMC OPT UI 1500-2 may comprise an AMC DS SEL UI 1521 to further facilitate selection of the one or more AMR 421, DU 121. In some implementations, prototype UI 1520-1 and/or AMC DS SEL UI 1521 may be populated with the AMC DS 144-*x*1 . . . 144-*x*J selected in 1304 of the AMC OPT procedure 1340 illustrated in FIG. 13D.

The FIG. 15E example illustrates selection of AMR 421-*x*1, 421-*x*2, 421-*x* . . . , which may cause AMR 421-*x*1 and 421-*x*2 (corresponding to DU 121-*x*1, 121-*x*2) to be highlighted within the prototype UI 1520-1 and cause information pertaining to AMR 421-*x*1, 421-*x*2 and DU 121-*x*1, 121-*x*2 to be displayed within other portions of the AMC OPT UI 1500-1. For example, the candidate OPT UI 1541 may be configured to display previous AMC DC UI 1544-*x*1, 1544-*x*2, . . . , and corresponding AMC DS UI 1444-*x*1, 1444-*x*2, . . . , the evaluation UI 1561 may be configured to display AM_PROP UI 1562-*x*1, 1562-*x*2, . . . and corresponding AM_REQ UI 1432-*x*1, 1562-*x*2, . . . , and so on. The prototype UI 1520-1 may be further configured to identify AMC 421 in which the prototype 180[*i*−1] fails to satisfy AM_REQ 132 of the design 120 (if any) (not shown in FIG. 15E to avoid obscuring details of the illustrated examples).

The AMC OPT UI 1500-1 may comprise a previous AMC UI 1540-1, which may be configured to display information pertaining to the AMC 140[*i*−1] of the previous iteration (i−1) of the IA procedure 1014, as disclosed herein. In the FIG. 15E example, the previous AMC UI 1540-1 comprises AMC DS 144-*x*1 and AMC DS 144-*x*2, which may be configured to display information pertaining to the selected AMC DS 144-*x*1 and 144-*x*2, respectively.

The AMC OPT UI 1500-1 may further comprise a profile UI 1560-1 configured to display information pertaining to the profile 160[*i*−1] determined for AMC 140[*i*−1]. The profile UI 1560-1 may comprise a metric UI 1570, as disclosed herein. The profile UI 1560-1 may further comprise one or more AM_PROP UI 1562, each configured to display information pertaining to AM_PROP 162 of the AMC 140 [*i*−1] at or within a respective AMR 421-*1* through 421-V (or DU 121-1 through 121-V). In the FIG. 15E example, the previous AMC UI 1540-1 comprises AM_PROP UI 1562-*x*1 and AM_PROP UI 1562-*x*2 configured to display information pertaining to the AM_PROP 162 of the AMC 140[*i*−1] at or within the selected AMR 421-*x*1 and AMR 421-*x*2, as disclosed herein.

The AMC OPT UI 1500-1 may also include a REQ UI 1430 configured to display information pertaining to the requirements 130 of the design 120. The REQ UI 1430 may comprise one or more AM_REQ UI 1432, each configured to display information pertaining to the AM_REQ 132 for a respective DU 121 (and/or corresponding AMR 421). In the FIG. 15E example, REQ UI 1430 comprises an AM_REQ UI 1432 configured to display AM_REQ 132 for the DU 121 associated with the selected AMR 421, including an AM_REQ UI 1432-*x*1 configured to display AM_REQ 132 for DU 121-*x*1 and AM_REQ UI 1432-*x*2 configured to display AM_REQ 132 for DU 121-*x*2.

The AM OPT UI 1500-1 may be configured to highlight AM_PROP 162 that fail to satisfy AM_REQ 132 of the design 120 (and/or highlight unsatisfied AM_REQ 132). In the FIG. 15E example, the AM OPT UI 1500-1 indicates that the primary tensile PM_PROP 168A-D at AMR 421-*x*1 of the prototype 180[*i*−1] produced by AMC 140[*i*−1] fails to satisfy the primary tensile M_REQ 138A-D specified for DU 121-*x*1.

The AM OPT UI 1500-1 may further comprise an AMC UI 1440-1 configured to provide user access to the candidate AMC 140[*i*] for the current iteration (i) of the IA procedure 1014. The AMC UI 1440-1 may comprise one or more AMC DS UI 1444, each configured to provide access to a respective AMC DS 144 of the AMC 140[*i*]. The AMC DS UI 1444 may be initially populated with recommended AMC DS 144 determined for the AMC 140[*i*] as disclosed herein.

The AMC UI 1440-1 may be configured to provide access to AMC DS 144 corresponding to selected AMR 421 (or DU 121). In the FIG. 15E example, the AMC UI 1440-1 may comprise AMC DS UI 1444-*x*1 configured to provide access to AMC DS 144-*x*1 corresponding to AMR 421-*x*1 (DU 121-*x*1), AMC DS UI 1444-*x*2 configured to provide access to AMC DS 144-*x*2 corresponding to AMR 421-*x*2 (DU 121-*x*2), and so on. The AMC UI 1444 may comprise parameter modification controls 1449, as disclosed herein (e.g., selection of a parameter modification control UI 1449 may invoke a parameter UI 1501, as disclosed herein).

The AMC OPT UI 1500-1 may further include a modify input 1402, an accept input 1404, and terminate input 1505, as disclosed herein.

Referring back to FIG. 13D, the candidate AMC 140[*i*] determined in the AMC OPT procedure 1340, and/or user interaction with the AMC UI 1500-1, may be profiled and evaluated as illustrated in FIG. 13A and described herein.

Figure 13E:
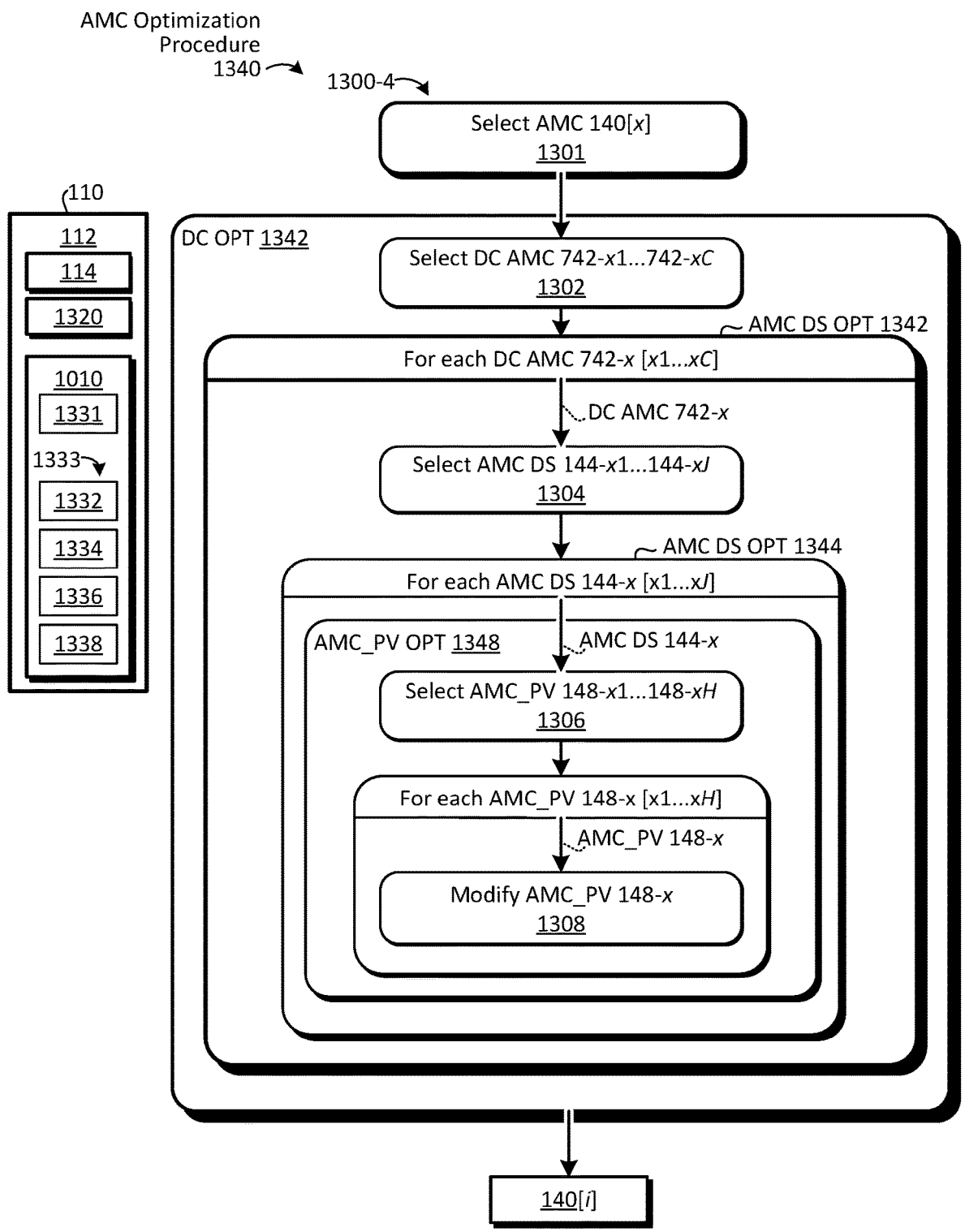

FIG. 13E illustrates another example of a design manager 110 configured to implement a method 1300-4 for an AMC OPT procedure 1340, as disclosed herein. The method 1300-4 may be configured to determine candidate AMC 140[*i*] configured to control AM of a hybrid design 120 comprising a plurality of DC 420, as disclosed herein (e.g., an AMC 140[*i*] defined at a DC-DU or DC-DU$_{DUR}$ granularity level). The candidate AMC 140[*i*] in the FIG. 13E example may comprise C AMC DC 742, each comprising a respective set of AMC DS 144 configured to control AM at or within respective DU 121 of the DC 420, as illustrated in FIG. 7A.

The method 1300-3 may comprise determining and/or selecting an AMC 140[*x*] at 1301, as disclosed herein. At 1302, one or more AMC DC 742 144-*x*1 . . . 144-*x*C may be selected for modification, where [*x*1 . . . xC] are selected from AMC DS 742-1 . . . 742-C of AMC 140[*x*]. The AMC DC 742 may be selected by use of AMC DC selection logic 1332.

The AMC DC selection logic 1332 may select AMC DC 742 based on any suitable criteria. In a first non-limiting example, substantially all of the AMC DC 742 may be selected for modification at 1302 (e.g., AMC DC 742-*x*1 . . . 742-*x*C may correspond to AMC DC 742-1 through 742-C). In a second non-limiting example, AMC DC 742 may be selected on a random or pseudo random basis. In a third non-limiting example, where the AMC 140[*x*] fails to satisfy the AM_REQ 132 of the design 120, the AMC DC 742-*x*1 . . . 144-*x*C may be selected from AMC DC 742 of the AMC 140[*x*] that fail to satisfy AM_REQ 132 defined for corresponding DC 420 of the design 120 (if any). In a fourth non-limiting example, where the AMC 140[*x*] satisfies AM_REQ 132 of the design 120, the AMC DC 742-*x*1 . . . 742-*x*C may be selected from AMC DC 742 of the AMC 140[*x*] having AMC_PV 148 (or cost metrics 172) that are higher than other AMC DC 742. In a fifth non-limiting example, selection and/or modification of the AMC DC 742-*x*1 . . . 742-*x*C may involve user interaction, as described in further detail herein.

The method 1300-4 may further comprise implementing an AMC DC OPT procedure 1342 on each AMC DC 742-*x*1 . . . 742-*x*C selected at 1302. The AMC DC OPT procedure 1342 implemented on each AMC DC 742-*x*1 . . . 742-*x*C (each AMC DC 742-*x*) may comprise selecting AMC DS 144 for modification at 1304 and implementing AMC DS OPT procedures 1344 on each selected AMC DS 144 at 1306 through 1308, as disclosed herein.

Figure 15F:
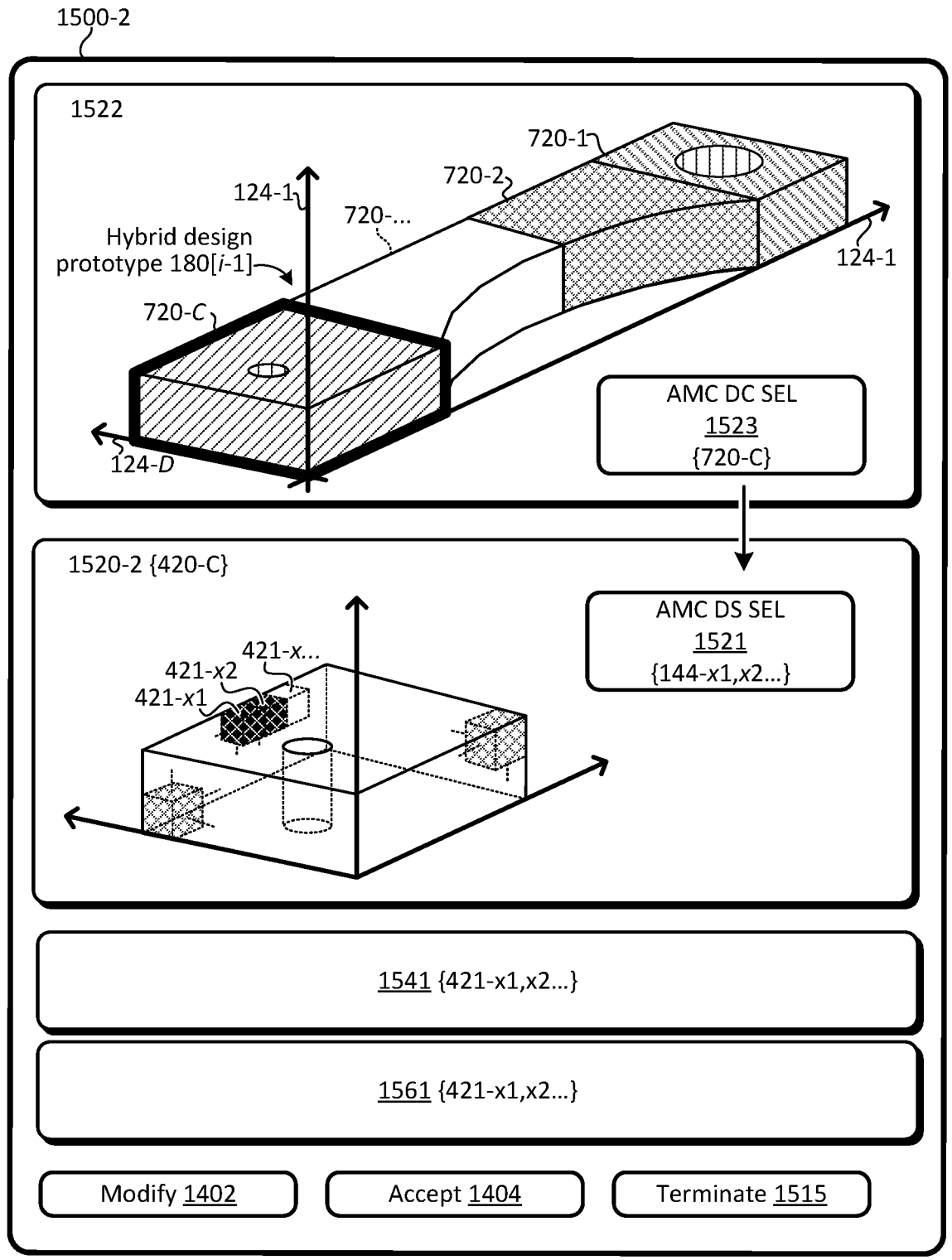

In some embodiments, 1302, 1304, 1306, and/or 1308 may involve user interaction. FIG. 15F illustrates an example of an AMC OPT UI 1500-3 configured to facilitate user interaction to select AMC DC 742-*x*1 . . . 742-*x*C for modification at 1302, and/or implement AMC DC OPT procedures 1342 on selected AMC DC 742-*x*1 . . . 742-*x*C, as disclosed herein.

The AMC OPT UI 1500-2 may comprise hybrid prototype UI 1522, which may be configured to display a graphical representation of the prototype 180[*i*−1] of the hybrid design 120 produced by the AMC 140[*i*−1]. The hybrid prototype UI 1522 may be further configured to display information pertaining to AM_DC 720 of the prototype 180[*i*−1] (and/or DC 420 of the hybrid design 120). In some implementations, the hybrid prototype UI 1522 may provide for user selection of AM_DC 720 on the prototype 180[*i*−1] (and/or DC 420 of the design 120), which may cause information pertaining to the selected AM_DC 720 to be displayed in other portions of the AMC OPT UI 1500-2, as disclosed in further detail herein. Alternatively, or in addition, the AMC OPT UI 1500-2 may comprise an AMC DC SEL UI 1523 to further facilitate selection of the one or more AM_DC 720 (and/or DC 420). In some implementations, prototype UI 1522 and/or AMC DC SEL UI 1523 may be populated with the AMC DC 742-*x*1 . . . 742-*x*C selected in 1302 of the AMC OPT procedure 1340 illustrated in FIG. 13E. The FIG. 15F example illustrates selection of AM_DC 720-C, which may cause AM_DC 720-C (corresponding to DC 420-C) to be highlighted within the prototype UI 1520-1 and cause information pertaining to AM_DC 720-C and/or DC 420-C to be displayed within other portions of the AMC OPT UI 1500-2. The prototype UI 1520-2 may be further configured to identify AM_DC 720 of the prototype 180[*i*−1] that fail to satisfy AM_REQ 132 of the design 120 (if any) (not shown in FIG. 15F to avoid obscuring details of the illustrated examples).

The AMC OPT UI 1500-2 may further comprise a prototype UI 1520-2. The prototype UI 1520-2 may be configured to display a graphical representation of a selected AM_DC 720 of the prototype 180[*i*−1]. The AM_DC UI 1520-2 may provide for selection of AMR 141 and/or DU 121 of the AM_DC 720, as disclosed herein. In the FIG. 15F example, the AM_DC UI 1520-2 is configured to display a graphical representation of AM_DC 720-C, per the selection of AM_DC 720-C in the hybrid prototype UI 1522.

The AMC OPT UI 1500-2 may further comprise a candidate OPT UI 1541 and evaluation UI 1561, as disclosed herein. The evaluation UI 1561 may comprise a profile UI 1560 configured to display information pertaining to the profile 160[*i*−1] determined for the AMC 140[*i*], including AM_PROP 162 of the selected AMR 421-*x*1, 421-*x*2, and so on; the evaluation UI 1561 may further comprise a REQ UI 1430 configured to display information pertaining to the AM_REQ 132 specified for the DU 121 corresponding to the selected AMR 421, as illustrated in FIG. 15E (profile UI 1560 and REQ UI 1430 not shown in FIG. 15F to avoid obscuring details of the illustrated examples).

The candidate OPT UI 1541 may comprise a previous AMC UI 1540 configured to display information pertaining to the AMC DS 144 for the selected AMR 421 (and/or DU 121) in the previous AMC 140[*i*−1] and a candidate UI 1440 configured to provide user access to the corresponding AMC DS 144 in the AMC 140[*i*] for the current or next iteration (i) of the IA procedure 1014, as illustrated in FIG. 15E (previous AMC UI 1540 and candidate AMC UI 1440 not shown in FIG. 15F to avoid obscuring details of the illustrated examples).

UI 1560 configured to display information pertaining to the profile 160[*i*−1] determined for the AMC 140[*i*], including AM_PROP 162 of the selected AMR 421-*x*1, 421-*x*2, and so on; the evaluation UI 1561 may further comprise a REQ UI 1430 configured to display information pertaining to the AM_REQ 132 specified for the DU 121 corresponding to the selected AMR 421, as illustrated in FIG. 15E (profile UI 1560 and REQ UI 1430 not shown in FIG. 15F to avoid obscuring details of the illustrated examples).

The AMC OPT UI 1500-2 may further include a modify input 1402, an accept input 1404, and terminate input 1505, as disclosed herein.

Referring back to FIG. 13E, the candidate AMC 140[*i*] determined in the AMC optimization procedures 1340 may be utilized in the current or next iteration (I) of the IA procedure 1014, as illustrated in FIG. 13A. More specifically, candidate AMC 140[*i*] determined in AMC OPT procedures 1340 illustrated in one or more of FIGS. 13B-13E may be profiled in respective AMCA procedures 960 and evaluated in respective evaluation procedures 1090, as disclosed herein.

The evaluation procedure 1090 may be configured to continue the IA procedure 1014 until one or more termination criteria 1015 are satisfied. The termination criteria 1015 may be determined and/or evaluated by the objective model 1022, as disclosed herein. Alternatively, or in addition, the termination criteria 1015 may comprise user-controlled criteria, such as the termination input 1515, disclosed herein.

As disclosed herein, in some embodiments, the AMC analysis logic 1010 may be configured to control the IA procedure 1014 in accordance with an optimization algorithm 1320. In these embodiments, the termination criteria 1015 of the IA procedure 1014 may be controlled and/or evaluated per the optimization algorithm 1320. Alternatively, or in addition, the IA procedure 1014 may be controlled by an AI/ML system 114, as disclosed herein. In these embodiments, the termination criteria 1015 may be controlled and/or evaluated by the AI/ML system 114.

As illustrated in FIG. 13A, the design manager 110 may be configured to populate the datastore 108 during implementation of the IA procedure 1014. Respective iterations of the IA procedure 1014 may result in respective entries 109, each entry 109 comprising the AMC 140 evaluated in the iteration and the profile 160 determined for the AMC 140. In the FIG. 13A example, the AMC analysis logic 1010 may have completed I iterations of the IA procedure 1014, which may result in recording entries 109-1 through 109-I within the datastore 108. The AMC analysis logic 1010 and/or AI/ML system 114 may utilize the entries 109-1 to develop parameter models 1042, GPC models 1044, CSPC models 1046, AI/ML profile models 1160, AI/ML CSPM models 1150, AI/ML AMC models 1190, and/or the like.

Figure 16:
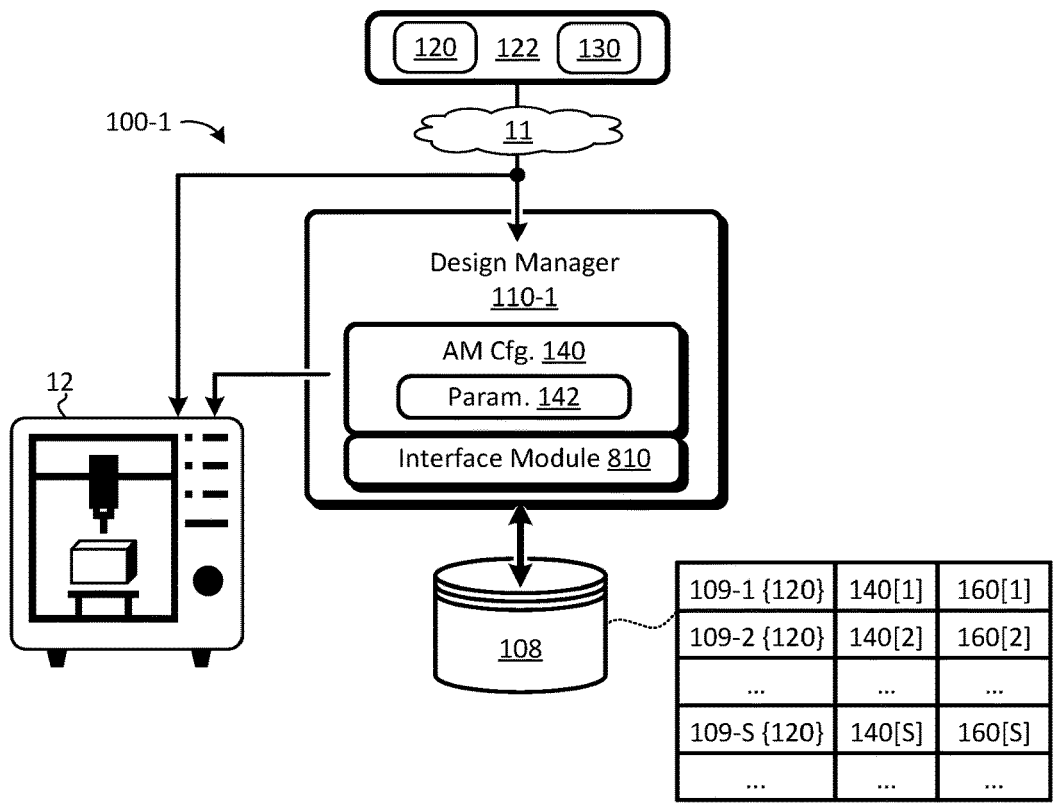
FIG. 16 illustrates an example of a system configured to manage AM processes by use of imported AM configuration data.

FIG. 16 is a schematic block diagram of another example of a system 100-1 for managing AM. In the FIG. 16 example, the system 100-1 comprises a design manager 110-1 and datastore 108, as disclosed herein. In the FIG. 16 example, the design manager 110-1 may not have the capability to profile AMC 140 (e.g., may not comprise and/or be coupled to an AMCA system 900). The design manager 110-1 may, therefore, rely on AMC 140 and profiles 160 determined by another source, such as another system 100 as illustrated in one or more of FIGS. 1A, 10A, 10B, and/or 13A.

In some embodiments, the design manager 110-1 may be configured import information pertaining to respective designs 120 (and/or design specifications 122). For example, the design manager 110-1 may be configured to import a plurality of entries 109 pertaining to a design 120, each entry 109 comprising a respective AMC 140 and known or predetermined profile 160. In the FIG. 16 example, the datastore 108 of the design manager 110-1 comprises S entries 109 for the design 120. The entries 109 may have been developed in one or more previously completed AMCA procedures 960, as disclosed herein. The design manager 110 of the system 100-1 may receive the entries 109-1 through 109-S through an electronic communication network 11 or other suitable means.

The design manager 110-1 may utilize the datastore 108 to determine suitable or optimal AMC 140 for the design 120 under different AM_REQ 132 (e.g., for respective design specifications 122). The design manager 110-1 may be configured to determine suitable or optimal AMC 140 as disclosed herein in conjunction with FIG. 8. Determining a suitable AMC 140 for a design specification 122 may comprise: a) retrieving entries 109 for the design 120 from the datastore 108, b) comparing profiles 160 of the retrieved entries 109 to requirements 130 of the design 120 (e.g., AM_REQ 132), and c) identifying AMC 140 having profiles 160 that satisfy the requirements 130. Determining an optimal AMC 140 for the design specification 122 may comprise a) identifying suitable AMC 140 for the design specification 122, and b) selecting a suitable AMC 140 from the identified suitable AMC 140 in accordance with an optimization criterion. In some implementations, the optimization criterion may correspond to AMC metrics 170 of the suitable AMC 140, as disclosed herein.

The design manager 110-1 may further comprise and/or be coupled to an interface module 810. The interface module 810 may be configured to communicatively and/or operatively couple the design manager 110-1 to an AMS 12. The design manager 110-1 may utilize the interface module 810 to configure the AMS 12 to implement the AMC 140 determined for the design specification 122, as disclosed herein.

FIG. 17 is a schematic block diagram illustrating another example of a system 100-2 for managing AM. In the FIG. 17 example, the design manager 110-2 may comprise an analysis module 112 and interface module 810, as disclosed herein. The design manager 110-2 may be communicatively and/or operatively coupled to an AMCA system 900, which may comprise and/or correspond to one or more virtual AMCA systems 900-1, physical AMCA systems 900-2, V/P AMCA systems 900-3, and/or the like. The design manager 110-2 may, therefore, be capable of analyzing, evaluating, and/or profiling AMC 140, as disclosed herein (e.g., may be capable of determining profiles 160 for respective AMC 140). In the FIG. 17 example, the design manager 110 is operatively and/or communicatively coupled to a physical AMCA system 900-2. In the interest of efficiency, among other factors, however, the design manager 110-2 may be configured to import entries 109 pertaining to a design 120 from a separate, external source, as disclosed herein (e.g., may import entries 109-1 through 109-S into NTS resources 105, such as a datastore 108). The design manager 110-2 may be further configured to determine suitable or optimal AMC 140 for design specifications 122 pertaining to the design 120 by use of the entries 109-1 through 109-S, as disclosed herein.

In some implementations, the design manager 110-2 may be further configured to determine feedback data 1750 for one or more AMC 140. For example, the design manager 110-2 may retrieve an AMC 140 for the design specification 122 from the datastore 108; in the FIG. 17 example, the design manager 110-2 may select the AMC 140[2] for the design specification 122. The design manager 110-2 may utilize the AMC 140[2] to control the manufacture of AMO 18 by the physical AMS 12-2, as disclosed herein.

In some embodiments, the design manager 110-2 may be further configured to determine feedback data 1750 for the AMC 140[2]. The feedback data 1750 may comprise a feedback profile 1760 determined for one or more of the AMO 18 (e.g., a feedback profile 1760[2] for the AMC 140[2]). The feedback profile 1740[2] may be produced through implementation of an MA procedure 964, as disclosed herein.

The analysis module 112 may be configured to evaluate the feedback data 1750. More specifically, the analysis module 112 may be configured to compare the feedback profile 1760[2] determined for the AMC 140[2] to the predetermined profile 160[2] of the AMC 140[2]. In some embodiments, the analysis module 112 may be further configured to update the entry 109[2] for the AMC 140[2] in accordance with the feedback profile 1760[2]. In a first non-limiting example, the analysis module 112 may determine an updated mechanical profile 160[2] for the AMC 140[2] based, at least in part, on the original profile 160[2] and the feedback profile 1760[2]. In a second non-limiting example, the updated profile 160[2] may comprise a combination of the original profile 160[2] and the feedback profile 1760[2]. In a third non-limiting example, the updated profile 160[2] may comprise an average or other aggregation of the original profile 160[2] and the feedback profile 1760[2]. In a fourth non-limiting example, the analysis module 112 may replace the original profile 160[2] with the feedback profile 1760[2]. In some implementations, the design manager 110-2 may be further configured to provide the feedback data 1750 to the source of the AMC 140[2]. For example, the design manager 110-2 may be configured to transmit feedback data 1750 to the separate, external system from which the entry 109[2] was received.

Figure 18:
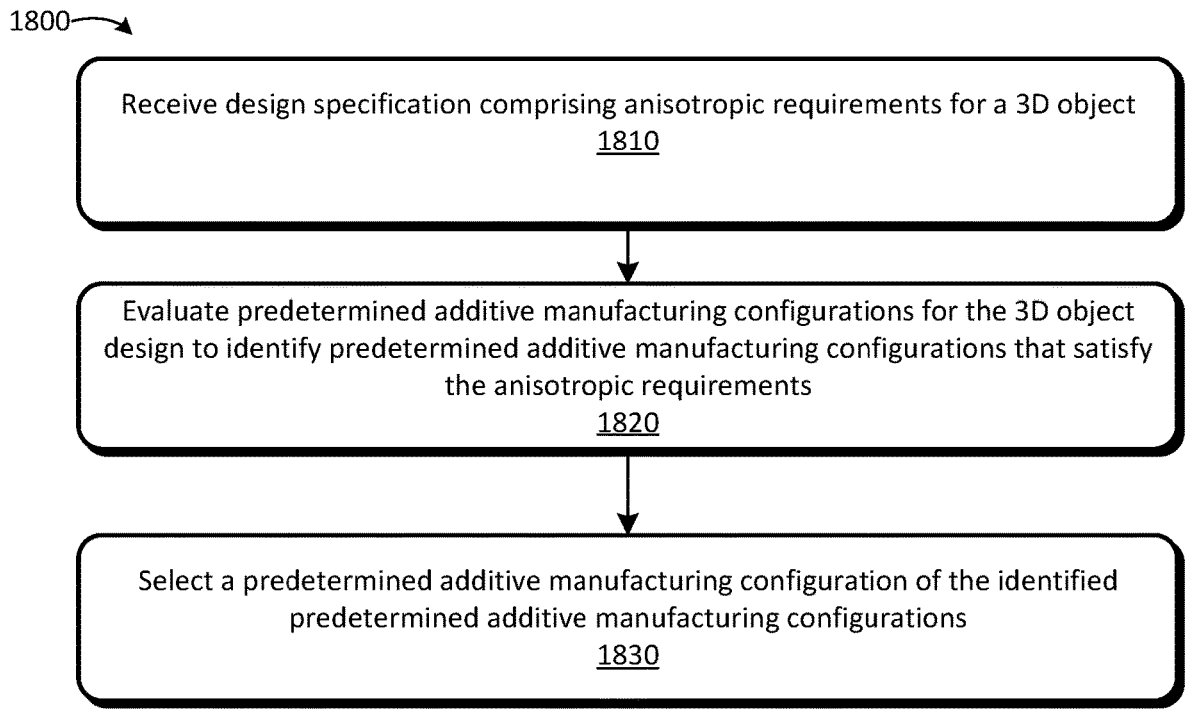
FIGS. 18-20 are flow diagrams illustrating examples of methods for managing additive manufacturing processes and/or systems.

FIG. 18 is a flow diagram illustrating an example of a method 1800 for managing AM. Step 1810 may comprise receiving a design specification 122, the design specification 122 comprising and/or referencing a design 120 and requirements 130, as disclosed herein. Step 1810 may further comprise determining and/or refining AM_REQ 132 for the design 120, as disclosed herein (e.g., based on the requirements 130 associated with the design 120).

Step 1820 may comprise evaluating predetermined AMC 140 for the 3D object design 120 to identify predetermined AMC 140 that satisfy AM_REQ 132 of the design 120. Step 1820 may comprise retrieving entries 109 pertaining to the design 120 from a datastore 108, as disclosed herein. The entries 109 may be configured to associate predetermined AMC 140 for the design 120 with determined profiles 160. The profiles 160 may comprise AM_PROP 162 for 3D object prototypes 180 produced in accordance with the predetermined AMC 140. Step 1820 may further comprise identifying suitable AMC 140 for the design specification 122, as disclosed herein. The suitable AMC 140 may comprise AMC 140 having AM_PROP 162 that satisfy the AM_REQ 132 of the design, as illustrated in one or more of FIGS. 5B, 6B, and 7B.

Step 1830 may comprise selecting a predetermined AMC 140 of the predetermined AMC 140 identified at step 1820. The selecting of step 1830 may be based on one or more of AMC metrics 170 of the identified AMC 140, e.g., cost metrics 172, MU metrics 174, and/or the like. In some implementations, step 1830 may comprise selecting an optimal AMC 140 for the design specification 122. In other words, step 1830 may comprise selecting an AMC 140 that satisfies the AM_REQ 132 of the design 120 at a minimal cost and/or a highest utility of the suitable AMC 140.

Figure 19:
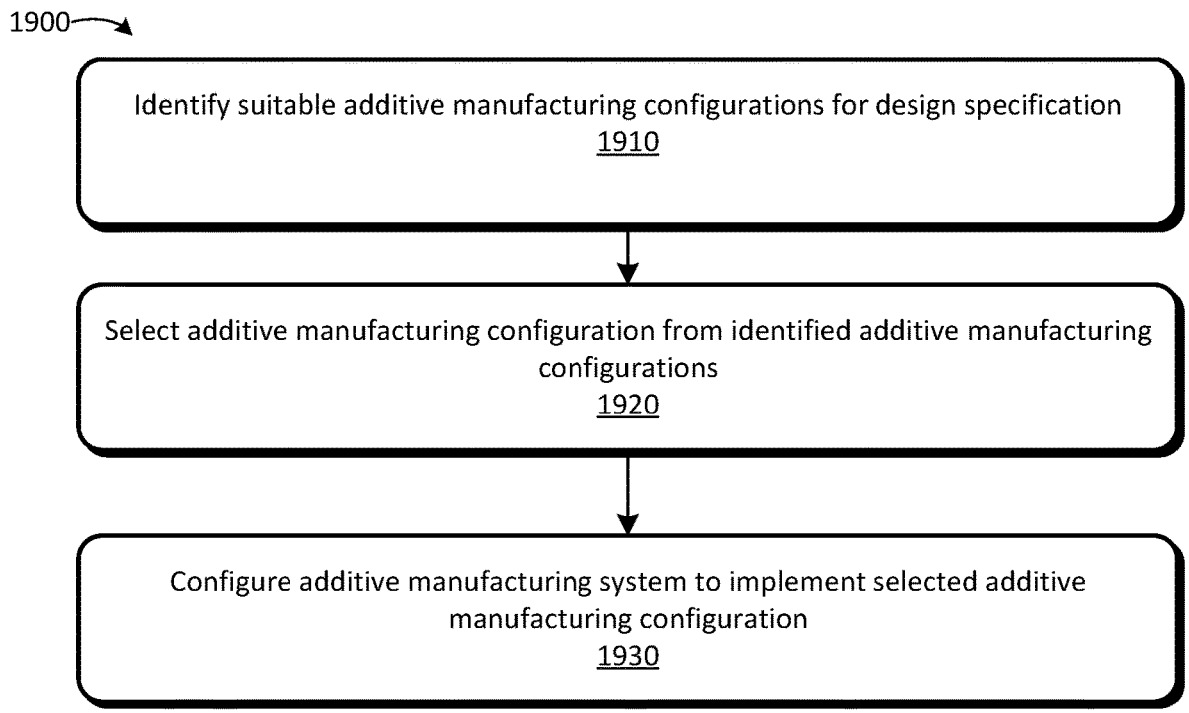

FIG. 19 is a flow diagram illustrating another example of a method 1900 for managing AM. Step 1910 may comprise identifying suitable AMC 140 for a design specification 122, as disclosed herein. Step 1920 may comprise selecting an AMC 140 from the identified AMC 140. The selecting may be based on AM metrics 170, such as cost metrics 172, MU metrics 174, and/or other optimization criteria. Step 1930 may comprise configuring an AMS 12 to implement the selected AMC 140. Step 1930 may comprise communicating data and/or instructions to the AMS 12 by use of an interface module 810, as disclosed herein. In response to the configuring of step 1930, the AMS 12 may implement one or more AM processes controlled per the selected AMC 140 to produce one or more AMO 18 of the design 120.

Figure 20:
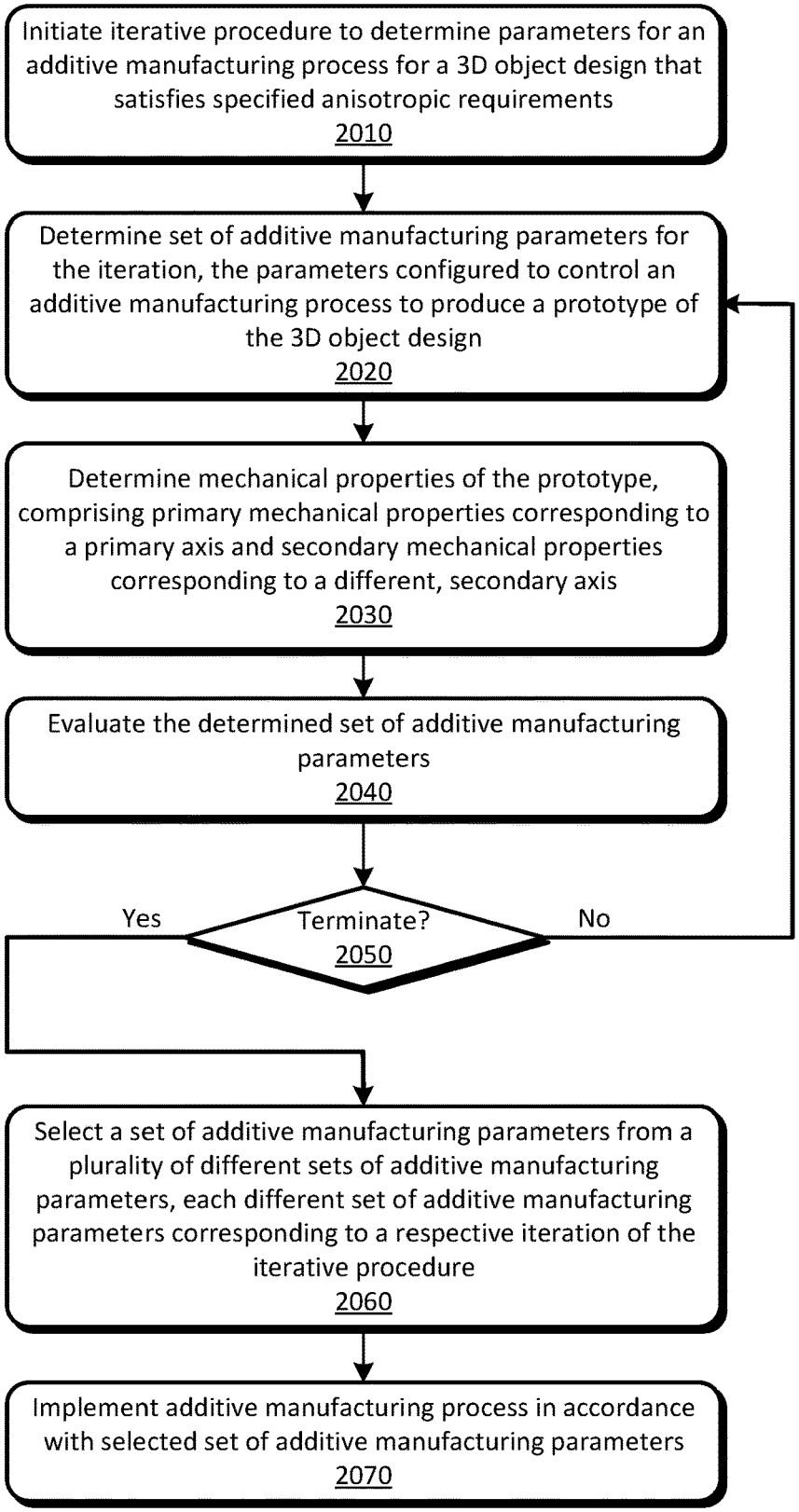

FIG. 20 is a flow diagram illustrating an example of a method 2000 for determining a suitable or optimal AMC 140 for a design specification 122. The method 2000 may comprise determining parameters 142 for an AM process to produce a 3D object design 120 that satisfies requirements 130 associated with the design 120, such as AM_REQ 132. The AM_REQ 132 may be configured to define M_REQ 138 with respect to a primary ODA 124-1 and M_REQ 138 for one or more secondary ODA 124-2 through 124-D. In some implementations, the AMC 140 for the design specification 122 may be determined in an AMC analysis operation 1012, which may comprise an IA procedure 1014, as disclosed herein.

Step 2010 may comprise initiating the IA procedure 1014. Step 2010 may comprise receiving a design 120 and corresponding requirements 130. Step 2010 may further comprise determining and/or refining AM_REQ 132 for the design 120, as disclosed herein.

Step 2020 may comprise implementing an iteration of the IA procedure 1014. Step 2020 may comprise determining a candidate AMC 140[$i$] for the iteration (I) (e.g., determining an AMC 140 comprising parameters 142). In a first non-limiting example, the candidate AMC 140[$i$] may be defined at a design granularity level and, as such, may comprise an AMC DS 144 configured to control AM of the design 120 as a whole. In a second non-limiting example, the candidate AMC 140[$i$] may be defined at a DU granularity level and, as such, may comprise a plurality of AMC DS 144, each configured to control AM of the design 120 at or within a respective DU 121. In a third non-limiting example, the candidate AMC 140[$i$] may be defined at a DC-DU granularity level; the AMC 140[$i$] may comprise AMC DC 742 configured to control the AM of respective DC 420 of a hybrid design, each AMC DC 742 comprising a respective set of AMC DS 144 configured to control AM at or within respective DU 121 of the DC 420.

The candidate AMC 140[I] for the first or initial iteration of the IA procedure 1014 may be determined in an AMC INI procedure 1041, as disclosed herein. The candidate AMC 140[$i$] for subsequent iterations ($i$>1), may be determined in an AMC OPT procedure 1340, as disclosed herein.

Step 2030 may comprise profiling the candidate AMC 140[$i$] determined at 2020. More specifically, step 2030 may comprise prototyping the AMC 140[$i$], performing prototype MA operations on the resulting prototype 180[$i$], and deriving a profile 160[$i$] for the AMC 140[$i$] based on the profiling. Step 2030 may comprise determining AM_PROP 162 and/or AMC metrics 170 for the AMC 140[$i$], as disclosed herein.

Step 2040 may comprise evaluating the candidate AMC 140[$i$] in view of the requirements 130 of the design 120. Step 2040 may comprise an evaluation procedure 1090, as disclosed herein. The evaluation procedure 1090 may comprise comparing the AM_PROP 162 of the AMC 140[$i$] to AM_REQ 132 of the design 120 as illustrated in one or more of FIGS. 5B, 6B, and 7B. The evaluation procedure 1090 may further comprise evaluating AMC metrics 170 of the candidate AMC 140[$i$], determining evaluation metrics 190 for the AMC 140[$i$], and so on, as disclosed herein.

Step 2040 may further comprise recording an AMC 140[$i$] and corresponding profile 160[$i$] in NTS resources 105 of the apparatus 101 (e.g., in an entry 109 of the datastore 108).

Step 2050 may comprise determining whether to terminate the IA procedure 1014. Step 2050 may comprise evaluating termination criteria 1015, as disclosed herein. If one or more termination criteria 1015 are satisfied the flow may continue at 2060; otherwise, a next iteration of the IA procedure 1014 may be implemented and the flow may continue at 2020.

Step 2060 may comprise selecting an AMC 140 from a plurality of different AMC 140, each AMC 140 corresponding to a respective iteration of the IA procedure 1014. The selecting of step 2060 may be based on one or more of AMC metrics 170 of the AMC 140, as disclosed herein. Step 2060 may comprise selecting an AMC 140 that satisfies AM_REQ 132 of the design 120 at a lowest cost or loss (per cost metrics 172 thereof).

In some implementations, the method 2000 may further comprise configuring a AMS 12 to implement an AMC 140 selected at 2060 to produce AMO 18 at step 2070. The AM process implemented by the AMS 12 may be controlled by the AMC_PV 148 defined by the selected AMC 140, as disclosed herein.

This disclosure has been made with reference to various exemplary embodiments. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

Additionally, as will be appreciated by one of ordinary skill in the art, principles of the present disclosure may be reflected in a computer program product on a computer-readable storage medium having computer-readable program code means embodied in the storage medium. Any tangible, non-transitory computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general-purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture, including implementing means that implement the function specified. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

While the principles of this disclosure have been shown in various embodiments, many modifications of structure, arrangements, proportions, elements, materials, and components, which are particularly adapted for a specific environment and operating requirements, may be used without departing from the principles and scope of this disclosure. These and other changes or modifications are intended to be included within the scope of the present disclosure.

The foregoing specification has been described with reference to various embodiments. However, one of ordinary skill in the art will appreciate that various modifications and changes can be made without departing from the scope of the present disclosure. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. As used herein, the terms "comprises," "comprising," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the claims.

We claim:

1. A system, comprising:
a processor coupled to a memory;
an additive manufacturing (AM) system operably coupled to the processor, the AM system configured to produce three-dimensional (3D) objects;
a datastore configured to store entries pertaining to a design for a 3D object, each entry configured to include a respective set of parameters for an AM process, the set of parameters configured to cause the AM system to produce the 3D objects to have designated mechanical properties; and
a design manager configured for operation on the processor, the design manager configured to:
determine a set of parameters that satisfy specified mechanical requirements for the 3D object, the specified mechanical requirements comprising anisotropic mechanical thresholds including primary mechanical thresholds pertaining to a primary axis and secondary mechanical thresholds pertaining to a secondary axis different from the primary axis, the primary axis including a direction along which a primary load is to be applied to the 3D object, the determined set of parameters based, at least in part, on parameters of one or more entries of the datastore;
wherein the anisotropic mechanical thresholds pertaining to the primary axis and the anisotropic mechanical thresholds pertaining to the secondary axis are different thresholds; and
cause the AM system to produce the 3D object according to the determined set of parameters.

2. The system of claim 1 wherein the secondary axis is perpendicular to the primary axis.

3. The system of claim 1, wherein the datastore comprises a plurality of entries pertaining to the design, the entries configured to associate respective AM configurations with mechanical properties determined for prototypes produced in accordance with the respective AM configurations.

4. The system of claim 3, wherein mechanical properties determined for a prototype comprise primary mechanical properties determined with respect to a primary axis of the prototype and secondary mechanical properties determined with respect to a secondary axis different from the primary axis.

5. The system of claim 4, further comprising an analysis module configured to compare the mechanical properties determined for respective prototypes to corresponding anisotropic mechanical thresholds of the mechanical requirements specified for the design.

6. The system of claim 3, wherein the design manager is further configured to identify an AM configuration that satisfies the specified mechanical requirements in response to comparing mechanical properties associated with respective entries of the plurality of entries with the specified mechanical requirements.

7. The system of claim 3, wherein the design manager is further configured to:

identify entries comprising mechanical properties that satisfy the specified mechanical requirements; and
select an entry from the identified entries based, at least in part, on cost metrics determined for the identified entries.

8. The system of claim 7, wherein the design manager is configured to determine a cost metric for an entry based, at least in part, on one or more of a material consumption, a manufacture time, a failure rate, and a prototype weight determined for the AM configuration of the entry.

9. The system of claim 3, further comprising an analysis module configured to determine a modified AM configuration for the design, wherein parameters of the modified AM configuration differ from parameters of the AM configurations stored in the datastore.

10. The system of claim 9, wherein the analysis module is further configured to store an entry within the datastore, the entry configured to associate the modified AM configuration with determined mechanical properties of a prototype produced in an AM process controlled by the parameters of the modified AM configuration.

11. The system of claim 9, further comprising a user interaction module configured to produce a user interface configured to display parameters of a recommended AM configuration determined for the design;
wherein the modified parameters determined are based, at least in part, on user-specified parameter values input through the user interface.

12. The system of claim 11, wherein the analysis module is configured to determine the parameters of the recommended AM configuration based, at least in part, on the specified mechanical requirements and one or more of the plurality of entries, wherein the parameters of the recommended AM configuration differ from the parameters of the entries within the datastore.

13. The system of claim 1, further comprising an interface module configured to cause the AM system to produce a 3D object in an AM process controlled by the determined set of parameters.

14. The system of claim 1, wherein the determined set of parameters is configured to specify one or more of a material type, an infill density, an infill geometry, a layer thickness, a percentage of reinforcement filaments, a distribution of reinforcement filaments, a laying direction, and a temperature of an AM process.

15. A method, comprising:
determining parameters for an additive manufacturing (AM) process to produce a three-dimensional (3D) object design that satisfies anisotropic mechanical requirements specified for the design, the anisotropic mechanical requirements comprising primary mechanical thresholds corresponding to a primary axis and secondary mechanical thresholds corresponding to a secondary axis different from the primary axis, the primary axis including a direction along which a primary load is to be applied to the 3D object; wherein the primary mechanical thresholds corresponding to the primary axis and the secondary mechanical thresholds corresponding to the secondary axis are different thresholds; wherein the determining comprises implementation of an iterative procedure, wherein an iteration of the iterative procedure comprises:
determining a set of AM parameters for the iteration, the parameters configured to control an AM process to produce a prototype of the 3D object design, determining mechanical properties of the prototype, comprising primary mechanical properties corresponding to the primary axis and secondary mechanical properties corresponding to the secondary axis, and
evaluating the determined set of AM parameters, the evaluating comprising comparing the determined primary mechanical properties of the prototype to the primary mechanical thresholds and comparing the determined secondary mechanical properties of the prototype to the secondary mechanical thresholds;
selecting a set of AM parameters from a plurality of different sets of AM parameters, each different set of AM parameters corresponding to a respective iteration of the iterative procedure; and
causing an AM system to produce the 3D object according to the selected set of AM parameters.

16. The method of claim 15, wherein the iteration further comprises recording an entry within a datastore, the entry configured to associate the set of AM parameters determined for the iteration with a mechanical profile comprising the determined mechanical properties.

17. The method of claim 15, further comprising determining a modified set of AM parameters for a next iteration of the iterative procedure, comprising modifying one or more parameter values of the set of parameters determined for the iteration based, at least in part, on the evaluating.

18. The method of claim 17, further comprising increasing the one or more parameter values in response to the evaluating indicating that the determined mechanical properties of the prototype fail to satisfy one or more thresholds of the anisotropic mechanical requirements.

19. The method of claim 17, further comprising decreasing the one or more parameter values in response to the evaluating indicating that the determined mechanical properties of the prototype satisfy the anisotropic requirements.

20. The method of claim 15, wherein the iteration further comprises:
generating a user interface comprising a set of recommended AM parameters; and
determining the set of AM parameters for the iteration based, at least in part, on user-specified parameter value received through the user interface.

21. The method of claim 20, further comprising determining the set of recommended AM parameters based on the anisotropic mechanical requirements specified for the design.

22. The method of claim 15, further comprising:
determining a cost metric for each set of AM parameters of the plurality of different sets of AM parameters, wherein the cost metric determined for a set of AM parameters is configured to quantify a cost associated with implementation of an AM process controlled by the set of AM parameters; and
selecting the set of AM parameters from the plurality of different sets of AM parameters based, at least in part, on cost metrics determined for the sets of AM parameters.

23. The method of claim 15, wherein the secondary mechanical thresholds correspond to at least two secondary axes of the 3D object.

24. A non-transitory computer-readable storage medium comprising instructions configured to cause a processor of a computing device to perform operations for managing additive manufacturing (AM), the operations comprising:
receiving a design specification, the design specification comprising anisotropic requirements for a three-dimensional (3D) object design;
evaluating predetermined AM configurations for the 3D object design to identify predetermined AM configurations that satisfy the anisotropic requirements, wherein evaluating a predetermined AM configuration comprises:
comparing primary mechanical properties determined for a prototype of the 3D object design to primary mechanical thresholds of the anisotropic requirements, wherein the primary mechanical thresholds correspond to a primary axis of the anisotropic requirements, the primary axis including a direction along which a primary load is to be applied to a 3D object according to the 3D object design, and wherein the prototype is produced in an AM process controlled by the predetermined AM configuration, and
comparing secondary mechanical properties determined for the prototype to secondary mechanical thresholds of the anisotropic requirements, wherein the secondary mechanical thresholds correspond to a secondary axis different from the primary axis; wherein the primary mechanical thresholds of the anisotropic requirements and the secondary mechanical thresholds of the anisotropic requirements are different thresholds;
selecting a predetermined AM configuration of the identified predetermined AM configurations; and
causing an AM system to produce the 3D object according to the selected predetermined AM configuration.

25. The non-transitory computer-readable storage medium of claim 24, wherein the secondary mechanical thresholds correspond to a plurality of non-dominant axes different from the dominant axis.

26. The non-transitory computer-readable storage medium of claim 24, wherein the predetermined AM configurations are associated with respective cost metrics, the cost metrics configured to quantify costs determined for AM processes controlled by the predetermined AM configurations, the operations further comprising, selecting the predetermined AM configuration based on cost metrics of the identified predetermined AM configurations.

27. The non-transitory computer-readable storage medium of claim 24, wherein the predetermined AM configurations are associated with respective utility metrics, the utility metrics configured to quantify a utility of the prototypes produced in AM processes controlled by the predetermined AM configurations, the operations further comprising, selecting the predetermined AM configuration based on utility metrics of the identified predetermined AM configurations.

* * * * *